United States Patent [19]
Jacoby

[11] 3,931,504
[45] Jan. 6, 1976

[54] ELECTRONIC DATA PROCESSING SECURITY SYSTEM AND METHOD

[75] Inventor: Edward A. Jacoby, Santa Clara, Calif.

[73] Assignee: Basic Computing Arts, Inc., Sunnyvale, Calif.

[22] Filed: Dec. 12, 1973

[21] Appl. No.: 424,014

Related U.S. Application Data

[63] Continuation-in-part of Ser. No. 224,152, Feb. 7, 1972, abandoned.

[52] U.S. Cl......... 235/153 R; 235/153 A; 340/172.5
[51] Int. Cl.² ..................... G06F 9/00; G06F 11/00
[58] Field of Search ................... 235/153 A, 153 R; 340/172.5; 444/1

[56] References Cited
UNITED STATES PATENTS

| | | | |
|---|---|---|---|
| 3,368,207 | 2/1968 | Beausoleil et al. | 340/172.5 |
| 3,566,362 | 2/1971 | Taylor | 340/172.5 |
| 3,573,855 | 4/1971 | Cragon | 340/172.5 |
| 3,745,316 | 7/1973 | Olah | 235/153 A |
| R27,251 | 12/1971 | Amdahl et al. | 340/172.5 |

OTHER PUBLICATIONS

D. K. Patrick, "File–Organized Security in a Real Time System", *IBM Tech. Disclosure Bulletin*, Sept. 1970, pp. 1030–1031.

*Primary Examiner*—David H. Malzahn
*Attorney, Agent, or Firm*—H. Ross Workman; J. Winslow Young

[57] ABSTRACT

A system and method for controlling the security of data in a central high speed data processing unit (CPU) by electronically sensing and comparing all operating or control statements coming into the CPU from terminal devices with a vocabulary of all statements unacceptable for security reasons which unacceptable statements are stored in a remote secondary computer system. The security of the data is also controlled by electronically sensing and comparing all operating and problem steps loaded into the CPU from library devices with a collection of identifiers known to identify all correct versions. The reaction to security dangers found in either sensing and comparing method is to exert predetermined counteraction to preclude unauthorized removal, alteration, destruction or inspection of problem data and/or procedures.

The system includes a plurality of sensors which monitor operating control statements, operating and problem steps or procedures and physical switches on the CPU control panel. The remote secondary computer analyzes the sensor output and responds by a predetermined counteraction which includes initiating an alarm and descriptive printout at a remote location and indicating the source and severity of any security violation. Further, the secondary computer may interrupt the CPU and drain any illegal control statements and prevent the loading of the operating process and problem steps.

20 Claims, 11 Drawing Figures

ELECTRONIC DATA PROCESSING SECURITY SYSTEM AND METHOD

BACKGROUND

Field of the Invention

This application is a continuation-in-part of applicant's copending application, Ser. No. 224,152, filed Feb. 7, 1972 now abandoned. The invention relates to a method and system for preventing unauthorized alteration, destruction, removal or reproduction of data stored or processed by a data processing unit and more particularly to a data processing security system which provides a control technique for sensing information entering into the CPU and comparing the information to developed standards. The comparison makes possible a determination by the secondary computer whether unauthorized or improper use of the CPU has been attempted so as to violate the security of the information therein and if such violation is detected, to take a predetermined counteraction to preclude alteration, destruction, removal or reproduction of information.

The Prior Art

The widespread use of computers which has developed in recent years has given rise to a growing body of information retained in computerized form, some of which has enormous value. businesses have taken a variety of steps to protect the integrity of their valuable information. Typically, computer centers are kept under constant television surveillance, computer rooms are sealed off to all except authorized personnel and round-the-clock security guards are posted at critical stations. All of these steps limit access to the computer but do not limit opportunity to appropriate information from a computer by various methods of remote access.

There are several ways in which data can be appropriated. The first technique is to tamper-change computer programs and swap them for the originals with the objective of misrepresenting actual transactions to the audit department. This technique accommodates draining bank accounts, payment of fictitious employees, purchasing non-existent or fraudulently expensive materials, crediting unpaid accounts, insuring nonentites and collecting damages and purchasing from illegitimate suppliers.

A second and more subtle method of obtaining valuable information without authorization is to request a work order for the computer to reproduce the confidential information in such a way that loss of the information cannot be detected. For example, the computer can be caused to copy confidential files onto separate disk packs during regular business operations so that the disk packs can be removed from the premises at any convenient time. Because the data still remains in memory in the computer, there is no indication that the data has been stolen unless the disk packs are discovered leaving the premises.

A third way in which data can be violated so as to cause injury to the owners is to gradually substitute false data and programs until enormous confusion exists. Factual data upon which contracts are bid can be altered so as to make it unable to compete in the marketplace.

Most of the existing auditing systems are virtually incapable of detecting tampering internal of the CPU. By way of example, a deck of punched cards requesting some routine computer operation can be delivered to the computer dispatch desk during regular working hours as is commonly done. The routine card deck could contain a second card deck which functions as a "plant". The cards are then placed into the card reader hopper and processed like any other work order.

The plant can then be removed from the collection bin. The result is that the computer program has been altered to include a processing step not otherwise recognized by company management.

Thereafter, when highly confidential information (e.g. on a magnetic disk) is read into computer memory for processing, the entire context of the confidential information can be recorded by copying it to a preselected section of one of the other disk packs on the handler. The second disk pack, now having the recorded confidential information thereon, can be easily removed from the computer area, leaving the original one to avoid detection.

In this instance, it is apparent that the opportunity to steal or tamper the data originates with a valid work order.

A variation on the plant is to administer modifications to computer programming while it is resident in the program library. Since programs are normally kept in stored files on disk packs, they are usually entered individually into the computer memory only when their turns comes to run. Modifications which alter the program permanently are called, in this specification, patches.

A practical way in which data tampering or alteration of the kind described above can be detected is through continuous electronic surveillance of the operating control statements. A number of attempts have been made recently to provide an electronic way of preventing central processing units from exceeding the bounds assigned to a problem process for security purposes. Most prior art devices are based upon the problems of simultaneous multiple processing within the same CPU such as where one problem process encroaches into the memory areas or terminal devices of a second causing destruction and failure of the second process. For example, see U.S. Pat. Nos. 3,368,207; 3,573,855; 3,371,744; 3,328,768; and 3,473,159.

While these devices serve a functional hardware purpose in modern computer technology, no present prior art system continually senses operating control statements. Rather, they sense encroachment across physical address boundaries (including memory addresses, terminal device addresses and library device addresses). Further, none of the known prior art devices accommodates comparing information with predetermined standards and reacting to prevent unauthorized alteration, removal, destruction and/or inspection of information.

BRIEF DESCRIPTION AND OBJECTS OF THE INVENTION

The present invention relates to precluding unauthorized removal, alteration, destruction and inspection of problem data and/or procedures in a CPU by monitoring operating control statements with a secondary computer system. Because data processing has come to require the performance of multiple processes in complex order within a short span of time (problem processing) a higher level or operating process has developed for control.

It is a feature of the present invention to achieve data processing security in the problem process by controlling the operating process. The controlling step includes monitoring information, comparing the information with predetermined standards and, in selected instances, following a predetermined counteraction plan.

It is, therefore, a primary object of the present invention to provide a novel data processing security system.

It is another primary object of the present invention to provide an improved method for controlling problem processing in a CPU to prevent unauthorized tampering of information.

One still further object of the invention is to prevent program changes without detection and to prevent undetected processing of forbidden operating control statements without authority.

It is a further important object of the present invention to provide a novel method for monitoring the operating process (OP) of a CPU.

These and other objects and features of the present invention will become more fully apparent from the following description and appended claims taken in conjunction with the accompanying drawigns.

DETAILED DESCRIPTION OF THE PREFERRED EMBODIMENTS

Reference is now made to the figures illustrating presently preferred embodiments of the invention, corresponding apparatus and parts thereof being identified with like numerals throughout.

THE OVERALL SYSTEM

Figure 1:
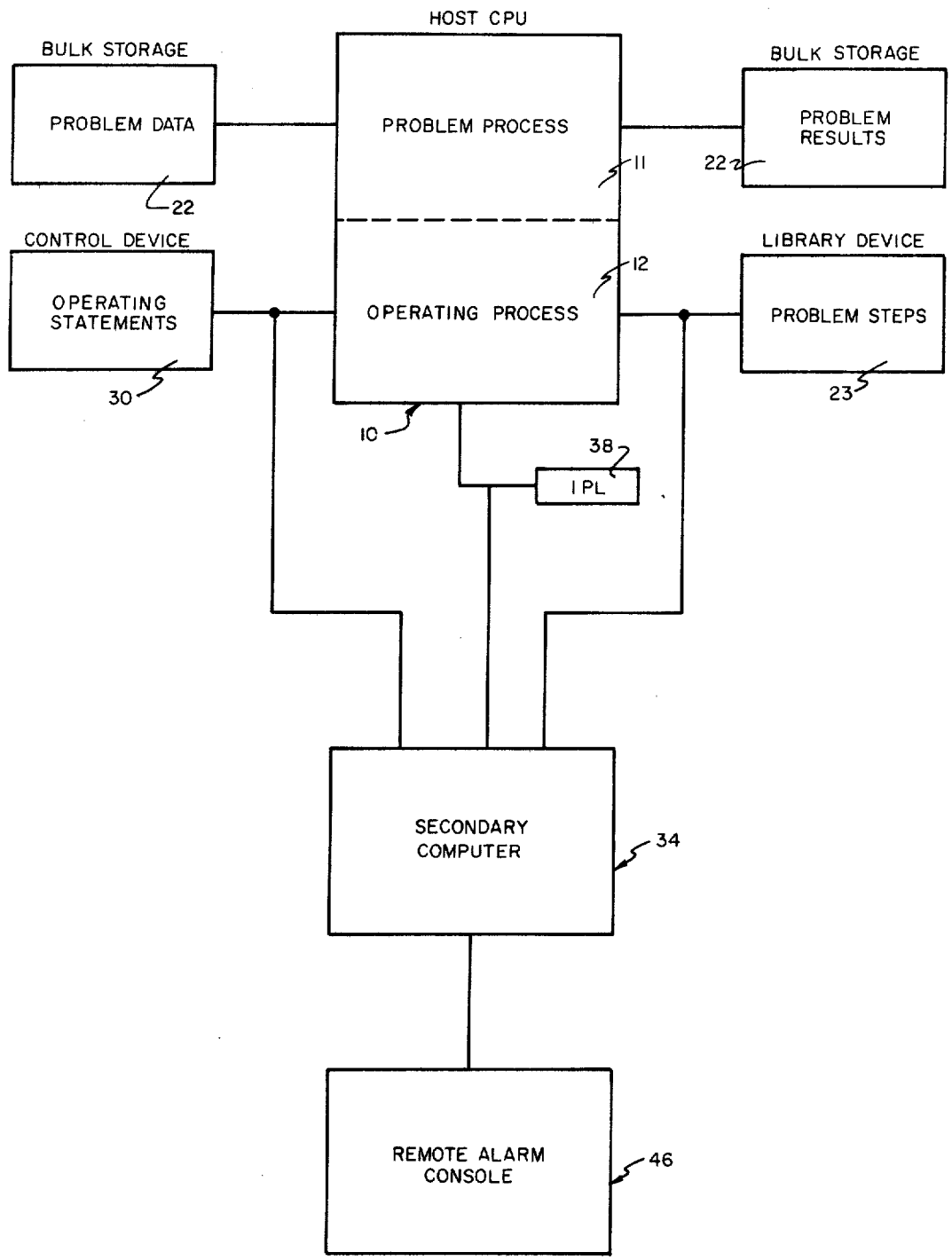
FIG. 1 is a functional block diagram of a general purpose digital computer and an associated security system.

Reference is now made to FIG. 1 which illustrates a host central processing unit (CPU) generally designated 10. The illustrated CPU has been schematically separated into its two principal operational subdivisions: the problem process 11 and the operating process 12. The problem process 11 serves the data processing function by transforming problem data in bulk storage 22, taken as input, into results representing the desired objective by predetermined steps. These objectives can then be stored in the same or different bulk storage, for reuse. Thus, the problem process 11 takes raw material (problem data input) and by predetermined steps accomplishes the objectives (problem results).

In the development of modern computer technology, it has become necessary in the problem process 11 to perform multiple processes in complex order within a very short span of time. In order to control the priority and scheduling of problem processes, an operating process 12 is included. In modern data processing systems, all problem processes must be governed by an operating process 12, which must be established first in the host CPU 10 by an initial program load (IPL) which will be susequently more fully described.

The operating process responds to information given in operating statements to determine the priority of problem processes, bulk storage needed, and the problem steps (e.g. programs) needed to accomplish the problem process, as described above. The operating statements originate at a suitable control device 30 which may include, for example, a card reader or an operator keyboard.

In this specification, problem steps means all computer oriented subtasks catalogued on the library device necessary to accomplish the objective of a problem process including computer instruction sequences, subroutines, programs and any and all combinations thereof and computer operating control statements, punctuation, and characters and any combination thereof. The problem steps are loaded from the library device 23 to implement the problem process 11. The objective of maintaining security in the problem process 11 is obtained by monitoring information at the operating process level.

Monitored information is analyzed by a secondary computer system generally designated 34. The secondary computer 34 is electronically coupled to the host CPU 10 so as to monitor all of the operating statements from control devices 30. In addition, the operating statements from control devices 30. In addition, the secondary computer is electronically coupled to the host CPU 10 so as to monitor and authenticate problem steps in the library device 23 prior to instituting any problem process.

The secondary computer 34 may interrupt the CPU and drain or ignore any illegal operating statements and prevent the loading of problem steps from the library device 23. Additionally, or, alternatively, if desired, where there has been a failure of comparison between operating statements or problem steps and a predetermined standard, the secondary computer 34 responds by initiating an alarm and a descriptive printout at a remote alarm console 46.

Figure 2:
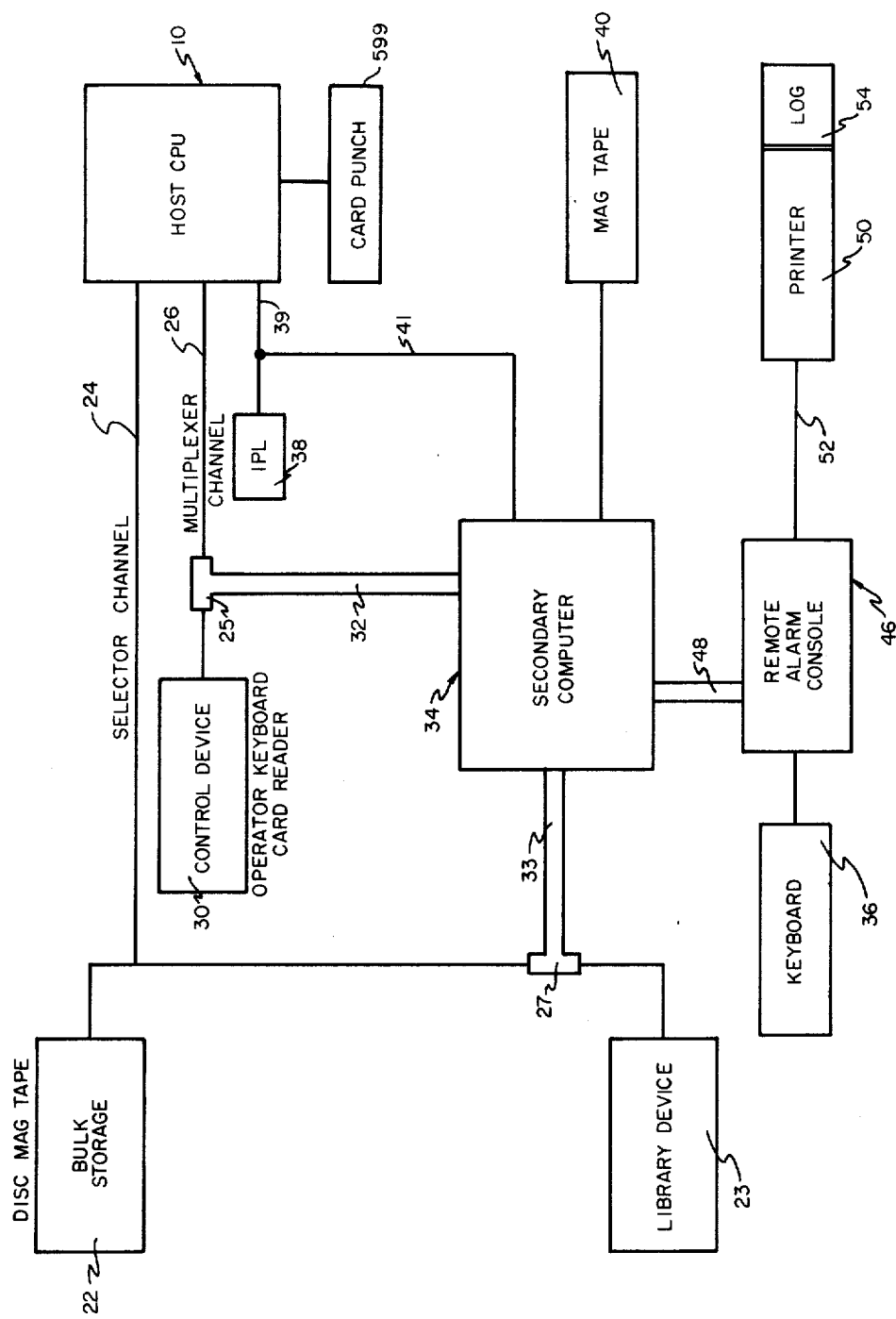
FIG. 2 is an interconnection diagram particularly illustrating interfacing between the host system and the security system.

Referring now to FIG. 2, the central processing unit (CPU) generally designated 10 is a host computer which may be any one of a variety of known units such as, for example, the IBM 360. Conventionally, the CPU host is connected to a bulk storage unit 22 which represents disk packs, magnetic tapes or other information storage devices. A library device 23 is illustrated connected to the CPU as a separate device to facilitate discussion or problem step monitoring as described in connection with FIG. 1, above. However, devices 22 and 23 could be located together. The bulk storage units and library device are connected by a selector channel 24 to the CPU so that information in the bulk storage unit can be retrieved or transmitted on command of the CPU.

In addition, the CPU is connected by a multiplexer channel 26 to at least one control device 30. Control device 30 includes any one of a variety of conventional apparatus such as a card reader or operator keyboard.

Operating statements in channel 26 and problem steps stored in library 23 are monitored by the secondary computer generally designated 34 at 25 and 27, respectively. If desired, information from the library device 23 could be received in the host 10 and communicated to the secondary computer 34 through line 32. Preferably, lines 32 and 33 are contained in a tamper-proof sheath so that signals in the channels are directed simultaneously to the CPU 10 and the secondary computer 34 without opportunity for alteration of the electronic signals.

The secondary computer 34 may be of any suitable variety, normally having a much smaller memory capacity than the CPU host 10. The PDP 11 manufactured by Digital Equipment Corporation has been found to be adequate. The IPL button 38 of the CPU initiates the operating process in the CPU through line 39. The electronic impulse from the IPL button is sensed by the secondary computer 34 through line 41.

The secondary computer 34 has a secondary or bulk storage unit 40 comprising a magnetic tape unit which may be, for example, the DEC tape units manufactured by Digital Equipment Corporation.

The secondary computer is also connected to an alarm console generally designated 46 by line 48 which is confined in a tamper-proof sheath to prevent tampering with signals between the secondary computer and the alarm console. It is presently preferred that a conventional printing unit 50 such as Model No. ASR33 manufactured by Teletype Corporation be connected through line 52 to the alarm console. The printer 50 will develop a printed log 54 which permanently registers events communicated from the secondary computer to the alarm console 46.

The keyboard 36 of the secondary computer 34 is preferably associated with the alarm console 46 for the purpose hereinafter more fully defined. The keyboard incorporated in the ASR33 manufactured by Teletype Corporation has been found suitable.

HOST SECONDARY COMPUTER INTERFACE

Figure 3:
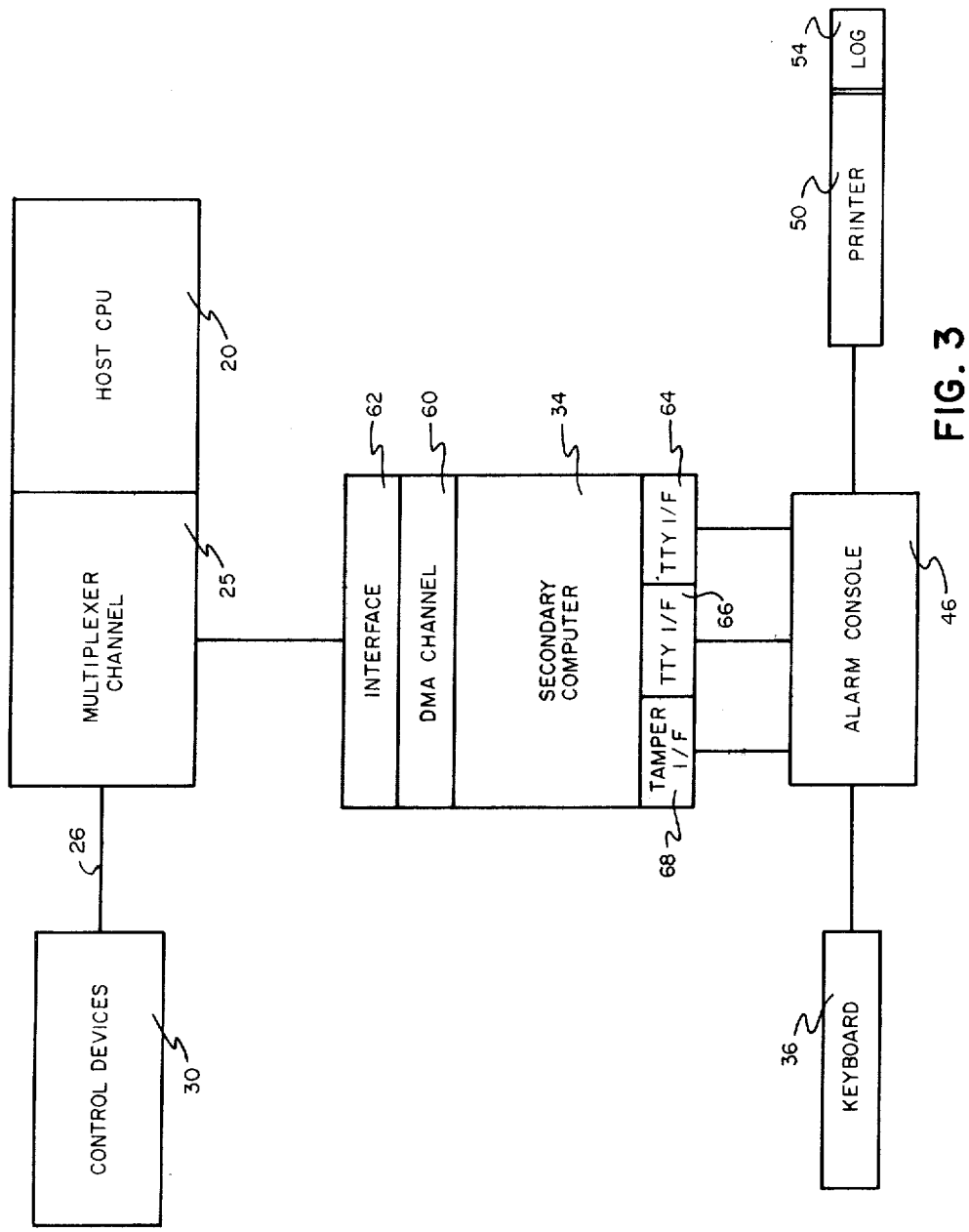
FIG. 3 is an interconnection diagram particularly illustrating interfacing hardware within the security system.

In the illustrated embodiment, an IBM 360 is interfaced to a PDP 11 as illustrated in FIG. 3. More specifically, the PDP 11 (secondary computer 34) is conventionally provided with a direct memory access (DMA) channel 60 which is, in turn, electronically coupled into interface 62. Interface 62, for the illustrated embodiment, may be the Peri-Phonics model IU 360 or a suitable equivalent. The interface is also coupled to the multiplexer channel 25 forming part of the CPU host 20. As has been heretofore described, the multiplexer channel is also connected to control devices 30.

With continued reference to FIG. 3, the secondary computer 34 is interfaced to the alarm console 46 with teletype interfaces 64 and 66 and tamper interrupt interface 68. Teletype interfaces 64 and 66 are conventional and, for example, are manufactured by Digital Equipment Company to make electronic connection with the ASR33 Teletype made by Teletype Corporation. The information transferred between the secondary computer 34 and the alarm console 46 is transferred bit serially. Teletype interface 64 operates at the usual 10 characters per second (CPS) transfer rate. However, the teletype interface 66 is simply modified to operate at 100 characters per second, a much higher rate than normally encountered with a teletype. The modification is easily accomplished by substituting higher rate oscillators for the 10 CPS oscillators in interface 64.

Figure 4:
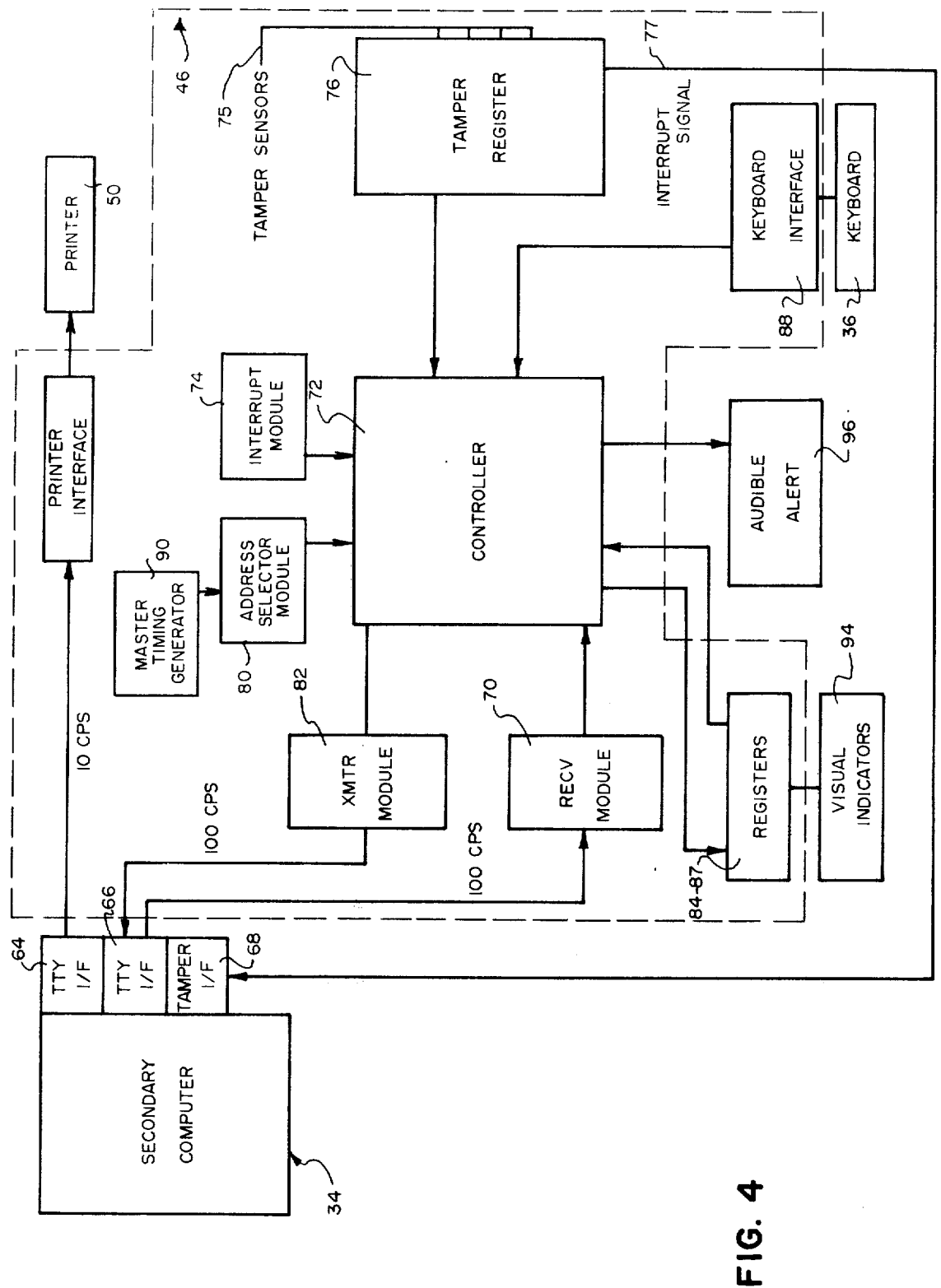
FIG. 4 is a detailed interconnection diagram of the modules within the alarm console of the security system.

Information transferred from the secondary computer 34 to the alarm console 46 is received by a serial to parallel interface forming part of the receiver module 70 illustrated in FIG. 4. This loads registers 84–87 under control of controller 72. Every register except 85 has a corresponding visual indicator 94 that is illuminated when the bit is set. When sending information to a particular register or module (as hereafter more fully described) any address byte is sent first, followed by a data byte. The data byte is routed according to the last address byte received by the controller. This sequence is shown best in FIG. 5.

Figure 5:
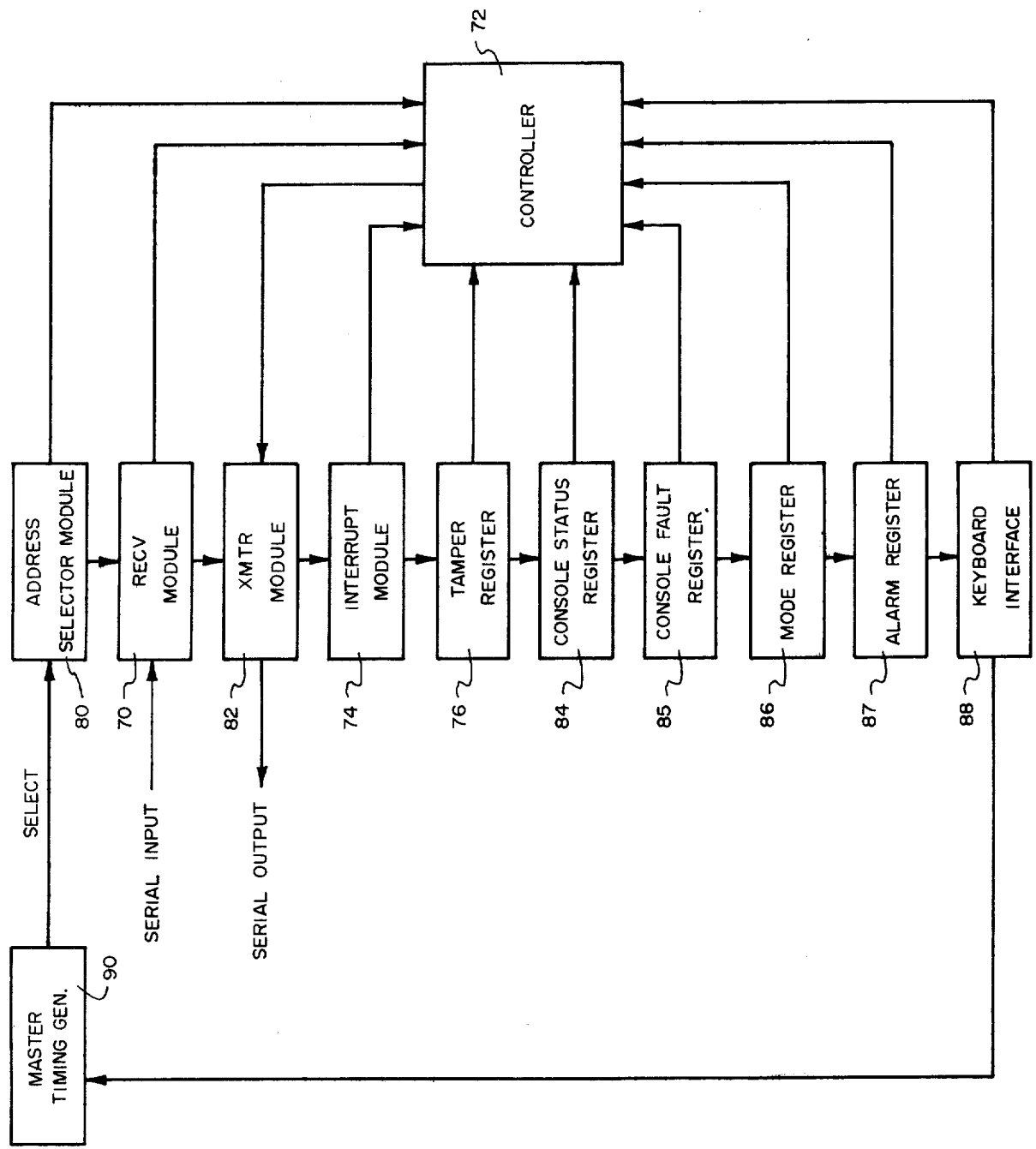
FIG. 5 is a timing chart representing the queuing sequence for electronic modules and registers under ther supervision of the controller within the alarm console of the security system.

In general, information transmitted to the secondary computer 34 (FIG. 4) by the transmitter module 82 will be from the operator keyboard 36 through the controller 72 to the transmitter module 82. This information will be in the form of an ASCII character, as in the usual teletype transfer. However, certain ASCII characters have been pre-empted for special purposes. For example, the ASCII character for ? is used to mean that the secondary computer is requested to read the console status register 84 (FIG. 5). Information contained in this register 84 informs the secondary computer 34 the nature of a requested operation.

In addition, the alarm console contains a tamper register 76 (FIGS. 4 and 5), the binary contents of which can also be sent to the secondary computer.

In this embodiment, a plurality of tamper-sensors 75 has been provided for connection at a variety of locations, the actual number of available sensors being determined by the size of register 76. If any of the sensors trigger because of tampering with the sensor connection, an appropriate bit pattern appears in tamper register 76 and an immediate interrupt signal is energized through line 77 to tamper interface 68. The response of the secondary computer is to request (by sending a request command to receiver module 70) the binary contents of the tamper register to be transmitted through controller 72 and transmitter module 82 for determination of the cause of the tamper condition.

The controller 72 operates by passing a "select" timing signal through each device which can accept or transmit data or control bytes. priority is determined by position in the daisy chain connection of modules and registers illustrated in FIG. 5. In order of priority, the address selector module 80 is followed by the receiver module 70, the transmitter module 82, the interrupt module 74, tamper register 76, console status register 84, console fault register 85, mode register 86, alarm register 87 and keyboard interface 88. Registers 84–87 are illustrated as a single block in FIG. 4. When the select signal reaches a module or register, it can seize control and prepare to transmit information, or raise an "allow send" signal and prepare to receive information. It is clear from reference to FIG. 4, that certain modules can only transmit data and some can only receive. Once a module receives the select signal and has a request, it can seize control. When control is seized, the select signal is reset and a timing sequence is initiated by the master timing generator 90 (FIG. 5) to provide a transfer pulse followed by a reset pulse to prepare all modules and registers for another cycle.

Information transferred from the alarm console 46 to the secondary computer 34 is first passed through the transmitter module 82 (FIGS. 4 and 5) which comprises a parallel to serial converter so that the output from the transmitter module 82 is serial.

In summary, the input information to the alarm console 46 can be received from several sources. More specifically, the alarm console can receive serial information into its receiver module 70 directly from the secondary computer 34. The alarm console 46 can also receive a byte in parallel from keyboard 36 (FIG. 4) which makes the information available in parallel form through the interface 88. Finally, tamper sensors are connected into the tamper register 76. An appropriate bit pattern appears in this register and an interrupt signal is communicated through 77 to the interface 68 of the secondary computer 34. The response of the secondary computer to this interrupt is to read the tamper register over the serial lines to the interface 66 to determine the cause of the interrupt.

Outputs from the alarm console 46 can exit in three ways. First, the serial output to the seondary computer 34 through the transmitter module 82 transfers information contained in the registers 84-87 as well as tamper and keyboard information from the register 76 and keyboard 36, respectively. Secondly, outputs from the alarm console 46 can be transferred to the visual indicators 94 (shown more particularly in FIG. 11). Finally, the audible alert alarm 96 can be sounded by output from the alarm console 46.

DECONTAMINATION OF THE HOST COMPUTER

In order to obtain the objective of preventing the unauthorized alteration, removal, destruction or inspection of problem data and/or steps in the host computer, it is necessary first to establish a decontamination of the host 10. This can be accomplished by examining the operating process 12 (FIG. 1) of the host and performing a comparison test against a known base copy of the operating process. Next, each problem step is compared against a known base copy. The decontamination procedure detects the presence of any plant or patch or other alteration in the host memory and library devices and establishes a clean base for monitoring subsequent transactions of the host 10.

The decontamination of the host 10 is not valid if the host itself performs the comparison because the comparing program is subject to unauthorized alteration. Accordingly, the secondary computer 34 is used to decontaminate the host CPU. The secondary computer is connected strategically to the multiplexer channel of the host and would require a base copy of the host operating process for comparison. The base copy must not be vulnerable to substitution itself, which means that it would have to be held within the secured memory of the secondary computer 34. Where the memory capacity of the secondary computer is small, however, it is observed that this is a physical impossibility because of the great size of the operating process of the host. Therefore, a technique called "checksum" may be used to compact the base copy into a unique statistical base that can always be calculated from the base copy.

CHECKSUMS

The term "checksum technique" is defined herein to mean a control technique for authenticating the legitimacy of a structurally complex arrangement having a measurable number of subdivisions. The checksum technique is performed by sensing the order of predetermined collections of subdivisions and comparing this order with a statistical summary of the expected base copy. The collection or accumulation of subdivisions is called herein "checksum" or sometimes "statistic". The checksum technique can best be understood by referring to an example of proving that a book is unaltered from its first published state. Without being able to compare the book word for word, the assignment at first seems impossible. However, suppose the book is considered an arrangement of words, each having a measurable number of letters. The order of words can be statistically captured by accumulating the number of letters in every 50 words in a finite accumulator register subject to overflow. If the words are accumulated in a different order, random mix of words will cause different filling and overflow conditions. Each sum of the letters in 50 words represents a statistical base or checksum in the summary of the expected base copy of the book. Where the sum of the letters exceeds the register capacity, the sum will be decreased by the amount of overflow. Clearly, if the book is longer than 50 words, there will be more than one checksum statistic for the book. The last checksum statistic covers whatever odd number of words are left over after the groups of 50 are removed. Thereafter, any copy of the book can be obtained and the letter count of the words accumulated in the accumulator register. If exactly the same checksums result, the probabilities that the book has not been altered are extremely high. This is particularly true if someone attempting to change the book copy without detection did not know how the statistics were counted (i.e. the number of words in each collection).

Computer problem steps are complex arrangements (of bytes) which, for purposes of this example, are similar to books. It is possible to accumulate checksums made from base copies of problem steps and operating processes of the host computer even in a small computer. The checksums are, for example, the accumulated number of information bits in a predetermined set number of bytes, possibly decreased by any overflow resulting from the finite capacity of the accumulator register. To perform the checksum technique, a questionable copy taken from the library device during initial program load (IPL), as will be subsequently more fully described, is resubjected to the same statistical analysis by the secondary computer as was applied to the base copy. If differences are found, an illegitimate copy is assumed and a predetermined counteraction may be initiated.

The checksum technique is performed by the secondary computer after any regeneration of the host operating process 12 or problem steps 23 (FIG. 1) in order to compute new statistical bases which are retained in a collection called sum file. The sum file must be kept secure from alteration or inspection.

Figure 6:
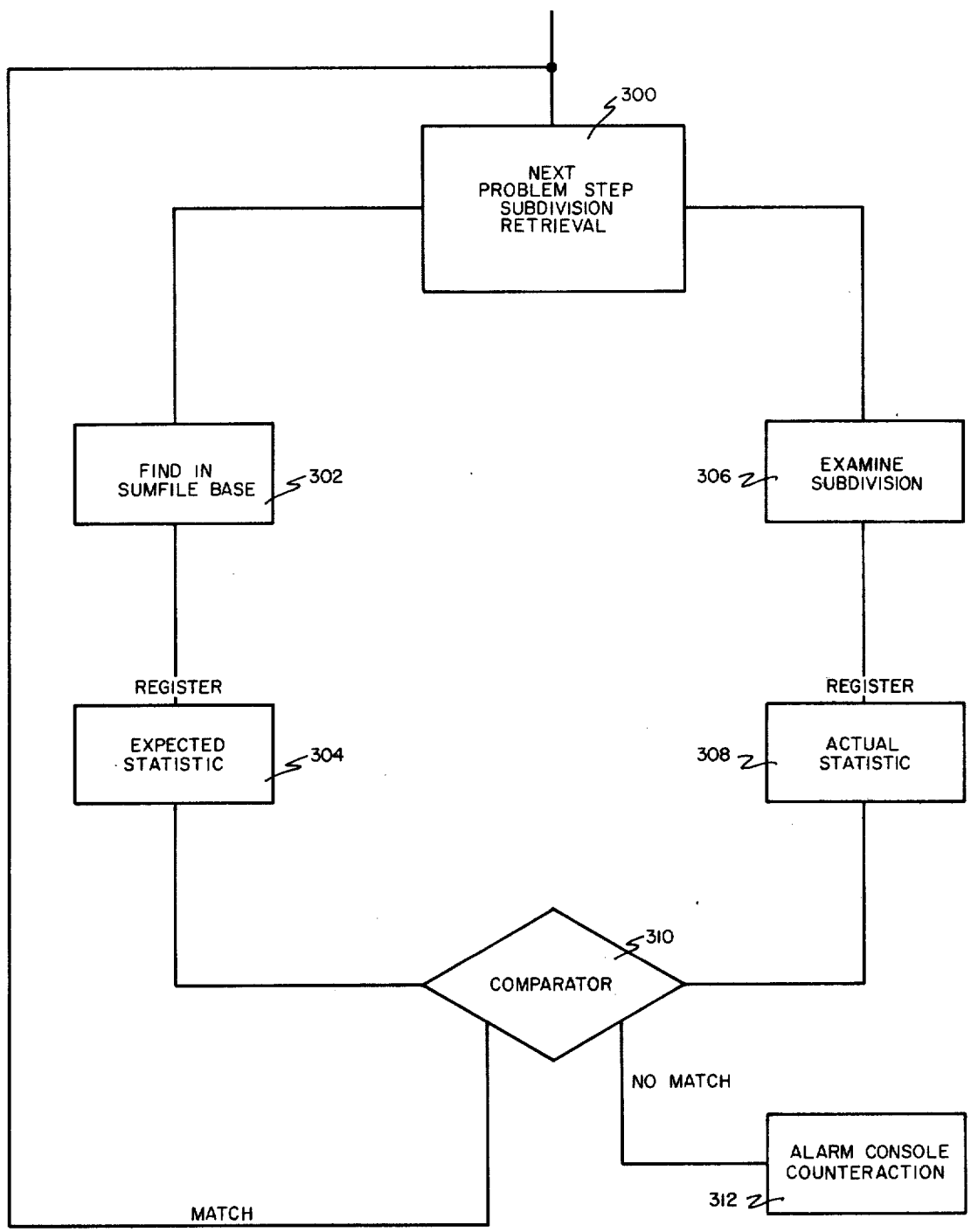
FIG. 6 is a block diagram illustrating the timing sequence within the security system for detecting unauthorized problem steps in the host CPU.

The checksum technique, as used with the illustrated embodiment, can best be understood by reference to FIG. 6. At IPL, or at any other appropriate selected time, the secondary computer requests retrieval of problem steps from the host's library device 23 as at 300. The particular problem step to be examined is thus identified. Its expected statistical base or checksum is extracted from the sum file at 302 and placed in a comparator register at 304.

As part of the same process, the problem step subdivision is examined (as set forth more particulary in the description of FIGS. 7 and 8 below) at 306 and the actual statistical base or checksum of the subdivision is placed in a comparator register at 308. Both the expected and actual statistical bases are brought together in a comparator 310.

If the actual and expected statistical bases match, the problem step subdivision is regarded as uncontaminated and eligible for use in implementing problem processes (see FIG. 1). The next problem step subdivision can then be examined. If the actual and expected statistical bases do not match, a counteraction impulse 312 is communicated to the alarm console. The process continues until all problem steps in the library devices have been examined. The operating process is handled in the same manner and is normally resident in a predetermined location in the library device.

INITIAL PROGRAM LOAD

A computer operator prepares a computer for use by making an initial program load (IPL). IPL retrieves a fresh copy of the operating process from the library device in the computer. IPL is usually made for any one of a number of reasons, most commonly including returning the computer to a secured running condition after a debugging period and also for recovering after a system crash. conventionally, a system crash defines that circumstance where the operating process has completely failed and is no longer usable for processing information. The IPL procedure can best be understood by reference to FIG. 7 Conventionally, IPL is initiated by actuating a button 38 (also shown in FIG. 1) at the host control panel thereby energizing the host hardware loader 102. The host hardware loader has the function of loading a starter program. The hardware within the loader 102 is conventionally a read-only memory within the host which in turn reads three load-unit switches set on the operating panel (not shown). A starter series of instructions are then read by the read-only memory from the device indicated by the load-unit switches (not shown) which device in turn retrieves a fresh copy of the operating process. The described process of serially implementing larger and more complex programs with the next preceding program is called boot-strapping.

When the secondary computer 34 is coupled to monitor the CPU host 10, additional functions are inserted into the IPL procedure which have the principal purpose of authenticating the new operating process copy against a known statistical base (determined by checksums) in order to be certain that it is legitimate.

Figure 7:
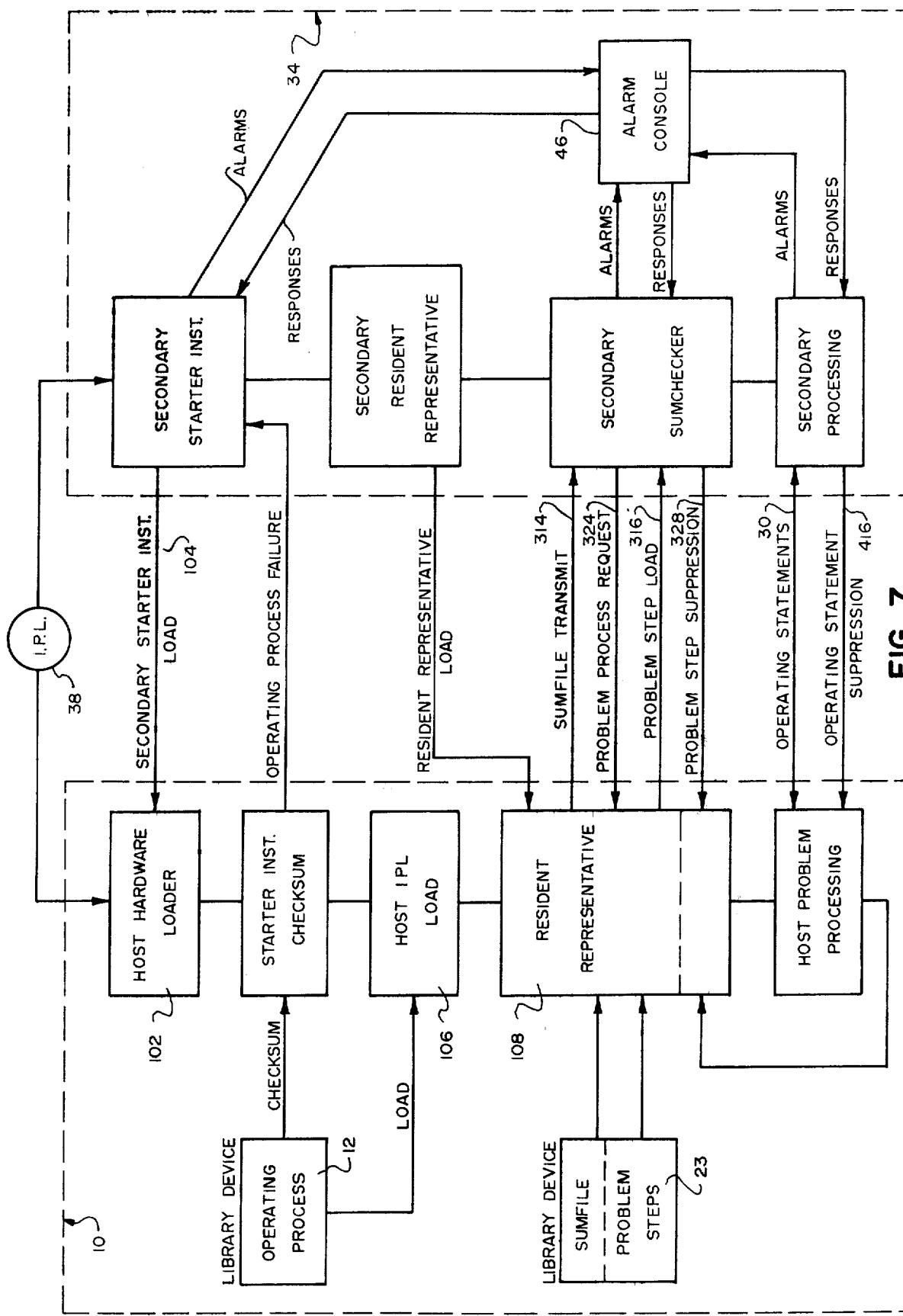
FIG. 7 is a block diagram illustrating the flow of information pulses upon initiation of IPL.
Figure 8:
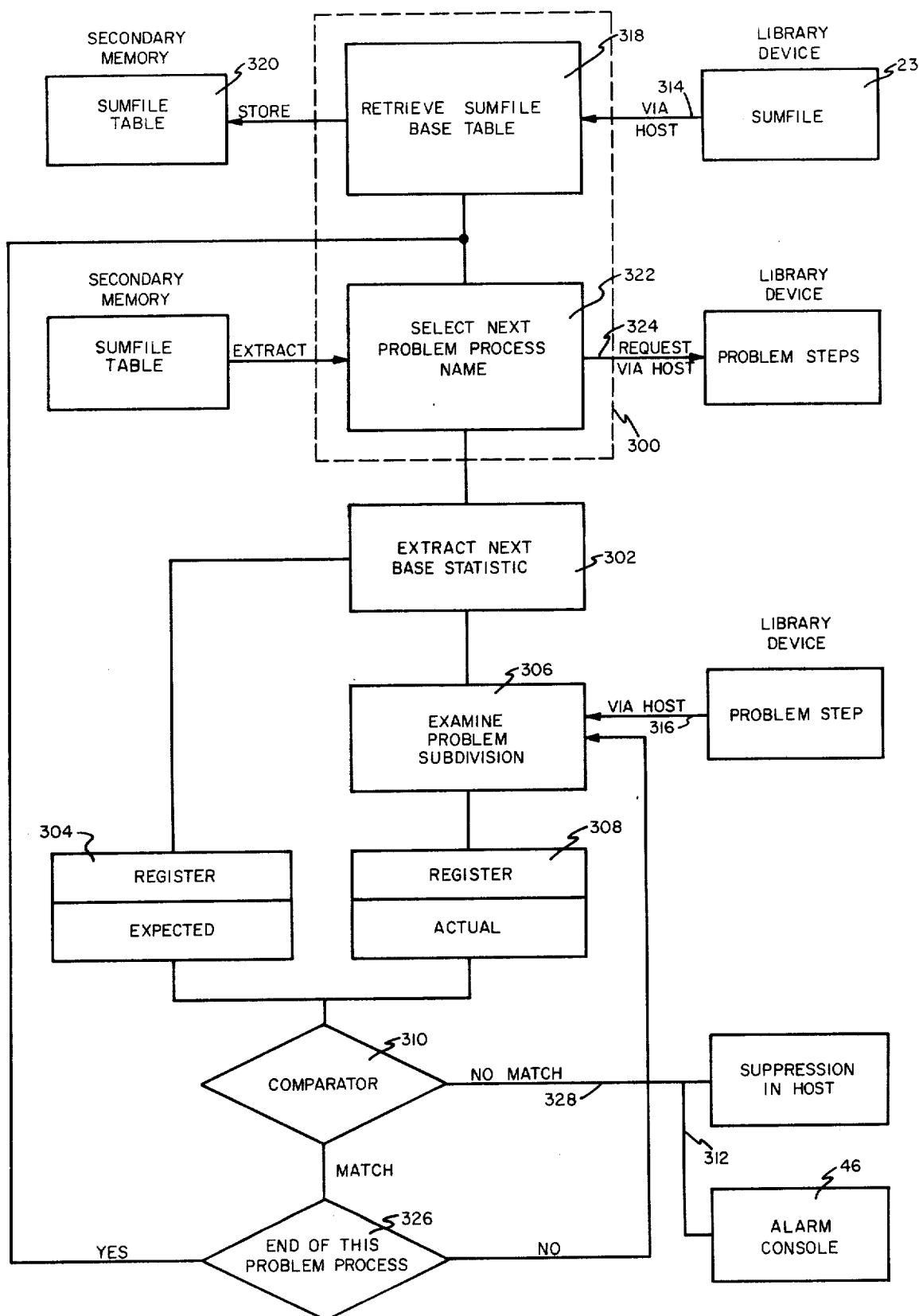
FIG. 8 is a procedural flow diagram illustrating the timing sequence of the security system for detecting modifications in a host CPU problem process.

The secondary computer 34, in the FIG. 7 embodiment, is the device referred by the host load-unit switches described above. The starter series of instructions 104 from the secondary computer 34 are loaded from the host hardware loader 102 establishing a toehold in the host 10. The starter instructions are such that they perform a checksum technique essentilly the same as that described in FIG. 6 except that the statistical base may be carried with the starter instructions rather than stored in the sum file.

After authentication, the starter instructions initiate loading of the operating process from the library device 12 into the host at 106. If authentication fails, a response is sent to the alarm console 46.

The first operation of the operating process is to establish the loading of a resident representative program 108 normally retained in the secondary computer and sent to the host 10 in response to the load request. The function of program 108 is to transmit the sum file at 314 from the library device 23 to the secondary computer 34 (see also FIG. 1). The structure accommodating the checksum technique which begins at this point can best be understood by reference to FIG. 8.

The secondary computer 34 retrieves the sum file base table 318 from the host library device 23 using the services of the resident representative 108. The sum file base table 318 is stored in the memory 320 of the secondary computer. Using the sum file table 318, the secondary computer selects the next problem process name and statistical base at 322 and extracts the name from the sum file base table in the secondary memory and requests the steps of this problem process at 324 from the resident representative (see FIG. 7). The secondary computer 34 then extracts the statistical base and stores same in register 304 (see also FIG. 6). The expected statistical base is now stored in comparator register 304.

When the process steps 316 are received from the host 10, they are examined at 306 and the actual statistical base of this copy of the problem process is placed in register 308. The actual and expected statistical bases are compared in comparator 310. If they match, the process is continued at 326. If they do not match, the alarm console counteraction 312 takes place and an impulse is transferred to the alarm console 46. Also, where desired, loading of the problem process is suppressed at 328 in the host 10. Causing the suppression in the host 10 is one of the functions of the resident representative 108.

Referring again to FIG. 7, once the operating process has been established as legitimate, every problem step stored by the host 10 on its library device 23 is read and authenticated against their known statistical bases to prove they are unaltered from their original state. Authenticating problem steps and the operating process is defined herein to mean decontamination of the host.

When the normal IPL has been completed, the normal data processing operations begin. In the event the load unit switches were set to a unit other than the secondary computer, it will not be selected to supply starter instructions. The host 10 recognizes this condition because it receives an impulse from IPL button 38 and after a reasonable delay, issues an alarm at 46 that the secondary computer 34 was not selected for IPL.

THE SUM FILE BIAS

As previously mentioned, the statistical bases used during the checksum technique are stored in the sum file on library device 23. The sum file is initialized at the time that a new version of the operating system in the host is generated at the completion of the generation process. The sum file is built into the host library device 23 in the form of a large binary table wherein each position in the table carries the name of a problem step and its statistical base quantities.

In order to protect the sum file from alteration without contamination in the host library device 23, each statistical base is given a periodic bias. The sum file bias is a code initiated at the security keyboard 36 (see FIG. 3) and transmitted through the resident representative 108 to the host 10. The sum file bias is used because the statistical bases are placed in an environment where illegitimate programs may exist in the host computer 10. Accordingly, it is conceivable that the statistical base for any particular program could be detected, altered and/or counterfeited. This opportunity is minimized by requiring a sum file bias.

The sum file bias can best be understood by observing the example where the statistical base is stored in a six-place shift register in binary form. For example, the value of a register representing a statistical base may, for example, be numerically represented as follows:

| $2^5$ | $2^4$ | $2^3$ | $2^2$ | $2^1$ | $2^0$ | |
|---|---|---|---|---|---|---|
| 1 | 1 | 0 | 0 | 1 | 1 | = 51 |

As can be readily observed, the value of this shift register numerically is equal to 51. The sum file bias represents a rotation of the positions from the illustrated normal position. For example, a parameter given to the security keyboard 36 during IPL to the resident representative 108 could be 8, which is used as the number of rotational positions from the normal. This means that the statistical base is revolved through eight positions after it is computed so that it would be represented in the shift register as follows:

| $2^5$ | $2^4$ | $2^3$ | $2^2$ | $2^1$ | $2^0$ | |
|---|---|---|---|---|---|---|
| 1 | 1 | 1 | 1 | 0 | 0 | = 60 |

Clearly, because of the sum file bias, the numerical value represented by the shift register differs depending upon which particular bias is used even though the statistical bases remain identical. Unless the sum file bias is known, the actual statistical base recorded in memory with its corresponding name cannot successfully be used without causing checksum failure.

There is no restriction on the frequency or extent of additions, alterations or deletions within the system of the host computer. However, it is required to call a checksum program to compute new statistical bases for inclusion in the sum file after each revision or update or introduction of a new problem process step.

MONITORING OF OPERATING STATEMENTS

Computer Command Authority

Once the host 10 has been decontaminated, it is necessary to maintain the state of decontamination. This is accomplished by monitoring or scanning all operating statements from control device 30 as shown in FIG. 1.

In general, operating statements are divided into two categories: those which are never permitted and those which are permitted if the proper degree of authority can be shown. Any number of levels of authority can be predetermined, ranging from a classification "maximum" to a classification "minimum" (including "none").

Any operating statement found to be prohibited causes an alarm and descriptive message to be transmitted to alarm console 46, and normally causes the offending statement to be suppressed before its effect is allowed to take place in the host 10.

Any other operating statement is acceptable only if accompanied by the appropriate corresponding authority. Without the proper authority, these statements are handled in the same manner as the forbidden statements described above.

In the illustrated embodiment of the invention, where operating statements are made through punched cards, rules are imposed upon the deck of punched cards to allow authority to be shown. Any request from the card deck for compilation or loading of programs in the CPU is a forbidden statement, regardless of any authority and will trigger an alert to the secondary computer as will be subsequently more fully described. The purpose for these prohibited steps is to prevent untested programs from entering the decontaminated domain in the host. Every step or execute card must be accompanied by an authority card. Each authority card is recognized by a unique passcode which must be given or an alarm will be registered at the secondary computer alarm console and the statement normally will be prevented from taking effect. The described authority policy may, if desired, include a variety of authority degrees based on passcode assignments.

A suitable authority card is preferably designed to prohibit counterfeiting or re-use of cards that may be lost or stolen. The authority cards are prepared by punching passcodes into the cards, each card having a different passcode. The cards may, for example, be punched by the CPU host based on enabling codes submitted by a security officer through the keyboard of the secondary computer. These same codes are retained in the secondary computer as a means for authenticating the legitimacy of authority cards. It is recommended that special card stock be used which is prominently marked so as to distinctive from other cards. Moreover, the punched authority card deck should be carefully guarded to prevent card theft and authority codes should be changed at unpredictable times to minimize counterfeiting.

The authority cards may be used only once, If an attempt is made to re-use an authority card, an alarm will be transferred to the secondary computer in a manner subsequently more fully described. Thus, it is not necessary to recollect the authority cards or extract them from the job decks. In one presently preferred embodiment, the authority serial number consists of four hexidecimal digits punched into the card at variable column positions from column 16, surrounded by as many as 12 false cover punches to conceal its actual location. An authority deck covers a serial code range starting with the lowest allowed passcode. However, the deck, punched in random (non-serial) order, omits the use entirely of a given digit which may be deleted to minimize predictability. For example, if the digit 7 were removed, the numbers 7, 17, 77, 710 and all other numbers with the digit 7 would be bypassed.

Figure 9:
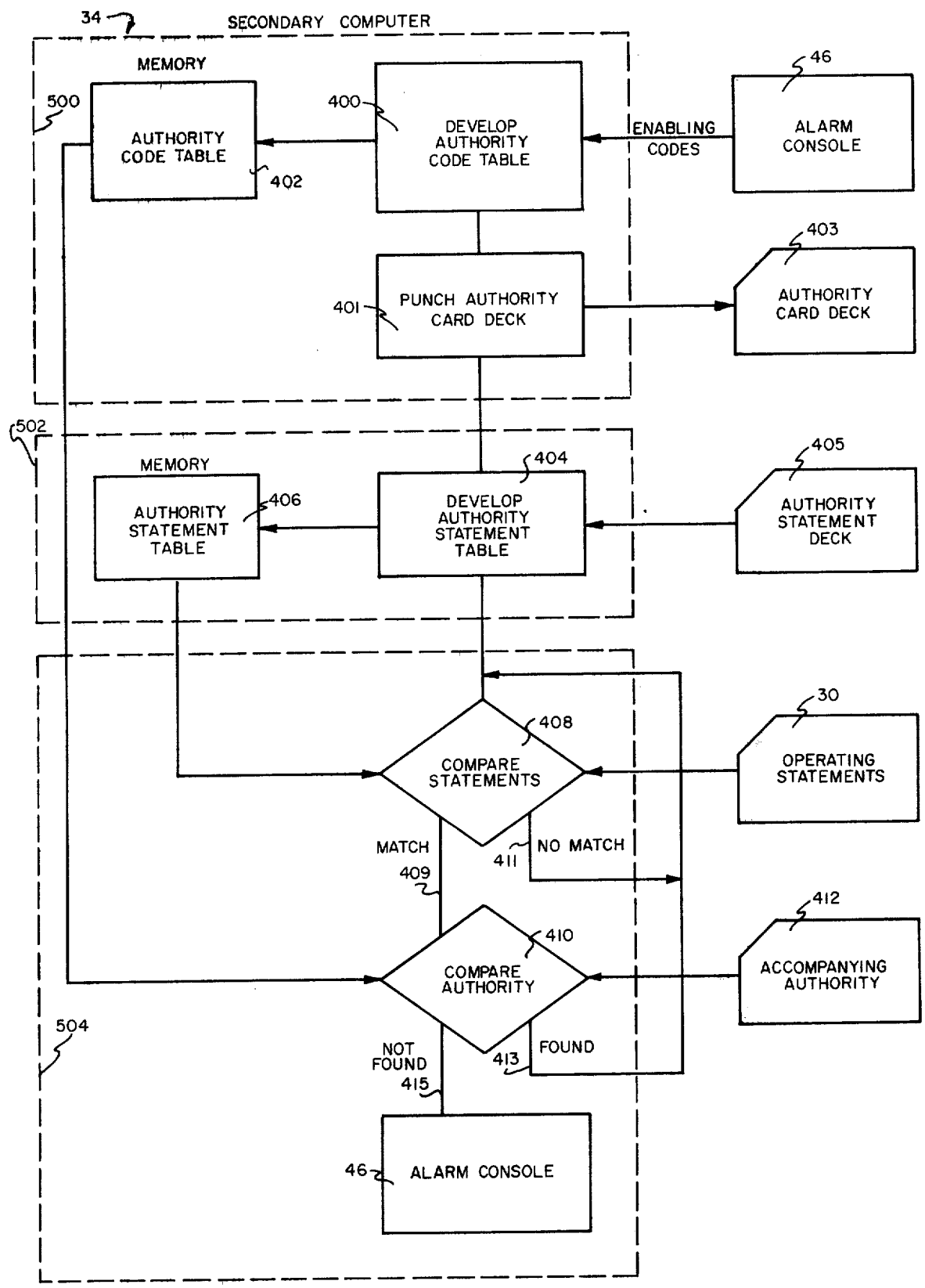
FIG. 9 is a procedural flow diagram illustrating the use of authority codes and cards at three distinct operating times.

The process of authorizing operating statements is defined herein as authority card technique. The structure accommodating the authority card technique can be best understood by reference to FIG. 9. FIG. 9 illustrates operation which can take place at three possibly distinct time periods 500, 502 and 504.

At IPL or some other convenient time, enabling codes are typed into the alarm console 46 and are received by the secondary computer 34 and an authority code table at 400 is developed for storage in memory 402. The authority code table is developed by providing four enabling codes: (a) the lowest allowed passcode, (b) the number of authority cards needed, (c) the digit to be deleted, and (d) the concealed position on the card. The code table is a sequential assignment of passcodes beginning at the lowest and excepting omissions caused by the deleted digit.

When the table is developed the cards are punched correspondingly at 401 to form a deck 403, there being only one punched card for each passcode in the table. This deck 403 is then guarded until its use, as described above.

At some other time (see 502) a statement authority card deck 405 is prepared as the enabling deck defining the authority policy, i.e. which of all possible statements are prohibited or require a specific authority level. These statements are developed into a statement authority table at 404 and stored in memory 406. This table remains in memory more or less permanently and is changed only as specific circumstances warranting same are required.

The host problem processing 11 takes place in time period 504 and attention is again drawn to FIG. 1. It will be remembered that the problem processes 11 of the host 10 are controlled by monitoring the operating process 12. This process is shown also in FIG. 7 at the termination of the IPL.

Referring again to FIG. 9, operating statements 30 are transferred to comparator 408 which requests the authority table from memory 406. If there is no match, the operating statement is acceptable without authority and the secondary computer moves to the next statement. If there is a match, then the statement is either forbidden or requires authority. The secondary computer then scans for an accompanying authority card 412 which is brought to comparator 410 for comparison against authority code table 402.

If a corresponding authority passcode is found, the operating statement is accepted. If not found at 415, an impulse is sent to the alarm console 46 for counteraction, as at 416 (FIG. 7). This will normally result in suppression of the statement and prevent its taking effect in the host 10.

At 413 (FIG. 9) each authority passcode as found in authority code table 402 is so marked that it may not be used again. At 409 (FIG. 9) if a match is found but the statement is forbidden regardless of authority, the counteraction is taken in alarm console 46, immediately.

JCL-TSO SCANNING

Two typical types of operating statement languages are given by the IBM job control language (JCL) and the IBM timesharing option language (TSO). These and any other operating statement languages can be scanned or monitored as above described. Authority is shown by interspersing authority passcodes among the operating statements at the required points. In the case of JCL, the authority passcodes are punched into authority cards as described and physically inserted into the operating statement punch card deck on the required locations.

In the case of TSO, the equivalent of authority cards are typed among operating statements at a user keyboard terminal.

ALARM CONSOLE STRUCTURE

The secondary computer 34 communicates with an authorized person at a secure alarm station which is preferably remote from the host computer 10 and, if desired, may be remote from the secondary computer (see FIG. 2). The alarm station includes the alarm console 46 schematically illustrated in FIG. 10. With continued reference to FIG. 10, the alarm console 46 comprises a keyboard 36 which may be a conventional teletype keyboard as described above. Also included is a numerical button array 37 which is an extension on the numerikeys on keyboard 36 and which accommodates communication of numerical codes and the like into the alarm console 46 and also the secondary computer 34 (FIG. 2). A screen 204 may be used to accommodate backlight instructions or, where desired, may present a cathode ray tube for displaying the output of television surveillance cameras at other locations such as at the site of the host 10.

Figure 11:
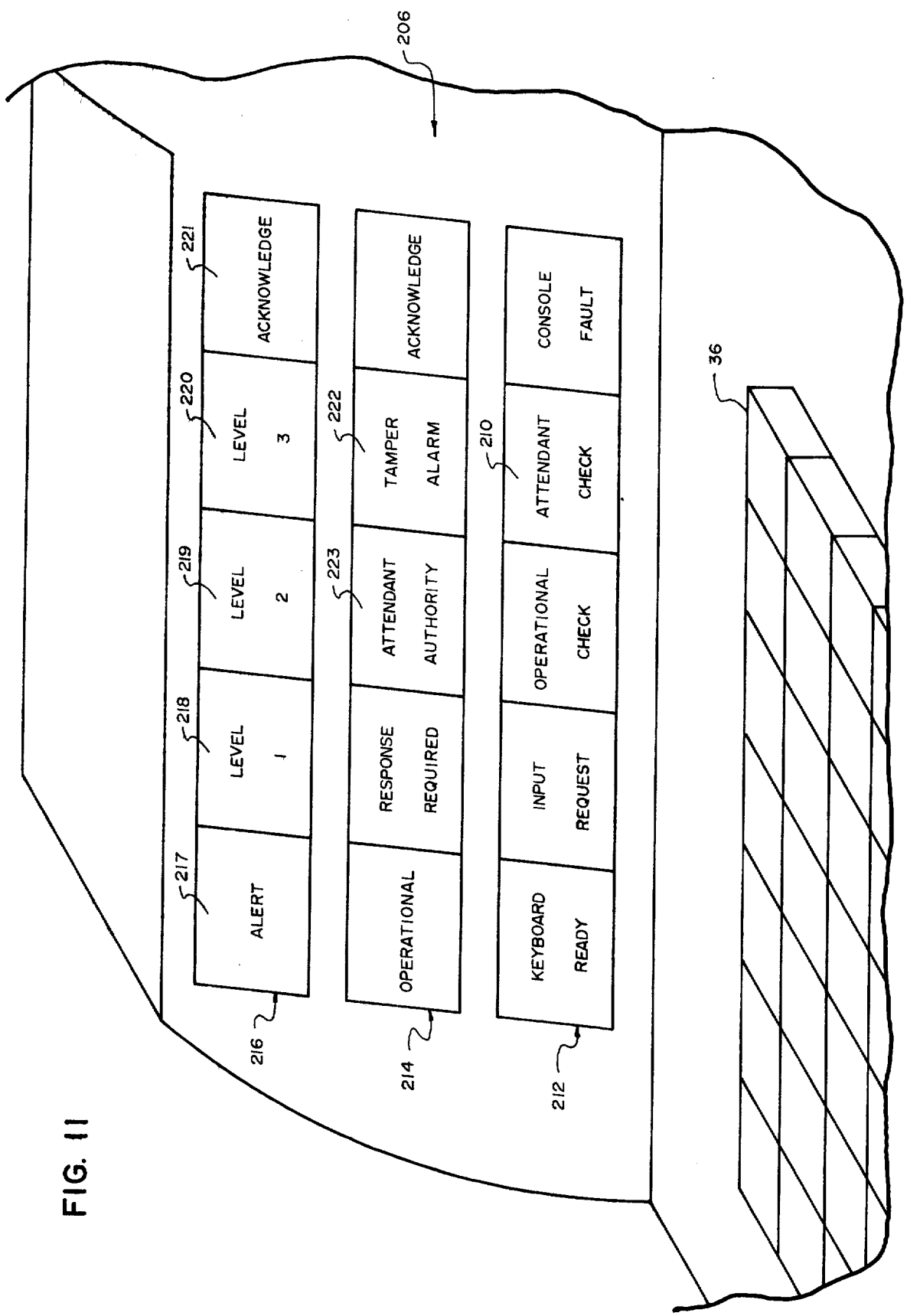
FIG. 11 is a fragmentary perspective illustration of a preferred embodiment of the register status indicator panel on the alarm console.

Indicator lights generally designated 206 are arranged in an array for communicating information to the operator. The array 206 is best illustrated in FIG. 11. The meaning and function of the array and its components will be discussed more particularly hereafter. Preferably, the console 46 has a teletype printout 50 which records all or selected portions of the information communicated to the console 46.

Figure 10:
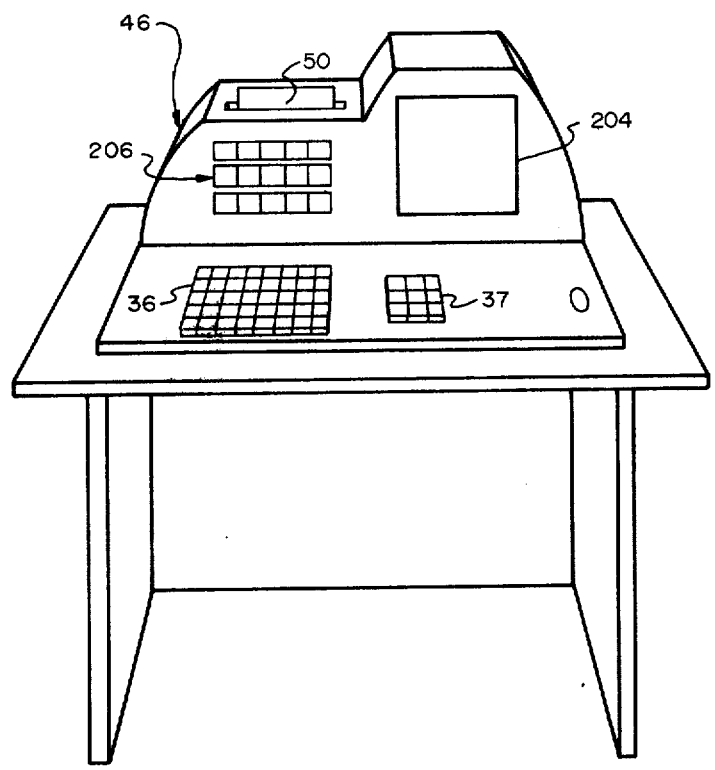
FIG. 10 is a perspective illustration of a presently preferred embodiment of the alarm console.

The secondary computer is placed in the response-required mode by typing in an appropriate code on the numeric array 37 of the console 46. In the response-required mode, the console 46 must be monitored continuously by a security person. To assure this, the control console 46 makes an attendant check from time to time by lighting the attendant check light 210. The attendant responds to the challenge by typing his identification code number into the console at 37 (FIG. 10). The use of an attendant is recommended for periods of high security precaution only. If desired, the secondary computer may be placed in a response-not-required mode which will then not require the consistent presence of an attendant. The attendant check light 210 comprises one of a series of five status lights in row 212. The row of lights at 214 indicates the alarm console mode and the row of lights at 216 indicates alarm levels. In addition to the alarm level lights in row 216, alarm tones may be provided by the console, each tone having a different pitch corresponding to a specific alarm condition.

ALARM LEVELS

The alarm console 46 has three alarm levels that indicate an increasing severity of security violation. Each alarm level is accompanied by a typed message from the teletype portion 50 of the console 46. The higher alarm levels may be accompanied by warning lights and audible tones. Each level of alarm requires resetting of the alarm console by one or more persons who have knowledge of a predetermined reset sequence.

As the operating statements are monitored from control device 30, the console 46 makes no acknowledgment statements that do not violate security but writes these on a magnetic tape log 40 (FIG. 2). Thus, all of the operating statements can be retained for audit.

When minor deviations are detected in operating statements that are being transferred to the host, a level 1 alarm is registered. The level 1 alarm includes a light at 218 in row 216 and a briefly sounded tone such as the margin bell on a typewriter. This signal alerts an authorized person that minor deviations in operating statements are being communicated to the host without authority. The captured mag tape log 40 (FIG. 2) assigns a special character ahead of the statement to identify the precise deviating statement. The deviating statement can be easily reviewed by an authorized security person.

A level 2 alarm is higher level alert. It could be caused by any one of a wide variety of faults, depending upon the established authority policy. In a level 2 alarm, a light appears at 219. The mag tape 40 records a description of the particular fault or error and precedes the description with a suitable designation for alarm levels. Both the security person and a data processing supervisor must punch their own personal clearing codes into the console 46 in order to reset the alarm at levels 2 and 3.

A level 3 alarm is the highest level as specified by the authority policy. The level 3 alarm triggers an illuminator at 220. The alert light at 217 may accompany the level 2 and 3 alarms and may produce an audible tone. The tone ceases when the acknowledge light 221 is energized by supplying a proper identification code.

All of the foregoing alarm signals are activated both when the alarm console is in the response-required and not-required mode.

As a special operational authority policy, codes input at 37 can require a full authority indicated at 223 which overrides the statement authority table 406 (FIG. 9) or any other authority policy thereby requiring an authority passcode for every operating statement. This allows a temporary maximum surveillance condition that may trap any offenders of the authority policy who are familiar with the system. Nevertheless, the mag tape continues to capture all operating statements as well as all alarms that occur.

When any identification or other codes are entered into the console 46, the code is checked for validity against an authorized table in a manner analagous to the authority passcode technique described with FIG. 9. When desired, the accumulated magnetic tape log can be typed on printer 50 or transferred to storage from the host.

It should be recognized that the invention lies in the electronic system defined by the claims. However, a certain amount of programming is required to adapt the data security system to a particular use. In order to fully disclose one embodiment of the invention, the following program listings are submitted. The first source program has been found desirable when an IBM-360 computer is the host system. The second source program has been employed for a Digital PDP-11 operating as the secondary computer.

```
STMT    SOURCE STATEMENT                                           F01OCT71

2            MACRO                    DS INTERFACE DRIVER SCELETON.
   3            CALLDS  &A
   4            CNOP    0,4
   5            L       15,=AL4(IUDRIV)
   6            BAL     1,*+8
   7            DC      AL4(&A)
   8            BALR    14,15
   9            MEND
  10            LCLC    &REL
  11  &REL      SETC    '21'             DS RELEASE 21.
  12  DTASNT    CSECT
  13  START     EQU     *
  14            USING   *,R15
  15            SAVE    (14,12),,*
  16+           B       12(0,15) BRANCH AROUND ID
  17+           DC      AL1(6)
  18+           DC      CL6'DTASNT' IDENTIFIER

19+           STM     14,12,12(13) SAVE REGISTERS
  20            LA      R3,REGSAV        PTR. TO REG. STACK.
  21            ST      R13,REGSAV+4     CHAIN REG. STACK ENTRIES.
  22            ST      R3,8(13)
  23            LR      R13,R3           NEW REG. STACK PTR.
  24            BALR    R12,0            ESTABLISH NEW BASE.
  25  BASE12    EQU     *
  26            DROP    R15              DROP OLD BASE.
  27  *
  28            USING   BASE12,R12,R2
  29            LA      R2,4095(R12)
  30            LA      R2,1(R2)
  31            B       STRT
  32            DC      C'CONFIDENTIAL PROPERTY OF BASIC COMPUTING ARTS, INC.'
  33            DC      C'DISCLOSURE PROHIBITED'
  34  STRT      EQU     *
  35  *
  36  * INITIALIZATION.
  37  *

39  *
  40  * ISSUE SYNCH (SYNCHRONOUS EXIT) TO GET INTO SUPERVISOR MODE
  41  *
  42            LA      R15,GETSUPV
  43            SVC     12
  44            B       CONTSUPV
```

-continued

```
STMT    SOURCE STATEMENT                                                F01OCT71

45 GETSUPV   L      R15,CVT              GET CVT
 46           L      R15,0(R15)           ADDR OF NEXT & CURRENT TCB
 47           L      R15,4(R15)           ADDR OF CURRENT TCB
 48           L      R15,TCBRBP(R15)      ADDR OF CURRENT RB
 49           L      R15,RBLINK(R15)      ADDR OF PREVIOUS RB
 50           NI     RBOPSW+1(R15),X'FE'  CLEAR PROBLEM PROGRAM BIT
 51           BR     R14                  EXIT
 52 CONTSUPV  EQU    *
 53 RBLINK    EQU    X'1C'                ADDR PREVIOUS RB OR TCB
 54 TCBRBP    EQU    0                    ADDR OF RB QUEUE
 55 RBOPSW    EQU    X'10'                RB OLD PSW

57 *
 58 * SPECIFY ABNORMAL EXIT ROUTINE.
 59 *
 60           STAE   STAERTN,CT,PURGE=HALT   ISSUE REQUEST.
 61+          CNOP   0,4 .                   ESTAB. FULL WD. BOUND. ALIGN.
 62+          BAL    1,*+12 . PUT LIST ADDR IN REG1 AND BR AROUND
 63+IHB0002   EQU    *
 64+          DC     AL1(1) .             FLAGS FOR TCB,
 65+*                                     PURGE AND ASYNCH
 66+          DC     AL3(STAERTN) .         STAE EXIT ROUTINE ADDR.
 67+          DC     A(0) .                 SPACE FOR PARM LIST ADDR
 68+          SR     0,0 .                  INDICATE CREATE OPTION
 69+          LA     1,0(1) .               MAKE REG1 POS. XCTL=NO
 70+          SVC    60 .                   ISSUE STAE SVC
 71           LTR    R15,R15              TEST IF SUCCESSFUL.
 72           BNZ    STAEFAIL             NO- ABEND.
 73 *
 74           OPEN   (PRTDCB,(OUTPUT))    OPEN PRINTER DATA SET.
 75+          CNOP   0,4
 76+          BAL    1,*+8 LOAD REG1 W/LIST ADDR.
 77+          DC     AL1(143) OPTION BYTE
 78+          DC     AL3(PRTDCB) DCB ADDRESS
 79+          SVC    19 ISSUE OPEN SVC
 80           TM     PRTDCB+48,X'10'      TEST IF OPEN SUCCESSFUL.
 81           BNO    PRTOPER              NO- GO ABEND.
 82 *
 83           CALLDS INITAL               INIT. DATA SENTINEL DRIVER.
 84+          CNOP   0,4
 85+          L      15,=AL4(IUDRIV)
 86+          BAL    1,*+8
 87+          DC     AL4(INITAL)
 88+          BALR   14,15
 89 *
 90 *
 91 * INITIALIZE FREE POOL CHAIN.
 92 *
 93           L      R0,=A(FREEQCB)       FREE QCB ADRS.
 94           L      R15,=A(PUTON)        PUT-ON-QUEUE ADRS.
 95           L      R1,=A(FREEPOOL)      INIT. AT FIRST ENTRY.
 96 IFPC1     BALR   R14,R15              PUT ENTRY ON FREE CHAIN.
 97           C      R1,=A(ENDFREEP)      TEST IF END.
 98           BE     IFPC2                YES.
 99           LA     R1,FPENTSIZ(R1)      NO- INCR. NEXT POOL ENTRY.
100           B      IFPC1
101 IFPC2     EQU    *
102 *
103 * ENABLE CANCEL.
104 *
105           WTOR   'REPLY ANYTHING TO END BCA',WTOREPLY,10,WTORECB
106+          CNOP   0,4
107+          BAL    1,IHB0005A BRANCH AROUND LIST
108+          DC     AL1(10) REPLY LENGTH
109+          DC     AL3(WTOREPLY) REPLY ADDRESS
110+          DC     A(WTORECB) ECB ADDRESS
111+          DC     AL2(29) TEXT LENGTH
112+          DC     B'0000000000000000' MCS FLAGS
113+          DC     C'REPLY ANYTHING TO END BCA'
114+IHB0005A  DS     0H
115+          SVC    35 ISSUE WTOR SVC
116 *
```

```
STMT   SOURCE STATEMENT                                                  F01OCT71

117 * TEST IF DATA SENTINEL IS ONLINE.
118 *
119 TDSOL      MVI    DSOFFSW,X'FF'        SET SW. FOR IUDRIV.
120            LA     R8,100               SET WAIT COUNT.
121 TDSOL1     EQU    *
122            CALLDS SENSAL               DO SENSE.
123+           CNOP   0,4
124+           L      15,=AL4(IUDRIV)
125+           BAL    1,*+8
126+           DC     AL4(SENSAL)
127+           BALR   14,15
128            TM     CSWW+3,X'02'         IS DS ONLINE(UNIT CHECK).
129            BNO    TDSOL2               YES.
130            STIMER WAIT,BINTVL=SNSWTIM  NO- RELINQ. CTL.
131+           LA     1,SNSWTIM LOAD PARAMETER REG 1
132+           LA     0,17(0,0) LOAD FLAG BYTE
133+           SLL    0,24(0) SHIFT TO HI-ORDER BYTE
134+           SVC    47 ISSUE STIMER SVC
135            BCT    R8,TDSOL1            TEST WAIT TIME ELAPSED.
136            WTO    'DS0002 DS IS NOT ONLINE'
137+           CNOP   0,4
138+           BAL    1,IHB0010A BRANCH AROUND MESSAGE
139+           DC     AL2(27) TEXT LENGTH
140+           DC     B'0000000000000000' MCS FLAGS
141+           DC     C'DS0002 DS IS NOT ONLINE'
142+IHB0010A  DS     0H
143+           SVC    35
144            B      TDSOL                CONTINUE TO WAIT.
145 TDSOL2     MVI    DSOFFSW,X'00'        CLEAR IUDRIV SW.
146            WTO    'DS0001 TSODS INITIALIZED'
147+           CNOP   0,4
148+           BAL    1,IHB0011A BRANCH AROUND MESSAGE
149+           DC     AL2(28) TEXT LENGTH
150+           DC     B'0000000000000000' MCS FLAGS
151+           DC     C'DS0001 TSODS INITIALIZED'
152+IHB0011A  DS     0H
153+           SVC    35
154            B      DSCTL1               GO PROCESS SENSE INFO.
155 *
156 REGSAV     DS     0F                   REGISTER
157            DS     18F                  SAVE AREA.
159 ****************************************************************
160 * DATA SENTINEL CONTROL ROUTINE.
161 *
162 DSCTL      EQU    *
163 *
164            TM     WTORECB,X'40'        SEE IF REPLY ENTERED.
165            BO     WTORR                YES- STOP.
166            TM     ABENDSW,X'FF'        TEST IF ABEND REQUESTED.
167            BO     QSPACER              YES- GO ABEND.
168 *
169            CALLDS SENSAL               CALL DS TO DO SENSE.
170+           CNOP   0,4
171+           L      15,=AL4(IUDRIV)
172+           BAL    1,*+8
173+           DC     AL4(SENSAL)
174+           BALR   14,15
175 DSCTL1     EQU    *
176            CLI    SBTC,TCUL            CHECK TASK CODE W/UPPER LIMIT.
177            BH     INVTC                INVALID.
178            CLI    SBAC,ACUL            CHECK ACTION CODE W/UPPER LIMIT.
179            BH     INVAC                INVALID.
180 *
181            SR     XT1,XT1              CLEAR XT1.
182            IC     XT1,SBTC             GET TASK CODE.
183            LA     XT2,TSTABL(XT1)      XT2 HAS TASK TABLE ENTRY ADRS.
184            SLL    XT1,2                MPY TASK CODE BY 4 FOR JMP TBLS.
185 *
186            SR     XT3,XT3              CLEAR.
187            IC     XT3,SBAC             GET ACTION CODE.
188            SLL    XT3,2                MPY BY 4.
189            L      XT3,DSC1(XT3)        ACTION RTN ADRS FROM TABLE.
190            LTR    XT3,XT3              TEST IF VALID.
```

```
STMT    SOURCE STATEMENT                                            F01OCT71

191             BZ      INVAC                   NO- GO ABEND.
192             BR      XT3                     EXECUTE ACTION.
193 *
194 DSC1        DS      0F
195             DC      AL4(0)                  0-ILLEGAL.
196             DC      AL4(NOP)                1- NO ACTION.
197             DC      AL4(INIT)               2- INITIATE.
198             DC      AL4(DISPOS)             3- DISPOSE.
199             DC      AL4(0)                  4-ILLEGAL.
200             DC      AL4(0)                  5-ILLEGAL.
201             DC      AL4(0)                  6-ILLEGAL.
202             DC      A(ENDTSK)               7- END OF TASK.
203             DC      A(ISSUE)                8- ISSUE NEXT I/O.
204 *
205 WTORR       LH      XT1,=H'321'             END IT.
206             B       ABORT
207 *
208 WTOREPLY    DS      1CC

209 WTORECB     DC      F'0'

211 *
212 * NO ACTION.
213 *
214 NOP         TM      TSTABL+2,TSSINI         IS DEVICE MON. INITIATED.
215             BNO     DSCTL                   NO- SENCE.
216             TM      TSTABL+2,TSDSPOS        IS A DISPOSITION AUTSTANDING.
217             BNO     NOP2                    NO.
218             LH      R1,DSPTIM               YES- HAS MAX.
219             BCT     R1,NOP1                    WAIT TIME ELAPSED.
220 *
221             B       DSDOWN                  ABEND******.
222 *
223 NOP1        STH     R1,DSPTIM               SAVE.
224             B       DSCTL                   GO SENSE.
225 *
226 NOP2        TM      TSTABL+2,TSISSUE        IS ISSUE COMMAND EXPECTED.
227             BNO     NOP4                    NO- ALREDY REC'D.
228             LH      R1,ISUETIM              YES- HAS MAX.
229             BCT     R1,NOP3                 WAIT TIME ELAPSED.
230             B       DSDOWN1                 YES- ABEND **********.
231 *
232 NOP3        STH     R1,ISUETIM              SAVE.
233             B       DSCTL                   GO SENSE.
234 *
235 NOP4        BAL     XSBR,PROCQUE            GO ATTEMPT TO SEND A MEDDAGE.
236             B       DSCTL                   GO SENSE.
237 *
238 * INITIATE ACTION.
239 *
240 INIT        TM      0(XT2),TSSINI           TEST TASK ALREADY INITIATED.
241             BO      IAER1                   YES-ERROR.
242             L       XT3,INIT2(XT1)          GET TASK'S INITIATE ACTION ADRS.
243             LTR     XT3,XT3                 TEST IF PRESENT.
244             BZ      IAER3                   NO- INVALID INITIATE TASK.
245             OI      0(XT2),TSSINI           SET TASK INITIATED.
246             OI      0(XT2),TSISSUE          SET ISSUE EXPECTED.
247             MVC     ISUETIM(2),=H'20'       SET MAX. ISSUE WAIT TIME.
248 INIT1       BALR    XSBR,XT3                PERFORM TASK'S INITIATE ACTION.
249 *
250 INIT1A      EQU     *
251             B       DSCTL                   GO DO NEXT SENSE.
252 * INITIATE TASK TABLE.
253 INIT2       DS      0F
254             DC      AL4(0)                  0
255             DC      AL4(SDINIT)             1- SECURITY DECK.
256             DC      AL4(DMINIT)             2- DEVICE MONITORING.
257             DC      AL4(LTINIT)             3- LOG TRANSFER.
258             DC      AL4(0)                  4
259             DC      AL4(0)                  5
260             DC      AL4(0)                  6
261             DC      AL4(0)                  7
```

```
STMT    SOURCE STATEMENT                                       F01OCT71

262             DC       A(DSOFFL)           8
263 *
264             DC       AL4(0)              9
265             DC       A(STOPD)            10- STOP WITH DUMP.
266             DC       A(STOPND)           11- STOP WITHOUT DUMP.
267 *
268 * DISPOSE ACTION.
269 *
270 DISPOS      TM       0(XT2),TSDSPOS      TEST IF DISPOSE EXPECTED.-
271             BNO      DAER1               NO- ERROR.
272             NI       0(XT2),TSCDSP       CLEAR DISPOSE EXPECTED.
273             OI       0(XT2),TSISSUE      SET ISSUE-EXPECTED.
274             MVC      ISUETIM(2),=H'20'   SET MAX. ISSUE WAIT TIME.
275             L        XT3,DISP1(XT1)      TASK'S DISPOSE ACTION ADRS.
276             LTR      XT3,XT3             TEST IF PRESENT.
277             BZ       DAER3               NO- INVALID DISPOSE TASK.
278             B        INIT1
279 * DISPOSE TASK TABLE.
280 DISP1       DS       0F
281             DC       AL4(0)              0
282             DC       AL4(SDDISP)         1- SECURITY DECK.
283             DC       AL4(DMDISP)         2- DEVICE MONITORING.
284             DC       AL4(0)              3- LOG TRFR (NO DISPOSE).
285             DC       AL4(0)              4
286             DC       AL4(0)              5
287             DC       AL4(0)              6
288             DC       AL4(0)              7
289             DC       AL4(0)              8
290             DC       AL4(0)              9
291             DC       AL4(0)              10
292             DC       AL4(0)              11
293 *
294 * END TASK.
295 *
296 ENDTSK      L        XT3,ENDTSK1(XT1)    ACTION ADRS,.
297             LTR      XT3,XT3
298             BZ       EAER1               INVALID-ERROR.
299             BALR     XSBR,XT3            PERFORM END ACTION.
300             NI       0(XT2),TSCINI       CLEAR INITIATED STATUS.
301             B        DSCTL               GO SENSE.
302 *
303             DS       0F
304 ENDTSK1     DC       AL4(0)              0
305             DC       AL4(SDEND)          1-SECURITY DECK.
306             DC       AL4(DMEND)          2- DEVICE MONITORING.
307             DC       AL4(LTEND)          3- LOG TRANSFER.
308             DC       AL4(0)              4
309             DC       AL4(0)              5
310             DC       AL4(0)              6
311             DC       AL4(0)              7
312             DC       AL4(0)              8
313             DC       AL4(0)              9
314             DC       AL4(0)              10
315             DC       AL4(0)              11
316 *
317 *ISSUE I/O TO DS.
318 *
319 ISSUE       TM       0(XT2),TSISSUE      WAS ISSUE EXPECTED.
320             BNO      ISAER1              NO ERROR.
321             NI       0(XT2),TSCISU       YES- CLEAR ISSUE.
322             L        XT3,ISSUE1(XT1)     ACTION ADRS.
323             LTR      XT3,XT3
324             BZ       ISAER2              INVALID.
325             B        INIT1               EXECUTE ACTION.
326 *
327             DS       0F
328 ISSUE1      DC       AL4(0)              0
329             DC       A(SDISSUE)          1-SECURITY DECK.
330             DC       A(DMISSUE)          2- DEVICE MONITORING.
331             DC       A(LTISSUE)          3- LOG TRANSFER.
332             DC       AL4(0)              4
333             DC       AL4(0)              5
334             DC       AL4(0)              6
```

```
STMT    SOURCE STATEMENT                                              F010CT71

335             DC      AL4(0)          7
336             DC      AL4(0)          8
337             DC      AL4(0)          9
338             DC      AL4(0)         10
339             DC      AL4(0)         11

341 ****************************************************************
342 * SECURITY DECK PROCESSING.
343 ****************************************************************
344 *
345 * INITIATE SECURITY DECK.
346 *
347 SDINIT  SR      XT4,XT4         CLEAR
348             ST      XT4,SDMCT         MESSAGE COUNT.
349 *
350             OPEN    (SDDCB)         OPEN SECURITY DECK.
351+            CNOP    0,4
352+            BAL     1,*+8 LOAD REG1 W/LIST ADDR.
353+            DC      AL1(128) OPTION BYTE
354+            DC      AL3(SDDCB) DCB ADDRESS
355+            SVC     19 ISSUE OPEN SVC
356             TM      SDDCB+48,X'10'   TEST IF OPEN GOOD.
357             BNO     SDCPNER          NO- GO ABEND.
358             BR      XSBR             EXIT.
359 *
360 * ISSUE I/O.
361 *
362 SDISSUE EQU     *
363 SDI1    GET     SDDCB,SDIBUF    GET SD RECORD.
364+SDI1    LA      1,SDDCB LOAD PARAMETER REG 1
365+            LA      0,SDIBUF LOAD PARAMETER REG 0
366+            L       15,48(0,1) LOAD GET ROUTINE ADDR.
367+            BALR    14,15 LINK TO GET ROUTINE
368 *
369 * SET UP TRANSMIT BUFFER HEADER.
370 SDI1A   MVC     TBBFCT(2),=H'88'  BUFFER BYTE COUNT.
371             MVC     TBMSCT(2),=H'80'  MESG. BYTE COUNT.
372             MVC     TBCHDA(2),=X'000C' CH/DEV ADRS.
373             MVI     TBDEVT,X'0'       DEVICE TYPE.
374             MVI     TRTC,TCSD         TASK CODE.
375 *
376             MVC     TBMESG(80),SDIBUF MOVE RECORD TO TRANSMIT BUF.
377             MVC     SDIPER(36),SPACES ES  BLANKS TO ERROR MESG.
378             CLC     SDIBUF(6),EOFCHR  TEST IF EOF CARD.
379             BNE     SDI2              NO.
380             OI      TSTABL+1,TSEND    SET END TASK.
381             MVC     TBBFCT(2),=H'0'   CLEAR BUF. CT. FOR EOF.
382 *
383 SDI2    EQU     *
384 *
385 SDI3    LH      XT4,SDMCT         INCR.
386             LA      XT4,1(XT4)         MESSAGE
387             STH     XT4,SDMCT          NUMBER.
388             STH     XT4,TBMSNO       MSG. NO. TO TRANSMIT BUF.
389 *
390             CALLDS  SDWRAL           TRANSMIT RECORD TO SENTINEL.
391+            CNOP    0,4
392+            L       15,=AL4(IUDRIV)
393+            BAL     1,*+8
394+            DC      AL4(SDWRAL)
395+            BALR    14,15
396             OI      TSTABL+1,TSDSPOS  SET DISPOSE -EXPECTED..
397 SDI3A   BR      XSBR             EXIT.
398 *
399 * SECURITY DECK DISPOSITION.
400 *
401 SDDISP  LH      XT4,SBMSNO       MSG. NO. FROM SENSE BUF.
402             CH      XT4,SDMCT         COMPARE W/CURRENT.
403             BNE     SDDER1            NOT SAME- ERROR.
404             CLI     SBDC,DCPMSG       IS DISP.= RELEASE.
405             BE      SDD1              YES.
406             CLI     SBDC,DCDMSG       NO- IS DISP= DISCARD.
407             BNE     SDDER2            NO- ERROR.
```

```
STMT    SOURCE STATEMENT                                               FO1OCT71

408             MVC     SDIPER(28),SODEM1    1 YES- PUT MESG. IN BUFFER.
409 *
410 SDD1        PUT     PRTDCB,SDIPRT           PRINT CARD.
411+SDD1        LA      1,PRTDCB LOAD PARAMETER REG 1
412+            LA      0,SDIPRT LOAD PARAMETER REG 0
413+            L       15,48(0,1) LOAD PUT ROUTINE ADDR.
414+            BALR    14,15 LINK TO PUT ROUTINE
415             BR      XSBR                    EXIT.
416 *
417 * END TASK.
418 *
419 SDEND       BR      XSBR

421 *****************************************************************
422 * LOG TRANSFER PROCESSING.
423 *****************************************************************
424 * INITIATE LOG TRANSFER.
425 *
426 LTINIT      SR      XT4,XT4                 CLEAR
427             STH     XT4,LTMCT                 MESSAGE COUNT.
428             OPEN    (LTDCB,OUTPUT)          OPEN LOG OUTPUT DATA SET.
429+            CNOP    0,4
430+            BAL     1,*+8 LOAD REG1 W/LIST ADDR.
431+            DC      AL1(143) OPTION BYTE
432+            DC      AL3(LTDCB) DCB ADDRESS
433+            SVC     19 ISSUE OPEN SVC
434             TM      LTDCB+48,X'10'          TEST IF OPEN GOOD.
435             BNO     LTOPNER                 NO- GO ABORT.
436             BR      XSBR                    EXIT.
437 *
438 * ISSUE I/O.
439 *
440 LTISSUE     EQU     *
441 *
442 LTI1        EQU     *
443             CALLDS  LTRDAL                  GET NEXT LOG RECORD FROM DS.
444+            CNOP    0,4
445+            L       15,=AL4(IUDRIV)
446+            BAL     1,*+8
447+            DC      AL4(LTRDAL)
448+            BALR    14,15
449 LTI2        PUT     LTDCB,RB                WRITE LOG RECORD.
450+LTI2        LA      1,LTDCB LOAD PARAMETER REG 1
451+            LA      0,RB LOAD PARAMETER REG 0
452+            L       15,48(0,1) LOAD PUT ROUTINE ADDR.
453+            BALR    14,15 LINK TO PUT ROUTINE
454             OI      TSTABL+3,TSISSUE        SET NEXT ISSUE EXPECTED.
455             BR      XSBR                    EXIT.
456 *
457 *END TASK.
458 LTEND       EQU     *
459             CLOSE   (LTDCB)                 CLOSE LOG DATA SET.
460+            CNOP    0,4
461+            BAL     1,*+8 BRANCH AROUND LIST
462+            DC      AL1(128) OPTION BYTE
463+            DC      AL3(LTDCB) DCB ADDRESS
464+            SVC     20 ISSUE CLOSE SVC
465 LTD1        BR      XSBR                    EXIT.

467 *
468 * INITIATE DEVICE MONITORING.
469 *
470 CMINIT      STM     R0,R15,SVF3             SAVE.
471             L       R15,=A(OPENHKS)
472             BALR    R14,R15                 INSERT OPEN HOOKS.
473             L       R15,=A(SVCHKS)
474             BALR    R14,R15                 INSERT SCRATCH,RENAME HOOKS.
475             L       R15,=A(TSUHKS)
476             BALR    R14,R15                 INSERT LOGON HOOKS.
477             LM      R0,R15,SVF3             RESTORE.
478             BR      XSBR                    EXIT.
479 *
480 * ISSUE I/O- DEVICE MONITORING.
481 *
```

```
STMT    SOURCE STATEMENT                                                        F010CT71

482 DMISSUE  ST    XSBR,DMISU1           SAVE.
483          BAL   XSBR,PROCQUE          GO PROCESS QUEUE.
484          L     XSBR,DMISU1           RESTORE.
485          BR    XSBR                  EXIT.

486 DMISU1   DC    F'0'
487 *
488 * DISPOSITION FOR MESSAGE SENT TO DATA SENTINEL.
489 *
490 DMDISP   ST    XSBR,DMDSP6           SAVE.
491          CLC   SBMSNO(2),DMMCT       CHECK MESG. NO'S.
492          BNE   DMDER1                NOT SAME- ERROR.
493 *
494          CLI   QETYPE,X'02'          IS LAST MSG A LOGOFF.
495          BNE   DMDSP2                NO.
496 DMDSP1   L     XSBR,DMDSP6           YES- RESTORE.
497          BR    XSBR                  EXIT.
498 DMDSP2   CLI   QETYPE,X'01'          IS IT LOGON.
499          BE    DMDSP1                YES- DON'T POST.
500          CLI   QETYPE,X'00'          LAST MSG AN OPEN.
501          BE    DMDSP5                YES.
502          CLI   SBDC,DCRMSG           NO- TEST DISPOSITION CODE.
503          BNE   DMDSP4                BAD.
504          MVI   OPNCC,X'C0'           GOOD- SET COMPL CODE GOOD.
505 DMDSP3   BAL   R3,POSTIT             POST WAITING TASK COMPLETE.
506          B     DMDSP1                GO EXIT.
507 DMDSP4   MVI   OPNCC,X'FF'           SET COMPL CODE BAD.
508          B     DMDSP3
509 DMDSP5   CLI   SBDC,DCRMSG           OPEN- TEST DISP. CODE.
510          BE    DMDSP1                GOOD- GO EXIT.
511          MVI   OPNCC,X'FF'           BAD- SET COMPL CODE BAD.
512          B     DMDSP1
513 DMDSP6   DC    F'0'
514 *
515 * END DEVICE MONITORING.
516 *
517 DMEND    BAL   R8,WITHDRW            WITHDRAW OS HOOKS.
518          BR    XSBR                  EXIT.
519 ************************************************************************
520 * PROCESS QUEUE ENTRY SUBROUTINE.
521 *
522 PROCQUE  STM   R0,R15,SVR3           SAVE REG'S.
523          TM    OPNBUSY,X'FF'         IS OPEN IN PROCESS.
524          BO    POPN9                 YES- PICK IT UP.
525 PRQ1     SSM   *+1                   NO- DISABLE.
526          CLC   OPENQCB+1(2),=X'0000' IS OPEN QUEUE EMPTY.
527          BNE   PRQ3                  NO.
528 *
529          SSM   =X'FF'                YES- ENABLE.
530          STIMER REAL,STXIT,BINTVL=SNSWTIM   SET MAX. WAIT TIME.
531+         LA    1,SNSWTIM LOAD PARAMETER REG 1
532+         LA    0,STXIT LOAD PARAMETER REG 0
533+         LA    14,19(0,0) LOAD FLAG BYTE
534+         SLL   14,24(0) SHIFT TO HI-ORDER BYTE
535+         OR    0,14 AND PACK WITHEXIT ADDR
536+         SVC   47 ISSUE STIMER SVC
537          SSM   *+1                   DISABLE.
538          XC    RUNTSODS(4),RUNTSODS  INIT. ECB.
539          WAIT  ECB=RUNTSODS          WAIT ON QUEUE OR TIMER.
540+         LA    1,RUNTSODS LOAD PARAMETER REG 1
541+         LA    0,1(0,0) COUNT OMITTED,1 USED
542+         SVC   1 LINK TO WAIT ROUTINE
543          CLI   RUNTSODS+3,STCOMPC    DID STIMER EXIT POST ECB.
544          BNE   PRQ1                  NO-QUEUE.
545 PRQ2     LM    R0,R15,SVR3           YES- RESTORE.
546          BR    XSBR                  EXIT FOR SENSE.
547 *
548 PRQ3     L     R0,=A(OPENQCB)
549          L     R15,=A(TAKEOFF)
550          BALR  R14,R15               GET NEXT QUEUE ENTRY.
551          MVC   SAVQUE(FPENTSIZ-4),4(R1) SAVE QUEUE ENTRY.
```

```
STMT    SOURCE STATEMENT                                               F010CT71

552             L       R0,=A(FREEQCB)
553             L       R15,=A(PUTON)
554             BALR    R14,R15               PUT ENTRY ON FREE QUEUE.
555             SSM     =X'FF'                ENABLE.
556             SR      R3,R3
557             IC      R3,QETYPE             QUE ENTRY TYPE.
558             SLL     R3,2                  SCALE.
559             B       PRQ4(R3)              DISPATCH.
560     *
561  PRQ4       B       PROCOPN               0-OPEN.
562             B       PROCLOGN              1-LOGON.
563             B       PROCLOGF              2-LOGOFF.
564             B       PROCSCR               3-SCRATCH.
565             B       PROCRENM              4- RENAME.
566     *
567     * TIMER EXIT.
568     *
569             USING   *,R15
570  STXIT      STM     R0,R15,STX3           SAVE.
571             L       R11,STX4              ECB ADRS.
572             TM      0(R11),X'80'          TEST IF WAITING.
573             BO      STX2                  YES.
574  STX1       LM      R0,R15,STX3           NO- RESTORE.
575             BR      R14                   EXIT.
576  STX2       LA      R10,1                 COMPLETION CODE.
577             L       R12,CVT               CVT ADRS.
578             L       R12,0(R12)            TCB ADRS'S.
579             L       R12,4(R12)            ADRS. OF CURRENT TCB.
580             LA      R13,0
581             L       R15,CVT               CVT ADRS.
582             L       R15,IEAOPT01(R15)     POST ROUTINE ADRS.
583             SSM     *+1                   DISABLE.
584             BALR    R14,R15               POST IT COMPLETE.
585             SSM     =X'FF'                ENABLE.
586             DROP    R15
587             BALR    R15,0                 NEW BASE.
588             USING   *,15
589             LM      R0,R15,STX3           RESTORE.
590             BR      R14                   EXIT.
591     *
592  STX3       DC      16F'0'
593  STX4       DC      A(RUNTSOCS)
594             DROP    R15
595     *
596     * PROCESS OPEN.
597     *
598  PROCOPN    MVI     CPNBUSY,X'FF'         SET OPEN IN PROCESS.
599             MVI     OPNCC,X'00'           INIT. COMPL. CODE= GOOD.
600             L       R3,QEWTGPT            WTG PTR FROM QUE ENTRY.
601             SR      R4,R4
602             IC      R4,WTGSIZ(R3)         NO. BYTES IN WTG FROM WTG.
603             SLL     R4,3                  GET NO. DOUBLE WDS IN WTG.
604             S       R4,WTGKB              DECR. BY CONSTANT(SIZE OF 1 DCB ENT).
605             LA      R4,0(R3,R4)           SUM BEG. ADRS AND NO BYTES TO GET
606             ST      R4,EDCBLIST             ENDING ADRS(LESS LAST DCB ENTRY).
607             LA      R3,WTG1DCB(R3)        POINT TO 1ST DCB LIST ENTRY.
608     *
609  POPN1      LA      R4,DSNTBL             INIT. @ TEMP DSN TABLE.
610     *
611  POPN2      C       R3,EDCBLIST           TEST IF END OF DCB LIST.
612             BNE     POPN4                 NO.
613             BAL     R8,ENSWAP             SET TASK SWAPABLE.
614             C       R4,=A(DSNTBL)         IS TEMP DSN TBL EMPTY.
615             BNE     POPN7                 NO.
616  POPN3      MVI     CPNBUSY,X'00'         YES- CLEAR OPEN IN PROCESS.
617             BAL     R8,POSTIT             POST WAITING TCB.
618             B       PRQ1                  GO SEE IF ANYTHING IN QUEUE.
619     *
620             AIF     ('&REL' NE '21').SK010
621  POPN4      CLC     0(2,R3),=X'F4C5'      IS THIS ENTRY FOR DASD.
622             AGO     .SK011
```

```
STMT    SOURCE STATEMENT                                        F01OCT71

623 .SK011   ANOP
624          BE      POPN6              YES.
625 POPN5    LA      R3,8(R3)           INCR. TO NEXT ENTRY.
626          B       POPN2              GO TEST DONE.
627 POPN6    L       R5,4(R3)           DCB WA ADRS.
628          AIF     ('&REL' EQ '21').SK030
629 .SK030   ANOP
630          LA      R5,JFCBIND2(R5)    INDIC. ADRS.
631          TM      0(R5),X'01'        TEST IF TEMPORARY DSN.
632          BO      POPN5              YES- IGNORE.
633          C       R4,=A(BDSNTBL)     WILL ENTRY FIT IN DSN TBL.
634          BE      POPN7              NO.
635          L       R5,4(R3)           DCB WA ADRS.
636          LA      R6,JFCBDSNM(R5)    DSN ADRS.
637          MVC     0(44,R4),0(R6)     MOVE DSN TO DSN TBL.
638          LA      R6,WTG1DEB(R5)     OPEN OPTION ADRS.
639          MVC     44(1,R4),0(R6)     MOVE TO DSN TBL.
640          LA      R4,45(R4)          INCR TO NEXT DSN TBL ENTRY.
641          B       POPN5
642 *
643 POPN7    ST      R4,EDSNTBL         SAVE END DSN TBL ADRS.
644          LA      R4,DSNTBL          INIT. AT TOP OF DSN TBL.
645 * SET UP DATA SENTINEL TRANSMIT BUFFER.
646 POPN8    MVC     TB+6(1),44(R4)     MOVE DSN.
647          MVC     TB+10(44),0(R4)    MOVE OPEN OPTIONS.
648          NI      TB+6,X'0F'         CLEAR HI 4 BITS.
649 POPN8A   OI      TB+6,X'20'         ACCESS CATEGORY= DSN ACCESS.
650          MVC     TB(4),=X'0034002C' SET BYTE COUNTS.
651 POPN8B   LH      R5,QETLN           SET TLN.
652          STH     R5,TB+4
653          LH      R5,DMMCT           UPDATE AND
654          LA      R5,1(R5)             MOVE
655          STH     R5,DMMCT             MSG. NO.
656          STH     R5,TB+8
657          MVI     TB+7,X'02'         TASK CODE.
658          LH      R5,TB              SET BYTE CT. IN I/O ARG LIST.
659          LA      R5,2(R5)
660          STH     R5,DMWRCT
661 *
662          CALLDS  DMWRAL             WRITE RECORD TO DATA SENTINEL.
663+         CNOP    0,4
664+         L       15,=AL4(IUDRIV)
665+         BAL     1,*+8
666+         DC      AL4(DMWRAL)
667+         BALR    14,15
668          OI      TSTABL+2,TSDSPOS   SET DISPOSE- EXPECTED.
669          MVC     DSPTIM(2),=H'20'   SET DISPOSE WAIT TIME.
670          STM     R3,R4,SVR3AND4     SAVE POINTERS.
671          B       PRQ2               GO EXIT.
672 *
673 POPN9    LM      R3,R4,SVR3AND4     RESTORE POINTERS.
674          LA      R4,45(R4)          INCR DSN TBL PTR.
675          C       R4,EDSNTBL         TEST END OF TABLE.
676          BNE     POPN8              NO- GO SEND NEXT.
677          C       R3,EDCBLIST        YES- ANY LEFT IN DCB LIST.
678          BNE     POPN1              YES- GO DO THEM.
679          B       POPN3              NO- GO POST AND EXIT.
680 *
681 * LOGON RECORD- SET UP TRANSMIT BUF.
682 *
683 PROCLOGN L       R5,QEUIDPT         USER ID. ADRS. FROM QUEUE ENTRY.
684          MVC     TB+10(8),0(R5)     MOVE USER ID.
685          MVI     TB+6,X'00'         ACCESS CATEGORIE=LOGON.
686          MVC     TB(4),=X'00100008' BYTE COUNTS.
687          B       POPN8B             GO FINISH.
688 *
689 * LOGOFF- SET UP TRANSMIT BUF.
690 *
691 PROCLOGF MVI     TB+6,X'10'         ACCESS CATEG.=LOGOFF.
692          MVC     TB(4),=X'00C80000' BYTE COUNTS.
693          B       POPN8B             GO FINISH.
694 *
695 * SCRATCH.
```

```
STMT    SOURCE STATEMENT                                                        F010CT71

696 *
697 PROCSCR   MVI    TB+6,X'05'          ACCESS TYPE= SCR.
698 PRSCR1    L      R5,QEDSNPT          DSN PTR. PTR.
699           L      R5,4(R5)            DSN PTR.
700           MVC    TB+10(44),0(R5)     MOVE DSN.
701           BAL    R8,ENSWAP           MAKE TASK SWAPPABLE.
702           B      POPN8A              GO FINISH.
703 *
704 * PROCESS RENAME.
705 *
706 PROCRENM  MVI    TB+6,X'06'          ACCESS TYPE.
707           B      PRSCR1              GO FINI'.
708 *
709 *
710 SVR3      DC     16F'0'              SAVE R0-R15.
711 OPNBUSY   DC     X'00'               OPEN-IN-PROCESS FLAG-
712 OPNCC     DC     F'0'                COMPLETION CODE.
713 WTGKB     DC     F'8'
714 EDCBLIST  DC     F'0'                SAVE END DCB LIST ADRS.
715 EDSNTBL   DC     F'0'                SAVE END DSN TBL ADRS.
716 SVR3AND4  DC     2F'0'               SAVE R3 AND R4.
717 DSNTBL    DS     225C                DATA SET NAME TABLE.
718 BDSNTBL   EQU    *                   BOTTOM OF DSN TABLE.
719 ****************************************************************************
720 * SUBROUTINE- PUT AN ELEMENT ON A QUEUE-
721 *
722 *     CALL: R0 HAS QCB ADRS.
723 *           R1 HAS ELEMENT ADRS.
724 *           L   R15,=A(PUTON)
725 *           BALR R14,R15
726 *           RETURN.
727 *
728 PUTON     STM    R3,R4,SVR1          SAVE.
729           LR     R3,R0               QCB ADRS.
730           L      R4,4(R3)            PTR. TO LAST FROM QCB.
731           ST     R1,4(R3)            ELEMENT BECOMES LAST.
732           CLC    1(2,R3),=X'0000'    TEST IF QUEUE EMPTY.
733           BE     P01                 YES.
734           ST     R1,0(R4)            NO-POINT OLD LAST AT NEW ELEMENT.
735           B      P02
736 P01       ST     R1,0(R3)            ELEMENT BECOMES NEW FIRST.
737 P02       MVC    1(3,R1),=X'000000'  CLEAR POINTER IN ELEMENT.
738           LM     R3,R4,SVR1          RESTORE.
739           BR     R14                 EXIT.
740 ****************************************************************************
741 * SUBROUTINE- TAKE AN ELEMENT OFF A QUEUE.
742 *
743 *     CALL: R0 HAS QCB ADRS.
744 *           L  R15,=A(TAKEOFF)
745 *           BALR R14,R15
746 *           RETURN- R1 CONTAINS ADRS. OF FIRST ELEMENT (WHICH WAS
747 *                   UNCHAINED). IF QUEUE WAS EMPTY THEN R1 HAS ZEROS.
748 *
749 TAKEOFF   ST     R3,SVR1             SAVE.
750           LR     R3,R0               QCB ADRS.
751           L      R1,0(R3)            PTR. TO 1ST ELEMENT FROM QCB.
752           LA     R1,0(R1)            CLEAR HIGH BYTE.
753           LTR    R1,R1               IS QUEUE EMPTY.
754           BZ     T01                 YES- EXIT WITH R1 ZERO.
755           MVC    1(3,R3),1(R1)       PTR FROM 1ST ELEMENT IS NEW 1ST.
756 T01       L      R3,SVR1             RESTORE.
757           BR     R14                 EXIT.
758 *
759 SVR1      DC     2F'0'
760 ****************************************************************************
761 * SUBROUTINE- PUT AN ELEMENT ON OPEN QUEUE.
762 *
763 *     CALL:  L   R15,=A(ENQUE)
764 *            BALR R14,R15
765 *            RETURN- R1 CONTAINS ADRS. OF ELEMENT JUST ADDED.
```

```
STMT    SOURCE STATEMENT                                                        F010CT71

766 *
767             USING   *,R15
768 ENQUE       STM     R12,R0,ENQSVR           SAVE 0-2,12-15.
769             ST      R2,ENQSVR1
770             L       R12,ENQ1                SET UP TSODS BASES.
771             L       R2,ENQ2
772             DROP    R15
773             USING   BASE12,R12,R2
774 *
775             L       R0,=A(FREEQCB)          FREE CHAIN QCB.
776             L       R15,=A(TAKEOFF)
777             BALR    R14,R15                 GET ELEMENT FROM FREE CHAIN.
778             LTR     R1,R1
779             BZ      ENQUE2                  ERROR- NONE AVAILABLE.
780             L       R0,=A(OPENQCB)          OPEN QUEUE QCB.
781             L       R15,=A(PUTON)
782             BALR    R14,R15                 PUT ELEMENT ON OPEN QUEUE.
783 ENQUE1      L       R2,ENQSVR1
784             LM      R12,R0,ENQSVR           RESTORE.
785             BR      R14                     EXIT.
786 *
787 ENQUE2      MVI     ABENDSW,X'FF'           SET ABEND FLAG.
788             LA      R1,SAVQUE-4             LET HOOKS CONTINUE.
789             B       ENQUE1
790 *
791 ENQSVR      DC      5F'0'
792 ENQSVR1     DC      F'0'
793 ENQ1        DC      A(BASE12)
794 ENQ2        DC      A(BASE12+4096)
795 ABENDSW     DC      X'00'
796 ****************************************************************************
797 * SUBROUTINE- POST TASK COMPLETE.
798 *
799 *       CALL: BAL  R8,POSTIT
800 *
801 *       REG. 8-15 ARE USED AND ONLY 12 IS PRESERVED.
802 *

803 POSTIT      L       R15,CVT                 CVT ADRS.
804             ST      R13,POSR13
805             L       R15,IEAOPT01(R15)       POST ROUTINE ADRS.
806             SR      R10,R10
807             IC      R10,OPNCC               COMPLETION CODE.
808             L       R11,QEECBPT             ECB ADRS.
809             O       R11,=X'80000000'        SET IPP.
810             LH      R13,QETJID              TJID NO.
811             LR      R9,R12                  SAVE.
812             L       R12,QETCBPT             TCB ADRS.
813             SSM     *+1                     DISABLE.
814             BALR    R14,R15                 GO POST.
815             SSM     =X'FF'                  ENABLE.
816             LR      R12,R9                  RESTORE.
817             L       R13,POSR13
818             BR      R8                      EXIT.
819 POSR13      DC      F'0'
820 ****************************************************************************
821 * SUBROUTINE- ENABLE TASK TO BE SWAPPED.
822 *    BAL R8,ENSWAP
823 ENSWAP      L       R14,QETCBPT             TCB ADRS.
824             TM      TCBTSFLG(R14),X'80'     TEST IF TASK SWAPPABLE.
825             BCR     14,R8                   NO- EXIT.
826             L       R15,CVT                 CVT ADRS.
827             L       R15,CVTTSCVT(R15)       TSO CVT ADRS FROM OS CVT.
828             L       R15,IKJEAI01(R15)       TSIP RTN ADRS. FROM TSO CVT.
829             LH      R0,QETJID               TJID NO.
830             SLL     R0,16                   POSITION.
831             IC      R0,=X'30'               FUNCTION CODE.
832             SR      R1,R1                   CLEAR.
833             SSM     *+1                     DISABLE.
834             BALR    R14,R15                 GO MARK SWAPPABLE.
835             SSM     =X'FF'                  ENABLE.
836             BR      R8                      EXIT.
```

```
STMT    SOURCE STATEMENT                                                F01OCT71

838     ****************************************************************************
839     ****************************************************************************
840     * ABNORMAL EXIT ROUTINE.
841     *
842             USING   *,R15
843     STAERTN STM     R13,R14,STAE1           SAVE.
844             L       R2,STAE2                SET BASES.
845             L       R12,STAE3
846             L       R3,STAE4                WITHDRAW ROUTINE.
847             BALR    R8,R3                   WITH DRAW OS HOOKS.
848             DROP    R15
849             BALR    R15,0                   NEW BASE.
850             USING   *,R15
851             LM      R13,R14,STAE1           RESTORE.
852             LA      R15,00                  CODE TO CONTINUE ABEND.
853             BR      R14                     RETURN,.
854     *
855     STAE1   DC      2F'0'
856     STAE2   DC      A(BASE12+4096)
857     STAE3   DC      A(BASE12)
858     STAE4   DC      A(WITHDRW)
859             DROP    R15
860     *
861     * ERROR ROUTINES.
862     *
863     INVTC   LH      XT1,=H'280'             INVALID TASK CODE.
864             B       ABORT
865     INVAC   LH      XT1,=H'281'             INVALID ACTION CODE.
866             B       ABORT
867     *
868     IAER1   LH      XT1,=H'282'             TASK ALREADY INITIATED.
869             B       ABORT
870     IAER3   LH      XT1,=H'284'             INVALID INITIATE TASK.
871             B       ABORT
872     *
873     DAER1   LH      XT1,=H'285'             DISPOSE NOT EXPECTED.
874             B       ABORT
875     *
876     EAER1   LH      XT1,=H'286'             INVALID TASK CODE FOR END ACTION.
877             B       ABORT
878     DAER3   LH      XT1,=H'287'             INVALID DISPOSE TASK.
879             B       ABORT
880     *
881     ISAER1  LH      XT1,=H'288'             ISSUE NOT EXPECTED.
882             B       ABORT
883     *
884     ISAER2  LH      XT1,=H'289'             INVALID TASK CODE FOR ISSUE.
885             B       ABORT
886     *
887     DSDOWN1 LH      XT1,=H'290'             ISSUE TIME-OUT.
888             B       ABORT
889     *
890     SDDER1  LH      XT1,=H'293'             SD MSG NO'S. DISAGREE.
891             B       ABORT
892     SDDER2  LH      XT1,=H'294'             INVALID SD DISPOSITION.
893             B       ABORT
894     *
895     DMDER1  LH      XT1,=H'295'             DEVICE MON. MSG. NO'S. DISAGREE.
896             B       ABORT
897     *
898     DSOPER  LH      XT1,=H'300'             DATA SENTINEL OPEN ERROR.
899             B       ABORT
900     *
901     DSUNCK  LH      XT1,=H'301'             DATA SENTINEL UNIT CHECK.
902             B       ABORT
903     *
904     DSTIMOUT LH     XT1,=H'302'             DATA SENTINEL NOT GIVING INTERRUPT.
905             B       ABORT
906     *
907     SDOPNER LH      XT1,=H'306'             SECURITY DECK OPEN ERROR.
908             B       ABORT
```

```
STMT    SOURCE STATEMENT                                              F01OCT71

909 *
910 PRTOPER   LH      XT1,=H'307'        PRINT OPEN ERROR.
911          B       ABORT
912 *
913 LTOPNER   LH      XT1,=H'308'        LOG OPEN ERROR.
914          B       ABORT
915 *
916 DSDOWN    LH      XT1,=H'310'        DATA SENTINEL HUNG WITH DISPOSITION.
917          B       ABORT
918 *
919 PRTERR    LH      XT1,=H'311'
920          B       ABORT
921 *
922 STOPND    BAL     R8,WITHDRW         STOP DSREP WITHOUT DUMP.
923 DSOFFL   EQU     STOPND             DS GOING OFFLINE.
924 *
925           WTO     'DS0004 TSODS IS ENDING'
926+          CNOP    0,4
927+          BAL     1,IHB0029A BRANCH AROUND MESSAGE
928+          DC      AL2(26) TEXT LENGTH
929+          DC      B'0000000000000000' MCS FLAGS
930+          DC      C'DS0004 TSODS IS ENDING'
931+IHB0029A DS       0H
932+          SVC     35
933           ABEND   313
934+          DS      0H
935+          LA      1,313 LOAD PARAMETER REG 1
936+          SVC     13 LINK TO ABEND ROUTINE
937 *
938 STOPD     LH      XT1,=H'314'        STOP DSREP WITH DUMP.
939          B       ABORT
940 *
941 QSPACER   LH      XT1,=H'316'        QUEUE SPACE GONE.
942          B       ABORT
943 *
944 STAEFAIL  LH      XT1,=H'317'        STAE MACRO FAILED.
945          B       ABORT
946 *
947 OPER1     LH      XT1,=H'318'        SYSTEM NOT RELEASE 21 OR GREATER.
948          B       ABORT
949 *
950 OPER2     LH      XT1,=H'319'        CANNOT LOCATE 1ST PATCH AREA.
951          B       ABORT
952 *
953 OPER3     LH      XT1,=H'320'        CANNOT LOCATE 2ND PATCH AREA.
954          B       ABORT
955 OPER4    EQU     OPER3
956 *
957 *
958 * ABORT THE PROGRAM.
959 *
960 ABORT     STH     XT1,ABCODE         SET ABEND CODE.
961           WTO     'DS0004 TSODS IS ENDING'
962+          CNOP    0,4
963+          BAL     1,IHB0032A BRANCH AROUND MESSAGE
964+          DC      AL2(26) TEXT LENGTH
965+          DC      B'0000000000000000' MCS FLAGS
966+          DC      C'DS0004 TSODS IS ENDING'
967+IHB0032A DS       0H
968+          SVC     35
969           BAL     R8,WITHDRW         WITHDRAW TCAM HOOKS.
970           CLOSE   (PRTDCB)   CLOSE PRINT FILE.
971+          CNOP    0,4
972+          BAL     1,*+8 BRANCH AROUND LIST
973+          DC      AL1(128) OPTION BYTE
974+          DC      AL3(PRTDCB) DCB ADDRESS
975+          SVC     20 ISSUE CLOSE SVC
976 *
977           CNOP    0,4                ALIGN.
978 ABCODE   EQU     *+6
979 KILL      ABEND   000,DUMP
980+KILL     DS      0H
```

```
STMT   SOURCE STATEMENT                                                      F01OCT71

981+         CNOP  0,4
 982+         B     *+8 BRANCH AROUND CONSTANT
 983+         DC    AL1(128) DUMP/STEP CODE
 984+         DC    AL3(000) COMPLETION CODE
 985+         L     1,*-4 LOAD CODES INTO REG 1
 986+         SVC   13 LINK TO ABEND ROUTINE
 988 ****************************************************************************
 989 ****************************************************************************
 990 *                                                                          *
 991 *   THIS ROUTINE IS ENTERED TO QUIETLY BRING TSODS DOWN.                   *
 992 *                                                                          *
 993 *      1. DISABLES                                                         *
 994 *                                                                          *
 995 *      2. REMOVES ALL HOOKS                                                *
 996 *                                                                          *
 997 *      3. POSTS ALL ENQUEUED REQUESTS AWAITING DS PROCESSING               *
 998 *                                                                          *
 999 *   GENERAL REGISTERS                                                      *
1000 *                                                                          *
1001 *      R2- BASE   R8-EXIT ADDR                                             *
1002 *      R12-BASE                                                            *
1003 *                                                                          *
1004 ****************************************************************************
1005 ****************************************************************************

1007 WITHDRW  DS    0H
1008          TM    TERMFLAG,X'FF'      HAS PROGRAM ALREADY TERMINATED.
1009          BCR   1,R8                YES- EXIT.
1010 *
1011          SSM   *+1                 DISABLE INTERRUPTS
1012          CLC   XSCRATCH(4),=X'00000000'  SVC HOOKS IN
1013          BE    SVCNOTIN                  NO-BR
1014          L     R6,CVT
1015          L     R6,CVTABEND(R6)     ADDR SECONDARY CVT
1016          L     R6,IBMORG(R6)       ADDR OF IBMORG
1017          LA    R7,116(R6)          ADDR SCRATCH ENTRY
1018          MVC   0(4,R7),XSCRATCH    RESTORE IBM ENTRY
1019          LA    R7,120(R6)          ADDR RENAME ENTRY
1020          MVC   0(4,R7),XRENAME     RESTORE IBM ENTRY
1021          LA    R7,28(R6)           ADDR OF XCTL ENTRY
1022          MVC   0(4,R7),XXCTL       RSTORE IBM ENTRY
1023 SVCNOTIN EQU   *
1024          CLC   OPATCH1A(4),=X'00000000'  OPEN HOOKS IN
1025          BE    OPENNTIN                  NO-BR
1026          L     R7,OPATCH1A
1027          MVC   0(4,R7),=X'470051B0'      RESTORE NOP
1028          L     R7,OPATCH2A
1029          XC    0(12,R7),0(R7)            CLEAR PATCH 2
1030 OPENNTIN EQU   *
1031          L     R6,CVT
1032          L     R6,CVTTSCVT(R6)     TSO CVT
1033          LTR   R6,R6               TSO RUNNING  OR STARTONG
1034          BZ    NOTSOHK             NO-BR
1035          CLC   IKJEAD02(4),=X'00000000' TSO HOOKS IN
1036          BE    NOTSOHK             NO-BR
1037          MVC   TSCVTD02(4,R6),IKJEAD02  RESTORE IBM ENTRY
1038 NOTSOHK  EQU   *
1039 *
1040 * POST MESSAGES, IF ANY.
1041 *
1042          ST    R8,WDSV8            SAVE.
1043          TM    TSTABL+2,TSSINI     ID DM INITIATED.
1044          BO    WTHD2               YES.
1045 WTHD1    L     R8,WDSV8            NO- RESTORE.
1046          MVI   TERMFLAG,X'FF'      SET PROGRAM TERMINATED.
1047          BR    R8                  EXIT.
1048 WTHD2    TM    TSTABL+2,TSDSPOS    IS THERE A DISPOSITION OUTSTANDING.
1049          BO    WTHD4               YES- POST MSG BEING HELD.
1050 WTHD3    CLC   OPENCCB+1(2),=X'0000'  IS QUEUE EMPTY.
1051          BE    WTHD1               YES- EXIT.
```

```
STMT    SOURCE STATEMENT                                            F01OCT71

1052            L       R0,=A(OPENQCB)
1053            L       R15,=A(TAKEOFF)
1054            BALR    R14,R15             GET NEXT QUEUE ENTRY.
1055            MVC     SAVQUE(FPENTSIZ-4),4(R1)  SAVE IT.
1056            L       R0,=A(FREEQCB)
1057            L       R15,=A(PUTON)
1058            BALR    R14,R15             PUT ENTRY ON FREE QUEUE.
1059 WTHD4      CLI     QETYPE,X'02'        IS ENTRY A LOGOFF.
1060            BE      WTHD3               YES- IGNORE.
1061            BAL     R8,ENSWAP            ENABLE SWAP.
1062            BAL     R8,POSTIT           POST TASK.
1063            B       WTHD3

1064 WDSV8      DC      F'0'
1065 TERMFLAG   DC      X'00'
1067 FREEQCB    DC      F'0'                PTR. TO 1ST ELEMENT IN FREE QUEUE.
1068            DC      F'0'                PTR. TO LAST ELEMENT IN FREE QUEUE.
1069 *
1070 FPENTSIZ   EQU     28                  SIZE OF 1 QUEUE ENTRY(BYTES).
1071 *
1072 OPENQCB    DC      F'0'                PTR TO 1ST ELEMENT IN OPEN QUEUE.
1073            DC      F'0'                PTR TO LAST ELEMENT IN OPEN QUEUE
1074 *
1075 * DEFINE FIELDS OF QUEUE ENTRY.
1076 *
1077 SAVQUE     DS      6F                  SAVE QUEUE ENTRY.
1078 *
1079 QETYPE     EQU     SAVQUE              TYPE OF ENTRY.
1080 QETLN      EQU     SAVQUE+4            TERMINAL LINE NO.
1081 QETJID     EQU     SAVQUE+6            TJID NO.
1082 QEECBPT    EQU     SAVQUE+8            ECB PTR.
1083 QETCBPT    EQU     SAVQUE+12           TCB PTR.
1084 QEWTGPT    EQU     SAVQUE+16           WTG PTR.(OPEN).
1085 QEDSNPT    EQU     SAVQUE+16           DSN PTR(SCRATCH,RENAME).
1086 QEUIDPT    EQU     SAVQUE+16           USER ID PTR.(LOGON).
1087 QEJOBPT    EQU     SAVQUE+20           JOB NAME PTR.
1088 *
1089 STCOMPC    EQU     X'01'               STIMER COMPLETION CODE.
1090 *
1091 SNSWTIM    DC      F'500'              MAX. SENSE WAIT TIME.
1092 *
1093 * DEFINE ACTION CODES.
1094 ***
1095 ACNONE     EQU     1                   NONE.
1096 ACINIT     EQU     2                   INITIATE TASK(AND SEND MSG).
1097 ACDISP     EQU     3                   DISPOSE OF MESSAGE(AND SEND NEXT).
1098 ACENDT     EQU     7                   END OF TASK.
1099 ACISSUE    EQU     8                   ISSUE TRANSFER.
1100 ***
1101 * DEFINE TASK CODES.
1102 ***
1103 TCNONE EQU         0                   NONE.
1104 TCSD       EQU     1                   SECURITY DECK TRANSFER.
1105 TCDM       EQU     2                   DEVICE MONITORING.
1106 TCLT       EQU     3                   LOG TRANSFER.
1107 TCSOFF EQU         8                   SENTINEL GOING OFF-LINE.
1108 *
1109 TCDP       EQU     10                  STOP DS/REP WITH DUMP.
1110 TCST       EQU     11                  STOP DS/REP WITHOUT DUMP.
1111 ***
1112 * DEFINE DISPOSITION CODES.
1113 ***
1114 DCNONE EQU         0                   NONE.
1115 DCRMSG EQU         1                   RELEASE MESSAGE(GOOD).
1116 DCDMSG EQU         2                   DISCARD MESSAGE(BAD).
1117 ***********************************************************************
1118 * DEFINE TASK STATUS TABLE(TSTABL).
1119 ****
1120 *   THE TASK STATUS TABLE REFLECTS THE CURRENT STATE
1121 *   OF ALL TASKS. THE APPROPRIATE BYTE IN TABLE IS LOCATED
1122 *   BY USING THE TASK CODE AS A FUNCTION OF THE TABLE.
1123 *
```

STMT    SOURCE STATEMENT                                                F01OCT71

```
1124 * DEFINE MASKS FOR SETTING,TESTING STATUS BITS.
1125 *
1126 TSISSUE  EQU    X'80'                ISSUE EXPECTED.
1127 TSDSPOS  EQU    X'40'                DISPOSE EXPECTED.
1128 TSEND    EQU    X'20'                END-TASK EXPECTED.
1129 TSSINI   EQU    X'10' BIT 3 = 1 _ TASK IS INITIATED.
1130 TSSWT    EQU    X'08' BIT 4 = 1 _ TASK IS IN WAIT STATE.
1131 *
1132 * MASKS FOR CLEARING STATUS BITS.
1133 *
1134 TSCINI   EQU    X'EF' TASK INITIATED.
1135 TSCISU   EQU    X'7F'
1136 TSCDSP   EQU    X'BF'
1137 TSCEND   EQU    X'DF'
1138 *
1139 * DEFINE TABLE.
1140 *
1141 TSTABL   DC     AL1(0)     0
1142          DC     AL1(0)     0       1- SECURITY DECK TRANSFER.
1143          DC     AL1(0)     0       2- DEVICE MONITORING-
1144          DC     AL1(0)     0       3- LOG TRANSFER.
1145          DC     AL1(0)     0       4
1146          DC     AL1(0)     0       5
1147          DC     AL1(0)     0       6
1148          DC     AL1(0)     0       7
1149          DC     AL1(0)             8- DATA SENT. GOING OFF-LINE.
1150          DC     AL1(0)     0       9
1151          DC     AL1(0)            10- DUMP DATA SENTINEL.
1152          DC     AL1(0)            11- STOP 360 PROGRAM.
1153 *
1154 TSTEND   EQU    *                   END OF TABLE.
1155 *
1156 * DEFINE I/C BUFFERS.
1157 *
1158          DS     0D
1159 TB       DS     40D                 TRANSMIT BUFFER.
1160 RB       DS     65D                 RECIEVE BUFFERS.
1161 SB       DS     1D                  SENSE BUFFER.
1162 SDIPRT   DC     CL4' '
1163 SDIBUF   DS     CL80                SECURITY DECK INPUT BUFFER.
1164 SDIPER   DC     CL36' '
1165 DMIPRT   DC     CL4' '
1166 DMIBUF   DS     CL80                TSO MESSAGES INPUT BUFFER.
1167 DMIPER   DC     CL48' '
1168 *
1169 * DEFINE FIELDS OF TRANSMIT BUFFER.(360-DATA SENTINEL).
1170 *
1171 TBBFCT   EQU    TB+0                 BUFFER BYTE COUNT.
1172 TBMSCT   EQU    TB+2                 MESSAGE BYTE COUNT.
1173 TBCHDA   EQU    TB+4                 CHANNEL/DEVICE ADDRESS.
1174 TBDEVT   EQU    TB+6                 DEVICE TYPE.
1175 TBTC     EQU    TB+7                 TASK CODE.
1176 TBMSNO   EQU    TB+8                 MESSAGE NUMBER.
1177 TBMESG   EQU    TB+10                MESSAGE.
1178 *
1179 * DEFINE FIELDS OF RECIEVE BUFFER. (DATA SENTINEL- 360).
1180 *
1181 RBMSCT   EQU    RB+0                 MESSAGE COUNT.
1182 RBTC     EQU    RB+3                 TASK CODE.
1183 RBMSNO   EQU    RB+4                 MESSAGE NUMBER.
1184 RBMESG   EQU    RB+6                 MESSAGE.
1185 *
1186 * DEFINE FIELDS OF SENSE BUFFER.
1187 *
1188 SBAC     EQU    SB+0                 ACTION CODE.
1189 SBTC     EQU    SB+1                 TASK CODE.
1190 SBDC     EQU    SB+2                 DISPOSITION CODE.
1191 SBMSNO   EQU    SB+4                 MESSAGE NUMBER.
1192 *
1193 * DEFINE REGISTERS.
1194 *
1195 R0       EQU    0
```

```
STMT    SOURCE STATEMENT                                                          F01OCT71

1196 R1       EQU    1
1197 R2       EQU    2
1198 R3       EQU    3
1199 R4       EQU     4
1200 R5       EQU     5
1201 R6       EQU     6
1202 R7       EQU     7
1203 R8       EQU     8
1204 R9       EQU     9
1205 R10      EQU    10
1206 R11      EQU    11
1207 R12      EQU    12
1208 R13      EQU    13
1209 R14      EQU    14
1210 R15      EQU    15
1211 *
1212 XT1      EQU    5
1213 XT2      EQU    6
1214 XT3      EQU    7
1215 XT4      EQU    8
1216 XT5      EQU    9
1217 XT6      EQU    10
1218 XSBR     EQU    11
1219 *
1220 *
1221 TCUL     EQU    11                      TASK CODE UPPER LIMIT.
1222 ACUL     EQU    8                       ACTION CODE UPPER LIMIT.
1223 DMMCT    DC     H'0'                     DEVICE MONITORING MESSAGE COUNT.
1224 LTMCT    DC     H'0'                     LOG TRANSFER MESG. COUNT.
1225 SDMCT    DC     H'0'                     SECURITY DECK MESG CT.
1226 *
1227 *
1228 DSOFFSW  DC     X'00'
1229 *
1230 SPACES   DC     132C' '
1231 SDDEM1   DC     CL28'**** ERROR- NOT SECURED****'
1232 *
1233 EOFCHR   DC     CL6'$$$EOF'
1234 *
1235 DMEM1    DC     CL22'*ERROR- CARD NOT SENT*'

1236 DSPTIM   DC     H'0'            MAX. DISPOSITION WAIT TIME.
1237 *
1238 ISUETIM  DC     H'0'            MAX. ISSUE WAIT TIME.
1239 ************************************************************************
1240 * DEFINE DATA SENTINEL ARG. LISTS.
1241 *
1242 INITAL   DC     X'0'            INITIALIZE DRIVER.
1243          DS     0F
1244 SENSAL   DC     X'3'             SENSE.
1245          DC     AL3(SB)
1246          DC     X'80'
1247          DC     X'0'
1248          DC     H'6'
1249 *
1250 SDWRAL   DC     X'2'             SECURITY DECK WRITE.
1251          DC     AL3(TB)
1252          DC     X'80'
1253          DC     X'0'
1254          DC     H'90'           80 BYTE CARD + 10 BYTE HEADER.
1255 *
1256 DMWRAL   DC     X'2'             DEVICE MONITORING WRITE.
1257          DC     AL3(TB)
1258          DC     X'80'
1259          DC     X'0'
1260 DMWRCT   DC     H'0'            NO. BYTES IN MESSAGE + 10 FOR HEADER.
1261 *
1262 LTRDAL   DC     X'1'            LOG TRANSFER READE.
1263          DC     AL3(RB)
1264          DC     X'80'
1265          DC     X'0'
1266          DC     H'518'
```

```
STMT    SOURCE STATEMENT                                                              F01OCT71

1267            LTORG
1268                    =AL4(IUDRIV)
1269                    =A(FREEQCB)
1270                    =A(PUTON)
1271                    =A(FREEPOOL)
1272                    =A(ENDFREEP)
1273                    =A(OPENHKS)
1274                    =A(SVCHKS)
1275                    =A(TSOHKS)
1276                    =A(OPENQCB)
1277                    =A(TAKEOFF)
1278                    =A(DSNTBL)
1279                    =A(BDSNTBL)
1280                    =X'0034002C'
1281                    =X'00100008'
1282                    =X'00080000'
1283                    =X'80000000'
1284                    =X'00000000'
1285                    =X'470051B0'
1286                    =H'321'
1287                    =H'20'
1288                    =H'88'
1289                    =H'80'
1290                    =X'000C'
1291                    =H'0'
1292                    =X'0000'
1293                    =X'F4C5'
1294                    =H'280'
1295                    =H'281'
1296                    =H'282'
1297                    =H'284'
1298                    =H'285'
1299                    =H'286'
1300                    =H'287'
1301                    =H'288'
1302                    =H'289'
1303                    =H'290'
1304                    =H'293'
1305                    =H'294'
1306                    =H'295'
1307                    =H'300'
1308                    =H'301'
1309                    =H'302'
1310                    =H'306'
1311                    =H'307'
1312                    =H'308'
1313                    =H'310'
1314                    =H'311'
1315                    =H'314'
1316                    =H'316'
1317                    =H'317'
1318                    =H'318'
1319                    =H'319'
1320                    =H'320'
1321                    =X'FF'
1322                    =X'000000'
1323                    =X'30'
1325    ****************************************************************************
1326    *   DEFINE DCB'S.
1327    *
1328 SDDCB      DCB     DSORG=PS,MACRF=(GM),DDNAME=SD

1330+*                          DATA CONTROL BLOCK
1331+*

1332+SDDCB     DC      OF'0'   ORIGIN ON WORD BOUNDARY

1334+*                          DIRECT ACCESS DEVICE INTERFACE

1336+         DC      BL16'0' FDAD,DVTBL
1337+         DC      A(0)    KEYLE,DEVT,TRBAL
```

```
STMT    SOURCE STATEMENT                                                        F01OCT71

1339+*                          COMMON ACCESS METHOD INTERFACE

1341+       DC      AL1(0) BUFNO
1342+       DC      AL3(1) BUFCB
1343+       DC      AL2(0) BUFL
1344+       DC      BL2'0100000000000000' DSORG
1345+       DC      A(1) IOBAD

1347+*                          FOUNDATION EXTENSION

1349+       DC      BL1'0C000000' BFTEK,BFLN,HIARCHY
1350+       DC      AL3(1) EODAD
1351+       DC      BL1'00000000' RECFM
1352+       DC      AL3(0) EXLST

1354+*                          FOUNDATION BLOCK

1356+       DC      CL8'SD' DDNAME
1357+       DC      BL1'00000010' OFLGS
1358+       DC      BL1'00000000' IFLG
1359+       DC      BL2'0101000000000000' MACR

1361+*                          BSAM-BPAM-QSAM INTERFACE

1363+       DC      BL1'00000000' RER1
1364+       DC      AL3(1) CHECK, GERR, PERR
1365+       DC      A(1) SYNAD
1366+       DC      H'0' CIND1, CIND2
1367+       DC      AL2(0) BLKSIZE
1368+       DC      F'0' WCPO, WCPL, OFFSR, OFFSW
1369+       DC      A(1) IOBA
1370+       DC      AL1(0) NCP
1371+       DC      AL3(1) EOBR, EOBAD

1373+*                          QSAM INTERFACE

1375+       DC      A(1) RECAD
1376+       DC      H'0' QSWS
1377+       DC      AL2(0) LRECL
1378+       DC      BL1'00000000' EROPT
1379+       DC      AL3(1) CNTRL
1380+       DC      F'0' PRECL
1381+       DC      A(1) EOB
1382 *TDCB  DCB     DSORG=PS,MACRF=(PM),DDNAME=LT
1383 LTDCB  DCB     DSORG=PS,MACRF=(PM),DDNAME=LT,
                    LRECL=518,BLKSIZE=3108,RECFM=FB

1385+*                          DATA CONTROL BLOCK
1386+*
1387+LTDCB  DS      0F'0' ORIGIN ON WORD BOUNDARY

1389+*                          DIRECT ACCESS DEVICE INTERFACE

1391+       DC      BL16'0' FDAD,DVTBL
1392+       DC      A(0) KEYLE,DEVT,TRBAL

1394+*                          COMMON ACCESS METHOD INTERFACE

1396+       DC      AL1(0) BUFNO
1397+       DC      AL3(1) BUFCB
1398+       DC      AL2(0) BUFL
1399+       DC      BL2'0100000000000000' DSORG
1400+       DC      A(1) IOBAD

1402+*                          FOUNDATION EXTENSION

1404+       DC      BL1'00000000' BFTEK,BFLN,HIARCHY
1405+       DC      AL3(1) EODAD
1406+       DC      BL1'10010000' RECFM
1407+       DC      AL3(0) EXLST
```

```
STMT   SOURCE STATEMENT                                                F01OCT71

1409+*                         FOUNDATION BLOCK

1411+          DC     CL8'LT' DDNAME
1412+          DC     BL1'00000010' OFLGS
1413+          DC     BL1'00000000' IFLG
1414+          DC     BL2'0000000001010000' MACR

1416+*                         BSAM-BPAM-QSAM INTERFACE

1418+          DC     BL1'00000000' RER1
1419+          DC     AL3(1) CHECK, GERR, PERR
1420+          DC     A(1) SYNAD
1421+          DC     H'0' CIND1, CIND2
1422+          DC     AL2(3108) BLKSIZE
1423+          DC     F'0' WCPO, WCPL, OFFSP, OFFSW
1424+          DC     A(1) IOBA
1425+          DC     AL1(0) NCP
1426+          DC     AL3(1) EOBR, EOBAD

1428+*                         QSAM INTERFACE

1430+          DC     A(1) RECAD
1431+          DC     H'0' QSWS
1432+          DC     AL2(518) LRECL
1433+          DC     BL1'00000000' EROPT
1434+          DC     AL3(1) CNTRL
1435+          DC     F'0' PRECL
1436+          DC     A(1) EOB
1437 PRTDCB    DCB    DSORG=PS,MACRF=(PM),DDNAME=PRT,SYNAD=PRTERR

1439+*                         DATA CONTROL BLOCK
1440+*
1441+PRTDCB   CC     0F'0' ORIGIN ON WORD BOUNDARY

1443+*                         DIRECT ACCESS DEVICE INTERFACE

1445+          DC     BL16'0' FDAD,DVTBL
1446+          DC     A(0) KEYLE,DEVT,TRBAL

1448+*                         COMMON ACCESS METHOD INTERFACE

1450+          DC     AL1(0) BUFNO
1451+          DC     AL3(1) BUFCB
1452+          DC     AL2(0) BUFL
1453+          DC     BL2'0100000000000000' DSORG
1454+          DC     A(1) IOBAD

1456+*                         FOUNDATION EXTENSION

1458+          DC     BL1'0C000000' BFTEK,BFLN,HIARCHY
1459+          DC     AL3(1) EODAD
1460+          DC     BL1'00000000' RECFM
1461+          DC     AL3(0) EXLST

1463+*                         FOUNDATION BLOCK

1465+          DC     CL8'PRT' DDNAME
1466+          DC     BL1'00000010' OFLGS
1467+          DC     BL1'00000000' IFLG
1468+          DC     BL2'0000000001010000' MACR

1470+*                         BSAM-BPAM-QSAM INTERFACE

1472+          DC     BL1'00000000' RER1
1473+          DC     AL3(1) CHECK, GERR, PERR
1474+          DC     A(PRTERR) SYNAD
1475+          DC     H'0' CIND1, CIND2
1476+          DC     AL2(0) BLKSIZE
1477+          DC     F'0' WCPO, WCPL, OFFSR, OFFSW
1478+          DC     A(1) IOBA
```

```
STMT    SOURCE STATEMENT                                                        F01OCT71

1479+          DC       AL1(0) NCP
1480+          DC       AL3(1) EOBR, EOBAD

1482+*                                  QSAM INTERFACE

1484+          DC       A(1) RECAD
1485+          DC       H'0' QSWS
1486+          DC       AL2(0) LRECL
1487+          DC       BL1'00000000' EROPT
1488+          DC       AL3(1) CNTRL
1489+          DC       F'0' PRECL
1490+          DC       A(1) EOB
1491 *
1492 *
1494 ***************************************************************************
1495 *
1496 *                       IUDRIV
1497 *              SENTINEL INTERFACE DRIVER
1498 *
1499 * CALLING SEQUENCE
1500 *
1501 *          L        15,=V(IUDRIV)
1502 *          BAL      REGN,ADDR1
1503 *          DC       A(ARGLST)
1504 *ADDR1     BALR     14,15
1505 * WHERE
1506 *    ARGLST CONTAINS COMMAND CODE, 1 BYTE
1507 *    ARGLST+1 CONTAINS I/O BUFFER ADDRESS, 3 BYTES
1508 *    ARGLST+4 CONTAINS FLAGS, 1 BYTE
1509 *    ARGLST+5 CONTAINS STATUS, 1 BYTE
1510 *    ARGLST+6 CONTAINS I/O COUNT, 2 BYTES
1511 *
1512 *
1513 IUDRIV    STM      14,12,RGSAV1
1514           L        11,0(1)          R1  POINTS TO ARGLST POINTER
1515           SR       10,10            ZERO R10
1516           IC       10,0(11)         PICK UP COMMAND CODE
1517           SLL      10,2             TIMES 4
1518           B        *+4(10)
1519           B        IUDR01           INITIALIZE
1520           B        IUDR02           READ
1521           B        IUDR04           WRITE
1522           B        IUDR05           SENSE
1523           B        IUDR06           REWIND
1524 *
1525 *    INITIALIZE
1526 *
1527 IUDR01    EQU      *
1528           B        IUDR99           SIMULATE. EXIT.          SIM DS
1529           OI       DCBAD+49,X'0C'   INHIBIT ERROR RECOVERY
1530           OPEN     (DCBAD,OUTIN)
1531+          CNOP     0,4
1532+          BAL      1,*+8  LOAD REG1 W/LIST ADDR.
1533+          DC       AL1(135) OPTION BYTE
1534+          DC       AL3(DCBAD) DCB ADDRESS
1535+          SVC      19 ISSUE OPEN SVC
1536           TM       DCBAD+48,X'10'   TEST OPEN GOOD.
1537           BO       IUDR99           OPEN GOOD.
1538           B        DSOPER           OPEN ERROR- GO ABORT.
1539 *
1540 *    READ
1541 *
1542 IUDR02    EQU      *
1543           MVI      CCWAD,X'02'      READ COMMAND TO CCW
1544 IUDR03    MVC      CCWBA(3),1(11)   BUFFER ADDRESS TO CCW
1545           MVC      CCWCT(2),6(11)   COUNT TO CCW
1546 IUDR07    EQU      *
1547           MVI      ECBAD,X'00'      INIT. ECB.
1548           EXCP     IOBAD            ISSUE I/O REQUEST
1549+          LA       1,IOBAD LOAD PARAMETER REG 1
1550+          SVC      0 ISSUE SVC FOR EXCP
1551           STIMER REAL,IUDRXIT,BINTVL=IOWAITIM  SET MAX. WAIT TIME.
```

```
STMT    SOURCE STATEMENT                                                    F01OCT71

1552+           LA      1,IOWAITIM LOAD PARAMETER REG 1
1553+           LA      0,IUDRXIT LOAD PARAMETER REG 0
1554+           LA      14,19(0,0) LOAD FLAG BYTE
1555+           SLL     14,24(0) SHIFT TO HI-ORDER BYTE
1556+           OR      0,14 AND PACK WITHEXIT ADDR
1557+           SVC     47 ISSUE STIMER SVC
1558            WAIT    ECB=ECBAD               WAIT FOR I/O.
1559+           LA      1,ECBAD LOAD PARAMETER REG 1
1560+           LA      0,1(0,0) COUNT OMITTED,1 USED
1561+           SVC     1 LINK TO WAIT ROUTINE
1562 *
1563 IUDR3B     EQU     *
1564            TM      DSOFFSW,X'FF'           IS DS BEING TESTED FOR OFFLINE.
1565            BC      IUDR99                  YES- EXIT.
1566            TM      CSWW+3,X'02'            TEST IF UNIT CHECK.
1567            BC      IUDR3C                  YES- ERROR.
1568            B       IUDR99                  RETURN TO CALLER
1569 IUDR3C     LM      14,12,RGSAV1            RESTORE.
1570            B       DSUNCK
1571 *
1572 *   WRITE
1573 *
1574 IUDR04     EQU     *
1575            L       R3,0(R11)               BUFF ADRS.              SIM DS
1576            ST      R3,SIMFRM               SET FROM ADRS.          SIM DS
1577            MVC     SIMSBMNO(2),8(R3)       SAVE MSG NO.            SIM DS
1578            LH      R4,6(R11)               BYTE COUNT.             SIM DS
1579            LA      R3,0(R4,R3)             ADD TO FROM.            SIM DS
1580            ST      R3,SIMTO                SET TO ADRS.            SIM DS
1581            MVC     SIMSBP(4),=A(SIMDSP)                            SIM DS
1582            LA      R1,SIMFRM               ARG. ADRS.              SIM DS
1583            L       R15,=V(HEXPR)
1584            BALR    R14,R15                 SNAPSHOT BUF.           SIM DS
1585            B       IUDR99                  EXIT.                   SIM DS
1586 SIMFRM     DC      F'0'                    FROM.                   SIM DS
1587 SIMTO      DC      F'0'                    THRU.                   SIM DS
1588            MVI     CCWAD,X'01'             WRITE COMMAND TO CCW
1589            B       IUDR03
1590 *
1591 *   SENSE
1592 *
1593 IUDR05     EQU     *
1594            L       R4,0(R11)               BUF. ADRS.              SIM DS
1595            L       R3,SIMSBP               SENSE ADRS.             SIM DS
1596            MVC     0(6,R4),0(R3)           MOVE SENSE TO CALLER.   SIM DS
1597            C       R3,=A(SIMNOP)
1598            BE      SIMX1
1599            C       R3,=A(SIMDSP)
1600            BE      SIMX2
1601            LA      R3,6(R3)
1602 SIMX1      ST      R3,SIMSBP               SAVE.                   SIM DS
1603            B       IUDR99                  EXIT
1604 SIMX2      LA      R3,SIMISU
1605            B       SIMX1

1606 SIMSBP     DC      A(SIMBF1)                                       SIM DS
1607 SIMBF1     DC      X'020200000000'         INITIATE DM.            SIM DS
1608 SIMISU     DC      X'080200000000'         ISSUE DM.               SIM DS
1609 SIMNOP     DC      X'010000000000'
1610 SIMDSP     DC      X'03020100'             DISPOSE DM.             SIM DS
1611 SIMSBMNO   DC      X'0000'                                         SIM DS
1612            MVI     CCWAD,X'04'             SENSE COMMAND TO CCW
1613            B       IUDR03
1614 *
1615 *   REWIND
1616 *
1617 IUDR06     EQU     *
1618            MVI     CCWAD,X'07'             REWIND COMMAND TO CCW
1619            MVC     CCWBA(3),ZERO           ZERO BUFFER ADDRESS
1620            MVC     CCWCT(2),ZERO           ZERO COUNT
1621            B       IUDR07
1622 *
```

—Continued

STMT    SOURCE STATEMENT                                                F010CT71

```
1623 IUDR99    EQU    *
1624           LM     14,12,RGSAV1
1625           BR     14                    RETURN TO CALLER
1626 *
1627 *
1628 * I/O WAIT TIME ELAPSED.
1629 *
1630           USING  *,R15
1631 IUDRXIT   TM     ECBAD,X'80'
1632           BCR    14,R14
1633           L      R8,=A(DSTIMOUT)
1634           BR     R8
1635           DROP   R15
1636           DS     0D
1637 DCBAD     DCB    DDNAME=DTASNT,MACRF=(E),DSORG=PS,IOBAD=IOBAD,RECFM=U

1639+*                          DATA CONTROL BLOCK
1640+*
1641+DCBAD    DC     0F'0'  ORIGIN ON WORD BOUNDARY

1643+*                          DIRECT ACCESS DEVICE INTERFACE

1645+         DC     BL16'0' FDAD,DVTBL
1646+         DC     A(0) KEYLE,DEVT,TRBAL

1648+*                          COMMON ACCESS METHOD INTERFACE

1650+         DC     AL1(0) BUFNO
1651+         DC     AL3(1) BUFCB
1652+         DC     AL2(0) BUFL
1653+         DC     BL2'0100000000000000' DSORG
1654+         DC     A(IOBAD) IOBAD

1656+*                          FOUNDATION EXTENSION

1658+         DC     BL1'00000000' BFTEK,BFLN,HIARCHY
1659+         DC     AL3(1) EODAD
1660+         DC     BL1'11000000' RECFM
1661+         DC     AL3(0) EXLST

1663+*                          FOUNDATION BLOCK

1665+         DC     CL8'DTASNT' DDNAME
1666+         DC     BL1'00000010' OFLGS
1667+         DC     BL1'00000000' IFLG
1668+         DC     BL2'1101000000001000' MACR
1669 *
1670 IOBAD    DS     0D
1671          DC     X'0200'
1672 SENSEW   DC     H'0'
1673          DC     A(ECBAD)         POINTS TO ECB
1674          DC     X'00'
1675 CSWW     DC     XL7'00'
1676          DC     A(CCWAD)         POINTS TO CHANNEL PROGRAM
1677          DC     A(DCBAD)
1678          DS     F
1679          DC     H'1'
1680          DC     XL10'00'
1681 *
1682 ECBAD    EQU    *
1683          DC     F'0'
1684 *
1685 CCWAD    DS     0D
1686          DC     F'0'
1687          DC     XL4'20000000'  SUPRESS INCORRECT LENGTH.
1688 CCWBA    EQU    CCWAD+1
1689 CCWCT    EQU    CCWAD+6
1690 CCWFL    EQU    CCWAD+4
1691 *
1692 ZERO     DC     F'0'
1693          DS     0D
```

—Continued

STMT    SOURCE STATEMENT                                                F01OCT71

```
1694 RGSAV1    DS      15F             REGISTER SAVE AREA
1695 IOWAITIM  DC      F'50'
1696          LTORG
1697                  =A(SIMDSP)
1698                  =V(HEXPR)
1699                  =A(SIMNOP)
1700                  =A(DSTIMOUT)
1702 ****************************************************************************
1703 ****************************************************************************
1704 *                                                                          *
1705 *   SVC HOOKS -- PUT HOOKS IN SVC TABLE (IBMORG)                           *
1706 *                                                                          *
1707 ****************************************************************************
1708 ****************************************************************************
1709 *   GENERAL REGISTERS
1710 *
1711 *     R2 -BASE    R14-RETURN
1712 *     R12-BASE    R15-ENTRY       R6-ADDR OF IBMORG
1713 *
1714 *
1715 SVCHKS    EQU     *
1716          L       R6,CVT
1717          L       R6,CVTABEND(R6)     ADDR SECONDARY CVT
1718          L       R6,IBMORG(R6)       ADDR OF IBMORG
1719          SSM     *+1                 DISABLE INTERRUPTS
1720          LA      R7,116(R6)          ADDR OF SCRATCH ENTRY
1721          MVC     XSCRATCH(4),0(R7)   SAVE OLD ENTRY
1722          MVC     0(4,R7),XSCRATCH+4  MOVE IN NEW ENTRY
1723          LA      R7,120(R6)          ADDR OF RENAME ENTRY
1724          MVC     XRENAME(4),0(R7)    SAVE OLD ENTRY
1725          MVC     0(4,R7),XRENAME+4   MOVE IN NEW ENTRY
1726          LA      R7,28(R6)           ADDRESS OF XCTL ENTRY
1727          MVC     XXCTL(4),0(R7)      SAVE OLD XCTL ENTRY
1728          MVC     0(4,R7),XXCTL+4     MOVE IN NEW ENTRY
1729          SSM     ENABLE
1730          BR      R14                 EXIT (RETURN)
1733 ****************************************************************************
1734 ****************************************************************************
1735 *                                                                          *
1736 *   ASYNCHRONOUS SVC HANDLER (IEAQTR00 - SVC SECOND LEVEL IH )             *
1737 *                                                                          *
1738 *   1. IEAQTR00-ENTERED BY THE SVC FLIH WHEN IT DETERMINES THAT            *
1739 *      THE REQUESTED SVC IS NOT TYPE 1.                                    *
1740 *                                                                          *
1741 *   2. REGISTERS                                                           *
1742 *                                                                          *
1743 *       REG 3 - CVT           REG 6 - SVC TABLE ENTRY                      *
1744 *                                                                          *
1745 *       REG 4 - TCB           REG 7 - SVC INTERRUPT SAVE AREA              *
1746 *                                                                          *
1747 *       REG 5 - CURRENT RB    REG 12- ENTRY (IEAQTR00)                     *
1748 *                                                                          *
1749 *   3. DISABLED, ZERO KEY, SUPERVISOR                                      *
1750 *                                                                          *
1751 *   4. SVC OLD PSW SAME AS WHEN SVC ISSUED                                 *
1752 *                                                                          *
1753 ****************************************************************************
1754 ****************************************************************************

1756 *****
1757 *XCTL*
1758 *****
1759 XCTL      DS      0H
1760          USING   *,R6
1761          AIF     ('&REL' EQ '21').SK002
1762 .SK002   ANOP
1763 XCTL001  CLC     8(8,R15),=C'IKJEAT03'  TSO INITIALIZATION
1764          BNE     XCTLEXIT              NO-EXIT
1765          LA      R7,8(R15)
1766          CL      R7,0(R15)             VARIFY EP
```

```
STMT   SOURCE STATEMENT                                              F010CT71

1767              BNE     XCTLEXIT            NOT CORRECT-EXIT
1768              LR      R8,R1
1769              LR      R7,R15              SAVE REGISTERS
1770              LR      R9,R14
1771              L       R15,=A(TSOHKS)
1772              BALR    R14,R15             CALL TSO HOOKS
1773              LR      R14,R9
1774              LR      R1,R8               RESTORE REGISTERS
1775              LR      R15,R7
1776 XCTLEXIT L           R6,XXCTL            RESTORE XCTL EP
1777              BR      R6                  EXIT
1778              DROP    R6

1780 *********
1781 *SCRATCH*
1782 *********
1783 SCRATCH  DS          0H
1784              USING   *,R6
1785              TM      TCBTSFLG(R4),X'80'  IS THIS A TSO SWAPPED TASK
1786              BO      SVCCON1             YES-CONTINUE
1787              MVI     10(R5),X'D0'        FLAG TRANSIENT
1788              LR      R13,R5              SVRB ADDR TO CORRECT REG
1789              L       R5,XSCRATCH         RELOAD SVC TABLE ENTRY
1790              N       R5,=X'3FFFFFFF'
1791              LR      R6,R5
1792              L       R5,28(R13)          ADDR PREVIOUS RB
1793              B       2(R14)              RETURN TO SVC SLIH

1795 *********
1796 *RENAME *
1797 *********
1798 RENAME   DS          0H
1799              USING   *,R6
1800              TM      TCBTSFLG(R4),X'80'  IS THIS A TSO SWAPPED TASK
1801              BO      SVCCON2             YES-CONTINUE
1802              L       R13,XRENAME         RELOAD SVC TABLE ENTRY
1803              N       R13,=X'3FFFFFFF'
1804              LR      R6,R13
1805 EXITS1       MVI     10(R5),X'D0'        FLAG SVRB TRANSIENT
1806              LR      R13,R5              SVRB ADDR TO CORRECT REG
1807              L       R5,28(R13)          ADDR PREVIOUS RB
1808              B       2(R14)              RETURN TO SVC SLIH

1810 SVCCON1  LR          R7,R1               SAVE PARAMETER LIST
1811              LA      R8,3                SET SCRATCH ENTRY CODE
1812              USING   SCRATCH,R6
1813              LA      R9,RENAME           RESET BASE
1814              L       R6,XSCRATCH         RELOAD SVC TABLE ENTRY
1815              DROP    R6
1816              USING   RENAME,R9
1817              B       SVCGEN
1818 SVCCON2  LR          R9,R6               RESET BASE
1819              LR      R7,R1               SAVE PARAMETER LIST
1820              LA      R8,4                SET RENAME ENTRY CODE
1821              L       R6,XRENAME          RELOAD SVC TABLE ENTRY

1823 *
1824 *
1825 * COMMON SVC SLIH PROCESSING
1826 *
1827 SVCGEN   DS          0H
1828 *
1829 * TEST FOR A TEMPORARY DATA SET--IF SO EXIT WITHOUT DATA SENTINEL-
1830 *      PROCESSING
```

```
STMT    SOURCE STATEMENT                                                    F010CT71

1831 *
1832 *   TEMPORARY DATA SETS ARE SYSNNNNN.T WITH V (MVT) IN THE 19TH POSTION
1833 *
1834 *
1835          N        R6,=X'3FFFFFFF'
1836          L        R1,4(R7)              GET DSNAME
1837          CLC      0(3,R1),=C'SYS'
1838          BNE      SVCCON3
1839          CLC      8(2,R1),=C'.T'
1840          BNE      SVCCCN3
1841          CLI      16(R1),C'.'
1842          BNE      SVCCON3
1843          CLI      18(R1),C'V'
1844          BE       EXITS1                WE FOUND A TEMPORARY DS-EXIT
1845 SVCCON3 EQU      *
1846 *
1847 *
1848 *
1849          GETMAIN  R,LV=16               STORAGE FOR ECB & REG 12-14
1850+         LA       0,16(0,0) LOAD LENGTH
1851+         BAL      1,*+4 INDICATE GETMAIN
1852+         SVC      10 ISSUE GETMAIN SVC
1853          LR       R10,R1                ECB POINTER
1854          LR       R13,R5
1855          XC       0(4,R10),0(R10)       CLEAR ECB
1856          STM      R12,R14,4(R10)        SAVE REG 12-14

1858          L        R15,TCBJSCB(R4)       GET JSCB ADDR
1859          LH       R15,JSCBTJID(R15)     GET TJID
1860          LTR      R15,R15               IS THE TJID ZERO
1861          BNZ      SVCCON4               NO-CONTINUE
1862          ABEND    4093,DUMP
1863+         DS       0H
1864+         CNOP     0,4
1865+         B        *+8 BRANCH AROUND CONSTANT
1866+         DC       AL1(128) DUMP/STEP CODE
1867+         DC       AL3(4093) COMPLETION CODE
1868+         L        1,*-4 LOAD CODES INTO REG 1
1869+         SVC      13 LINK TO ABEND ROUTINE
1870 *///////////////////////////////////////////////////////////////////////
1871 SVCCON4 L        R11,16                ADDR OF CVT
1872          L        R11,CVTTSCVT(R11)     ADDR OF TSCVT
1873          LR       R2,R11                SAVE TSCVT ADDR
1874          LTR      R11,R11               TSO RUNING
1875          BNM      RSVC2                 NO-EXIT
1876          LR       R13,R15               SAVE TJID
1877          MH       R15,TJBLNTH(R11)
1878          L        R11,TSCVTTJB(R11)     TJB ADDR
1879          LA       R11,0(R11,R15)        LOCATE CORRECT TJB
1880          LH       R11,TJBLINE(R11)      GET TERMINAL LINE NUMBER

1882 *
1883 * R11-TERMINAL LINE NUMBER, R10-ECB, R4-TCB, R13-TJID, R7-PARM,
1884 *   R8-ENTRY CODE
1885 *
1886          SSM      *+1                   DISABLE THE ALREADY DISABLED INTS
1887 *
1888 *  STORE ENTRY ON QUEUE FOR TSQDS
1889 *
1890          L        R15,=A(ENQUE)
1891          BALR     R14,R15               CALL ENQ
1892 * RETURNS WITH R1 CONTAINING ENTRY
1893          STH      R11,QUELINE(R1)       STORE TERMINAL LINE NO.
1894          STH      R13,QUETJID(R1)       STORE TJID
1895          ST       R10,QUEECB(R1)        STORE ECB
1896          ST       R4,QUETCB(R1)         STORE TCB
1897          ST       R7,QUEPARM(R1)        STORE PARMETERS
1898          STC      R8,QUEFLAGS(R1)       STORE FLAG
```

```
STMT    SOURCE STATEMENT                                            FO1OCT71

1900 *  CALL TSIP TO SET TSO TASK NON-SWAPABLE
1901 *  ********************
1902 *  *TSEVENT DONTSWAP(29)*  REGISTERS C = 2-14 ARE RESTORED ON EXIT
1903 *  ********************
1904 *
1905          TM     TCBTSFLG(R4),X'80'   TSO SWAPPED TASK
1906          BNO    SKSWAP
1907          L      R15,IKJEAI01(R2)     GET TSIP BRANCH ENTRY
1908          SR     R1,R1                CLEAR REGISTER
1909          LR     R0,R13               GET TJID
1910          SLL    0,16                 POSITION TJID
1911          IC     0,DONTSWAP           GET ENTRY CODE
1912          BALR   R14,R15              GO TO TSIP
1913 SKSWAP   EQU    *

1915 *
1916 *  POST TSODS
1917 *
1918          TM     RUNTSODS,X'80'       TSODS WAITING
1919          BNO    QWAIT2               NO-DO NOT POST
1920 *  POST ENTRY IEAOPT01
1921 *        0-9 & 14 ARE TRANSPARENT
1922 *        10-13 & 15 ARE VOLATILE
1923 *
1924 *        ENTRY ADDR IN 15
1925 *        RETURN ADDR IN 14
1926 *        WAITING TCB IN 12 (NOT NEEDED)
1927 *        ECB IN 11
1928 *        POST CODE IN 10
1929 *
1930          LR     R1,R10               SAVE ECB FOR OPEN
1931          LA     R10,29               POST CODE
1932          L      R14,16
1933          L      R15,IEAOPT01(R14)    POST ENTRY
1934          LA     R11,RUNTSODS         ECB ADDRESS
1935          BALR   R14,R15              GO TO POST
1936          LR     R10,R1

1938 *
1939 *  PUT SVC REQ IN WAIT STATE FOR DS
1940 *
1941 QWAIT2   WAIT   1,ECB=(10)
1942+QWAIT2   LA     1,0(0,10) CLEAR HIGH BYTE OF REG
1943+         LA     0,1 LOAD PARAMETER REG 0
1944+         SVC    1 LINK TO WAIT ROUTINE
1945          CLI    3(R10),0             IS REQUEST OK
1946          BE     RSVC2                YES
1947          L      R0,=XL4'80BCA000'    ABEND SVC REQUESTOR
1948          SVC    13
1949 RSVC2    LM     R12,R14,4(R10)       RESTORE REG
1950          LR     R1,R10
1951          FREEMAIN R,LV=16,A=(1)
1952+         LA     0,16(0,0) LOAD LENGTH
1953+         LA     1,0(1) CLEAR THE HIGH ORDER BYTE
1954+         SVC    10 ISSUE FREEMAIN SVC          P2504
1955          MVI    10(R13),X'D0'        FLAG SVRB TRANSIENT
1956          L      R5,28(R13)           ADDR PREVIOUS RB
1957          B      2(R14)               RETURN TO SVC SLIH

1958 XRENAME  DC     F'0'
1959          DC     X'80'
1960          DC     AL3(RENAME)          ENTRY POINT OF RENAME
1961 XSCRATCH DC     F'0'
1962          DC     X'80'
1963          DC     AL3(SCRATCH)         ENTRY POINT OF SCRATCH
1964 XXCTL    DC     F'0'
1965          DC     X'80'
1966          DC     AL3(XCTL)            ENTRY POINT OF ZCTL
```

```
STMT    SOURCE STATEMENT                                                        F01OCT71

1967            LTORG
1968                    =C'IKJEAT03'
1969                    =A(TSOHKS)
1970                    =X'3FFFFFFF'
1971                    =A(ENQUE)
1972                    =XL4'80BCA000'
1973                    =C'.T'
1974                    =C'SYS'
1975            DROP    9
1977 ****************************************************************************
1978 ****************************************************************************
1979 *                                                                          *
1980 *    OPEN HOOKS -- PUT HOOKS IN OPEN RESIDENT ROUTINE   (IFG019RA)          *
1981 *                                                                          *
1982 ****************************************************************************
1983 ****************************************************************************
1984 *    GENERAL REGISTERS
1985 *
1986 *       R2 -BASE   R14-RETURN    R6-ADDR OF IFG019RA    R8-ADDR OF PATCH2
1987 *       R12-BASE   R15-ENTRY     R7-ADDR OF NOP PATCH
1988 *
1989            DS      0H
1990 OPENHKS    EQU     *
1991            AIF     ('&REL' NE '21').SK001
1992            L       R5,16                   GET CVT ADDR
1993            LR      R6,R5
1994            LA      R0,4
1995            SLR     R6,R0
1996            CLC     0(2,R6),=CL2'&REL'      IS THIS RELEASE GT 21
                CLC     0(2,R6),=CL2'21'        IS THIS RELEASE GT 21
1997            BNE     OPER1                   NO--ERROR
1998            L       R6,CVTDMSVR(R5)         GET ADDR OF IFG019RA
1999            LA      R7,OPNOP(R6)            GET NOP PATCH ADDR
2000            CLC     0(4,R7),=X'47005180'    VERIFY CONTENTS
2001            BNE     OPER2                   NOT CORRECT-ERROR
2002            LA      R8,OPTRACE(R6)          GET ADDR OF TRACE CODE
2003 OPLP1      LA      R9,20                   LOOP COUNT
2004            CLC     0(4,R8),=X'47F05160'    VERIFY RETURN BR
2005            BE      OPFN1                   FOUND
2006            LA      R8,2(R8)                INCREMENT TO NEXT INS
2007            BCT     R9,OPLP1                LOOP & CONTINUE LOOPING
2008            B       OPER3                   ERROR-DID NOT FIND INS
2009 OPFN1      LA      R8,4(R8)                POINT TO PATCH AREA
2010            LA      R9,20
2011 OPLP2      CLC     0(12,R8),=XL12'00'      IS THERE 3 WORDS OF ZEROES
2012            BE      OFNZERO                 YES-FOUND ZEROES
2013            LA      R8,2(R8)                INCREMENT TO NEXT LOCATION
2014            BCT     R9,OPLP2                LOOP & CONTINUE SEARCH
2015            B       OPER4                   ERROR-NO ZEROES
2016 OFNZERO    LR      R10,R8
2017            SLR     R10,R6                  CALC RELATIVE ADDR PATCH2
2018            STH     R10,OPATCH1+2
2019            LA      R10,8(R10)
2020            STH     R10,OPATCH2+2
2021            SSM     *+1                     DISABLE ALL INTERRUPTS
2022            MVC     0(4,R7),OPATCH1         MOVE IN PATCHES
2023            MVC     0(12,R8),OPATCH2
2024            ST      R7,OPATCH1A             SAVE PATCH1 ADDR
2025            ST      R8,OPATCH2A             SAVE PATCH2 ADDR
2026            LA      R7,4(R7)
2027            ST      R7,OPNOPA4              SAVE RETURN ADDR
2028            SSM     ENABLE
2029            AGO     .SK015
2030 .SK015     ANOP
2031            BR      R14                     EXIT TO CALLER

2033            DS      0F
2034 OPATCH2    DC      X'58950000'             L 9,**8
2035            DC      X'07F90000'             BR9
```

```
STMT    SOURCE STATEMENT                                          F010CT71

2036            DC      A(DSASNCO)          ADDR OF OPEN ASYNC HANDLER
2037 OPATCH1    DC      X'47F50000'         B PATCH2
2038 OPATCH1A  DC      F'0'                ADDR OF PATCH ONE
2039 OPATCH2A  DC      F'0'                ADDR OF PATCH TWO
2040 ENABLE    DC      X'00'
2041            DS      0H

2043 ****************************************************************************
2044 ****************************************************************************
2045 *                                                                          *
2046 *   ASYNCHRONOUS OPEN (RESIDENT ROUTINE) HANDLER                           *
2047 *                                                                          *
2048 *   1. ENTRY IS FOR MULTIPLE DCB S FOR OPEN,TCLOSE,CLOSE,OPENJ             *
2049 *                                                                          *
2050 *   2. LAST FOUR BYTES OF MODULE ARE RESPECTIVELY:                         *
2051 *       2.1 3 BYTE EBCDIC CALL CODE '019' FOR OPEN                         *
2052 *       2.2 1 BYTE RELATIVE POINTER TO MODULES XCTL TABLE IN DW            *
2053 *                                                                          *
2054 *   3. REGISTER USAGE                                                      *
2055 *       REG 3 - CONTAINS BASE OF MODULE CURRENTLY IN CONTROL               *
2056 *       REG 5 - BASE FOR IFG019RA (RESIDENT OPEN)                          *
2057 *       REG 6 - ADDR OF WTG TABLE                                          *
2058 *                                                                          *
2059 *       0,1,3,9-15 CAN BE USED WITHOUT SAVING (SEE BELOW)                  *
2060 *                                                                          *
2061 *   4. RESIDENT ROUTINE WORK AREA                                          *
2062 *                                                                          *
2063 *       4.1 RPAR-ADDR TO OPEN PARMETER LIST                                *
2064 *       4.2 ECB...ECB CORRESPONDING TO DCB S                               *
2065 *                                                                          *
2066 ****************************************************************************
2067 ****************************************************************************
2068 *   REGISTER USAGE CONTINUED
2069 *
2070 *   R9-ENTRY POINT    R14-EXIT ADDR IN OPEN
2071 *
2072 *
2073            AIF     ('&REL' EQ '21').SK009
2074 .SK009     ANOP

2075            DC      A(ENQUE)            ADDRESS OF ENQ ROUTINE
2076            DC      A(DSASNCO)          ADDRESS OF ASYNC OPEN HANDLER
2077 *
2078 * THE ABOVE CONTANTS ARE USED BY TRANSIENT ROUTINES TO GET ADDRESS
2079 *   ABILITY
2080 *
2081            USING   *,9
2082 DSASNCO    EQU     *
2083            L       R14,OPNOPA4         GET RESIDENT ROUTINE RETURN ADDR
2084            AIF     ('&REL' NE '21').SK003
2085            CLC     0(8,R6),=C'IFG0194E'  NEXT OPEN ROUTINE FOR DASD
2086            BCR     7,R14               NO-EXIT
2087 .SK003     ANOP
2088            L       R15,16              ADDR OF CVT
2089            L       R15,0(R15)          ADDR OF NEXT & CURRENT TCB
2090            L       R15,4(R15)          ADDR OF CURRENT TCB
2091            LA      R15,0(R15)          CLEAR BYTE 0
2092            CLI     TCBPKF(R15),0       SYSTEM TASK (KEY ZERO)
2093            BNZ     OCCN9
2094            CL      R15,TCBJSTCB(R15)   SYSTEM TASK(JOB STEP TCB=CURRENT).
2095            BCR     8,R14               YES-RETURN
2096 OCGN9      EQU     *
2097            TM      TCBTSFLG(R15),X'80'  IS THIS A TSO SWAPPED TASK
2098            BCR     14,R14              NO EXIT
2099 *
2100 * TSO BACKGROUND TEST MUST BE DEVELOPED
2101 *
2102 *
2103 *
2104 * LOOK FOR ANY DASD WHICH ARE BEING OPENED--IF FOUND SAVE OPEN OPTION
2105 *   BITS IN DEB FOR TSODS
2106 * TSODS WILL LATER CLEAR THESE BITS
```

STMT    SOURCE STATEMENT                                                F01OCT71

```
2107 *
2108            LA      R10,1                   SET CONTINUE SWITCH
2109            LR      R11,R6                  ADDR OF WTG
2110            AIF     ('&REL' NE '21').SK004
2111            L       R13,RRWKA(R6)           RESIDENT ROUTINE WORK AREA ADDRESS
2112 .SK004     ANOP
2113            LA      R11,WTG1DCB(R11)        POINT TO FIRST DCB IN WTG
2114            AIF     ('&REL' EQ '21').SK005
2115 .SK005     ANOP
2116 OTEST1     CLC     0(2,R11),=X'F4C5'       NEXT DCB FOR DASD
2117            BE      OHIT                    YES-DASD
2118 .SK006     ANOP
2119 OTEST2     TM      0(R13),X'80'            END OF PARM LIST
2120            BO      CKCONOP                 YES
2121            LA      R11,8(R11)              INCREMENT TO NEXT WTG DCB ENTRY
2122            LA      R13,4(R13)              INCREMENT PARAMETER LIST POINTER
2123            B       OTEST1
2124 OHIT       SR      R10,R10                 CLEAR SWITCH
2125            L       R1,4(R11)               ADDR OF DCB O/C WORK AREA
2126            MVC     WTG1DEB(1,R1),0(R13)    SAVE OPEN OPTIONS IN DEB
2127            B       OTEST2
2128 CKCONOP    LTR     R10,R10                 CONTINUE DS PROCESSING
2129            BCR     7,R14                   NO-RETURN TO OPEN
2130 *
2131 * WE HAVE AT LEAST ONE DASD OPEN WHICH REQUIRES DATASENTINEL PROCESSING
2132 *      -TCB ADDR STILL IN R15-
2133 *
2134            LR      R12,R15                 SAVE TCB ADDR
2135            L       R15,TCBJSCB(R15)        GET JSCB ADDR
2136            LH      R15,JSCBTJID(R15)       GET TJID
2137            LTR     R15,R15                 IS THE TJID ZERO
2138            BNZ     OCONT9                  NO-BR
2139 * THERE SHOULD NOT BE A TSO SWAPPED TASK WITH A ZERO TJID
2140            ABEND   4095,DUMP
2141+           DS      0H
2142+           CNOP    0,4
2143+           B       *+8 BRANCH AROUND CONSTANT
2144+           DC      AL1(128) DUMP/STEP CODE
2145+           DC      AL3(4095) COMPLETION CODE
2146+           L       1,*-4 LOAD CODES INTO REG 1
2147+           SVC     13 LINK TO ABEND ROUTINE
2148 *////////////////////////////////////////////////////////////////////////
2149 OCONT9     L       R11,16                  ADDR OF CVT
2150            L       R11,CVTTSCVT(R11)       ADDR OF TSCVT
2151            LR      R3,R11                  SAVE TSCVT ADDR
2152            LTR     R11,R11                 TSO RUNNING
2153            BCR     11,R14                  NO-EXIT
2154            LR      R13,R15                 SAVE TJID
2155            MH      R15,TJBLNTH(R11)
2156            L       R11,TSCVTTJB(R11)       TJB ADDR
2157            LA      R11,0(R11,R15)          LOCATE CORRECT TJB
2158            LH      R11,TJBLINE(R11)        GET TERMINAL LINE NUMBER
2159            AIF     ('&REL' NE '21').SK007
2160            L       R10,RRWKA(R6)           GET RESIDENT ROUTINE WORK AREA ADDR
2161            LA      R10,4(R10)              POINT TO ECB
2162            AGO     .SK008
2163 .SK008     ANOP
2164            XC      0(4,R10),0(R10)         CLEAR ECB

2166 *
2167 * R11-TERMINAL LINE NUMBER, R10-ECB, R6-WTG, R12-TCB, R13-TJID
2168 *
2169            SSM     *+1                     DISABLE INTERRUPTS
2170 *
2171 *   STORE ENTRY ON QUEUE FOR TSODS
2172 *
2173            L       R15,=A(ENQUE)
2174            BALR    R14,R15                 CALL ENQ
2175 * RETURNS WITH R1 CONTAINING ENTRY
2176            STH     R11,QUELINE(R1)         STORE TERMINAL LINE NO
```

```
STMT    SOURCE STATEMENT                                            F01OCT71

2177            STH     R13,QUETJID(R1)     STORE TJID
2178            ST      R10,QUEECB(R1)      STORE ECB
2179            ST      R12,QUETCB(R1)      STORE TCB
2180            ST      R6,QUEWTG(R1)       STORE WTG
2181            SR      R0,R0
2182            STC     R0,QUEFLAGS(R1)     STORE OPEN FLAG

2184 *  CALL TSIP TO SET TSO TASK NON-SWAPABLE
2185 *  *******************
2186 *  *TSEVENT DONTSWAP(29)*  REGISTERS 0 = 2-14 ARE RESTORED ON EXIT
2187 *  *******************
2188 *
2189            TM      TCBTSFLG(R12),X'80'  TSO SWAPPED TASK
2190            BNO     SKIPSWAP
2191            L       R15,IKJEAI01(R3)    GET TSIP BRANCH ENTRY
2192            SR      R1,R1               CLEAR REGISTER
2193            LR      R0,R13              GET TJID
2194            SLL     0,16                POSITION TJID
2195            IC      0,DONTSWAP          GET ENTRY CODE
2196            BALR    R14,R15             GO TO TSIP
2197 SKIPSWAP   EQU     *

2199 *
2200 *  POST TSODS
2201 *
2202            TM      RUNTSODS,X'80'      TSODS WAITING
2203            BNO     OWAIT               NO--DO NOT POST
2204 *  POST ENTRY IEAOPT01
2205 *       0-9 & 14 ARE TRANSPARENT
2206 *       10-13 & 15 ARE VOLATILE
2207 *
2208 *       ENTRY ADDR IN 15
2209 *       RETURN ADDR IN 14
2210 *       WAITING TCB IN 12 (NOT NEEDED)
2211 *       ECB IN 11
2212 *       POST CODE IN 10
2213 *
2214            LR      R1,R10              SAVE ECB FOR OPEN
2215            LA      R10,19              POST CODE
2216            L       R14,16
2217            L       R15,IEAOPT01(R14)   POST ENTRY
2218            LA      R11,RUNTSODS        ECB ADDRESS
2219            BALR    R14,R15             GO TO POST
2220            LR      R10,R1
2221 *
2222 *
2223 *  PUT OPEN REQ IN WAIT STATE FOR DS
2224 *
2225 OWAIT      WAIT    1,ECB=(10)
2226+OWAIT     LA      1,0(0,10) CLEAR HIGH BYTE OF REG
2227+          LA      0,1 LOAD PARAMETER REG 0
2228+          SVC     1 LINK TO WAIT ROUTINE
2229            L       R14,OPNOPA4         GET OPEN RETURN ADDRESS
2230            CLI     3(R10),0            IS OPEN OK
2231            BCR     8,R14               YES-LET IT PASS-EXIT
2232            L       R0,=XL4'80BCA000'   ABEND OPEN REQUESTOR
2233            SVC     13
2234            DROP    9

2236 DONTSWAP   DC      X'29'               DONTSWAP ENTRY CODE
2237            AIF     ('&REL' NE '21').SK012

2238 OPNOPA4    DC      F'0'                ADDRESS OF RETURN TO RESIDENT OPEN
2239            AGO     .SK013
2240 .SK013     ANOP
2241 RUNTSODS   DC      F'0'
```

```
STMT    SOURCE STATEMENT                                                        F01OCT71

2243 CVT       EQU    X'10'                    CVT
2244 CVTABEND  EQU    X'C8'                    ADDR OF SECONDARY CVT
2245 CVTDMSVR  EQU    X'110'                   ADDR DATA MANAGEMENT RESIDENT ROUTINE
2246 CVTTSCVT  EQU    X'E4'                    ADDR TIME SHARING CVT
2247 DPAENT    EQU    3
2248 DPATJID   EQU    0
2249 IBMORG    EQU    X'84'                    ADDR OF SVC TABLE
2250 IEAOPT01  EQU    X'98'                    POST ENTRY POINT
2251 IKJEAI01  EQU    X'30'                    TSIP BRANCH ENTRY
2252 JFCBDSNM  EQU    X'64'                    DSNAME
2253 JFCBMASK  EQU    X'AC'
2254 JSCBTJID  EQU    X'10C'                   TERMINAL JOB ID
2255 OPNOP     EQU    X'15C'                   PATCH 1 RELATIVE IN RESIDENT ROUTINE
2256 OPTRACE   EQU    X'1B0'                   PATCH 2 RELATIVE IN RESIDENT ROUTINE
2257 RRWKA     EQU    16
2258 TCBJSCB   EQU    X'B4'                    ADDR OF JSCB
2259 TCBJSTCB  EQU    X'7C'                    ADDR OF 1ST TCB FOR JOB STEP
2260 TCBPKF    EQU    X'1C'                    PROTECTION KEY
2261 TCBTSFLG  EQU    148
2262 TJBLINE   EQU    X'2E'                    UNIT ADDR OF LINE
2263 TJBLNTH   EQU    X'14'                    LENGTH OF TJB
2264 TJBUSER   EQU    X'1C'
2265 TSCVTD02  EQU    X'40'                    DRIVER ENTRY POINTER
2266 TSCVTTJB  EQU    0                        TJB TABLE
2267 QUEECB    EQU    12
2268 QUEFLAGS  EQU    4
2269 QUELINE   EQU    8
2270 QUEPARM   EQU    20
2271 QUETCB    EQU    16
2272 QUETJID   EQU    10
2273 QUEUSID   EQU    20
2274 QUEWTG    EQU    20
2275 WTGSIZ    EQU    X'10'                    SIZE OF WTG IN WTG.
2276 WTG1DCB   EQU    X'20'                    1ST DCB IN WTG
2277 WTG1DEB   EQU    X'148'                   OPEN OPTION BITS IN DEB
2278 JFCBIND2  EQU    X'88'                    TEMP DSN FLAG(BIT 7) IN DEB.
2279 *
2280 *
2281           LTORG
2282                  =C'IFG0194E'
2283                  =X'470051B0'
2284                  =X'47F05160'
2285                  =XL12'00'
2286                  =A(ENQUE)
2287                  =XL4'80BCA000'
2288                  =CL2'21'
2289                  =X'F4C5'
2291 ***************************************************************************
2292 ***************************************************************************
2293 *                                                                         *
2294 *   TSO LOGON/LOGOFF HOOK INSTALLATION ROUTINE                            *
2295 *                                                                         *
2296 *     ENTRY                                                               *
2297 *        1. AT INITIALIZATION TIME OF TSODS                               *
2298 *                                                                         *
2299 *        2. AT XCTL TIME DURING TSO INITIALIZATION                        *
2300 *                                                                         *
2301 *                                                                         *
2302 ***************************************************************************
2303 ***************************************************************************
2304 TSOHKS    EQU    *
2305           USING  *,15
2306           L      R1,CVT
2307           L      R1,CVTTSCVT(R1)           TSO CVT
2308           LTR    R1,R1                     TSO RUNNING
2309           BCR    08,R14                    RETURN
2310           MVC    IKJEAD02(4),TSCVTD02(R1)  SAVE DRIVER ADDR
2311           MVC    TSCVTD02(4,R1),XDRIVER    MOVE IN NEW DRIVER ADDR
2312           BR     R14                       RETURN
2313           DROP   15

2314 IKJEAD02  DC     F'0'                     SAVE ADDR OF DRIVER  (IKJEAD02)
2315 XDRIVER   DC     A(DRIVER)
```

```
STMT    SOURCE STATEMENT                                                        F01OCT71

2317 ****************************************************************************
2318 ****************************************************************************
2319 *                                                                          *
2320 *    ASYNCHRONOUS LOGON/LOGOFF HANDLER                                     *
2321 *                                                                          *
2322 *         ( TIME SHARING DRIVER - IKJEAD02 )                               *
2323 *                                                                          *
2324 *    DRIVER IS ENTERED FROM TSIP VIA BALR 14,15                            *
2325 *                                                                          *
2326 *    REGISTER CONTENTS                                                     *
2327 *                                                                          *
2328 *          1- DPA ADDR                                                     *
2329 *         13- SAVEAREA ADDR                                                *
2330 *         14- RETURN ADDR                                                  *
2331 *         15- ENTRY POINT                                                  *
2332 *                                                                          *
2333 *    ENTRY CODES                                                           *
2334 *                                                                          *
2335 *       43  2B   LOGOFF--LOGOFF ACCOUNTING.                                *
2336 *                                                                          *
2337 *       25  19   LOGON-- PASS LOGON ACCOUNTING INFORMATION                 *
2338 ****************************************************************************
2339 ****************************************************************************

2341 DRIVER    DS    0H
2342           USING *,R15
2343           CLI   DPAENT(R1),25       LOGON
2344           BE    LOGON               YES-BR
2345           CLI   DPAENT(R1),43       LOGOFF
2346           BE    LOGOFF              YES-BR
2347           L     R15,=A(IKJEAD02)
2348           L     R15,0(R15)
2349           BR    R15                 EXIT TO TSO DRIVER
2350 *******
2351 *LOGON*
2352 *******
2353 LOGON     DS    0H
2354           STM   R14,R12,12(R13)     SAVE REG
2355           LR    R6,R1               SAVE DPA
2356           LR    R5,R13              SAVE SAVEAREA
2357           LH    R13,DPATJID(R6)     GET TJID
2358           LA    R8,1                LOGON ENTRY CODE (ENQUE)
2359           L     R11,CVT             ADDR OF CVT
2360           L     R4,0(R11)           ADDR OF NEXT & CURRENT TCB
2361           LR    R9,R15              SWITCH BASE
2362           DROP  R15
2363           USING DRIVER,R9
2364           L     R4,4(R4)            ADDR OF CURRENT TCB
2365           L     R11,CVTTSCVT(R11)   ADDR OF TSCVT
2366           LR    R2,R11              SAVE TSCVT ADDR
2367           LR    R15,R13             COPY TJID
2368           MH    R15,TJBLNTH(R11)
2369           L     R11,TSCVTTJB(R11)   TJB ADDR
2370           LA    R15,0(R11,R15)      LOCATE CORRECT TJB
2371           LH    R11,TJBLINE(R15)    GET TERMINAL LINE NUMBER
2372           LA    R7,TJBUSER(R15)     USER ID ADDR

2374 *
2375 * R11-TERMINAL LINE NUMBER, R10-ECB, R4-TCB, R13-TJID, R7-USER ID,
2376 *   R8-ENTRY CODE
2377 *
2378           SSM   *+1                 DISABLE
2379 *
2380 *    STORE ENTRY ON QUEUE FOR TSODS
2381 *
2382           L     R15,=A(ENQUE)
2383           BALR  R14,R15             CALL ENQ
2384 *    RETURNS WITH R1 CONTAINING ENTRY
```

```
STMT    SOURCE STATEMENT                                              F01OCT71

2385            STH    R11,QUELINE(R1)      STORE TERMINAL LINE NO.
2386            STH    R13,QUETJID(R1)      STORE TJID
2387            ST     R4,QUETCB(R1)        STORE TCB
2388            ST     R7,QUEUSID(R1)       STORE USER ID
2389            STC    R8,QUEFLAGS(R1)      STORE FLAG

2391    *
2392    * NO NEED TO MAKE NON-SWAPABLE--ALL DATA RESIDENT
2393    *

2395    *
2396    *  POST TSODS
2397    *
2398            L      R11,=A(RUNTSODS)
2399            TM     0(R11),X'80'         TSODS WAITING
2400            BNC    RLOG2                NO-DO NOT POST
2401    * POST ENTRY IEAOPT01
2402    *       0-9 & 14   ARE TRANSPARENT
2403    *       10-13 & 15 ARE VOLATIVE
2404    *
2405    *       ENTRY ADDR IN 15
2406    *       RETURN ADDR IN 14
2407    *       WAITING TCB IN 12 (NOT NEEDED)
2408    *       ECB IN 11
2409    *       POST CODE IN 10
2410            LA     R10,49               POST CODE
2411            L      R14,16
2412            L      R15,IEAOPT01(R14)    POST ENTRY
2413            BALR   R14,R15              GO TO POST

2415 RLOG2      LR     R13,R5
2416            LM     R14,R12,12(R13)
2417            DROP   R9
2418            USING  DRIVER,R15
2419            L      R15,=A(IKJEAD02)
2420            L      R15,0(R15)           GET DRIVER ADDR
2421            BR     R15                  EXIT TSO DRIVER
2422    ********
2423    *LOGOFF*
2424    ********
2425 LOGOFF     DS     0H
2426            STM    R14,R12,12(R13)      SAVE REG
2427            DROP   R15
2428            USING  DRIVER,R9
2429            LR     R5,R13
2430            LR     R9,R15               GET BASE
2431            LR     R6,R1                SAVE DPA
2432            LH     R13,DPATJID(R6)      GET TJID
2433            LA     R8,2                 LOGOFF ENTRY CODE
2434            L      R11,CVT
2435            L      R11,CVTTSCVT(R11)    ADDR OF TSCVT
2436            LR     R15,R13              COPY TJID
2437            L      R11,TSCVTTJB(R11)    TJB ADDR
2438            MH     R15,TJBLNTH(R11)
2439            LA     R11,0(R11,R15)       LOCATE CORRECT TJB
2440            LH     R11,TJBLINE(R11)     GET TERMINAL LINE NUMBER

2442    *
2443    * R11-TERMINAL LINE NUMBER, R13-TJID, R8-ENTRY CODE
2444    *
2445            SSM    *+1                  DISABLE
2446    *
2447    *  STORE ENTRY ON QUEUE FOR TSODS
2448    *
```

```
STMT    SOURCE STATEMENT                                            F01OCT71

2449              L       R15,=A(ENQUE)
2450              BALR    R14,R15                 CALL ENQ
2451   * RETURNS WITH R1 CONTAINING ENTRY
2452              STH     R11,QUELINE(R1)         STORE TERMINAL LINE NO
2453              STH     R13,QUETJID(R1)         STORE TJID
2454              STC     R8,QUEFLAGS(R1)         STORE FLAG

2456   *
2457   * POST TSODS
2458   *
2459              L       R11,=A(RUNTSODS)        ECB ADDRESS
2460              TM      0(R11),X'80'            TSODS WAITING
2461              BNO     QWAIT4                  NO-DO NOT POST
2462   * POST ENTRY IEAOPT01
2463   *      0-9 & 14 ARE TRANSPARENT
2464   *      10-13 & 15 ARE VOLATILE
2465   *
2466   *      ENTRY ADDR IN 15
2467   *      RETURN ADDR IN 14
2468   *      WAITING TCB IN 12 (NOT NEEDED)
2469   *      ECB IN 11
2470   *      POST CODE IN 10
2471   *
2472              LA      R10,39                  POST CODE
2473              L       R14,CVT
2474              L       R15,IEAOPT01(R14)       POST ENTRY
2475              BALR    R14,R15                 GO TO POST
2476   QWAIT4     EQU     *

2479   *
2480   * WAITY& NO-SWAP NOT NEEDED
2481   *
2482              LR      R13,R5
2483              LM      R14,R12,12(R13)
2484              DROP    9
2485              USING   DRIVER,R15
2486              L       R15,=A(IKJEAD02)
2487              L       R15,0(R15)              GET DRIVER ADDR
2488              BR      R15                     EXIT TSO DRIVER
2489              DROP    R15
2490              LTORG
2491                      =A(IKJEAD02)
2492                      =A(ENQUE)
2493                      =A(RUNTSODS)

2495   HEXPR     CSECT
2496              PRINT   NOGEN
2497              USING   *,R15
2498              SAVE    (14,12),,*
2503              LA      R3,$ASAVE
2504              ST      R13,$ASAVE+4
2505              LR      R13,R3
2506              BALR    R12,0
2507   BASE       EQU     *
2508              DROP    R15
2509              USING   BASE,R12
2510   *          CALL HEXPR(FROM,TO)
2511   *          CALL HEXPR(LOCATION,LENGTH)
2512   *
2513              LM      R1,R2,0(R1)             PICK UP ARGS
2514              STM     R1,R2,$FROM
2515              SR      R3,R3
2516              ST      R3,$WORDNO              INITIALIZE WORD COUNT
2517              TM      PRINTER+48,X'10'
```

```
STMT    SOURCE STATEMENT                                              F01OCT71

2518                BC       OPENED
2519                OPEN     (PRINTER,(OUTPUT))
2525                TM       PRINTER+48,X'10'        CHECK THE SUCCESSFUL
2526                BO       OPENOK                  OPEN BIT
2527 *                                               WELL IT DIDN'T OPEN NOW WHAT
2528                ABEND    407,DUMP
2536 OPENED         EQU      *
2537 OPENOK         EQU      *
2538 HEXPRA         EQU      *
2539                L        R4,$FROM                POINT TO AREA TO DUMP
2540                LA       R3,8                    DO 8 WORDS PER LINE
2541                LA       R5,$PLINE               POINT TO PRINT LINE
2542                MVI      $PLINE,X'40'            SET $PLINE TO BLANK
2543                MVC      $PLINE+1(131),$PLINE
2544                UNPK     0(9,R5),$WORDNO(5)      PRINT LINE NUMBER
2545                TR       0(8,R5),$HABLE-240      TR TO HEX
2546                MVI      8(R5),X'40'             BLANK SEPERATOR
2547                LA       R5,9(R5)                POINT TO NEXT SLOT IN $PLINE
2548 HEXPRB         EQU      *
2549                UNPK     0(9,R5),0(5,R4)         NEXT WORD
2550                TR       0(8,R5),$HABLE-240      CONVERT TO HEX
2551                MVI      8(R5),X'40'             BLANK SEPERATOR
2552                LA       R5,9(R5)                NEXT SLOT IN $PLINE
2553                LA       R4,4(R4)                NEXT WORD
2554                BCT      R3,HEXPRB               DONE 8 YET
2555 *                                               8 DONE
2556                ST       R4,$FROM                SAVE NEXT WORD ADDRESS
2557                S        R4,=F'32'               BACK UP FOR THE CHAR
2558                MVC      0(32,R5),0(R4)          PRINT  32 CHARS
2559                TR       0(32,R5),$TABLE         REMOVE GARBAGE CHARS
2560                PUT      PRINTER,$PLINE
2565                L        R3,$WORDNO
2566                LA       R3,32(R3)               BUMP WORD COUNT
2567                ST       R3,$WORDNO              AND SAVE IT
2568                L        R4,$FROM                SEE IF DONE YET
2569                C        R4,$TO                  IF NOT CONTINUE
2570                BL       HEXPRA                  WITH NEXT LINE
2571                L        R13,$ASAVE+4
2572 *              CLOSE    PRINTER
2573                RETURN   (14,12)
2576 $ASAVE         DS       18F
2577 $FROM          DS       F
2578 $TO            DS       F
2579 $WORDNO        DS       F
2580 $PLINE         DS       132C
2581 $HABLE         DC       CL16'0123456789ABCDEF'
2582 $TABLE         DC       193C'.'
2583                DC       CL9'ABCDEFGHI'
2584                DC       7C'.'
2585                DC       CL9'JKLMNOPQR'
2586                DC       8C'.'
2587                DC       CL8'STUVWXYZ'
2588                DC       6C'.'
2589                DC       CL10'0123456789'
2590                DC       6C'.'
2591                DS       0F
2592 PRINTER        DCB      DDNAME=FT14F001,DSORG=PS,MACRF=(PM),SYNAD=FT14ERR
2646                DS       10F
2647 FT14ERR        ABEND    408,DUMP
2655                LTORG
2656                         =F'32'
2657 *
2658 *
2660 ***************************************************************************
2661 * DEFINE QUEUE SPACE.
2662 *
2663 FREEPOOL       DS       700F                    AVAILABLE POOL- 100 ENTRIES.
2664 ENDFREEP       EQU      *-FPENTSIZ              ADRS OF LAST ENTRY.
2665 PATCH          DC       20F'0'
2666 DTASNT         CSECT
2667                ORG      START+X'3000'-X'EA8'    GET THIS SOB ON A 2K BOUNDARY
2668                END
```

```
R0=%0
R1=%1
R2=%2
R3=%3
R4=%4
R5=%5
R6=%6
SP=%6
R7=%7
PC=%7

LF=12
CR=15
BLANK=40
 SPC=40
EXCLAM=41
QUOTE=42
DOLLAR=44
APOS=47
AST=52
COMMA=54
MINUS=55
DECPT=56
SLASH=57
ZERO=60
FIVE=65
SEVEN=67
NINE=71
COLON=72
SEMI=73
EQUAL=75
QUEST=77

CRS=164020              ;ALARM I/F RESPONSE STATUS
    CRB=164022              ;         RESPONSE BUFFER
    CTS=164024              ;         TRANSMIT STATUS
    CTB=164026              ;         TRANSMIT BUFFER

TCST=177340             ;DEC TAPE STATUS REG.
    TCCM=177342             ;         COMMAND REG
    TCWC=177344             ;         WORD COUNT (NEGATIVE)
    TCBA=177346             ;         BUFFER ADDRESS
    TCDT=177350             ;         DATA REG.

LKS=177546              ;INTERVAL TIMER

TKS=177560              ;TTY I/F  KBD STATUS REG.
    TKB=177562              ;         KBD BUFFER
    TPS=177564              ;         PTR STATUS REG.
    TPB=177566              ;         PTR BUFFER

CSR=177570              ;CONSOLE SWITCH REG.
    CRB=164022              ;         RESPONSE BUFFER
    CTS=164024              ;         TRANSMIT STATUS
    CTB=164026              ;         TRANSMIT BUFFER

TCST=177340             ;DEC TAPE STATUS REG.
    TCCM=177342             ;         COMMAND REG
    TCWC=177344             ;         WORD COUNT (NEGATIVE)
    TCBA=177346             ;         BUFFER ADDRESS
    TCDT=177350             ;         DATA REG.

LKS=177546              ;INTERVAL TIMER

TKS=177560              ;TTY I/F  KBD STATUS REG.
    TKB=177562              ;         KBD BUFFER
    TPS=177564              ;         PTR STATUS REG.
    TPB=177566              ;         PTR BUFFER

CSR=177570              ;CONSOLE SWITCH REG.

PSW=177776              ;PROGRAM STATUS REG.

MEMCON=20000            ;ADDED BYTES OF CORE OVER 40000
```

-Continued

```
       QTCON=15300+MEMCON
       SYSCON=0                    ;LOGICAL TAPE BLOCK START
       TPBOOT=37000+MEMCON         ; TAPE BOOT ORIGIN
       BLKSZE=512.                 ;TAPE BLOCK SIZE(BYTES)
       IBLKSZ=310.                 ;360 I/F BLK SIZE
       CCATCH=100                  ; CONCATENATION CHAR.
        IDENUF=23.
       HDRIBU=6                    ;HEADER SIZE FOR OS TO 360 TRNFR
DISPLAACEMENTS IN TASK STATUS TABLE
        WAIT=-1                    ;WAITING (1 BYTE)
        TIMOUT=-2                  ;TIMEOUT (1 BYTE)
        ERROR=-3                   ;ERROR (1 BYTE)
        TIMERR=-4                  ;TIMER (2 BYTES)
        TIMVAL=-6                  ;TIMER VALUE (2 BYTES)
        SIGNIN=-1                  ;SIGNED IN(1BYTE)
        INPROC=-3                  ;IN PROCESS(1 BYTE )
        INPUT=0
        OUTPUT=-1
                    VOCABULARY CODES
        VCSYS1=10                  ;SYS1

TYPE CODES (I/O)
        TCLOGN=10.                 ;LOGON
        TCEND=11.                  ;END
        TCLOGF=12.                 ;LOGOFF
        TCEDIT=13.                 ;EDIT
        TCCHGE=14.                 ;CHANGE
        TCPROF=15.                 ;PROFILE
        TCNTSO=20.                 ;NORMAL TSO
        TCTIME=25.                 ;TIME
        TCSED=26.                  ;SEC DECK
        TCCINL=27.                 ;INPUT FROM CONSOLE
        TCGDIN=28.                 ;GUARD INITIALS
        IKB=177562                 ;       KBD BUFFER
        TPS=177564                 ;       PTR STATUS REG.
        TPB=177566                 ;       PTR BUFFER

CSR=177570                 ;CONSOLE SWITCH REG.

R0=%0
    R1=%1
    R2=%2
    R3=%3
    R4=%4
    R5=%5
    R6=%6
    SP=%6
    R7=%7
    PC=%7

LF=12
    CR=15
    BLANK=40
     SPC=40
    EXCLAM=41
    QUOTE=42
    DOLLAR=44
    APOS=47
    AST=52
    COMMA=54
    MINUS=55
    DECPT=56
    SLASH=57
    ZERO=60
    FIVE=65
    SEVEN=67
    NINE=71
    COLON=72
    SEMI=73
    EQUAL=75
    QUEST=77

CRS=164020                 ;ALARM I/F RESPONSE STATUS
```

```
        CRB=164022              ;          RESPONSE BUFFER
        CTS=164024              ;          TRANSMIT STATUS
        CTB=164026              ;          TRANSMIT BUFFER

TCST=177340             ;DEC TAPE STATUS REG.
        TCCM=177342             ;          COMMAND REG
        TCWC=177344             ;          WORD COUNT (NEGATIVE)
        TCBA=177346             ;          BUFFER ADDRESS
        TCDT=177350             ;          DATA REG.

LKS=177546              ;INTERVAL TIMER

TKS=177560              ;TTY I/F  KBD STATUS REG.
        TKB=177562              ;         KBD BUFFER
        TPS=177564              ;         PTR STATUS REG.
        TPB=177566              ;         PTR BUFFER

CSR=177570              ;CONSOLE SWITCH REG.

PSW=177776              ;PROGRAM STATUS REG.

MEMCON=20000            ;ADDED BYTES OF CORE OVER 40000
        GTCON=15300+MEMCON
        SYSCON=0                ;LOGICAL TAPE BLOCK START
        TPBOUT=37000+MEMCON     ; TAPE BOOT ORIGIN
        BLKSZE=512.             ;TAPE BLOCK SIZE(BYTES)
        IBLKSZ=310.             ;360 I/F BLK SIZE
        CCATCH=100              ; CONCATENATION CHAR.
        IDENUF=23.
        HDRIBO=6                ;HEADER SIZE FOR OS TO 360 TRNFR
DISPLAACEMENTS IN TASK STATUS TABLE
        WAIT=-1                 ;WAITING (1 BYTE)
        TIMOUT=-2               ;TIMEOUT (1 BYTE)
        ERROR=-3                ;ERROR (1 BYTE)
        TIMERR=-4               ;TIMER (2 BYTES)
        TIMVAL=-6               ;TIMER VALUE (2 BYTES)
        SIGNIN=-1               ;SIGNED IN(1BYTE)
        INPROC=-3               ;IN PROCESS(1 BYTE )
        INPUT=0
        OUTPUT=-1
                        VOCABULARY CODES
        VCSYS1=10               ;SYS1

TYPE CODES (I/O)
        TCLOGN=10.              ;LOGON
        TCEND=11.               ;END
        TCLOGF=12.              ;LOGOFF
        TCEDIT=13.              ;EDIT
        TCCHGE=14.              ;CHANGE
        TCPROF=15.              ;PROFILE
        TCNTSO=20.              ;NORMAL TSO
        TCTIME=25.              ;TIME
        TCSED=26.               ;SEC DECK
        TCCINL=27.              ;INPUT FROM CONSOLE
        TCGDIN=28.              ;GUARD INITIALS
        TCNMTA=29.              ;NORMAL MSG TO ATTENDANT
        TCLOGP=48.              ;LOG PRINT
        TCPRMT=49.              ;PROMPT
        TCFBE=50.               ;FIRCE BLOCK END
        TCWEOF=51.              ;WRITE EOF
        TCLGPC=52.              ;LOG PRINT CONSOLE LINE
SOURCE CODES
        SCDSA=1                 ;DATA SENTINEL A
        SC651=10.               ;360/65 =1
PROCESSOR CODES
        PCDSA=1                 ;DATA SENTINEL A

TASK CODES
        TSDTSK=1.               ;SECURITY DECK
        DEVTSK=2.               ;DEVICE MONITORING
        TLTTSK=3.               ;TRANSFER LOG
        TKNTSK=4.               ;KERNEL
        TCKTSK=5.               ;CHECKSUM
        LATTSK=6                ;LIST ATTRIBUTES
```

```
USUTSK=8.           ;DS GOING OFFLINE
PRCTSK=9.           ;20 SEC PROCESS TIMER
STDTSK=10.          ;STOP 360 WITH DUMP
STPTSK=11.          ;STOP 360
SENTSK=12.          ;SENSE
TYPTSK=13.          ;TYPIN
SGNTSK=14.          ;SIGN IN
LGPTSK=15.          ;LOG PRINT
EMPTSK=16.          ;EMERGENCY PWR
HALTSK=17.          ;HOLD ALL 360 TASKS
DECTSK=18.          ;DEC TAPE OUT
ATCTSK=19.          ;ATTENDANCE CHECK
ATRTSK=20.          ;ATTENDANCE RESPONSE
CLKTSK=21.          ;15 MIN CLOCK
TAMTSK=23.          ;TAMPER
TLRTSK=24.          ;TRANSMIT LOG READ
OPCTSK=26.          ;OPR.CK. TIME OUT
ITMTSK=50.          ;INTERRUPT TAPE MSG
TEL=8.              ;LENGTH OF EACH ENTRY IN TASK STATUS
 TSDDSP=0
 DEVDSP=8.
 TLTDSP=16.
 TKNDSP=24.
 TCKDSP=32.
 LATDSP=40.
 DAUDSP=48.
 USDDSP=56.
 STPDSP=80.
 SENDSP=88.
 TYPDSP=96.
 SGNDSP=104.
 LGPDSP=112.
 EMPDSP=120.
 HALDSP=128.
 DECDSP=136.
 ATCDSP=144.
 ATRDSP=152.
 CLKDSP=160.
 TAMDSP=176.
 TLRDSP=184.

VCACCT=10.        ;VOCAB CODE FOR ACCT
FAILURE CODES

FCOK=0            ;OK
  FCLV1=1           ;LEVEL 1
  FCLV2=2           ;LEVEL 2
  FCLV3=3           ;LEVEL 3
   LCEOL=0          ;LEX CODE END OF LINE
   LCALFA=1         ;LEX CODE ALPHA
   LCNUM=2          ;LEX CODE NUMERIC
   LCSDEL=3         ;LEX CODE SIGNIFICANT DEL.
   LCIDEL=4         ;LEX CODE INSIGNIFIENT DEL.
   LCLIT=5          ;LEX CODE LITERAL
   LCCCAT=6         ;LEX CODE CONCATENATE

VCINP=46
  VCOUT=47
  SFVOCD=44

SIVOCD=45         ;SIGN IN VOCABULARY CODE
  TSVOCD=42         ;TIME SET VOCABULARY CODE
  SRTVOC=10         ;FIRST VOCABULARY CODE
  ENDVOC=50         ;LAST VOCABULARY CODE
  ALLVOC=37         ;ALL CODE
  SCATBN=62         ;TAPE BLK OF SCAT TABLE
I/O CODES

IOCTYP=1          ;TYPE
  IOCTAP=2          ;TAPE
  IOCTT=3           ;TYPE AND TAPE
 TCB FLAGS

KLOGN=400         ;LOGGED ON
```

―Continued

```
            KFLA=1000              ;FULL AUTHORITY
            KSECRT=10000           ;SECRET PASSWRD IN USE
     SCAT  FLAGS
            SOID=20000             ;SECURITY OFFICER ID BIT
            ATTID=4000             ;ATTENDANT ID BIT
            EDPSID=2000            ;EOP SPECIALIST ID BIT
            USID=2000              ;USER ID
            SCRTID=40000
            WRTENB=40000           ;WRITE ENABLE

KALT=20                ; ALERT LIGHT
            KV1=10                 ; LEVEL 1 ALARM LIGHT
            KV2=4                  ; LEVEL 2 ALARM LIGHT
            KV3=2                  ; LEVEL 3 ALARM LIGHT
            KVACK=1                ; ACKNOWLEDGE LIGHT

KOPR=20                ; SYSTEM OPERATIONAL LIGHT
            KIBOL=10               ;360 ON LINE
            KRS=4                  ;RESPONSE REQ'D
            KRDY=02                ;KEYBOARD READY (MMDREG)
            KATCHK=1               ;ATTENDANCE CHK.

KOPRCK=20              ;OPERATIONAL CHECK (MCSREG)
            KMRGY=10               ;BATTERY POWER ON(MCSREG)
            KTAMPR=4               ;TAMPER ALERT
            KREQ=02                ;INPUT REQUEST (MCSREG)
            KFLT=1                 ; FAULT CHECK LIGHT

360 INTERFACE CODES
            KIFBSY=1               ;BUSY
            KIFDN=2                ;DONE
            KIFONL=200             ;ON LINE
            KIFENB=400             ;ENABLE
            KIFRBK=4000            ;READ BACK
            KIFSNS=10000           ;SENSE
            KIFRD=40000            ;READ
            KIFWRT=100000          ;WRITE
ACTION CODES
            KANOOP=1.              ;NO-OP
            KAITSK=2.              ;INITIALIZE
            KADISP=3.              ;DISPOSE
            KAWT=4.                ;WAIT
              .WORD  ERTRAP,40     ;010 ILLEGAL INSTRUCTION
              .WORD  MONSET,40     ;014 MONITOR SETUP (.WORD 3)
              .WORD  QRBK,0        ;020 QT BREAKPOINT (IOT)
              .WORD  PFAIL,100     ;024      POWER FAILURE
              .WORD  XNFER,340     ;030 SYS TRANSFER (EMT)
              .WORD  DEBUG,40      ;034      TRACE TRAP
MSBQ:       .WORD  0               ;40  MSG TYPE QUEUE START VECTOR
MSBQN:      .WORD  0               ;42  MSG TYPE QUEUE END VECTOR
MSBQG:      .WORD  0               ;44  MSG TYPE QUEUE GET
MSBQP:      .WORD  0               ;46  MSG TYPE QUEUE PUT
ROOM:       .WORD  0               ;50  AVAILABLE BYTES IN TYPE QUEUE
MCHRAD:     .WORD  0               ;52  CHARACTER TBL ADDRESS
MVOCAD:     .WORD  0               ;54  VOCABULARY TBL ADDRESS
TYPPTR:     .WORD  0               ;/ 056 CONSLE INPUT POINTER
            .WORD  CSLINT,100      ;060 TTY KEYBOARD
            .WORD  PRTINT,100      ;064 TTY PRINTER
SW1TYM:     .WORD  0               ;070 1 TIME SWITCH
INTCNT:     .WORD  0               ;072 CLOCK INTERRUPT COUNT
XATBP:      .WORD  XATBL           ;074 SCAT START VECTOR
XATBNP:     .WORD  XATBN           ;076 SCAT END VECTOR
            .WORD  CLKINT,300      ;100 INTERVAL TIMER
DECFCB:     .WORD  0               ;104 CURRENT FCB FOR DEC OUTPUT
DCMFCB:     .WORD  0               ;106 CURRENT FCB FOR STACKED MSGS.
TAPNTR:     .WORD  0               ;110 CURRENT POSITION IN TAPE BLOCK
UNQPTR:     .WORD  0               ;112 TAPE 0 QUEUE GET
QUEQPT:     .WORD  0               ;114 TAPE 0 QUEUE PUT
UN1PTR:     .WORD  0               ;TAPE 1 QUEUE GET
            .WORD  CSLINT,200      ;120 CONSOLE INTERRUPT
UNQQUE:     .WORD  0               ;126 TAPE 1 QUEUE(36)
            .=.+34.
```

```
UNQENU=.
         .WORD  IBMINT,300              /170 IBM 360 I/F
M360:    .BYTE  1                       /174 360 PRESENT
MALC:    .BYTE  0                       /175 ALARM CONSOLE NOT PRESENT
MTAM:    .BYTE  1                       /176 TAMPER SYSTEM PRESENT
SAVKEY:  .BYTE  0                       /177 SAVED TIME KEY FOR DECOUT(5)
         .=.+4
         .EVEN
REPCDE:  .WORD  0                       /204 REPLY CODE
QUE1PT:  .WORD  0                       /206 TAPE 1 QUEUE PUT
         .=214
         .WORD  TAPINT,300              /DEC TAPE INTERRUPT
TAPKEY:  .BYTE  0                       /220 TIME KEY FOR DECOUT(5)
         .=.+4
KEYBUF:  .BYTE  0                       /225 TIME KEY FOR TYPING TIME(5)
         .=.+4
TYMBUF:  .WORD  0                       /232 BUFFER FOR TIME PRINTOUT(30)
         .=.+26
SECOND:  .WORD  0                       /262  SECOND
MINUTE:  .WORD  0                       /264  MINUTE
HOUR:    .WORD  0                       /266  HOUR
DAY:     .WORD  0                       /270  DAY
MONTH:   .WORD  0
         .WORD  TPBF3,0
;
MALREG:  .WORD  40                      /A/C ALARM REGISTER(CORE IMAGE)
MCSREG:  .WORD  0                       /A/C STATUS REGISTER(CORE IMAGE)
MMOREG:  .WORD  40                      /A/C MODE   REGISTER(CORE IMAGE)
IDPTR:   .WORD  0                       /ATTENDANT ID SAVE AREA
OWNKEY:  .BYTE  0                       /366 TIME KEY FOR SYSTEM DOWN(5)
         .=.+4
         .=400
XFRTBL:  .WORD  0                       /SYSTEM TRANSFER TABLE
         .=.+374
STACK=.                                 /FIRST STACK POSITION
; INSERT I/F TABLE
         .=1000
;///////////////////////////////////////////////////////////////////////
;
; IBM 360 INTERFACE STATUS TABLE    /1000
;
;
IBSTAT:  .BYTE  00,00,00,14,00,02,02,10     /1000
ESTAT:   .BYTE  14,02,02,14,00,02,02,14     /1010
;
;    FILE CONTROL BLOCKS
FCB6:    .BYTE  0,0,0,1,ITMTSK,0     ; 1020 FILE CONTROL BLOCK 6
         .WORD  0,0
FCB7:    .BYTE  0,0,0,1,ITMTSK,0     /1032 FILE CONTROL BLOCK 7
         .WORD  0,0
FCB8:    .BYTE  0,0,0,1,ITMTSK,0     /1044 FILE CONTROL BLOCK 8
         .WORD  0,0
FCB9:    .BYTE  0,0,0,1,ITMTSK,0     /1056 FILE CONTROL BLOCK 9
         .WORD  0,0
FCB10:   .BYTE  0,0,0,1,ITMTSK,0     /1070 FILE CONTROL BLOCK 10
         .WORD  0,0
FCB11:   .BYTE  0,0,0,3,TYPTSK,0     /1102 FILE CONTROL BLOCK 11
         .WORD  INBUF+6,0            ; PRIORITY=3
FCB12:   .BYTE  0,0,0,2,TAMTSK,0     /1114 FILE CONTROL BLOCK 12
         .WORD  0,0                  ; PRIORITY=2
FCB13:   .BYTE  0,0,0,0,DECTSK,0     /1126 FILE CONTROL BLOCK 13(MOUNT)
         .WORD  0,0                  ; PRIORITY=0
FCB14:   .BYTE  0,0,0,0,TLTTSK,0     /1140 FILE CONTROL BLOCK 14
         .WORD  TPBF1-6,BLKSZE+6     ; PRIORITY=0
FCB15:   .BYTE  0,0,0,0,TLTTSK,6     /1152 FILE CONTROL BLOCK 15
         .WORD  TPBF2-6,BLKSZE+6     ; PRIORITY=0
FCB16:   .BYTE  0,0,0,1,TLRTSK,0     /1164 FILE CONTROL BLOCK 16
         .WORD  TPBF1,0              ; PRIORITY=1
FCB17:   .BYTE  0,0,0,1,TLRTSK,0     /1176 FILE CONTROL BLOCK 17
         .WORD  TPBF2,0              ; PRIORITY=1
;
TAPROT:  .WORD  0                       /1076 TASK PROCESSOR TABLE(50)
         .=.+68.
                                     ;BYTES RSRVD FOR TIME KEYS&TIME MSG.
OFFSET:  .WORD  33.
SINITV:  .WORD  SINIT                ; VECTOR TO SINIT
```

```
;////////////////////////////////////////////////////////////////////////
;   START VOLATILE STORAGE (STILL COMMON )
;
STRVOL=.
MFRAME: .WORD   0
MTST:   .BYTE   0
MTTIF:  .BYTE   0
MTZER:  .BYTE   0
OPEIP:  .BYTE   0
        .EVEN
SENSOG: .WORD   0               ;SENSE GET
SENSOP: .WORD   0               ;SENSE PUT
        .=.+HDRIBO              ;DISPLACEMENT FOR 360 HEADER
TPBF1:  .WORD   0               ;TAPE BUFFER 1 (514)
        .=.+HDRIBO              ;DISPLACEMENT FOR 360 HEADER
TPBF2:  .WORD   0               ;TAPE BUFFER 2 (514)
        .=.+512.
        .=.+HDRIBO              ;DISPLACEMENT FOR 360 HEADER
TPBF3:  .WORD   0               ;TAPE BUFFER 3 (514)
        .=.+512.
        .=.+IDENOF              ;OFFSET FOR IDENTIFIER
        .EVEN
IBMBF1: .WORD   0               ;IBM BUFFER(150)
        .=.+148.
        IBFMAX=.-IBMBF1
        .=.+IDENOF              ;OFFSET FOR IDENTIFIER
        .EVEN
IBMBF2: .WORD   0               ;IBM BUFFER 2 (150)
        .=.+148.
UNIQUE: .WORD   0               ;TAPE 1 QUEUE(36)
        .=.+34.
UN1END=.
INBUF:  .WORD   0               ;CONSOLE INPUT LINE (86)
        .=.+84.
        ENDVOL=.-2
; TASK STATUS TABLE- 8 BYTES PER TASK -LAST WORD IS TIMER VALUE
;       IN SECONDS
TASTTB: .WORD   0,0,0,60.       ;01 SEC.DECK
        .WORD   0,0,0,600.      ;02 DEV.MON.
        .WORD   0,0,0,60.       ;03 TRANSFER LOG
        .WORD   0,0,0,0         ;04 KERNEL
        .WORD   0,0,0,0         ;05 CHECKSUM
        .WORD   0,0,0,0         ;06 LIST ATTRIBUTES
        .WORD   0,0,0,0         ;07 DISPLAY ACTIVE USERS
        .WORD   0,0,0,0         ;08 DS GOING OFFLINE
        .WORD   0,0,0,0         ;09 20 SEC PROCESS TIMER
        .WORD   0,0,0,0         ;10
        .WORD   0,0,0,0         ;11 STOP 360
        .WORD   0,0,0,60.       ;12 SENSE
        .WORD   0,0,0,60.       ;13 TYPIN
        .WORD   0,0,0,120.      ;14 SIGN IN
        .WORD   0,0,0,0         ;15 LOG PRINT
        .WORD   0,0,0,900.      ;16 EMERGENCY PWR.
        .WORD   0,0,0,0         ;17 HOLD ALL 360 TASKS
        .WORD   0,0,0,0         ;18 DEC TAPE OUTPUT
        .WORD   0,0,0,300.      ;19 ATTENDANCE CHECK
        .WORD   0,0,0,120.      ;20 ATTENDANCE RESPONSE
        .WORD   0,0,0,900.      ;21 15 MINUTE CLOCK
        .WORD   0,0,0,0         ;22 UNUSED
        .WORD   0,0,0,0         ;23 TAMPER
        .WORD   0,0,0,0         ;24 TRANSMIT LOG READ
        .WORD   0,0,0,0         ;25 UNUSED
        .WORD   0,0,0,5         ;26 OPERATIONA CK TIME OUT
        .WORD   0,0,0,0         ;RESERVE SPACE
        .WORD   0,0,0,0         ;RESERVE SPACE
        .WORD   0,0,0,0         ;RESERVE SPACE
        .WORD   0,0,0,0         ;RESERVE SPACE
        .WORD   0,0,0,0         ;RESERVE SPACE
IBWA:   .WORD   0               ;VECTOR TO I/F ADDRESS
IBBC:   .WORD   0               ;VECTOR TO I/F BYTE CNT
IBST:   .WORD   0               ;VECTOR TO I/F STATUS
IBCD:   .WORD   0               ;VECTOR TO I/F COMMAND
IFWA:   .WORD   0               ;SIMULATED I/F ADDRESS
IFBC:   .WORD   0               ;SIMULATED I/F BYTE CNT
IFST:   .WORD   0               ;SIMULATED I/F STATUS
IFCD:   .WORD   0               ;SIMULATED I/F COMMAND
;
```

```
              ENDCOM=.
              .=57000-1014.        ; ORG FOR SCAT
XATBL:  .WORD   0                  ;SCAT
        .=.+1000.
XATBN:  .WORD   0                  ;END OF SCAT
IRESET: .WORD   0                  ;RESET CODE
ATMAX:  .WORD   900.                ;MAX ATT.CHECK (15 MINUTES)
ATMIN:  .WORD   300.                ;MIN ATT.CHECK ( 5 MINUTES)
        .WORD   0,0
        .ENDCOM
;********************************************************************
;
;
;
;////////////////////////////////////////////////////////////////////
;            DATA SENTINEL SYSTEM MONITOR
;            COPYRIGHT  APRIL 1972  DATA SENTINEL CORP.
;            SUBSIDIARY OF BASIC COMPUTING ARTS, INC.
;            3197 PARK AVE.     PALO ALTO,CALIFORNIA
;////////////////////////////////////////////////////////////////////
;
STRTQT: MOV     #550,SP
        MOV     @#PSW,-(SP)
;  TEST FOR A/C OR TTY
        CLR     @#CRS               ;CLEAR STATUS
        CLRB    MALC                ;ASSUME NO A/C
        MOVB    #21,@#CTB           ;SELECT REG 1
        CLR     R0                  ;WAIT
        INC     R0
        BNE     .-2
        CMPB    @#CRB,#221          ;VALID ECHO ?
        BEQ     SQT05               ;YES=A/C PRESENT
        CMPB    @#CRB,#376          ;OP CHECK ?
        BNE     SQT10               ;NO= A/C NOT HERE
SQT05:  INCB    MALC                ;SET A/C HERE
        JSR     R7,CLRALC           ;AND RESET
SQT10:  JSR     R7,QT
SRTSYS: JSR     R7,MONSET
        JSR     R7,@#SINITV
        JMP     SUPVSR
QMANUL: MOV     #40,@#PSW           ;MANUAL ENTRY
        MOV     #40,-(SP)
        JSR     R7,QT
        BR      QMANUL
;
;//////////////////////////////QT DEBUG SYS.//////////////////////////
;       TITLE  01 AUG 71                   QT
;EAJ
;QT ENTRANCE
;
;
QT:     CLRB    QBKFLG              ;CLEAR BRKPNT FLAG
        ADD     #2,(SP)             ;ADJUST ENTRY POINTER
        JMP     QSETUP              ;GO SETUP
;
QTQT:   MOV     #QTMSG1,R1          ;!QT!
        JSR     R7,TTYPRT
;
QTABRT: JSR     R7,QTCRET           ;TYPE CR AND 3 BLANKS
;
QTBEGN: JSR     R7,QTINIT           ;INITIALIZE FOR NEXT INPUT
;
QTNEXT: JSR     R7,QTRDCH           ;READ TYPER, R0 = CHAR
        MOV     QTREG,R1            ;R1 = OPEN REGISTER
                                    ;LOOKUP ACTION
        MOV     #QTACTS-2,R3
QTFIND: TST     (R3)+               ;BUMP TO NEXT CONTROL CHAR
        TST     (R3)                ;TEST ZERO
        BEQ     QTNMBR              ;ASSUME & NUMBER
                                    ;TEST AGAINST ACTUAL
        BNE     QTFIND              ;NOPE
        JMP     @0(R3)              ;GO TO ACTION
```

```
////////////////////////////////////////////////////////////////////////
QTACTS: .WORD   BLANK,QTBLNK            ;ACTION TABLE
        .WORD   COMMA,QTCOMA            ; ,
        .WORD   DECPT,QTPNT             ; .
        .WORD   CR,QTRET                ; RET
        .WORD   SEMI,QTSEMI             ; ;
        .WORD   COLON,QTCOLN            ; :
        .WORD   SLASH,QTSLSH            ; /
        .WORD   MINUS,QTMINS            ; -
        .WORD   101,QTLOW               ; A
        .WORD   102,QTBYTE              ; B
        .WORD   103,QTCMP               ; C
        .WORD   104,QTDUMP              ; D
        .WORD   106,QTPAT               ; F
        .WORD   107,QTGO                ; G
        .WORD   175,QTABRT              ;ALT MODE
        .WORD   122,QTRFB               ; R
        .WORD   123,QTRFPB              ; S
        .WORD   120,QTBKP               ; P
        .WORD   130,QTWIPE              ; X
        .WORD   127,QTWORD              ; W
        .WORD   111,QTLOAD              ; I
        .WORD   117,QTSAVE              ; O
        .WORD   132,QTHIGH              ; Z
        .WORD   131,QTYES               ; Y
        .WORD   116,QTNO                ; N
        .WORD   0                       ;END OF TABLE
;
;                                       ;AT THIS POINT, ASSUME R0 = NUMBER
QTNMBR: MOVB    R0,(R5)+                ;ASSUMED NUMBER TO BUFFER
        INC     R4                      ;COUNT CHAR
        MOV     #QTBUF,R3
        JSR     R7,BIN                  ;CONVERT TO BINARY(AS IF COMPLETE)
        .WORD   QTTEMP
;
        MOV     R1,QTCNTS               ;SAVE CONVERTED NUMBER
        INCB    QTNUMF                  ;SET 'NUMBER PRESENT' FLAG
        MOVB    QTTEMP,R0               ;INSPECT NUMBER TYPE
        BEQ     QT2                     ; ILLEGAL. GO ABORT.
        TSTB    QTTEMP(R0)              ;TEST NUMBER ERROR
        BEQ     .+6
QT2:    JMP     QTABRT                  ; ILLEGAL GO ABORT
        JMP     QTNEXT                  ; OK TO CONTINUE
;
////////////////////////////////////////////////////////////////////////
; SPACE BAR OPENS REGISTER AND DISPLAYS
;

.WORD   131,QTYES               ; Y
        .WORD   116,QTNO                ; N
        .WORD   0                       ;END OF TABLE
;
;                                       ;AT THIS POINT, ASSUME R0 = NUMBER
QTNMBR: MOVB    R0,(R5)+                ;ASSUMED NUMBER TO BUFFER
        INC     R4                      ;COUNT CHAR
        MOV     #QTBUF,R3
        JSR     R7,BIN                  ;CONVERT TO BINARY(AS IF COMPLETE)
        .WORD   QTTEMP
;
        MOV     R1,QTCNTS               ;SAVE CONVERTED NUMBER
        INCB    QTNUMF                  ;SET 'NUMBER PRESENT' FLAG
        MOVB    QTTEMP,R0               ;INSPECT NUMBER TYPE
        BEQ     QT2                     ; ILLEGAL. GO ABORT.
        TSTB    QTTEMP(R0)              ;TEST NUMBER ERROR
        BEQ     .+6
QT2:    JMP     QTABRT                  ; ILLEGAL GO ABORT
        JMP     QTNEXT                  ; OK TO CONTINUE
;
////////////////////////////////////////////////////////////////////////
; SPACE BAR OPENS REGISTER AND DISPLAYS
;
;COMMA OPENS REGISTER AND DISPLAYS RELATIVE.
;
```

```
;DEC PNT OPENS REGISTER,AND DISPLAYS RELATIVE BRANCH
;
QTCOMA: INCB    QTRELF              ; SET RELATIVE FLAG
        BR      QTBLNK
;
QTPNT:  INCB    QTBRF               ; SET RELATIVE BRANCH FLAG
;
QTBLNK: JSR     R7,QTOPEN           ;OPEN NEW REGISTER,IF ANY
        TSTB    QTNUMF              ;TEST NUMBER PRESENT
        BNE     QTBLK1              ;YES
        JSR     R7,QTPRAD           ;NO, PRINT ADDRESS
QTBLK1: JSR     R7,QTPRCN           ;PRINT CONTENTS
        JMP     QTBEGN              ;GO AGAIN
;
;////////////////////////////////////////////////////////////////////
; CARRIAGE RETURN CLOSES REGISTER, OPENS AND DISPLAYS NEXT
;
QTRET:  JSR     R7,QTCLOZ           ;CLOSE PRESENT REGISTER
QTRET0: TST     (R1)+               ;BUMP TO NEXT
QTRET1: MOV     R1,QTREG            ;SAVE NEW REG,
QTRET3: JSR     R7,QTCRET           ; TYPE 3 BLANKS AND CR
QTRET2: JSR     R7,QTPRAD           ;PRINT ADDRESS
        JSR     R7,QTPRCN           ;PRINT CONTENTS
        JMP     QTBEGN              ;GO AGAIN
;
;////////////////////////////////////////////////////////////////////
;SLASH CLOSES REGISTER,AND MODIFIES
;
;SEMICOLON CLOSES REGISTER, AND MODIFIES RELATIVE ADDRESS
;
;COLON CLOSES REGISTER,AND MODIFIES RELATIVE BRANCH
;
;
QTSEMI: INCB    QTRELF              ; SET RELATIVE FLAG
        BR      QTSLSH
;
QTCOLN: INCB    QTBRF               ;SET RELATIVE BRANCH FLAG
;
QTSLSH: JSR     R7,QTCLOZ           ; CLOSE PRESENT REGISTER
        JMP     QTBKP3
;
;////////////////////////////////////////////////////////////////////
;MINUS SIGN CLOSES REGISTER,AND OPENS AND DISPLAYS LAST,
;
QTMINS: JSR     R7,QTCLOZ           ;CLOSE PRESENT REGISTER
QTMIN0: TST     -(R1)               ;BACKUP TO LAST
        BR      QTRET1              ;GO CR AND TYPE,
;
;////////////////////////////////////////////////////////////////////
;
; LETTER A SETS LOW LIMIT
;
```

```
QTLOW: JSR    R7,QTOPEN              ; OPEN NEW REG, IF ANY
       MOV    R1,QTLIM1              ; SAVE LOW LIMIT
       JMP    QTBKP3
;////////////////////////////////////////////////////////////////////////////
;LETTER B SETS 'BYTE' MODE
;
QTBYTE: JSR   R7,QTOPEN              ; OPEN NEW REG,IF ANY
        CLR   QTABIT                 ;ALLOW ODD ADDRESSES
        BIS   #100000,QTRET0         ;TRANSFORM INSTRUCTIONS INTO BYTE MOD
        BIS   #100000,QTMIN0
        BIS   #100000,QTCLZ1
        BIS   #100000,QTPRCN
        JMP   QTRET3                 ;90 CR.
;
;////////////////////////////////////////////////////////////////////////////
;LETTER C COMPARES MEMORY FOR OPEN ADDRESS
;
QTCMP:  JSR   R7,QTOPEN              ;OPEN NEW REG,IF ANY
        MOV   R1,-(SP)               ;SAVE OPEN ADDRESS
        MOV   #1000,R4               ;START SEARCH ABOVE STOCK
        MOV   #37776+MEMCON,R5       ;SET UPPER LIMIT
QTCMP1: CMP   R4,R5                  ;TEST END REACHED
        BHI   QTCMP3                 ;YES
        MOV   (R4)+,R2               ;FETCH NXT WORD
        MOV   R2,R3                  ;SAVE IT
        CMP   R2,(SP)                ;TEST ABSOLUTE
        BEQ   QTCMP2                 ;YES
        ADD   R4,R2                  ;TEST RELATIVE
        CMP   R2,(SP)
        BEQ   QTCMP2                 ;YES
        BIC   #177400,R3             ;TEST BR
        MOVB  R3,R2
        ASL   R2
        ADD   R4,R2
        CMP   R2,(SP)
        BNE   QTCMP1                 ;NO
QTCMP2: MOV   R4,R1
        TST   -(R1)                  ;BACKUP 2
        JSR   R7,QTCRET              ;CARRIAGE RET.
        JSR   R7,QTPRAD              ;  AND PRINT ADDRESS.
        JSR   R7,QTPRCN              ;PRINT CONTENTS
        BR    QTCMP1                 ;CONTINUE
QTCMP3: MOV   (SP)+,R1               ;RESTORE OPEN REGISTER
        JMP   QTABRT
;////////////////////////////////////////////////////////////////////////////
;
; LETTER D DUMPS MEMORY TO IBM 360
;
;LETTER D DUMPS MEMORY BETWEEN LIMITS:
QTDMP:  BIC   #7,QTLIM1              ;FORCE LOW=XXXX0.
        MOV   QTLIM1,R1              ;R1 CONTAINS OPEN ADDRESS.
        MOV   #4767,QTDMP5           ;SET CR/LF SWITCH
        JSR   R7,QTCRET              ;CR/LF.
        JMP   QTDMP2                 ;START PROCESSING.
QTDMP1: TST   (R3)+                  ;8 COLUMNS DONE?
        BNE   QTDMP                  ;NO-DO NEXT COLUMN.
        MOV   R1,-(SP)               ;SAVE R1.
        MOV   #QTMSGA,R1             ;
        JSR   R7,TTYPRT              ;PRINT ASCII.
        MOV   (SP)+,R1               ;RESTORE R1.
;
QTDMP2: MOV   #-8.,R3                ;INITIALIZE 8 COL.COUNT.
        MOV   #QTMSGA-1,R2           ;SET ASCII PTR.
        CMP   QTLIM2,R1              ;R1 + HIGH LIMIT?
        BLO   QTBEGN                 ;YES=ALL DONE
        TSTB  MALC                   ;TEST FOR ALARM CONSOLE.
        BNE   QTDMP3                 ;YES=
        TSTB  @#TKS                  ;KEYSTRUCK FROM TTY?
        BMI   QTBEGN                 ;YES=ABORT PRINTING
        BR    QTDMP4                 ;NO=PRINT ADR.
QTDMP3: TSTB  @#CRS                  ;KEY STRUCK?
        BMI   QTBEGN                 ;YES=ABORT PRINTING.
        MOV   #401,QTDMP5            ;NO=DISABLE TTY CR/LF.
```

```
QTDMP4: JSR    R7,QTPRAD           ;PRINT ADDRESS
QTDMP5: JSR    R7,QTCRET           ;IF TTY-DO LF/CR
        JSR    R7,QTPRCN           ;PRINT CONTENTS
        JSR    R7,QTDMP6           ;CONVERT FIRST BYTE TO ASCII.
        JSR    R7,QTDMP6           ;CONVERT NEXT
        BR     QTDMP1              ;CONTINUE.
;
;
QTDMP6: CMPB   (R1),#140           ;BYTE GREATER THAN 140?
        BHI    QTDMP8              ;YES - PRINT A '.'
        CMPB   (R1),#37            ;BYTE LESS THAN 37?
        BLOS   QTDMP8              ;YES- PRINT A '.'
        MOVB   (R1),(R2)+          ;NO-MOVE BYTE TO ASCII BUF.
QTDMP7: TSTB   (R1)+               ;BUMP R1.
        RTS    R7                  ;EXIT.
QTDMP8: MOVB   #56,(R2)+           ;MOVE A'56 TO ASCII BUF.
        BR     QTDMP7              ;BUMP AND EXIT.
;
QTMSGA: .WORD  0,0,0,0,0,0,0,0     ;ASCII BUFFER
        .BYTE  CR,CR,CR,LF,0 ;
;////////////////////////////////////////////////////////////
;
;
; LETTER F FORMATS PATCHES FROM IBM 360
;
QTPAT:  JMP    QTABRT
;
;////////////////////////////////////////////////////////////
; LETTER G CAUSES RESTORE AND GO
;
;LETTER R CAUSES RESTORE AND RETURN
;
QTGO:   JSR    R7,QTOPEN           ;OPEN NEW REGISTER,IF ANY
QTEXIT: MOV    R1,@QTPC            ;PUT 'GO' ADRS IN PC
;
QTRFB:  MOV    @QTPC,R1            ;RETURN ADDRESS
        JSR    R7,QTPRAD           ; PRINTED
        JSR    R7,QTCRET           ;CR/LF
        JSR    R7,QTWSET           ;SET WORD MODE
        MOV    QKBSAV,@#TKS        ;RESTORE KEYBOARD INTRUPT.
        MOV    QTPSAV,@#TPS        ;RESTORE PRINTER STATUS
        TSTB   TASTTB+OPCDSP       ;OP CHECK RUNNING ?
        BEQ    QTRX                ;NO
        MOV    OPCTSK,R3           ;YES-RESTART OP CHECK
        JSR    R7,SETTIM           ; TIMER
QTRX:   JSR    R7,XRSTR
        TST    (SP)+               ;POP OUT SLOT RESERVED FOR R6
        MOV    QCKSAV,@#LKS        ;RESTART CLOCK
        RTI                        ;EXIT FROM IOT TRAP
;
QTRFPB: MOV    QTPS,@QTPC
        BR     QTRFB
;
;////////////////////////////////////////////////////////////
;LETTER P SETS A BREAKPOINT
;
QTBKP:  JSR    R7,QTOPEN           ;OPEN NEW REGISTER,IF ANY
;
        JSR    R5,QTLOOK           ;LOOK FOR AVAILABLE SLOT(MARKED -1)
        .WORD  QTMONE              ;
        BR     QTBKP2              ;NONE AVAILABLE, TABLE IS FULL
;
        MOV    R1,(R3)+            ;R3=AVAILABLE SLOT, FILL WITH OPEN REG. AD
        MOV    (R1),(R3)           ;R3+2=CONTENTS OF BREAKPOINT WORD
;
        MOV    QTBKP1,(R1)         ;BREAKPOINT WORD = IOT
;
        JSR    R7,QTCRET           ;CAR RETURN
QTBKP3: JSR    R7,QTPRAD           ; PRINT ADDRESS
        JSR    R7,QTPRCN           ;PRINT CONTENTS
        JSR    R7,QTCRET           ;CAR RETURN
        JMP    QTBEGN              ;GO AGAIN
QTBKP1: IOT                        ;BREAKPOINT INSTRUCTION
;
```

-Continued

```
QTBKP2: MOV     R1,-(SP)
        MOV     #QTMSG4,R1
        JSR     R7,TTYPRT           ;!TOO MANY !
        MOV     (SP)+,R1
        JMP     QTBEGN          ;GO AGAIN
;
;
;///////////////////////////////////////////////////////////////////////
;LETTER X WIPES ALL BREAKPOINTS
;
QTWIPE: MOV     R1,-(SP)            ;SAVE R1
        JSR     R7,QTCRET           ;CARRIAGE RETURN
        MOV     #QTBKTB,R4          ;SEARCH BREAK POINT TABLE
QTWP1:  CMP     R4,#QTBKTN          ;TEST END
        BHIS    QTWP4               ;YES
;
        TST     (R4)+               ;TEST THIS SLOT
        BMI     QTWP3               ;NOT IN USE
        MOV     -2(R4),R1           ;R1= BREAKPOINT ADDRESS
        MOV     #-1,,-2(R4)         ;MAKE SLOT AVAILABLE
        MOV     (R4),(R1)           ; RESTORE
        CLR     (R4)                ;CLEAR
QTWP2:  JSR     R7,QTPRAD           ;PRINT ADDRESS
        JSR     R7,QTCRET           ;CAR. RET.
QTWP3:  TST     (R4)+               ;BUMP TO NEXT SLOT
        BR      QTWP1               ;KEEP GOING
;
QTWP4:  JSR     R7,QTCRET           ;CARRIAGE RETURN.
        MOV     (SP)+,R1            ;RESTORE R1
QTSAVX:JMP     QTBEGN              ;GO AGAIN
;
;
;///////////////////////////////////////////////////////////////////////
;LETTER W RESTORES "WORD" MODE
;
QTWORD: JSR     R7,QTOPEN           ;OPEN NEW SEG,IF ANY
        JSR     R7,QTWSET           ;SET WORD MODE
        JMP     QTRET3              ;GO CR
QTWSET: BIC     #1,R1               ;FORCE OPEN ADDRESS TO BE EVEN
        BIC     #1,QTREG            ;
        MOV     #1,QTABIT           ;SUPPRESS ODD ADDRESSES
        BIC     #100000,QTRET0      ;RESTORE INSTRUCTIONS TO WORD MODE
        BIC     #100000,QTMIN0      ;RESTORE INSTRUCTIONS TO WORD
        BIC     #100000,QTCLZ1
        BIC     #100000,QTPRCN      ;
        RTS     R7                  ;EXIT
;
;///////////////////////////////////////////////////////////////////////
; LETTER I (INPUT) LOADS GIVEN BLOCK FROM GIVEN UNIT
;
QTLOAD: MOV     #READ,R4            ;TAPE READ
        BR      QTSAV1
;
;///////////////////////////////////////////////////////////////////////
; LETTER O (OUTPUT) WRITES GIVEN BLOCK ON GIVEN UNIT
;
QTSAVE: MOV     #WRITE,R4           ;TAPE WRITE
QTSAV1: MOV     R0,R2
        MOV     #QTWARN,R1
        JSR     R7,TTYPRT           ;!WARN!
        JSR     R7,QTRDCH           ;NEXT TYPE BYTE
        CMP     R0,R2               ;TEST SAME
        BNE     QTSAVX              ;NO
        MOV     QTCNTS,R0           ;YES
        CMP     R0,#620             ;TEST MAX
        BLOS    .+4
        CLR     R0                  ;MAKE ZERO
        JMP     @R4                 ;EXECUTE TAPE
;///////////////////////////////////////////////////////////////////////
;
; LETTER Z SETS HIGH LIMIT
;
QTHIGH: JSR     R7,QTOPEN           ; OPEN NEW REG IF ANY
        MOV     R1,QTLIM2           ; SAVE HIGH LIMIT.
        JMP     QTBKP3
```

```
;//////////////////////////////////////////////////////////////////////////////
;
;
;BREAKPOINTS RETURN HERE
;
QRBK:   INCB    QBKFLG              ;SET BRKPUT FLAG
        BR      QTSE10
;
        QSETUP=.
QTSE10: MOV     @#LKS,QCKSAV        ;SAVE CLOCK STATUS
        MOV     @#TKS,QKBSAV        ;SAVE KBD INTRUPT.
        CLR     @#TKS               ;CLEAR KBD INTERUPT
; WAIT FOR TTY PRINTER TO GO UNBUSY
QTSE05: TSTB    @#TPS               ;PRINTER BUSY?
        BPL     QTSE05              ; YES-WAIT
        JSR     R7,WAITMS           ;WAIT FOR 100 MSEC
        TSTB    @#TPS               ;CHECK FOR SPURIOUS
        BPL     QTSE05              ; DONE
; SAVE TTY PRINTER STATUS
        MOV     @#TPS,QTPSAV        ;SAVE PRINTER STATUS
        CLR     @#TPS               ;DISABLE PRINT INTERRUPTS
        MOV     SP,QTPC             ;SAVE PC POINTER
        MOV     R6,-(SP)            ;SAVE R6
        ADD     #6,(SP)             ;
        JSR     R7,XSAVE            ;SAVE REGISTERS
        MOV     SP,QTPTR            ;SAVE STACK START POINTER
        MOV     @QTPC,R1            ;OPEN REG = WHERE BREAKPOINT OCCURED.
        BIC     #1,R1               ;DON'T ALLOW ODD ADDRESS
;                                   ;(IE,FROM SPURIOUS INTERRUPT ENTRY)
        TST     -(R1)               ;BACKUP 2
        MOV     R1,@QTPC            ;SET PROPER RETURN POINT
        MOV     R1,QTREG            ; SAVE BREAKPOINT ADDRESS
        JSR     R7,QTWSET           ;SET WORD MODE
        TSTB    QBKFLG              ;TEST BREAKPUT FLAG
        BNE     .+6                 ;YES
        JMP     QTQT                ;NO. GO TO START
;
        JSR     R5,QTLOOK           ;LOOK FOR MATCHING ADDRESS
        .WORD   QTREG
        BR      QRBK2               ;NOT FOUND
;
        MOV     #-1,,(R3)+          ;MAKE SLOT AVAILABLE
        MOV     (R3),(R1)           ;RESTORE ORIGINAL CONTENTS
        CLR     (R3)                ;ZERO SLOT
QRBK1:  MOV     R1,-(SP)
        MOV     #QTMSG5,R1
        JSR     R7,TTYPRT           ;|BKPT|
        MOV     (SP)+,R1
        JSR     R7,QTPRAD           ;PRINT ADDRESS
        JSR     R7,QTCRET           ;PRINT CARRIAGE RET.
        JMP     QTBEGN              ;GO AGAIN
;
QRBK2:  MOV     R1,-(SP)
        MOV     #QTMSG6,R1
        JSR     R7,TTYPRT           ;|PERM|
        MOV     (SP)+,R1
        ADD     #2,@QTPC            ;BUMP OVER PERMANENT BREAKPOINT
        ADD     #2,QTREG            ;
        MOV     QTREG,QTPS
        BR      QRBK1               ;GO EXIT
;
;BREAKPOINT TABLE LOOKUP
;       JSR     R5,QTLOOK
;       .WORD   (ADDRESS OF LOOKUP PATTERN)
;       BR      (NO-HIT ADDRESS)
;
QTLOOK: MOV     (R5)+,R4            ;R4 = PATTERN ADDRESS
        MOV     #QTBKTB,R3          ;R3 = BRKPT TABLE ADDRESS
QTLK1:  CMP     R3,#QTBKTN          ;TEST END OF TABLE
        BLO     QTLK2               ;NO
        RTS     R5                  ;YES, NO-HIT EXIT
QTLK2:  CMP     (R3)+,(R4)          ;TEST SLOT START WORD VERSUS PATTERN
        BEQ     QTLK3               ;HIT
```

```
            TST      (R3)+                 ;BUMP TO NEXT SLOT
            BR       QTLK1                 ;KEEP TRYING
    ;
    QTLK3:  TST      -(R3)                 ;R3 = HIT ADDRESS
            TST      (R5)+                 ;BUMP TO NORMAL EXIT
            RTS      R5                    ;HIT EXIT.
    ;
    ;
    ;///////////////////////////////////////////////////////////////////////
    ;INITIALIZE FOR NEXT COMMAND
    ;
    QTINIT: CLRB     QTNUMF                ;RESET NUMBER PRESENT FLAG
            CLRB     QTRELF                ;RESET RELATIVE FLAG
            CLRB     QTBRF                 ;RESET RELATIVE BRANCH FLAG
            CLR      R4                    ;RESET BYTE COUNTER
            MOV      #QTBUF,R5             ;SET NUMBER BUFFER POINTER
            RTS      R7                    ;EXIT
    ;
    ;///////////////////////////////////////////////////////////////////////
    ; RETURN CARRIAGE AND TYPE 3 BLANKS
    ;
    QTCRET: MOV      R1,-(SP)
            MOV      #QTMSG2,R1
            JSR      R7,TTYPRT             ;CR AND 3 BLANKS
            MOV      (SP)+,R1
            RTS      R7                    ;EXIT
    ;
    ;
    ;///////////////////////////////////////////////////////////////////////
    ;OPEN NEW REGISTER
    ;
    QTOPEN: TSTB     QTNUMF                ;TEST NUMBER PRESENT
            BEQ      QTOPN2                ;NO,EXIT
            MOV      QTCNTS,R1             ;YES. OPEN NEW REG.
            CMP      #7,R1                 ;TEST REF 0 TO 7
            BLOS     QTOPN1                ;NO
            ASL      R1                    ;DOUBLE REGISTER NO.
            ADD      QTPTR,R1              ;YES. ADD STACK ADRS FOR REGISTERS
    QTOPN1: BIC      QTABIT,R1             ;MAKE ADDRESS EVEN IF NECESSARY
            MOV      R1,QTREG              ; NO
    QTOPN2: RTS      R7                    ;EXIT
    ;
    ;
    ;///////////////////////////////////////////////////////////////////////
    ;CLOSE OPEN REGISTER USING COLLECTED NUMBER AS NEW CONTENTS
    ;
    QTCLOZ: TSTB     QTNUMF                ;TEST NUMBER PRESENT
            BEQ      QTCLZ2                ; NO
            TSTB     QTBRF                 ;TEST RELATIVE BRANCH FLAG
            BEQ      QTCLZ1                ;NO
    ;
            SUB      R1,QTCNTS             ;YES
            SUB      #2,QTCNTS             ;COMPUTE RELATIVE ADDRESS
            ASR      QTCNTS                ;DIVIDE BY TWO
            MOVB     QTCNTS,(R1)           ;MOVE DESPLACEMENT TO BRANCH INST
            RTS      R7                    ;EXIT.
    ;
    QTCLZ1: MOV      QTCNTS,(R1)           ;MOVE CONTENTS TO WORD
            TSTB     QTRELF                ;TEST RELATIVE FLAG
            BEQ QTCLZ2                     ;NO
            SUB      R1,(R1)               ;YES. MAKE CONTENTS RELATIVE
            SUB      #2,(R1)
    QTCLZ2: RTS      R7                    ;EXIT.
    ;
    ;
    ;///////////////////////////////////////////////////////////////////////
    ;PRINT OPEN REGISTER ADDRESS
    ;
    QTPRA0: MOV      R1,R0                 ;R0 = ADDRESS
    QTPR01: MOV      #8.,R2                ;R2 = OCTAL
            MOV      #QTGEN+1,R3           ;R3 = GEN BUFFER ADDRESS +1
            JSR      R7,UNBIN              ;CONVERT TO OCTAL
    ;
```

```
            MOVB    #BLANK,-(R3)
            MOVB    #BLANK,7(R3)
            CLRB    10(R3)
            MOV     R1,-(SP)
            MOV     R3,R1
            JSR     R7,TTYPRT       ;TYPE ADDRESS
            MOV     (SP)+,R1
            RTS     R7              ;EXIT.
;
;
;////////////////////////////////////////////////////////////////////////
;PRINT OPEN REGISTER CONTENTS
;
QTPRCN:     MOV     (R1),R0         ;R0 = CONTENTS
            MOVB    #BLANK,QTGEN+8.
            TSTB    QTBRF           ;TEST RELATIVE BRANCH
            BNE     QTPRC2          ;YES
            TSTB    QTRELF          ;TEST RELATIVE FLAG
            BEQ     QTPRC1          ;NO
QTPRC0:     ADD     R1,R0           ;YES, MAKE CONTENTS ABSOLUTE
            ADD     #2,R0
QTPRC1:     BR      QTPRD1          ;GO TYPE
QTPRC2:     MOV     #-1.,R0         ;SETUP SIGN EXTENSION
            BIT     #200,(R1)       ;TEST NEGATIVE DESPLACEMENT
            BNE     QTPRC3          ;YES
            CLR     R0              ;NO
QTPRC3:     MOVB    (R1),R0         ;MOVE DISPLACEMENT TO ADDRESS
            ASL     R0              ;MULTIPLY WORD COUNT BY TWO
            BR      QTPRC0
;
;
;////////////////////////////////////////////////////////////////////////
;READ ONE TYPED CHARACTER (KBD SELECTED IF OCTAL 62 = NOT ZERO)
;
QTRDCH:     TSTB    MALC            ;A/C HERE ?
            BNE     QTRD3           ;YES
            INCB    @#TKS           ;NO-GET CHAR FROM
QTRD2:      TSTB    @#TKS           ; TTY
            BPL     QTRD2
            MOVB    @#TKB,R0
            BIC     #177600,R0
QTRD2A:     MOV     R0,QTMSG7
            MOV     R1,-(SP)
            MOV     #QTMSG7,R1      ;ECHO CHARACTER
            JSR     R7,TTYPRT
            MOV     (SP)+,R1
            RTS     R7              ;OTHERWISE-RETURN
;
QTRD3:      CLR     TASTTB+OPCDSP-TIMERR ;STOP OP CHECK TIMER
            CLR     @#CRS
            MOVB    #23,@#CTB       ;SELECT MODE REG
QTRD4:      TSTB    @#CRS
            BPL     QTRD4
            MOVB    #42,@#CTB       ;ENABLE KBD RDY
QTRD5:      TSTB    @#CRS
            BPL     QTRD5
            MOVB    @#CRB,R0
;
QTRD6:      TSTB    @#CRS           ;WAIT FOR CHAR
            BPL     QTRD6
            MOVB    @#CRB,R0
            BIC     #177600,R0
            CMP     R0,#140
            BLOS    QTRD2A          ;ADJUST CASE
            SUB     #40,R0
            BR      QTRD2A
;
;////////////////////////////////////////////////////////////////////////
;    Y SETS STATE FLAGS
;
QTYES:      JSR     R7,QTRDCH       ;GET NEXT CHARACTER
            CMPB    R0,#101         ;SET ALARM CONSOLE ?
            BNE     QTYD20          ;NO
            INCB    MALC            ;YES-ALARM CONSOLE PRESENT
```

—Continued

```
QTY010: JMP    QTABRT              ;ACTION FINISHED
QTY020: CMPB   R0,#102             ;SET IBM 360 ?
        BNE    QTY030              ;NO
        INCB   M360                ;YES - 360 IS PRESENT
        JSR    R7,VEC360           ;SETUP INTERFACE VECTORS
        BR     QTY010              ;AND LEAVE
QTY030: CMPB   R0,#124             ;TAMPER SYSTEM ?
        BNE    QTY010              ;NO-ILLEGAL ENTRY
        INCB   MTAM                ;YES-TAMPER SYSTEM PRESENT
        BR     QTY010
;////////////////////////////////////////////////////////////////////////
;    N RESETS STATE FLAGS
;
QTN:    JSR    R7,QTRDCH           ;GET NEXT CHARACTER
        CMPB   R0,#101             ;RESET ALARM CONSOLE ?
        BNE    QTN020              ;NO
        CLRB   MALC                ;YES-A/C NOT PRESENT
QTN010: JMP    QTABRT              ;ACTION FINISHED
QTN020: CMPB   R0,#102             ;RESET IBM 360 ?
        BNE    QTN030              ;NO
        CLRB   M360                ;YES- 360 NOT PRESENT
        JSR    R7,VECSIM           ;SETUP INTERFACE VECTORS
        BR     QTN010              ;AND LEAVE
QTN030: CMPB   R0,#124             ;RESET TAMPER SYSTEM PRESENT ?
        BNE    QTN010              ;NO-INVALID ENTRY
        CLRB   MTAM                ;YES-TAMPER SYSTEM NOT PRESENT
        BR     QTN010              ;AND LEAVE
;////////////////
;
;////////////////
;
UMTEMP: .WORD  0
QTABIT: .WORD  0                   ;ADDRESS MASK BIT
QBKFLG: .WORD  0                   ;BRK PUT ENTRY FLAG
QTBRF:  .WORD  0                   ; RELATIVE BRANCH FLAG
QTBUF:  .WORD  0,0,0,0,0           ;NUMBER CONVERSION BUFFER
QCKSAV: .WORD  0                   ;SAVE CLOCK
QTCNTS: .WORD  0                   ;CONTENTS OF OPEN REGISTER
QTGEN:  .WORD  0,0,0,0,0           ;NUMBER GENERATION BUFFER
QTLIM1: .WORD  STACK               ; LOW LIMIT
QTLIM2: .WORD  37776+MEMCON        ; HIGH LIMIT
QKBSAV: .WORD  0                   ;KBD SAVE
QTMONE: .WORD  -1                  ;MINUS ONE
;
QTNUMF: .WORD  0                   ;NUMBER PRESENT FLAG
QTPC:   .WORD  0                   ;PC POINTER (IN STACK)
QTPS:   .WORD  0
QTPTR:  .WORD  QTPTR               ;STACK POINTER
QTREG:  .WORD  QTREG               ;OPEN REGISTER
QTRELF: .WORD  0                   ;RELATIVE ADDRESS FLAG
QTPSAVE:.WORD  0
QTTAPE: .WORD  0,0,0
QTTEMP: .WORD  0,0                 ;TEMPORARY
;
;
QTMSG1: .BYTE  CR,LF
        .ASCII /: QT :/
        .BYTE  CR,LF,0
QTMSG2: .BYTE  CR,LF,40,40,40,0
QTMSG4: .BYTE  CR,LF
        .ASCII /: TOO MANY BKPTS :/
        .BYTE  CR,LF,0
QTMSG5: .BYTE  CR,CR,CR,LF
        .ASCII /HOLD/
        .BYTE  CR,CR,CR,LF
QTWARN: .ASCII /: WARN :/
        .BYTE  CR,LF,0
QTMSG6: .ASCII /: PERM/
        .BYTE  0
QTMSG7: .BYTE  0,0                 ;ECHO BUFFER
QTMSG8: .BYTE  CR,LF,0
BKKBUF: .BYTE  40,40,40,LF
        .BYTE  134,CR,LF,0
DELETE: .BYTE  134,0
        .EVEN
```

```
;
;                                       ;BREAKPOINT TABLE (8)
QTBKTB: .WORD   -1,0,-1,0,-1,0,-1,0,-1,0,-1,0,-1,0,-1,0
        .WORD   -1,0,-1,0,-1,0,-1,0,-1,0,-1,0,-1,0,-1,0
QTBKTN: .WORD   0
;SYSTEMS STORAGE (VOLATILE)
        .EVEN
SYVOL:.                                 ;START OF SYSTEM VOLATILE AREA
IBICQG: .WORD   0                       ;IBM INPUT QUEUE GET
IBICQP: .WORD   0                       ;IBM INPUT QUEUE PUT
IBOCQG: .WORD   0                       ;IBM OUTPUT QUEUE GET
IBOCQP: .WORD   0                       ;IBM OUTPUT QUEUE PUT
IBICBQ: .WORD   0                       ;IBM INPUT CONTROL QUEUE (8)
        .=.+4                           ;2 BYTES PER ENTRY
IBICQN: .WORD   0
;
IBOCBQ: .WORD   0                       ;IBM OUTPUT CONTROL QUEUE (8(
        .=.+4                           ; 2 BYTES PER ENTRY
IBOCQN: .WORD   0
IBSENQ: .WORD   0                       ;IBM SENSE QUEUE (48)
        .=.+44.                         ; 6 BYTES PER ENTRY
IBSNQN: .WORD   0
PR1Q:   .WORD   0                       ;PRIORITY 1 QUEUE(28)
        .=.+16.
PR1QN:  .WORD   0
;
PR2Q:   .WORD   0                       ;PRIORITY 2 QUEUE(28)
        .=.+16.
PR2QN:  .WORD   0
;
PR3Q:   .WORD   0                       ;PRIORITY 3 QUEUE(28)
        .=.+16.
PR3QN:  .WORD   0
PR1QG:  .WORD   0                       ;PRIORITY 1 GET
PR1QP:  .WORD   0                       ;PRIORITY 1 PUT
PR2QG:  .WORD   0                       ;PRIORITY 2 GET
PR2QP:  .WORD   0                       ;PRIORITY 2 PUT
PR3QG:  .WORD   0                       ;PRIORITY 3 GET
PR3QP:  .WORD   0                       ;PRIORITY 3 PUT
OUTBLK: .WORD   0                       ;SAVED TAPE BLK #
PARERR: .BYTE   0                       ;PARITY ERROR
TAPRDF: .BYTE   0                       ;
MSNSI:  .BYTE   0                       ;SENSE IMMEDIATE FLAG
        .EVEN
SYVOLN:.                                ; END OF SYSTEM VOLATILE AREA
;SYSTEM         NON-VOLATILE
        EQMCH1=376
        EQMCH2=377
MONTBL: .WORD   BIN
        .WORD   C360TS
        .WORD   CLR360
        .WORD   CLRIBI
        .WORD   CLRIBO
        .WORD   CLRSEN
        .WORD   CLRTIM
        .WORD   CLRTSK
        .WORD   CRLF
        .WORD   CRLF3
        .WORD   DECOUT
        .WORD   DIV
        .WORD   GETICB
        .WORD   GETOCB
        .WORD   GETTAB
        .WORD   GETTIM
        .WORD   IBMINT
        .WORD   INIATB
        .WORD   INIATP
        .WORD   INITOR
        .WORD   MPY
        .WORD   QT
        .WORD   SCAN
        .WORD   TW1BLK
        .WORD   SETTIM
```

```
            .WORD   TAPOUT
            .WORD   TERMTR
            .WORD   TROBLK
            .WORD   TRIBLK
            .WORD   TYMKEY
            .WORD   TYMSG
            .WORD   TYPOUT
            .WORD   TYPSMT
            .WORD   TYPTYM
            .WORD   UNBIN
            .WORD   XABLD
            .WORD   XALKP
            .WORD   XSENSE
            .WORD   XSENSI
            .WORD   TSOOUT
            .WORD   TAPSMT
            .WORD   TYTYMS
            .WORD   UNHASH
            .WORD   QUEBUP
            .WORD   SYSFLT
            .WORD   IBMIN
            .WORD   ENLINE
            .WORD   CLRALC
            .WORD   UPTPHD
            .WORD   LOTOP
            .WORD   TPRDWT
            .WORD   SETWAT
            .WORD   IBMOUT
             .WORD  TPWRAP
             .WORD  TATYMS
MONTBN:  .WORD  0,0,0,0,0,0,0,0,0,0,0,0
;////////////////////////////////////////////////////////////////////////////
;//////////////////////////////// ERTRAP ////////////////////////////////////
;////////////////////////////////////////////////////////////////////////////
;RFD
         .EVEN
ERTRAP:  MOV     SP,@#776            ;SAVE SP AT 776
         CMP     SP,#400             ;STACK UNDERFLOW ?
         BGE     ERT020              ;NO
ERT005:  MOV     #500,SP             ;YES    RESET SP
ERT010:  MOV     #13.,R3
         JMP     SYSFLT
ERT20:   CMP     SP,#776             ;OVERFLOW?
         BLT     ERT010              ;NO
         BR      ERT005              ;YEA
;////////////////////////////////////////////////////////////////////////////
;//////////////////////////////// PFAIL /////////////////////////////////////
;////////////////////////////////////////////////////////////////////////////
;RFD
PFAIL:   MOV     #14.,R3             ;SYSTEM FAULT #13
         JSR     R7,SYSFLT
;////////////////////////////////////////////////////////////////////////////
;//////////////////////////////// SYSFLT ////////////////////////////////////
;////////////////////////////////////////////////////////////////////////////
;RFD
;////////////////////////////////////////////////////////////////////////////
;///////////////////////////INPUT TO BINARY ////////////////////////////////
;        TITLE   01 JUL 71                       BIN
;EAJ
;
         .EVEN
BIN:     JSR     R7,XSAVE
         MOV     14(SP),R5           ;RETURN ADDRESS POINTS TO
         MOV     (R5),R5             ;USER FLAG AREA
         ADD     #2,14(SP)           ;PREPARE EXIT
         NEG     R4                  ;=(NUMBER OF BYTES)
         CLR     R0                  ;INITIALIZE REGISTERS AND .BYTES
         CLR     R1
         CLR     R2
         MOV     #2,(R5)+            ; CODE = 2 (ASSUME OCTAL)
         CLR     (R5)+
         CLR     -(SP)               ;NEGATIVE FLAG = RESET
;
```

```
BIN1:   MOV     R4,-(SP)        ;SAVE NEGATIVE R4
        MOVB    (R3)+,R4        ;R4 = NEXT BYTE
        CMP     #BLANK,R4       ;TEST FOR SPACE
        BEQ     BIN8            ;YES, IGNORE IT.
        CMP     #DECPT,R4       ;TEST FOR DECIMAL POINT
        BNE     BIN2            ;NO.
        MOV     R0,R1           ;YES, FORCE DECIMAL
        DECB    -4(R5)          ;MODE = 1 (DECIMAL)
BIN1A:  TST     (SP)+           ;POPOUT-(NUMBER OF BYTES)
        BR      BIN9            ;GO TO EXIT
;
BIN2:   CMP     #COLON,R4       ;TEST FOR COLON
        BNE     BIN3            ;NO
        MOV     R2,R1
        INCB    -4(R5)          ;MODE=3, (HEXIDECIMAL)
        BR      BIN1A           ;GO TO EXIT
;
BIN3:   CMP     #SEMI,R4        ;TEST FOR SEMICOLON
        BNE     BIN4            ;NO
        CLR     -2(R5)          ;CODE =0 (NON-NUMERIC)
        CLR     -4(R5)          ;RESET FLAGS
        BR      BIN1A           ;GO TO EXIT.
;
BIN4:   CMP     #MINUS,R4       ;TEST FOR MINUS SIGN
        BNE     BIN5            ;NO
        INCB    2(SP)           ;NEGATIVE FLAG =SET
        BR      BIN8            ;CONTINUE
BIN5:   CMP     #SLASH,R4       ;TEST FOR ILLEGAL FORMATS
        BHIS    BIN6            ;YES, GO SET ERROR
        CMP     #SEVEN,R4       ;TEST FOR OCTAL NUMBERIC
        BHIS    BIN7            ;YES, GO CONVENT
        INCB    -2(R5)          ;SET OCTAL FORMAT ERROR FLAG
        CMP     #NINE,R4        ;TEST FOR DECIMAL NUMERIC
        BHIS    BIN7            ;YES, GO CONVENT
        INCB    -3(R5)          ;SET DECIMAL FORMAT ERROR FLAG
        SUB     #7,R4           ;CHANGE HEX A TO F TO NUMERIC
BIN5A:  CMP     #NINE,R4        ;TEST FOR ILLEGAL FORMATS
        BHIS    BIN6            ;YES, GO' SET ERROR
        CMP     #77,R4          ;TEST FOR HEX NUMERIC
        BHIS    BIN7            ;YES, GO CONVENT
        SUB     #40,R4          ;CHANGE LOWER-CASE HEX A TO F TO NUME
        BMI     BIN6            ; ILLEGAL FORMATS
        BR      BIN5A           ;KEEP TRYING
BIN6:   INCB    -1(R5)          ;SET HEX FORMAT ERROR FLAG
        INCB    -2(R5)          ;SET OCTAL FORMAT ERROR FLAG
        INCB    -3(R5)          ;SET DECIMAL FORMAT ERROR FLAG
;
;
BIN7:   BIC     #177760,R4      ;RETURN NUMBERIC BITS ONLY
        MOV     R4,-(SP)        ;SAVE NUMERIC BITS IN STACK
;
        ASL     R0              ;MULTIPLY R0 X 10
        MOV     R0,R4
        ASL     R0
        ASL     R0
        ADD     R4,R0
;
        ASL     R1              ;MULTIPLY R1 X 8
        ASL     R1
        ASL     R1
;
        ASL     R2              ;MULTIPLY R2 X 16
        ASL     R2
        ASL     R2
        ASL     R2
;
        MOV     (SP)+,R4        ;RESTORE NUMERIC BIT.
        ADD     R4,R0           ;DECIMAL CONVERT
        BIS     R4,R1           ;OCTAL CONVERT
        BIS     R4,R2           ;HEX CONVERT
;
;
BIN8:   MOV     (SP)+,R4        ;RESTORE -(NUMBER OF BYTES)
        INC     R4              ;TEST END
```

```
            BNE     BIN1              ;NO. CONTINUE CONVERT
;
BIN9:   TST     (SP)+             ;TEST NEGATIVE FLAG
        BEQ     BIN10             ;NO
        NEG     R0                ;YES. NEGATE RESULTS
        NEG     R1
        NEG     R2
;
BIN10:  MOV     R0,(SP)           ;RESULTS TO SAVED REGS
        MOV     R1,2(SP)
        MOV     R2,4(SP)
        JSR     R7,XRSTR
        RTS     R7                ;EXIT
;
;////////////////////////////////////////////////////////////////////
;///////////////////////////// CALLTS ///////////////////////////////
;////////////////////////////////////////////////////////////////////
;
;RFD
;       CLEAR ALL ENTRIES IN TASK STATUS TABLE
CALLTS: JSR     R7,XSAVE          ;
        MOV     #1,R3             ;
CATS10: JSR     R7,CLRTSK         ;CLEAR TASK
        INC     R3                ;BUMP TO NEXT
        CMP     R3,#30.           ;LAST ?
        BLE     CATS10            ;NO
        JSR     R7,XRSTR
        RTS     R7
;
;////////////////////////////////////////////////////////////////////
;///////////////////////////// CLKINT ///////////////////////////////
;////////////////////////////////////////////////////////////////////
;RFD
;
CLKINT: BIT     #100000,@#CSR     ;CONSOLE SW 15 SET?
        BEQ     CLK010            ;NO
        TSTB    SYF1TS            ;ALREADY ENTERED?
        BEQ     CLK005            ;NO
        RTI
        MOV     #5,R3             ;YES=ABORT
        JSR     R7,SYSFLT
;
CLK010: CLR     @#LKS             ;STOP CLOCK
        BIS     #100,@#LKS        ;RESTART CLOCK
        JSR     R7,XSAVE
        INC     INTCNT            ;BUMP INTERRUPT COUNT UNTIL
        CMP     INTCNT,#60.       ;  1   SECOND
        BGE     CLK020
        JMP     CLK900            ;NOT AN EVEN SECOND
;
CLK020: CLR     INTCNT            ;CLEAR INTERRUPT COUNTER
        INC     SECOND
        CMP     SECOND,#60.       ;A MINUTE ?
        BNE     CLK200            ;NO
        CLR     SECOND            ;CLEAR SECONDS
        INC     MINUTE            ;
        CMP     MINUTE,#60.       ;AN HOUR ?
        BNE     CLK200            ;NO
        INC     HOUR              ;YES=BUMP HOUR
        CLR     MINUTE
        CMP     HOUR,#24.         ;A DAY ?
        BNE     CLK200            ;NO
        CLR     HOUR
        INC     DAY
;
;
CLK200: JSR     R7,TIMER          ;NORMAL TIMER FUNCTIONS
CLK900: JSR     R7,XRSTR
        RTI
;
;////////////////////////////////////////////////////////////////////
;////////////////////////////////////////////////////////////////////
;       CLEAR BUSY FLAG IN FCB
;
CLRBSY: CLRB    (R3)              ;CLEAR BUSY FLAG IN FCB
        RTS     R7
```

```
;//////////////////////////////////////////////////////////////////
;///////////////////////////// CLRTSK /////////////////////////////
;//////////////////////////////////////////////////////////////////
;RFD
;
        .EVEN
CLRTSK: JSR     R7,XSAVE
        JSR     R7,GETTAS               ;GET TASK BYTES ADDRESS
        CLR     (R3)+                   ;CLEAR INITIATED,WAITING
        CLR     (R3)+                   ;CLEAR TIMEOUT
        CLR     (R3)                    ;CLEAR TIMER
        JSR     R7,XRSTR
        RTS     R7
;//////////////////////////////////////////////////////////////////
;///////////////////////////// CLRIBI /////////////////////////////
;//////////////////////////////////////////////////////////////////
;RFD
;
CLRIBI: JSR     R7,XSAVE
        MOV     @#PSW,R1                ;SAVE PSW
        MOV     #340,@#PSW              ;NO INTERRUPTS
        MOV     #IBICBQ,R0              ;START   IBM INPUT CONTROL QUEUE
        MOV     R0,IBICQG               ;  RESTORE 'GET'
        MOV     R0,IBICQP               ;  RESTORE 'PUT'
CLIBI1: CLR     (R0)+                   ;CLEAR ENTIRE QUEUE
        CMP     R0,#IBICQN
        BLE     CLIBI1
        MOV     R1,@#PSW                ;RESTORE PSW
        JSR     R7,XRSTR
        RTS     R7
;//////////////////////////////////////////////////////////////////
;///////////////////////////// CLRIBO /////////////////////////////
;//////////////////////////////////////////////////////////////////
;RFD
;
CLRIBO: JSR     R7,XSAVE
        MOV     @#PSW,R1                ;SAVE PSW
        MOV     #340,@#PSW              ;NO INTERRUPTS
        MOV     #IBOCBQ,R0              ;START OF IBM OUTPUT CONTROL QUEUE
        MOV     R0,IBOCQG               ;RESTORE 'GET'
        MOV     R0,IBOCQP               ;RESTORE 'PUT'
CLIBO1: CLR     (R0)+                   ;CLEAR ENTIRE QUEUE
        CMP     R0,#IBOCQN
        BLE     CLIBO1
        MOV     R1,@#PSW                ;RESTORE PSW
        JSR     R7,XRSTR
        RTS     R7
;//////////////////////////////////////////////////////////////////
;///////////////////////////// CLRSEN /////////////////////////////
;//////////////////////////////////////////////////////////////////
;RFD
;
CLRSEN: JSR     R7,XSAVE
        MOV     @#PSW,R1                ;SAVE PSW
        MOV     #340,@#PSW              ;NO INTERRUPTS
        MOV     #IBSENQ,R0              ;START OF IBM SENSE QUEUE
        MOV     R0,SENSQG               ;RESTORE 'GET'
        MOV     R0,SENSQP               ;RESTORE 'PUT'
;
CLRSN1: CLR     (R0)+                   ;CLEAR ENIRE QUEUE
        CMP     R0,#IBSNQN              ;
        BLE     CLRSN1
        MOV     R1,@#PSW                ;RESTORE PSW
        JSR     R7,XRSTR
        RTS     R7
;//////////////////////////////////////////////////////////////////
;///////////////////////////// CLR360 /////////////////////////////
;//////////////////////////////////////////////////////////////////
;RFD
;
CLR360: JSR     R7,CLRIBI               ;INIT INPUT CONTROL
        JSR     R7,CLRIBO               ;INIT OUTPUT CONTROL
        JSR     R7,CLRSEN               ;INIT SENSE QUEUE
        RTS     R7
```

```
;////////////////////////////////////////////////////////////////////////
;/////////////////////////////// C360TS /////////////////////////////////
;////////////////////////////////////////////////////////////////////////
;RFD
;
C360TS: JSR     R7,XSAVE
        MOV     #TSDTSK,R3
        JSR     R7,CLRTSK
        MOV     #DEVTSK,R3
        JSR     R7,CLRTSK
        MOV     #TLTTSK,R3
        JSR     R7,CLRTSK
        MOV     #SENTSK,R3              ;CLEAR SENSE
        JSR     R7,CLRTSK               ; TASK
        JSR     R7,XRSTR
        RTS     R7
;////////////////////////////////////////////////////////////////////////
;//////////////////////////////// CRLF //////////////////////////////////
;////////////////////////////////////////////////////////////////////////
;RFD
;
        .EVEN
CRLF:   JSR     R7,XSAVE
        MOV     #CRLFMS,R3
        JSR     R7,TYPOUT
        JSR     R7,XRSTR
        RTS     R7
;////////////////////////////////////////////////////////////////////////
;/////////////////////////////// CRLF3 //////////////////////////////////
;////////////////////////////////////////////////////////////////////////
;RFD
;
CRLF3:  JSR     R7,XSAVE
        MOV     #CRLF3M,R3
        JSR     R7,TYPOUT
        JSR     R7,XRSTR
        RTS     R7
CRLFMS: .BYTE   CRLFMN-CRLFMS,TCNMTA,SCDSA,PCDSA,1,0
CRLFMN=.
CRLF3M: .BYTE   CRLF3N-CRLF3M,TCNMTA,SCDSA,PCDSA,3,0
CRLF3N=.
        .EVEN
;////////////////////////////////////////////////////////////////////////
;/////////////////////////////// DISPCH /////////////////////////////////
;RFD
;////////////////////////////////////////////////////////////////////////
;
DISPCH: JSR     R7,XSAVE
        CMPB    4(R3),#ITMTSK           ;MESSAGE FOR DEC TAPE OUTPUT ?
        BNE     DIS050                  ;NO
        MOV     6(R3),R3                ;MESSAGE ADDRESS
        JSR     R7,DECOUT
        BR      DIS070
;
;
DIS050: MOVB    4(R3),R0                ;SAVE TASK
        DEC     R0                      ;DECREMENT TO USE AS INDEX
        ASL     R0                      ;MULTIPLIED BY 2
        JSR     R7,@TAPROT(R0)          ; TO TASK PROCESSOR TABLE
DIS070: JSR     R7,XRSTR
        RTS     R7
;
;////////////////////////////////////////////////////////////////////////
;////////////////////////////////////////////////////////////////////////
;       DECOUT  OUTPUTS  MESSAGES  TO TAPE
;
        .EVEN
DECOUT: JSR     R7,XSAVE
        TSTB    TASTTB+DECDSP-OUTPUT    ;DEC TAPE INITIALIZED ?
        BNE     DOT100                  ;YES
        JSR     R7,XRSTR                  ;NO-IGNORE REQUEST
        RTS     R7
DOT100: CMPB    #TCFBE,1(R3)            ;FORCE BLOCK ?
        BNE     DOT120                  ;NO
```

```
            MOV     #DECTSK,R3              ;YES-STOP DEC TAPE
            JSR     R7,TERMTR               ;OPERATIONS
DOT120:     MOV     @#PSW,R0                ;GET PROGRAM STATUS
            BIC     #177437,R0              ;EXTRACT PRIORITY
            CMP     R0,#40                  ;STATUS GREATER THAN 1
            BLE     DOT130
            JMP     DOT800
DOT130:     CMPB    #TCFBE,1(R3)            ;FORCE BLK. REQ.?
            BEQ     DOT300                  ;YES
DOT200:     MOV     TAPNTR,R2               ;PUT PNTR
            MOV     DECFCB,R0               ;RESTORE CURRENT FCB
            MOV     6(R0),R4                ;BUFFER ADR TO R4
            ADD     #511.,R4                ;R4 = END OF BUFFER
            JSR     R7,MOMSTB               ;MOVE MESSAGE
            TST     R3                      ;END OF MSG?
            BNE     DOT250                  ;NO, END OF BUFFER
            MOV     6(SP),R3                ;RESTORE MSG HEADER ADDRESS
            MOVB    (R3),R1                 ;MSG. BYTE COUNT
            BIC     #177400,R1
            ADD     R1,TAPNTR               ;UPDATE PUT PNTR
            BR      DOT700                  ;BRANCH TO EXIT
DOT250:     CMP     R2,R4                   ;CURRENT POSITION PAST
            BGT     DOT300                  ;BUFFER ? = YES
            CLRB    (R2)                    ;NO-CLEAR LAST BYTE CNT TO END
DOT300:     MOV     6(R0),R2                ;GET BUFFER ADR.
            MOV     #SAVKEY,R3              ;ADR. OF SAVED TIME KEY
            MOVB    (R3)+,(R2)+             ;MOVE SAVED TIME KEY
            MOVB    (R3)+,(R2)+             ;  TO TAPE BUFFER
            MOVB    (R3)+,(R2)+
            MOVB    (R3)+,(R2)+
            MOVB    (R3)+,(R2)+
            MOV     #SAVKEY,R3
            JSR     R7,TYMKEY               ;GET AND SAVE CURRENT TIME KEY
            MOVB    (R3)+,(R2)+             ;MOVE CURRENT TIME KEY
            MOVB    (R3)+,(R2)+             ;  TO TAPE BUFFER
            MOVB    (R3)+,(R2)+
            MOVB    (R3)+,(R2)+
            MOVB    (R3)+,(R2)+
            MOV     6(R0),R3                ;ADR OF OLD TIME KEY
            JSR     R7,TYMSG                ;BUILD MSG. OF TIME IN BUFFER
DOT500:     MOV     DECFCB,R3               ;ADR. OF FILE CONTROL BLK
            MOV     10(R3),R0               ;GET BLK #
            JSR     R7,LOTOP                ;CHANGE TO PHYSICAL
            JSR     R7,TW1BLK               ;WRITE BLOCK
            JSR     R7,FLPFCB               ;FLIP FILE CONTROL BLKS.
            JSR     R7,TPWRAP               ;TEST FOR WRAPAROUND
            BR      DOT555                  ;WRAP AROUND OCCURRED
            CMP     R0,#432.                ;LOG FILLING
            BLE     DOT600                  ;NOT YET
            MOV     #LOGFIL,R3              ;LOG FILLING
            BR      DOT557                  ;AND CONTINUE
DOT555:     MOV     #WRPRND,R3              ;LOG WRAPAROUND MESSAGE
DOT557:     JSR     R7,TYTYMS               ;PRINT TIME AND MSG.
DOT600:     MOV     DECFCB,R1               ;GET FCB ADR
            MOV     R0,10(R1)               ;MOVE NEW LOGICAL BLK NO TO FCB
            MOV     6(R1),TAPNTR            ;UPDATE BUFFER PNTR
            ADD     OFFSET,TAPNTR
            MOV     6(SP),R3                ;RESTORE R3 OF CALL
            CMPB    1(R3),#TCFBE            ;FORCE BLK. REQ?
            BEQ     DOT700                  ;YES
            MOV     TAPNTR,R2               ;INIT. BUF. PNTR.
            MOVB    (R3),R5                 ;GET MSG BYTE CNT AND
            BIC     #177400,R5
            ADD     R5,TAPNTR               ;UPDATE 'PUT' POINTER
            MOV     6(R1),R4
            ADD     #511.,R4                ;INIT. END OF BUFFER
            JSR     R7,MOMSTB               ;MOVE MSG
DOT700:     JSR     R7,XRSTR                ;RESTORE REGS.
            RTS     R7
DOT800:     MOV     @#PSW,-(SP)             ;SAVE PROGRAM STATUS
            MOV     #340,@#PSW              ;DISABLE INTRS.
            MOV     DCMFCB,R3               ;ADR OF FCB FOR INTR. MSGS.
            MOV     10(SP),6(R3)            ;MSG HDR. TO FCB
            JSR     R7,QUESUP               ;QUEUE FCB TO SUPERVISOR
            ADD     #10.,DCMFCB             ;UPDATE PNTR.
```

```
            CMP     #FCB10+10.,DCMFCB       ;WRAP AROUND FCB
            BNE     .+10                    ;NO
            MOV     #FCB6,DCMFCB            ;YES, INIT. FOR FIRST ONE
            MOV     (SP)+,@#PSW             ;RESTORE REGS.
            BR      DOT700                  ;EXIT
;
;       FLIP    FCB ADRS. IN DECFCB
;
FLPFCB:     JSR     R7,XSAVE                ;SAVE REGS.
            CMP     #FCB3,DECFCB            ;FCB3 CURRENT
            BNE     FLP100                  ;NO
            MOV     #FCB4,R1                ;INIT. FCB4 AS CURRENT BLK.
            MOV     #TPBF2,R0               ;GET TAPE ADR. FOR INIT.
            BR      FLP200
FLP100:     MOV     #FCB3,R1                ;INIT. FCB3 AS CURRENT BLK.
            MOV     #TPBF1,R0               ;GET TAPE ADR. FOR INIT.
FLP200:     MOV     R0,6(R1)                ;BUFF ADD. TO FCB
            MOV     R1,DECFCB               ;UPDATE INTR. MSG. PNTR.
            TSTB    (R1)                    ;TEST BUFFER. BUSY
            BNE     FLP300                  ;YES, WAIT
FLP250:     INCB    (R1)                    ;SET BUSY
            MOV     #10.,4(R1)              ;SET TASK CODE 10.,
            CLRB    3(R1)                   ;SET PRIORITY ZERO
            JSR     R7,XRSTR                ;RESTORE REGS.
            RTS     R7
;
FLP300:     TSTB    (R1)                    ;BUFFER STILL BUSY?
            BEQ     FLP250                  ;
            MOV     #30.,R2                 ;WAIT 30 SECONDS
            JSR     R7,WAITMS               ; FOR TAPE TO GO UNBUSY
            DEC     R2                      ; IF MORE THAN 30 SEC
            BNE     FLP310                  ; SAVE TAPE STATUS AND
            TSTB    (R1)                    ; ABEND 10.
            BEQ     FLP250
            MOV     @#PSW,R2
            MOV     @#TCCM,R3
            MOV     @#TCST,R4
            MOV     @#TCDT,R5
            MOV     #10.,R3
            JSR     R7,SYSFLT
WRPRND:     .BYTE   WRPRNN-WRPRND,TCNMTA,SCDSA,PCDSA,1,0
            .ASCII  /TAPE WRAP AROUND/
WRPRNN=.
LOGFIL:     .BYTE   LOGFIN-LOGFIL,TCNMTA,SCDSA,PCDSA,1,0
            .ASCII  /LOG FILLING/
LOGFIN=.
            .EVEN
;//////////////////////DIVIDE                   //////////////////////////
;       TITLE   01 JUL 71                       DIV
;DIVIDE UNSIGNED NUMBERS
;EAJ
;
DIV:        CLR     R1                      ;INTEGER-DIVIDE ENTRY=CLEAR HIGH ORDE
;
DPDIV:      MOV     R4,-(SP)                ;DBL-PREC DIVIDE ENTRY:  SAVE R4
            TST     R2                      ;R2 = DIVISOR
            BEQ     DIVX                    ;ERROR IF DIVISOR IS ZERO
            CMP     R1,R2                   ; TEST FOR ILLEGAL DIVIDE
            BHI     DIVX                    ;ERROR IF R1 .GR. R2
;
            MOV     #16.,R4                 ;MOVE 16-BIT COUNTER TO R4
            ASL     R0                      ;SHIFT LEFT LOW ORDER DIVIDEND
;
DIV1:       ROL     R1                      ;FINISH DBL-PRECISION SHIFT LEFT OF D
            CLC                             ;CLEAR CARRY BIT
            CMP     R2,R1                   ;TEST IF DIVISOR GOES INTO R1
            BHI     DIV2                    ;NO. (CARRY IS ZERO)
;
            SUB     R2,R1                   ;YES. REDUCE DIVIDEND HIGH PART
            SEC                             ;SET CARRY BIT (FOR R0)
;
DIV2:       ROL     R0                      ;SHIFT LEFT LOW DIVIDEND, (MOVE IN C
            INC     R4                      ;TEST FOR END OF DIV
            BNE     DIV1                    ;NO. CONTINUE DIV.
```

```
;
DIVX:   MOV     (SP)+,R4                ;RESTORE R4
        RTS     R7                      ;EXIT
;
;
;////////////////////////////////////////////////////////////////////////
;
;///                    ENLINE
;////////////////////////////////////////////////////////////////////////
;RFD
;
ENLINE: JSR     R7,XSAVE
        BIS     #KOPR,MMDREG            ;SET OPERATIONAL
        BIC     #KRDY,MMDREG            ;CLEAR KBD READY
        CLRB    FCB11+2                 ;RESET I/O IN PROCESS
        JSR     R7,CRLF                 ; DO CR/LF
        MOV     #TYPTSK,R3              ;STOP TIMER
        JSR     R7,TERMTR
        MOV     #SGNTSK,R3              ;START SIGN IN TIMER
        JSR     R7,INITOR
        TSTB    MALC                    ;ALARM CONSOLE ?
        BEQ     ENLRT                   ;NO
        MOV     #OPCTSK,R3              ;OPR.CK. TIME OUT
        JSR     R7,INITOR               ;INITIATE
;       RESET FLAGS FOR TAMPER SELF TEST
        CLRB    MTST                    ;CLEAR
        CLRB    MTZER                   ; TAMPER
        CLRB    MTTIF                   ;  FLAGS
        CLR     MFRAME
        MOVB    #1,OPEIP                ;YES, SET OP.ENABLE IN PROC.
        BIS     #100,@#CRS              ;ENABLE A/C INTERRUPTS
        MOVB    #23,@#CTB               ;SELECT MODE REG.
ENLRT:  JSR     R7,XRSTR
        RTS     R7
;///////////////////////////////////////////////////////////////////////
;
;///////////////////////////////////////////////////////////////////////
;//////////////////////////// GETICB ///////////////////////////////////
;///////////////////////////////////////////////////////////////////////
;RFD
;
        .EVEN
 GETICB: MOV    @#PSW,-(SP)
        MOV     #340,@#PSW
        TSTB    FCB1                    ;BUFFER 1 BUSY ?
        BNE     GETI20                  ;YES
        MOV     #FCB1,R3                ;NO-USE FCB1
GETI10: INCB    (R3)                    ;SET BUSY
        MOV     (SP)+,@#PSW             ;ALLOW INTERRUPTS
        RTS     R7
GETI20: MOV     #FCB2,R3                ;USE FCB2
        BR      GETI10
;///////////////////////////////////////////////////////////////////////
;//////////////////////////// GETOCB ///////////////////////////////////
;///////////////////////////////////////////////////////////////////////
;RFD
;
GETOCB: MOV     @#PSW,-(SP)             ;SAVE PSW
        MOV     #340,@#PSW              ;NO INTERRUPTS
        TSTB    FCB3                    ;FCB3 BUSY ?
        BNE     GETO20                  ;YES
        MOV     #FCB3,R3                ;NO-USE FCB3
GETO10: INCB    (R3)
        MOV     (SP)+,@#PSW             ;ALLOW INTERRUPTS
        RTS     R7
;
GETO20: TSTB    FCB4                    ;FCB4 BUSY ?
        BNE     GETO30                  ;YES
        MOV     #FCB4,R3                ;NO-USE FCB 4
        BR      GETO10
;
GETO30: MOV     #FCB5,R3                ;USE FCB5
        BR      GETO10
;
```

; ADD TO IBMINT P 60

;///////////////////////////////////////////////////////////////
;///////////////////////////////////////////////////////////////
;     IBMINT     360   INTERRUPT  SERVICE   ROUTINE
;
        .EVEN
IBMINT:  BIC    #400,@IBST          ;DISABLE 360 INTERRUPTS
         JSR    R7,XSAVE            ;SAVE REGS.
         MOV    @IBST,R0            ;GET I/F STATUS
         BIT    #1,R0               ;DEVICE BUSY SET?
         BNE    IBM025              ;YES
IBM010:  BIC    #10,@IBST           ;NO, CLR DISCONNECT IN I/F STATUS
         MOV    #DIS360,R3          ;360 DISCONNECTED
         JSR    R7,TAPOUT           ;TAPE MSG.
         BR     IBM310
IBM025:  BIT    #10,R0              ;DIVICE DISCONNECT?
         BNE    IBM010              ;YES
         BIT    #40,R0              ;I/F RESET?
         BEQ    IBM050              ;NO
         BIC    #40,@IBST           ;RESET 'I/F RESET'
         MOV    #RES360,R3          ;360 RESET
         JSR    R7,TAPOUT           ;TAPE MSG.
         BR     IBM310
IBM050:  MOV    @IBCD,R1            ;GET COMMAND
         BPL    IBM075              ;BRANCH IF NOT WRITE
         JMP    IBM500
IBM075:  BIT    #10000,R1           ;SENSE CMD?
         BNE    IBM200              ;YES
         BIT    #40000,R1           ;READ CMD?
         BEQ    IBM100              ;NO
         MOV    IBOCQG,R3           ;YES, GET OUTPUT QUEUE PNTR
         BR     IBM400
IBM100:  BIT    #20000,R1           ;CONTROL OR MODE ?
         BNE    IBM310              ;YES
         MOV    #9.,R3              ;SYSTEM FALT
         JSR    R7,SYSFLT
;
IBM200:  BIS    #KIBOL,MMDREG       ;SET ON-LINE LIGHT ON CONSOLE
         TSTB   TASTTB+SENDSP       ;SENSE INITIATED ?
         BNE    IBM210              ;YES
         TSTB   TASTTB+TSDDSP       ;SEC DECK STARTED?
         BNE    IBM205              ;YES
         TSTB   TASTTB+TLTDSP       ;LOG TRNSFER STARTED?
         BNE    IBM205
         JSR    R7,CLR360           ;INIT. 360 QUEUES AND PNTRS
         MOV    #SENTSK,R3          ;SET SENSE INITIATED
         JSR    R7,INITOR
         MOV    #DEVTSK,R3          ;
         JSR    R7,INITOR           ;INITIATE DEVICE MONITORING
         BR     IBM210
IBM205:  MOV    #SENTSK,R3          ;SET SENSE INITIATED
         JSR    R7,INITOR
IBM210:  MOV    SENSQG,R2           ;GET SENSE QUEUE GET PNTR.
         TSTB   M360                ;360 IN SYSTEM?
         BEQ    IBM220              ;NO
         MOV    #SENTSK,R3          ;SET TIME OUT FOR SENSE
         JSR    R7,SETTIM           ;
IBM220:  BIT    #2,R0               ;SENSE DONE?
         BNE    IBM300              ;YES
         TST    (R2)                ;SENSE QUEUE EMPTY?
         BNE    IBM250              ;NO
         TSTB   TASTTB+DEVDSP-INPROC  ;IN PROCESS ?
         BEQ    IBM240              ;NO-SEND NOOP
         MOVB   #1,TASTTB+SENDSP-WAIT ;YES-SET SENSE WAITING
         BR     IBM350              ;AND LEAVE
;       SEND NOOP SENSE
IBM240:  CLR    -(SP)               ;SETUP SENSE
         CLR    -(SP)
         MOV    #KANOOP,-(SP)       ;NO-ACTION
         MOV    SP,R3
         JSR    R7,XSENSI           ;BUILD IMMEDIATE SENSE
         TST    (SP)+               ;RESTORE STACK ADR.

```
            TST     (SP)+
            TST     (SP)+
            MOV     SENSQG,R2           ;GET SENSE GET PNTR
IBM250:     MOV     #6,@IBBC            ;INIT. FOR 6 BYTE TRANSFER
            MOV     R2,@IBWA            ;INIT. ADR. OF SENSE CMD
            BR      IBM350
IBM300:     CLR     (R2)                ;OPEN QUEUE SLOT
            ADD     #6,SENSQG           ;UPDATE SENSE GET PNTR.
            CMP     SENSQG,#IBSNQN      ;END OF QUEUE ?
            BLE     IBM310
            MOV     #IBSENQ,SENSQG      ;YES, INIT. QUEUE GET PNTR
IBM310:     MOV     #14,ESTAT           ;END STATUS
            MOV     #204,@IBST          ;INIT. END STATUS, DEVICE ON LINE
IBM350:     JSR     R7,XRSTR            ;RESTORE REGS.
            BIS     #400,@IBST          ;TURN 360 INTR. ON
            RTI
;
IBM400:     TST     (R3)                ;QUEUE EMPTY?
            BNE     IBM410              ;NO
            MOV     #14,ESTAT           ;ISSUE END STATUS
            MOV     #204,@IBST
            MOV     #12.,R3             ;YES, SYSTEM FAULT
            JSR     R7,SYSFLT
IBM410:     BIT     #2,R0               ;OPERATION DONE?
            BNE     IBM450              ;YES
            MOV     (R3),R4             ;FCB ADR.
            INCB    2(R4)               ;SET I/O IN PROCESS
            MOV     10(R4),@IBBC        ;BYTE CNT FOR TRANSFER
            MOV     6(R4),@IBWA         ;INIT. BUFFER ADR FOR TRANSFER
            BR      IBM350
;
IBM450:.
IBM460:     MOV     (R3),R4             ;FCB ADR.
            CLR     (R3)                ;CLEAR QUEUE
            MOVB    4(R4),R3
            JSR     R7,SETTIM           ; RESTART TIMER
            CLRB    2(R4)               ;RESET E/O IN PROCESS
            MOV     R4,R3               ;ADR OF FCB
            JSR     R7,QUESUP           ;QUEUE FOR SUPERVISOR
IBM480:     ADD     #2,IBOCQG           ;UPDATE PNTR
            CMP     #IBOCQN,IBOCQG      ;END OF QUEUE ?
            BHI     IBM310
            MOV     #IBOCBQ,IBOCQG      ;INIT. GET PNTR TO TOP OF QUEUE
            BR      IBM310
; INPUT (WRITE CMD) SEQUENCE
IBM500:     BIT     #KIFON,R0           ;DONE ?
            BNE     IBM550              ;YES
            JSR     R7,GETICB           ;NO-GET BUFFER
            CLRB    1(R3)               ;CLEAR ERRORS
            INCB    2(R3)               ;SET I/O IN PROC.
            MOV     R3,INBAD            ;SAVE INPUT BUFFER CONTROL BLOCK
            MOV     10(R3),@IBBC        ;BYTE CNT
            MOV     6(R3),@IBWA         ;BUFFER ADDRESS
            BR      IBM350              ;AND LEAVE
; TRANSFER COMPLETE
IBM550:     BIT     #20,R0              ;PARITY ERROR ?
            BNE     IBM570              ;YES
            MOV     INBAD,R2            ;GET BUFF ADDRESS
            MOV     6(R2),R3            ; FROM CONTROL BLOCK
            MOVB    7(R3),R3            ;GET TASK CODE
            MOVB    R3,4(R2)            ;STORE TASK IN CONTROL BLK
            JSR     R7,SETTIM           ;RESTART TIMER
            JSR     R7,GETTAS           ;GET TASK ENTRY
            TSTB    1(R3)               ;WAITING FOR I/O ?
            BEQ     IBM590              ;NO-ERROR
            CLRB    2(R2)               ;RESET I/O IN PROC.
            CLRB    1(R3)               ;CLEAR WAIT IN TASK TABLE
            MOV     R2,R3
            JSR     R7,QUESUP           ;QUEUE I/O TO SUPERVISOR
            MOV     #PRCTSK,R3          ;START 20 SEC
            JSR     R7,SETTIM           ;PROCESS TIMER
            JMP     IBM310              ;AND END SEQUENCE
; PARITY ERROR
```

―Continued

```
IBM5701  MOV    #14,ESTAT           ;END STATUS
         MOV    #204,@IBST          ;IESS
         MOV    #10.,R3             ;ABEND 10.
         JSR    R7,SYSFLT
; UNEXPECTED I/O
IBM5901  MOV    #14,ESTAT           ;IESS
         MOV    #204,@IBST
         MOV    #12.,R3             ;ABEND 12.
;
;
ERR360:  .BYTE  ERR36N-ERR360,TCNMTA,SCDSA,PCDSA,1,0
         .ASCII '360 I/F ERROR'
ERR36N.
DIS360:  .BYTE  DIS36N-DIS360,TCNMTA,SCDSA,PCDSA,1,0
         .ASCII /360 DISCONNECTED/
DIS36N.
RES360:  .BYTE  RES36N-RES360,TCNMTA,SCDSA,PCDSA,1,0
         .ASCII /360 RESET/
RES36N.
         .EVEN
;
;///////////////////////////////////////////////////////////////////
;      IBMIN    QUEUES   RECORD   REQUESTS   FROM   360
;///////////////////////////////////////////////////////////////////
         INPUT R3=TASK CODE

;
IBMIN:   JSR    R7,XSAVE            ;SAVE REGS.
         MOV    @#PSW,-(SP)         ;SAVE PROGRAM STATUS
         MOV    #340,@#PSW          ;DISABLE INTRS.
         JSR    R7,SETWAT           ;SET WAITING FOR I/O
         MOV    (SP)+,@#PSW         ;RESTORE PROGRAM STATUS
         MOV    R3,R0               ;GET TASK CODE
         SWAB   R0                  ;
         ADD    #KAISS,R0           ;ACTION CODE FOR START CODE
         CLR    -(SP)               ;NO MSG NO
         CLR    -(SP)               ;NO DISP CODE
         MOV    R0,-(SP)            ;ACTION CODE AND TASK CODE
         MOV    SP,R3               ;ADR. OF SENSE BYTES TO R3
         JSR    R7,XSENSE           ;QUEUE SENSE CMD?
         TST    (SP)+               ;RESTORE STACK ADR.
         TST    (SP)+
         TST    (SP)+
         JSR    R7,XRSTR            ;RESTORE REGS.
         RTS    R7                  ;EXIT

;
;///////////////////////////////////////////////////////////////////
;      IBMOUT   OUTPUTS  RECORD  TO  360
;///////////////////////////////////////////////////////////////////
;
IBMOUT:  JSR    R7,XSAVE            ;REG. SAVE
         MOV    @#PSW,-(SP)         ;SAVE PROGRAM STATUS
         MOV    #340,@#PSW          ;SET NO INTRS.
         MOV    IBOCQP,R2           ;GET PUT PNTR
         TST    (R2)                ;QUEUE FULL?
         BEQ    IBMOT1              ;NO
         MOV    #11.,R3
         JSR    R7,SYSFLT           ;SYSTEM ERROR - NO RECOVERY
IBMOT1:  MOV    R3,(R2)             ;FCB ADR TO OUTPUT QUEUE
         MOV    6(R3),R0            ;GET BUFFER ADR.
         MOV    10(R3),(R0)         ;BYTE COUNT TO HDR
         MOVB   4(R3),3(R0)         ;TASK CODE TO HDR
         CLR    4(R0)               ;CLEAR MESSAGE NO.
         CLRB   2(R0)               ; INIT EOF IN HDR
         TSTB   5(R3)               ; EOF?
         BEQ    IBMOT3              ; NO
         INCB   2(R0)               ; SET EOF IN HDR
         CLRB   5(R3)               ; CLEAR EOF IN FCB
IBMOT3:  ADD    #2,IBOCQP           ;UPDATE PUT PNTR.
         CMP    IBOCQP,#IBOCQN      ;END OF QUEUE ?
         BLE    IBMOT2              ;NO
         MOV    #IBOCBQ,IBOCQP      ;YES, INIT. PNTR
IBMOT2:  MOV    (SP)+,@#PSW         ;RESTORE PROGRAM STATUS
```

—Continued

```
        CLR     -(SP)                   ;BUILD SENSE
        CLR     -(SP)
        MOV     4(R3),R0                ;GET TASK NO.
        SWAB    R0                      ;POSITION
        ADD     #KAISS,R0               ;ACTION CODE - ISSUE TASK
        MOV     R0,-(SP)
        MOV     SP,R3                   ;SENSE ADR TO R3
        JSR     R7,XSENSE
        TST     (SP)+                   ;RESTORE STACK
        TST     (SP)+
        TST     (SP)+
        JSR     R7,XRSTR                ;RESTORE REGS
        RTS     R7                      ;EXIT
;////////////////////////////////////////////////////////////////
;///////////////////////////// INIATB ///////////////////////////
;////////////////////////////////////////////////////////////////
;RFU
;
        .EVEN
INIATB: JSR     R7,XSAVE
        JSR     R7,INIATP               ;LOAD POINTERS
        MOV     XATBP,R3
INIA10: CLR     (R3)+                   ;ZERO AUTHORITY TABLE
        CMP     R3,XATBNP
        BLE     INIA10
        JSR     R7,XRSTR
        RTS     R7
;////////////////////////////////////////////////////////////////
;///////////////////////////// INIATP ///////////////////////////
;////////////////////////////////////////////////////////////////
;RFU
;
INIATP: MOV     #XATBL,XATBP            ;START OF AUTH TABLE
        MOV     #XATBN,XATBNP           ;END OF AUTH TABLE
        RTS     R7
;////////////////////////////////////////////////////////////////
;///////////////////////////// INISUP ///////////////////////////
;////////////////////////////////////////////////////////////////
;RFU
;
        .EVEN
INISUP: JSR     R7,XSAVE
        MOV     #PR1Q,R3                ;PRIORITY 1 QUEUE
        MOV     R3,PR1QG                ;RESTORE 'GET'
        MOV     R3,PR1QP                ;RESTORE 'PUT'
INSP10: CLR     (R3)+                   ;CLEAR QUEUE
        CMP     R3,#PR1QN
        BLE     INSP10
;
        MOV     #PR2Q,R3                ;PRIORITY 2 QUEUE
        MOV     R3,PR2QG                ;RESTORE 'GET'
        MOV     R3,PR2QP                ;RESTORE 'PUT'
INSP20: CLR     (R3)+                   ;CLEAR QUEUE
        CMP     R3,#PR2QN
        BLE     INSP20
;
        MOV     #PR3Q,R3                ;PRIORITY 3 QUEUE
        MOV     R3,PR3QG                ;RESTORE 'GET'
        MOV     R3,PR3QP                ;RESTORE 'PUT'
INSP30: CLR     (R3)+                   ;CLEAR QUEUE
        CMP     R3,#PR3QN
        BLE     INSP30
;
        JSR     R7,XRSTR
        RTS     R7
;
;
;////////////////////////////////////////////////////////////////
;///////////////////////////// INITOR ///////////////////////////
;////////////////////////////////////////////////////////////////
;RFU
;
INITOR: JSR     R7,XSAVE
;
```

```
;   SET UP SENSE COMMAND
;
        SUB     #6,SP
        MOVB    R3,(SP)             ;TASK= THIS TASK
        MOVB    #2,1(SP)            ;ACTION=INITIATE
        CLR     2(SP)
        CLR     4(SP)
        MOV     R3,R0               ;SAVE TASK CODE
        DEC     R3                  ;COMPUTE JUMP VECTOR
        ASL     R3
        JMP     @INI020(R3)
INI020: .WORD   INI100,INI130,INI170,INI040,INI040,INI040,INI040
        .WORD   INI040,INI040,INI040,INI200,INI250,INI300,INI350
        .WORD   INI400,INI450,INI500,INI530,INI550,INI600,INI040
        .WORD   INI040,INI040,INI040,INI040,INI700,INI040,INI040
        .WORD   0,0,0,0,0,0,0,0     ;RESERVED
;
;   BAD INITIATE
;
INI040: MOV     #100,14(SP)         ;RETURN CODE=100
        BR      INI070
;
;   GOOD INITIATE
;
INI060: CLR     14(SP)              ;RETURN CODE=0
INI070: ADD     #6,SP               ;RESTORE STACK
        JSR     R7,XRSTR
        RTS     R7
;
;   SECURITY DECK=1 , DEV MON.=2  LOG TRANSFER=3
;
INI100: TSTB    TASTTB+DECDSP-OUTPUT ;DEC TAPE READY?
        BEQ     INI040              ;NO=BAD INITIATE
        TSTB    TASTTB+DEVDSP       ;DEV MONITORING INITIATED ?
        BEQ     INI120              ;NO
;
INI110: TST     REPCDE              ;NO-SEE IF ANYTHING ELSE WAITING
        BNE     INI040              ; TO BE STARTED
        MOV     R0,14(SP)           ;NONE WAITING=RETURN THIS CODE
        MOV     #INMSG1,R3          ;"STOP TSO MONITORING ?"
        JSR     R7,TYPOUT
        BR      INI070
;
;
INI120: TSTB    TASTTB+TSDDSP       ;SEC DECK TRNSFR INITIATED ?
        BEQ     INI130              ;NO
        JMP     INI040              ;YES=ERROR
INI130: MOV     R0,R3
        JSR     R7,SETINA           ;SET INITIATED BIT
        TSTB    M360                ;360 IN SYSTEM ?
        BEQ     INI140              ;NO
        JSR     R7,SETTIM           ;START TIMER
        MOV     SP,R3               ;TASK= THIS TASK
        JSR     R7,XSENSE           ;ACTION= INITIATE
;
INI140: CMP     R0,#TLTTSK          ; OS TO 360 TRANSFER ?
        BEQ     INI160              ;YES
;
INI150: MOVB    R0,R3               ;TASK= THIS TASK
        JSR     R7,IBMIN            ;GET A RECORD
INI160: JMP     INI060
;
;   TRANSFER LOG
;
INI170: BIT     #KIBOL,MMDREG       ;360 ONLINE ?
        BNE     INI175              ;YES
INI172: JMP     INI040              ;NO=INVALID INITIATE
;
INI175: TSTB    TASTTB+TSDDSP       ;        TRNSFER INITIATED ?
        BNE     INI172              ;YES=INVALID INITIATE
        TSTB    TASTTB+TLTDSP       ; LOG TRNSFER INITIATED ?
        BNE     INI172              ;YES= INVALID INITIATE
        TSTB    TASTTB+DEVDSP       ;DEV MON INITIATED ?
        BNE     INI110              ;YES=SEE IF SHOULD BE STOPPED
```

```
;
;   OK TO INITIATE LOG TRNSFER
        JMP     INI130                  ;AND FINISH INITIATING LOG
;
;   STOP 360
;
INI200: MOV     R0,R3
        JSR     R7,SETINA               ;SET INITIATED BIT
        TSTB    M360                    ;360 IN SYSTEM ?
        BEQ     INI220                  ;NO
        MOV     SP,R3                   ;TASK= THIS TASK (STOP 360)
        JSR     R7,XSENSI               ;ACTION= INITIATE
INI220: JMP     INI060
;
;   START SENSING
;
INI250: TSTB    M360                    ;360 IN SYSTEM
        BEQ     INI270                  ;NO
        MOV     R0,R3
        JSR     R7,SETINA               ;SET INITIATED
        JSR     R7,SETTIM               ;STARTUP TIMER
INI270: JMP     INI060
;
;   KEYBOARD INPUT
;
INI300: MOV     R0,R3
        JSR     R7,SETINA               ;SET INITIATED
        JSR     R7,SETTIM               ;START TIMER FOR KEY STRIKES (1 MIN.)
        MOV     #OPCTSK,R3              ;OPR. CK TIME OUT
        JSR     R7,TERMTR               ;TERMINATE TASK
        JMP     INI060
;
;   SIGN IN
;
INI350: MOV     R0,R3                   ;RESTORE TASK CODE
        JSR     R7,SETINA               ;SET INITIATED
        JSR     R7,SETTIM               ;START TIMER (30 SEC MAX. )
INI370: JMP     INI060
;
;   LOG PRINTING
;
INI400: TST     TASTTB+DECDSP           ;DEC TAPE     INITIATED ?
        BNE     INI420                  ;YES-OK
;
;   BAD INITIATE
;
INI410: JMP     INI040                  ;ABORT INITIATE
;
INI420: TSTB    TASTTB+LGPDSP           ;LOG PRINT INITIATED ?
        BNE     INI410                  ;YES-ABORT
        MOV     R0,R3                   ;RESTORE TASK CODE
        JSR     R7,SETINA               ;SET INITIATED
        JMP     INI060
;
;   EMERGENCY POWER
;
INI450: MOV     R0,R3
        JSR     R7,SETINA               ;SET INITIATED
        JSR     R7,SETTIM               ;START TIMER
        JMP     INI060
;
;   WAIT ALL 360 TASKS
;
INI500: MOV     R0,R3
        JSR     R7,SETINA               ;SET INITIATED
        TSTB    M360                    ;360 IN SYSTEM ?
        BEQ     INI520                  ;NO
        MOV     SP,R3                   ;TASK= WAIT ALL 360 ACTIVITY
        JSR     R7,XSENSE               ;ACTION= INITIATE
INI520: JMP     INI060
;   DEC TAPE TASK
INI530: MOV     R0,R3                   ;RESTORE TASK CODE
        JSR     R7,SETINA               ;SET INITIATE
        BR      INI520
```

```
;	ATTENDANCE CHECKS
;
INI550:	MOV	R0,R3
	JSR	R7,SETINA	;SET INITIATED
	JSR	R7,SETTIM	;START TIMER
	JMP	INI060
;
;	ATTENDANCE RESPONSE
;
INI600:	MOV	R0,R3
	JSR	R7,SETINA	;SET INITIATED
	JSR	R7,SETTIM	;START TIMER
	JMP	INI060
;
;	OPERATIONAL TIMER
;
INI700:	MOV	R0,R3		; TASK CODE
	JSR	R7,SETINA	;SET INIT.
	JSR	R7,SETTIM	;SET TIMER
	JMP	INI060		;EXIT
INMSG1:	.BYTE	INMS1N-INMSG1,TCNMTA,SCOSA,PCOSA,3,0
	.ASCII	/STOP TSO MONITORING ?/
INMS1N=.
	.EVEN
;////////////////////////////////////////////////////////////////////
;///////////////////////////// INITPS ///////////////////////////////
;////////////////////////////////////////////////////////////////////
;RFD
;
INITPS:	JSR	R7,XSAVE
	MOV	#CLRBSY,TAPROT+34.	;CLR BSY IN FCB
	JSR	R7,XRSTR
	RTS	R7
;////////////////////////////////////////////////////////////////////
;////////////////////////////////////////////////////////////////////
;
;	INITIALIZE TYPOUT QUEUE AND PNTRS  - NON-REENTRANT
;
	.EVEN
INITYP:	JSR	R7,XSAVE	;SAVE REGS.
	MOV	XATBP,R0	;GET AUTH. TBL. STRT ADR
	DEC	R0		;STRT ADR -1
	MOV	R0,MSBQN	;QUEUE END ADR.
	DEC	R0
	TST	-(R0)		;CHECK FOR END OF SOS BY
	BEQ	.-2		;SEARCHING FOR NON-ZERO BYTE
	TST	(R0)+		;INC ADR TO QUEUE START ADR
INTP20:	MOV	R0,MSBQ		;INIT. QUEUE ADR PNTR.
	MOV	R0,MSBQG	;INIT. TYPOUT GET PNTR
	MOV	R0,MSBQP	;INIT. TYPOUT PUT PNTR
	MOV	MSBQN,R0	;GET END ADR OF QUEUE
	SUB	MSBQ,R0		;SUB START ADR OF QUEUE
	INC	R0		;
	MOV	R0,ROOM		;TOTAL AVAILABLE BNT COUNT IN QUEUE
	MOV	#100,##TPS
	JSR	R7,XRSTR	;RESTORE REGS.
	RTS	R7		;RETURN
;////////////////////////////////////////////////////////////////////
;///////////////////////////// INIVEC ///////////////////////////////
;////////////////////////////////////////////////////////////////////
;RFD
;
	.EVEN
INIVEC:	JSR	R7,XSAVE
;
;	BREAKPOINT VECTORS
;
	MOV	#QRBK,##20	;IOT TRAPS TO QT
;
;	PERMANENT TRAP
;
	MOV	#ERTRAP,##4	;ILLEGAL INS.,BUS ERROR
	MOV	#ERTRAP,##10	;RESERVED INSTRUCTIONS
```

```
;
;   CLOCK INTERRUPT
;
        MOV     #CLKINT,@#100
;
;   POWER FAILURE
;
        MOV     #PFAIL,@#24
;
;   SYTEM TRANSFER
;
        MOV     #XNFER,@#30             ;EMT USED FOR TRANSFER
;
;   TAPE INTERRUPT
;
        MOV     #TAPINT,@#214
;
;   TELETYPE INTERRUPT
;
        MOV     #PRTINT,@#64
;
;   SETUP 360 INTERFACE VECTORS
;
        JSR     R7,VEC360
        JSR     R7,XRSTR
        RTS     R7
;////////////////////////////////////////////////////////////////////
;//////////////////////////// MOMSTB ////////////////////////////////
;////////////////////////////////////////////////////////////////////
;RFD
;
MOMSTB: JSR     R7,XSAVE
MOM005:  CLR    R0
         MOVB   (R3),R0                 ;SAVE MSG COUNT
         BIC    #177400,R0
         CMP    R2,R4                   ;END OF BUFFER ?
         BEQ    MOM030                  ;   YES
MOM010:  MOVB   (R3)+,(R2)+             ;MOVE BYTE TO RECEIVING AREA
         DEC    R0                      ;DEC MSG COUNT
         BEQ    MOM030                  ;END OF MESSAGE
         CMP    R2,R4                   ;END OF RECEIVING AREA ?
         BLE    MOM010                  ;NO
;
MOM030:  MOV    R0,6(SP)                ;COUNT BACK TO INPUT R3
         JSR    R7,XRSTR
         RTS    R7
;////////////////////////////////////////////////////////////////////
;//////////////////////////// MONSET ////////////////////////////////
;////////////////////////////////////////////////////////////////////
;RFD
;
MONSET: MOV     (SP),STACK-2            ;SAVE RETURN PC
        MOV     #STACK-2,SP             ;INITIALIZE STACK PTR.
        MOV     #40,@#PSW               ;NORMAL PSW
MON001: JSR     R7,XSAVE
        MOV     #SYVOL,R4               ;ZERO SYSTEM
MON005: CLRB    (R4)+                   ; VOLATILE STORAGE
        CMP     R4,#SYVOLN              ;AREA
        BNE     MON005
;
        JSR     R7,INISUP               ;SUPERVISOR QUEUES
        JSR     R7,INITPS               ;TASK PROCESSOR TABLE FOR SYSTEM
        JSR     R7,INIVEC               ;LOW CORE VECTORS
        JSR     R7,INIATP               ;AUTHORITY TABLE POINTERS
        JSR     R7,INITYP               ;TYPOUT POINTERS
        JSR     R7,CLR360               ;360 QUEUES AND POINTERS
        JSR     R7,CALLTS               ;CLEAR TASK TABLE
        TSTB    M360
        BNE     MON020
        JSR     R7,VECSIM
        BR      MON030
MON020: JSR     R7,VEC360
MON030: JSR     R7,XRSTR
        RTS     R7
```

```
;//
;//                     MOVE /
;//
;
;RFO
;   MOVE ITEM TO STAC WITH BLANK FILL
;   R3=SCAN CONTROL BLOCK ADDRESS
MOVE:   SUB     #10.,SP             ;RESERVE 10 BYTES IN STACK
        MOV     12(SP),(SP)         ;SAVE RETURN
        JSR     R7,XSAVE            ;SAVE REGISTERS
        MOV     4(R3),R0            ;GET ITEM
        ADD     12(R3),R0           ; START
        MOV     14(R3),R1           ;ITEM LENGTH
        MOV     SP,R2               ;STACK POSITION
        ADD     #16,R2              ; ADJUST
        MOV     R2,R4               ;COMPUTE END
        ADD     #9.,R4              ; POSITION
MOV010: MOVB    (R0)+,(R2)+         ;MOVE ITEM
MOV015: CMP     R2,R4               ; 9 CHARACTERS ?
        BEQ     MOV030              ;YES
        DEC     R1                  ;NO-END OF ITEM ?
        BGT     MOV010              ;NO
MOV020: MOVB    #BLANK,(R2)+        ;BLANK FILL
        BR      MOV015              ; REST OF STACK
MOV030: JSR     R7,XRSTR
        RTS     R7
;
;////////////////////////MULTIPLY              ////////////////////////////
;       TITLE   01 JUL 71                      MPY
;MULTIPLY UNSIGNED NUMBERS
;EAJ
;
MPY:    MOV     R4,-(SP)            ;SAVE R4
        MOV     R0,R1               ;MOVE MULTIPLICAND TO R1
        MOV     #-16.,R4            ;MOVE 16-BIT COUNTER TO R4
        CLR     R0                  ;CLEAR R0 AND CARRY BIT.
MPY1:   ASL     R0                  ;THESE TWO INSTRUCTIONS =
        ROL     R1                  ;DBL-PRECISION LEFT SHIFT,R1 AND R0.
        BCC     MPY2                ;TEST IF HIGH R1 BIT WAS SHIFTED INTO
;
        ADD     R2,R0               ;YES. ADD MULTIPLIER INTO PARTIAL PRO
        ADC     R1                  ;ADD POSSIBLE CARRY INTO R1
        CLC                         ;CLEAR C
;
MPY2:   INC     R4                  ;TEST FOR END OF MPY
        BNE     MPY1                ;NO. CONTINUE MPY
;
        MOV     (SP)+,R4            ;RESTORE R4
        RTS     R7                  ;EXIT
        .EVEN
;////////////////////////////////////////////////////////////////////////
;////////////////////////////////////////////////////////////////////////
;
;       TYPOUT  INTERRUPT  SERVICE  ROUTINE
;
PRTINT: MOV     R3,-(SP)            ;SAVE R3
        JSR     R7,GET              ;GET NEXT CHAR
        BR      PRT300              ;NORMAL EXIT
        CMPB    R3,#EOMCH2          ;MODE SET ?
        BNE     PRT200              ;NO
        BIC     #20,MMDREG          ;CLR OPERATIONAL
        BIS     #2,MMDREG           ;TURN ON KBD  RDY
PRT200: JSR     R7,GET              ;GET NEXT CHAR
        .WORD   240                 ;NORMAL EXIT
PRT300: MOV     (SP)+,R3            ;RESTORE R3
        RTI
;////////////////////////////////////////////////////////////////////////
;////////////////////////////////////////////////////////////////////////
;
;       QUESUP  QUEUES FILE CONTROL BLOCK FOR SUPERVISOR
;
QUESUP: JSR     R7,XSAVE            ;SAVE REGS.
        MOV     @#PSW,-(SP)         ;SAVE PROGRAM STATUS
        MOV     #340,@#PSW          ;SET NO INTER.
```

```
              TSTB    3(R3)               ;PRIORITY 0
              BNE     QUES10              ;NO
              JSR     R7,DISPCH           ;YES, DISPATCH IMMEDIATELY
              BR      QUES60              ;EXIT
QUES10:       CMPB    3(R3),#1            ;PRIORITY 1
              BEQ     QUES30              ;YES
              CMPB    3(R3),#2            ;PRIORITY 2
              BEQ     QUES50              ;YES
              MOV     PR3QP,R0            ;GET PRIORITY 3 PUT PNTR
              MOV     R3,(R0)             ;FCB ADR TO QUEUE 3
              CMP     R0,#PR3QN           ;END OF QUEUE?
              BNE     QUES20              ;NO
              MOV     #PR3Q-2,PR3QP       ;YES,INIT.TO TOP-2
QUES20:       ADD     #2,PR3QP            ;UPDATE PNTR
              BR      QUES60              ;EXIT
QUES30:       MOV     PR1QP,R0            ;PRIORITY 1 PUT PNTR
              MOV     R3,(R0)             ;FCB ADR TO QUEUE 1
              CMP     R0,#PR1QN           ;END OF QUEUE?
              BNE     QUES40              ;NO
              MOV     #PR1Q-2,PR1QP       ;YES, BEGIN OF QUEUE-2
QUES40:       ADD     #2,PR1QP            ;UPDATE PNTR
              BR      QUES60              ;EXIT
QUES50:       MOV     PR2QP,R0            ;GET PRIORITY 2 PUT PNTR
              MOV     R3,(R0)             ;FCB ADR TO QUEUE 2
              CMP     R0,#PR2QN           ;END OF QUEUE?
              BNE     QUES55              ;NO.
              MOV     #PR2Q-2,PR2QP       ;YES, BEGIN OF QUEUE-2
QUES55:       ADD     #2,PR2QP            ;UPDATE PNTR
QUES60:       MOV     (SP)+,##PSW         ;RESTORE PROGRAM STATUS
              JSR     R7,XRSTR
              RTS     R7
;
;
;///////////////////////// SETINA //////////////////////////////////
;//////////////////////////////////////////////////////////////////
;RFD
;
SETINA:   JSR     R7,XSAVE
          JSR     R7,GETTAS           ;GET ADDRESS OF TASK STATUS
          MOVB    #1,(R3)             ;SET INITIATED
          JSR     R7,XRSTR
          RTS     R7
;//////////////////////////////////////////////////////////////////
;///////////////////////// SETTIM //////////////////////////////////
;//////////////////////////////////////////////////////////////////
;RFD
;
SETTIM:   JSR     R7,XSAVE
          JSR     R7,GETTAS
          CLRB    2(R3)               ;CLEAR TIMEOUT
          MOV     6(R3),4(R3)         ;MOVE SET VALUE TO TIMER
          JSR     R7,XRSTR
          RTS     R7
;//////////////////////////////////////////////////////////////////
;///////////////////////// CLRTIM //////////////////////////////////
;//////////////////////////////////////////////////////////////////
;RFD
;
CLRTIM:   JSR     R7,XSAVE
          JSR     R7,GETTAS
          CLRB    2(R3)               ;CLEAR TIMEOUT
          CLR     4(R3)               ;CLEAR TIMER
          JSR     R7,XRSTR
          RTS     R7
;//////////////////////////////////////////////////////////////////
;///////////////////////// SETWAT //////////////////////////////////
;//////////////////////////////////////////////////////////////////
;RFD
;
SETWAT:   JSR     R7,XSAVE
          JSR     R7,GETTAS
          MOVB    #1,1(R3)            ;SET WAIT BIT
          JSR     R7,XRSTR
          RTS     R7
```

```
;////////////////////////////////////////////////////////////////////////////
;///////////////////////////////// GETTAS ///////////////////////////////////
;////////////////////////////////////////////////////////////////////////////
;RFD
;
GETTAS: DEC     R3                      ; ADDRESS OF STATUS BYTES =
        ASL     R3                      ;   (( TASK -1 ) X 8)+ ADDRESS OF
        ASL     R3                      ;      TABLE
        ASL     R3
        ADD     #TASTTB,R3
        RTS     R7
;////////////////////////////////////////////////////////////////////////////
;///////////////////////////////// SETTMT ///////////////////////////////////
;////////////////////////////////////////////////////////////////////////////
;RFD
;
SETTMT: JSR     R7,XSAVE
        JSR     R7,GETTAS               ;GET ADDRESS OF STATUS BYTES
        INCB    2(R3)                   ;SET TIMEOUT
        JSR     R7,XRSTR
        RTS     R7
;////////////////////////////////////////////////////////////////////////////
;///////////////////////////////// GETTIM ///////////////////////////////////
;////////////////////////////////////////////////////////////////////////////
;RFD
;
GETTIM: JSR     R7,XSAVE                ;
        JSR     R7,GETTAS               ;GET ADDRESS OF STATUS BYTES
        ADD     #4,R3                   ;ADJUST TO TIMER WORD
        MOV     R3,6(SP)                ;BACK TO STACKED R3
        JSR     R7,XRSTR
        RTS     R7
;
;////////////////////////////////////////////////////////////////////////////
;///////////////////////////// SCAN /////////////////////////////////////////
;////////////////////////////////////////////////////////////////////////////
;
SCAN:   JSR     R7,XSAVE                ;SAVE REGS.
        TST     14(R3)                  ;NO OF CHARS IN ITEM
        BNE     SCN010                  ;NOT FIRST TIME
        CLR     16(R3)                  ;RESET 1 TIME SW
        CLR     12(R3)                  ;CURRENT POSITION PNTR TO ZERO
SCN010: MOV     12(R3),R0               ;CP REG.
        ADD     14(R3),R0               ;CP = CP + CC
SCN040: CLR     R1                      ;CLR CHAR. CNT. REG.
SCN100: JSR     R7,GETSCN               ;GET CHAR.
SCN105: MOV     R4,R2                   ;GET LEX CODE
        ASL     R2                      ;CODE*2
        JMP     @SCN110(R2)             ;JUMP TO ACTION
SCN110: .WORD   EOL,ALPHA,NUMRIC,SIGDEL,INSDEL,LITERL
;
;
;       END OF LINE
;
EOL:    MOV     R4,10(R3)               ;EOL CODE TO SCB
        JMP     EOIEX                   ;EXIT SCAN
;
;       ALPHA CHARACTER
;
ALPHA:  INC     R1                      ;INC CHAR. CNT.
        MOV     #LCALFA,10(R3)          ;ALPHA TO SCB
        JSR     R7,GETSCN               ;GET NEXT CHAR.
        CMP     R4,#LCALFA              ;ALPHA CHAR?
        BEQ     ALPHA                   ;YES
        CMP     R4,#LCNUM               ;NUMERIC CHAR?
        BEQ     ALPHA                   ;YES
        JMP     EOI                     ;END OF ITEM
;
;       NUMERIC CHARACTER
;
NUMRIC: INC     R1                      ;INC CHAR. CNT
        MOV     R4,10(R3)               ;NUMERIC TO SCB
        JSR     R7,GETSCN               ;GET NEXT CHAR.
        CMP     R4,#LCALFA              ;ALPHA CHAR?
```

```
              BEQ    ALPHA                    ;YES
              CMP    R4,#LCNUM                ;NUMERIC ?
              BEQ    NUMRIC                   ; YES
              JMP    EOI                      ;END OF ITEM
       ;
       ;      SIGNIFICANT DELIMETER
       ;
       SIGDELL: INC   R1                      ;INC CHAR. CNT.
               MOV   R4,10(R3)                ;SIGNIFICAT DELIM.TO SCB
               JMP   EOIEX                    ;EXIT SCAN
       ;
       ;      INSIGNIFICNT DELIMETER
       ;
       INSDEL: INC   R0                       ;BUMP CURRENT POSITION
               JMP   SCN100                   ;GET NEXT CHAR
       ;
       ;      LITERAL
       ;
       LITERL: TST   16(R3)                   ;1 TIME SW SET?
               BEQ   LITRL1                   ;NO
               CLR   16(R3)                   ;RESET 1 TIME SW.
               BR    INSDEL                   ;THROW AWAY'
       LITRL1: MOV   #LCALFA,10(R3)           ;ALPHA CHAR CODE FOR LITERAL
               INC   R0
       LITRL2: JSR   R7,GETSCN                ;GET NEXT CHAR.
               TST   R4                       ;EOL IN LITERAL?
               BNE   LITRL3                   ;NO
               JMP   SCN040                   ;YES
       LITRL3: CMP   R4,#LCLIT                ;END OF LITERAL
               BEQ   LITRL4                   ;YES
               INC   R1                       ;INC CHAR CNT
               BR    LITRL2                   ;GET NEXT CHAR
       LITRL4: INC   16(R3)                   ;SET 1 TIME SW
               BR    EOI
       ;
       ;      END OF ITEM
       ;
       EOI:   TST    (R3)                     ;VOCABULARY TBL ADR?
              BEQ    EOIEX                    ;NO, DO NOT LOOK UP
              MOV    4(R3),R5                 ;MESG. ADR.
              ADD    R0,R5                    ;MOVE TO ITEM SCANNED
              MOV    R5,-(SP)                 ;SAVE IN STACK
              MOV    R0,-(SP)                 ;SAVE CURRENT POSITION POINYER
              MOV    R1,-(SP)                 ;SAVE CHAR. CNT.
              MOV    (R3),R4                  ;VOCABULARY TBL ADR.
              MOV    R4,R0                    ;SAVE ADR IN T0
       EOI1:  TSTB   (R4)                     ;CURRENT POSITION END OF TBL
              BEQ    EOI4                     ;YES
              MOVB   (R4),R1                  ;BYTECNT OF ENTRY
              ADD    R1,R0                    ;CURRENT ADR + MSG BYTE CNT
              ADD    #2,R0                    ;R0 POINTS TO NEXT ENTRY
              CMPB   (R4)+,(SP)               ;MSG SAME SIZE AS ENTRY
              BNE    EOI3                     ;NO, MOVE TO NEXT ENTRY
              MOV    (SP),R1                  ;BYTE CNTR
              MOV    4(SP),R5                 ;ADR OF MESG.
       EOI2:  CMPB   (R4)+,(R5)+              ;CHECK IF SAME
              BNE    EOI3                     ;NOT SAME
              DEC    R1                       ;CNT BYTE
              BNE    EOI2                     ;CONTINUE
              MOVB   (R4),10(R3)              ;VOCABULARY CODE TO SCB
              BR     EOI4
       EOI3:  MOV    R0,R4                    ;ADR NEXT ENTRY VOCAB TBL
              BR     EOI1
       EOI4:  MOV    (SP)+,R1                 ;RESTORE CC
              MOV    (SP)+,R0                 ;RESTORE CP
              TST    (SP)+                    ;POP MSG ADR
       EOIEX: MOV    R0,12(R3)                ;CP TO SCB
              MOV    R1,14(R3)                ;CC TO SCB
              JSR    R7,XRSTR                 ;RESTORE REGS.
              RTS    R7
       ;
       ;      GET NEXT SCAN CHAR
       ;
```

```
GETSCN:  MOV    R0,R4             ;CP TO R4
         ADD    R1,R4             ;CP+CC = NEXT CHAR
         CMP    R4,6(R3)          ;END OF LINE?
         BNE    GETSN1            ;NO
         CLR    R4                ;EOL CODE
         RTS    R7                ;EXIT
;
GETSN1:  MOV    4(R3),R5          ;ADR OF MESG
         ADD    R4,R5             ;ADD DISPLACEMENT TO CHAR
         MOVB   (R5),R4           ;CHAR TO R4
         MOV    2(R3),R5          ;CHAR TBL ADR
         BIC    #177600,R4        ;CLR PARITY BIT
         ADD    R4,R5             ;ADR + CHAR = ADR OF LEX CODE
         MOVB   (R5),R4           ;R4 = LEX CODE
         RTS    R7                ;EXIT
;////////////////////////////////////////////////////////////////
;//////////////////////////// SUPVSR ////////////////////////////
;////////////////////////////////////////////////////////////////
;RFD
;
SUPVSR:  MOV    PR1QG,R0          ;PRIORITY 1 QUEUE 'GET'
         TST    (R0)              ;ANYTHING IN QUEUE ?
         BEQ    SUP100            ;NO
         MOV    (R0),R3           ;YES-SAVE ADDRESS OF FCB
         CLR    (R0)+             ;CLEAR QUEUE SLOT AND BUMP
         CMP    R0,#PR1QN         ;WRAPAROUND ?
         BLE    SUP020            ;NO
         MOV    #PR1Q,R0          ;YES
SUP020:  MOV    R0,PR1QG          ;RESTORE 'GET'
SUP040:  JSR    R7,DISPCH         ;DISPATCH REQUEST
         BR     SUPVSR
;
;   PRIORITY 2
;
SUP100:  MOV    PR2QG,R0          ;PRIORITY 2 QUEUE 'GET'
         TST    (R0)              ;ANYTHING IN QUEUE ?
         BEQ    SUP200            ;NO
         MOV    (R0),R3           ;YES-SAVE FCB ADDRESS
         CLR    (R0)+             ;CLEAR QUEUE SLOT AND BUMP
         CMP    R0,#PR2QN         ;WRAPAROUND ?
         BLE    SUP120            ;NO
         MOV    #PR2Q,R0          ;YES
;
SUP120:  MOV    R0,PR2QG          ;RESTORE 'GET'
;
         JMP    SUP040            ;DISPATCH
;
;   PRIORITY 3
;
SUP200:  MOV    PR3QG,R0          ;PRIORITY 3 QUEUE 'GET'
         TST    (R0)              ;ANYTHING IN QUEUE ?
         BEQ    SUP240            ;NO
         MOV    (R0),R3           ;YES-SAVE FCB ADDRESS
         CLR    (R0)+             ;CLEAR QUEUE SLOT AND BUMP
         CMP    R0,#PR3QN         ;WRAPAROUND ?
         BLE    SUP220            ;NO
         MOV    #PR3Q,R0          ;YES
;
SUP220:  MOV    R0,PR3QG          ;RESTORE 'GET'
         JMP    SUP040            ;DISPATCH
;
SUP240:  JMP    SUPVSR
;
;////////////////////////////////////////////////////////////////
;//////////////////////////// SYSFLT ////////////////////////////
;////////////////////////////////////////////////////////////////
;RFD
;       SYSTEM FAULT ROUTINE   INPUT R3=FAULT CODE
;
SYSFLT:  MOV    #340,@#PSW        ;NO INTERRUPTS
         CLR    @#LKS             ;STOP CLOCK
         TSTB   SYF1TS            ;ENTERED ?
         BEQ    SYF010            ;NO
```

-Continued

```
            MOV     #204,@#IBST        ;YES-SEND ESTAT TO 360
            HALT                       ;AND STOP
SYF010:     COMB    SYSFITS            ;SET ENTERED
SYF020:     MOV     SP,SYF025
            MOV     R0,SYF025+2
            MOV     R1,SYF025+4
            MOV     R2,SYF025+6
            MOV     R3,SYF025+10
            MOV     R4,SYF025+12
            MOV     R5,SYF025+14
            MOV     R3,R4              ;SAVE R3
            CMP     R3,#5              ;DWN FOR MAINT ?
            BEQ     SYF030             ;YES
            MOV     #SENSTD,R3         ;NO-GO DOWN WITH DUMP
            BR      SYF035
SYF025:     .WORD   0,0,0,0,0,0,0      ;SAVE AREA
;   MAINTENANCE
SYF030:     MOV     #SENSTP,R3         ;DOWN WITHOUT DUMP
SYF035:     JSR     R7,XSENSI
            JSR     R7,CLRALC          ;RESET A/C
            MOV     #OPCTSK,R3         ;STOP OP CHECK TIMER
            JSR     R7,TERMTR
            MOV     #40,@#PSW          ;ALLOW INTERRUPTS
;
            MOV     #30.,R3            ;WAIT 30 SEC
SYF037:     JSR     R7,WAITMS
            DEC     R3
            BNE     SYF037
            BIC     #KIFONL,@IBST      ;TURN I/F OFFLINE
;
            CMP     SYF025+10,#5       ;MAINT ?
            BNE     SYF100             ;NO
            MOV     #SYFM01,R3         ;'GOING DOWN FOR MAINTENANCE'
            JSR     R7,TAPOUT
SYF045:     MOV     #SYFM02,R3         ;CLOSE LAST BLOCK ON TAPE
            JSR     R7,DECOUT
            JSR     R7,UPTPHD          ;UPDATE DEC TAPE TAPE HEADER
            MOV     #DWNKEY,R3         ;FORMAT LAST TIME KEY
            JSR     R7,TYMKEY
            MOV     #30.,R1
SYF050:     JSR     R7,WAITMS          ;WAIT FOR 30 SECONDS FOR
            DEC     R1                 ;I/O TO COMPLETE
            BNE     SYF050             ; AND STOP
            HALT
;   REAL FAULT -FIRST DUMP MEMORY ON BLOCK 70
SYF100:     MOV     #65,R1             ;BLK # FOR SEARCH
;   FIND BLOCK 70
            MOV     #4003,@#TCCM       ;UNIT 0,REVERSE
SYF110:     BIT     #100200,@#TCCM     ;READY OR ERROR
            BEQ     SYF110             ;WAIT
            BMI     SYF140             ;ERROR
            SUB     @#TCDT,R1          ;BLOCK FOUND ?
            BLT     SYF100             ;NO
SYF120:     MOV     #70,R1             ;RESTORE BLOCK
            MOV     #3,@#TCCM          ;UNIT 0,FORWARD
SYF130:     BIT     #100200,@#TCCM     ;READY OR ERROR
            BEQ     SYF130             ;WAIT
            BMI     SYF140             ;ERROR
            SUB     @#TCDT,R1
            BGT     SYF120
            BLT     SYF100
            BR      SYF160             ;FOUND
SYF140:     TST     @#TCST             ;END ZONE ?
            BMI     SYF150             ;YES
            HALT                       ;N/-ERROR
SYF150:     BIT     #4000,@#TCCM       ;DIRECTION ?
            BNE     SYF120             ;IF REV,GO FORWARD
            BR      SYF100             ;OTHERWISE REV
;   DUMP CORE
SYF160:     MOV     #-30000,@#TCCM     ;WORDS IN CORE
            MOV     #0,@#TCBA          ;START AT 0
            MOV     #13,@#TCCM         ;WRITE,UNIT 0,FORWARD,DO
SYF170:     BIT     #100200,@#TCCM
            BEQ     SYF170
```

```
            BPL      SYF180              ;OK
            HALT                         ;ERROR
;   STOP 360
SYF180:     MOV      #1,@#TCCM           ;STOP TAPE
            JSR      R7,CLRSEN
            BIC      #KIFONL,@IBST       ;I/F OFFLINE
            MOV      #40,@#PSW
            JSR      R7,CLRALC
            MOV      R4,R0               ;CONVERT FAULT CODE
            MOV      #10,R2              ;  TO CHARACTERS IN
            MOV      #SYFM03+33,R3       ;MESSAGE
            JSR      R7,UNBIN
            MOV      #SYFM03,R3
            CMP      R4,#2.              ;TYPOUT FAILED ?
            BEQ      SYF210              ;YES
            CMP      R4,#15.             ;TAPE ERROR ?
            BEQ      SYF220              ;YES
            JSR      R7,TAPOUT           ;'DSA DOWN-SYSTEM CODE---'
            JMP      SYF045
;   TYPOUT-FAILED
SYF210:     JSR      R7,DECOUT
            JMP      SYF045
;   TAPE FAILED
SYF220:     JSR      R7,TYPOUT
            BR       .
SYFM01:     .BYTE    SYFM1N-SYFM01,TCNMTA,SCDSA,PCDSA,1,0
            .ASCII   /DSA GOING DOWN FOR MAINTENANCE/
SYFM1N=.
SYFM02:     .BYTE    SYFM2N-SYFM02,TCFBE,SCDSA,PCDSA,1,0
SYFM2N=.
SYFM03:     .BYTE    SYFM3N-SYFM03,TCNMTA,SCDSA,PCDSA,1,0
            .ASCII   /DSA DOWN-SYSTEM CODE          /
SYFM3N=.
SENDSO:     .BYTE    KAITSK,DSOTSK,0,0,0,0
SENSTP:     .BYTE    KAITSK,STPTSK,0,0,0,0
            .EVEN
;
SYF1TS:     .WORD    0                   ;ONE TIME ENTERED
;
;///////////////////////////////////////////////////////////////////////
;            DEC TAPE INTERRUPT SERVICE
;
TAPINT:     JSR      R7,XSAVE
            MOV      @#TCCM,R1           ;GET CURRENT COMMAND
            MOV      R1,R2
            MOV      UN0PTR,R0           ;SETUP UNIT 0
            BIC      #174377,R2
            BEQ      TPIN1
            MOV      UN1PTR,R0           ;SETUP UNIT 1
;
TPIN1:      MOV      #173777,R3          ;FWD/REV TEST BIT
            TST      (R0)                ;ANYTHING IN QUEUE ?
            BNE      TPIN1A              ;YES-CONTINUE
            BIS      #11,R2              ;NO-STOP TRANSPORT
            JMP      TPIN17              ;  AND EXIT
TPIN1A:     MOV      (R0)+,R4            ;FCB ADDRESS
            MOV      (R0)+,@#TCWC        ;WORD COUNT
            MOV      (R0)+,@#TCBA        ;BUFFER ADDRESS
            MOV      (R0)+,R5            ;QUEUE CMD
            TST      (R0)+               ;BUMP TO ERR COUNT
;
            TST      R1                  ;TEST ANY ERROR
            BMI      TPIN20              ;YES
;
            TST      -(R0)               ;BUMP BACK TO BLOCK NUMBER
            BIT      #2,R1               ;TEST FOR RNUM IN PROGRESS
            BEQ      TPIN10              ;NO
;                                        ;YES, BLOCK NUMBER JUST READ
            MOV      R5,-(SP)            ;QUEUE CMD REV BIT TO STACK
            BIC      R3,(SP)
            BIC      R3,R1               ;RNUM CMD BIT TO R3
            MOV      R1,R3
            BNE      TPIN2
```

```
            BIS     #4000,R2           ;MAKE NEXT RNUM OPP. DIRECTION
;
TPIN2:  MOV     #TCDT,R1          ;ADDRESS OF DATA WORD
        CMP     (R0),(R1)         ;TEST BLOCK NUMBER FOUND
        BNE     TPIN4             ;NO
                                  ;BLOCK WANTED=BLOCK READ
;
        CMP     R3,(SP)+          ;TEST SAME DIRECTION
        BEQ     TPIN3             ;YES
        INC     @#TCCM            ;NO, REISSUE SAME RNUM
        BR      TPEXT             ;GO EXIT
;
TPIN3:  TSTB    @#TCST            ;TEST UPS
        BEQ     TPIN16            ;NO, GO TO REVERSE RNUM
        MOV     R5,@#TCCM         ;ISSUE QUEUE CMD
        INCB    2(R4)             ;SET I/O IN PROCESS
;
TPEXT:  JSR     R7,XRSTR
        RTI                       ;RETURN FROM INTERRUPT
;
;
;                                 ;BLOCK NOS. NOT THE SAME.
TPIN4:  TST     R3                ;TEST RNUM REV SET
        BNE     TPIN5             ;YES
        CMP     (R0),(R1)         ;TEST BLK WANTED.GR.READ
        BR      TPIN5B
TPIN5:  CMP     (R1),(R0)         ;TEST BLK READ.BR.WANTED
TPIN5B: BLT     TPIN6             ;NO
        TST     (SP)+             ;YES, POP STACK
TPIN5A: INC     @#TCCM            ;REISSUE SAME RNUM
        BR      TPEXT             ;GO EXIT
;
TPIN6:  CMP     R3,(SP)+          ;TEST SAME DIRECTION
        BEQ     TPIN16            ;YES, GO TO REVERSE RNUM
;
        MOV     (R0),R4           ;QUEUE BLOCK NUMBER(WANTED)
        TST     R3                ;TEST RNUM REV SET
        BNE     TPIN7             ;YES
        ADD     #3,R4             ;TEST WITHIN 3 BLOCKS OF DESTINATION
        CMP     R4,(R1)
        BR      TPIN8
TPIN7:  SUB     #3,R4
        CMP     (R1),R4
TPIN8:  BLT     TPIN16            ;NO, GO TO REVERSE RNUM
        BR      TPIN5A            ;YES, GO REISSUE SAME RNUM
;
;                                 ;FINISHING READ OR WRITE
TPIN10: CLRB    1(R4)             ;CLEAR ERRORS BYTE
TPIN9:  CLR     -10(R0)           ;CLEAR QUEUE TABLE 1ST WORD
        CLRB    2(R4)             ;RESET I/O IN PROCESS
        MOV     R4,R3             ;FCB ADR
        JSR     R7,QUESUP         ;QUEUE TO SUPERVISOR
        ADD     #4,R0             ;BUMP TO NEXT QUEUE POSITION
        TST     R2                ;TEST UNIT NUMBER
        BNE     TPIN12
        CMP     R0,#UN0END        ;UNIT ZERO POINTER UPDATE
        BNE     TPIN11
        MOV     #UN0QUE,R0
TPIN11: MOV     R0,UN0PTR
        BR      TPIN14
;
TPIN12: CMP     R0,#UN1END        ;UNIT ONE POINTER UPDATE
        BNE     TPIN13
        MOV     #UN1QUE,R0
TPIN13: MOV     R0,UN1PTR
;
TPIN14: TST     (R0)              ;TEST NEXT QUEUE POSITION
        BNE     TPIN15            ;GO HANDLE NEXT OPERATION
        BIS     #11,R2            ;STOP TRANSPORT CMD
;
        BR      TPIN17
TPIN15: MOV     6(R0),R2          ;BUILD NEXT ANUM CMD
        MOV     (R0),R3           ;GET FCB
        MOVB    #1,2(R3)          ;SET I/O IN PROCESS
        BIC     #170377,R2
```

```
!
TPIN16: BIS     #103,R2             ;RNUM COMMAND
TPIN17: MOV     R2,@#TCCM           ;ISSUE NEXT CMD
        BR      TPEXT
!
!
!
!                                   ;ERROR
TPIN20: TST     @#TCST              ;TEST FOR END ZONE
        BPL     TPIN22              ;NO
TPIN21: BIC     R3,R1               ;YES, REVERSE DIRECTION
        BNE     TPIN16
        BIS     #4000,R2
        BR      TPIN16              ;98 ISSUE RNUM
TPIN22: INCB    (R0)                ;COUNT ERROR
        CMPB    (R0),#5             ;TEST FOR 5
        BLOS    TPIN21              ;NOT YET
        MOV     @#TCST,R3           ;GET ERROR STATUS
        SWAB    R3                  ;PUT ERROR BITS IN LOW BYTE
        MOVB    R3,1(R4)            ;SET ERROR BYTE IN FCB
        MOV     #15.,R3             ;TAPE ERROR
        JSR     R7,SYSFLT           ;SYSTEM FAULT
!
;///////////////////////////////////////////////////////////////////////
!       TAPOUT     TYPES A TIME STMT AND THE INPUT MSG, THEN IT
!                  TAPES A TIME STMT AND THE INPUT MSG.
;///////////////////////////////////////////////////////////////////////
!
TAPOUT: JSR     R7,XSAVE            ;SAVE REGS
        JSR     R7,CRLF3            ; 3 SPACES
        MOV     #TAPKEY,R3          ;TIME KEY SAVE AREA ADR.
        JSR     R7,TYMKEY           ;BUILD TIME KEY
        JSR     R7,TYPSMT           ;TYPE TIME STMT, FROM TAPKEY
        MOV     6(SP),R3            ;RESTORE MSG HDR ADR TO R3
        JSR     R7,TYPOUT           ;TYPE OUT MSG.
        MOV     #TAPKEY,R3          ;TIME KEY SAVE AREA ADR.
        JSR     R7,TAPSMT           ;TAPE TIME STMT, FROM TAPKEY
        MOV     6(SP),R3            ;RESTORE MSG, HDR ADR TO R3
        JSR     R7,DECOUT           ;TAPE MSG
        JSR     R7,XRSTR            ;RESTORE REGS
        RTS     R7
;///////////////////////////////////////////////////////////////////////
;///////////////////////////////////////////////////////////////////////
!
!       TAPE A TIME MESSAGE AND A REQUESTED MESSAGE
!
TATYMS: JSR     R7,XSAVE            ;SAVE REGS.
        JSR     R7,TAPTYM           ;BUILD TIME KEY AND        TIME
        MOV     6(SP),R3            ;RESTORE ADR OF MSG.
        JSR     R7,DECOUT           ;TAPE MSG.
        JSR     R7,XRSTR            ;RESTORE REGS.
        RTS     R7
!
!
;///////////////////////////////////////////////////////////////////////
!       TAPTYM     TAPES THE CURRENT TIME KEY
!       TAPSMT     TAPES INPUT TIME KEY
;///////////////////////////////////////////////////////////////////////
!
TAPSMT: JSR     R7,XSAVE            ;SAVE REGS
        BR      TAPTM1
TAPTYM: JSR     R7,XSAVE            ;SAVE REGS
        MOV     #KEYBUF,R3          ;ADR FOR TIME KEY BUF
        JSR     R7,TYMKEY           ;BUILD TIME KEY
TAPTM1: MOV     #TYMBUF,R2          ;ADR FOR TIME STATEMENT
        JSR     R7,TYMSG            ;BUILD TIME STATEMENT
        MOV     R2,R3               ;ADR OF TIME STMT TO R3
        JSR     R7,DECOUT           ;TAPE TIME STATEMENTS
        JSR     R7,XRSTR            ;RESTORE REGS
        RTS     R7
;///////////////////////////////////////////////////////////////////////
;///////////////////////////////// TERMTR //////////////////////////////
;///////////////////////////////////////////////////////////////////////
;RFD
!
```

```
TERMTR:  JSR    R7,XSAVE
         MOV    R3,R2              ;USE R2 FOR JUMP
         DEC    R2                 ;  INDEX
         ASL    R2
         JMP    @TER020(R2)
;
TER020:  .WORD  TER100,TER200,TER350,TER150,TER150,TER150
         .WORD  TER150,TER150,TER150,TER150,TER150,TER150
         .WORD  TER150,TER250,TER400,TER150,TER150,TER150
         .WORD  TER150,TER150,TER150,TER150,TER150,TER150
         .WORD  TER150,TER150,TER150,TER150,TER150,TER150
;
;   SECURITY DECK
;
TER100:  JSR    R7,CLRTSK          ;CLEAR ALL BITS
         JSR    R7,TERSEN          ;SENSE TO 360
         MOV    #DEVTSK,R3         ;RE-INITIATE DEV. MON.
         JSR    R7,INITOR
         BR     TER160             ;AND LEAVE
TER150:  MOV    6(SP),R3           ;CLEAR ALL BITS FOR THIS
         JSR    R7,CLRTSK          ;  TASK
TER160:  JSR    R7,XRSTR
         RTS    R7
;
;   DEVICE MONITORING
;
TER200:  JSR    R7,TERSEN          ;SENSE TO 360
         BR     TER150
;
;   SIGNED OFF
;
TER250:  TSTB   TASTTB+SGNDSP-SIGNIN  ;SIGNED IN ?
         BEQ    TER150             ;NO-CLEAR BITS AND LEAVE
         MOV    #TERMS1,R3         ;'SIGNED OFF'
         JSR    R7,TAPOUT
         BR     TER150             ;AND LEAVE
;
;   TRANSFER LOG
;
TER350:  JSR    R7,TERSEN
         BR     TER150
TERSEN:  MOV    R3,-(SP)
         SUB    #6,SP              ;SETUP SENSE COMMAND
         MOVB   R3,(SP)            ;TASK CODE
         MOVB   #KASTSK,1(SP)      ;ACTION=STOP
         CLR    2(SP)
         CLR    4(SP)
         MOV    SP,R3
         JSR    R7,XSENSE          ;SENSE TO 360
         ADD    #6,SP              ;POP STACK
         MOV    (SP)+,R3
         RTS    R7
;
;   LOG PRINT
;
TER400:  CLR    CURLPS
         CLR    CURBEN
         CLRB   BLKFND
         BR     TER150
;
TERMS1:  .BYTE  TERM1N-TERMS1,TCNMTA,SCDSA,PCDSA,1,0
         .ASCII /SIGNED OFF/
TERM1N=.
;//////////////////////////////////////////////////////////////
;////////////////////////////// TIMER /////////////////////////
;//////////////////////////////////////////////////////////////
;RFD
;
TIMER:   JSR    R7,XSAVE
         MOV    #TSDTSK,R3         ;SEC.DECK TRANSFER
         JSR    R7,GETTIM          ;
         TST    (R3)               ;TIMER STARTED ?
         BEQ    TIM100             ;NO
```

```
            DEC     (R3)                    ;YES-DECREMENT TIMER
            BNE     TIM100                  ;NOT TIMED OUT
    ;
            MOV     #TIMS01,R3              ;'SECURITY DECK FAILED'
            JSR     R7,TAPOUT
            JSR     R7,C360TS               ;CLEAR STATUS FOR ALL 360 TASKS
            MOV     #STPTSK,R3
            JSR     R7,INITOR               ;  AND STOP 360
    ;
    ;
    ;   CHECK DEVICE MON. TIMER
    ;
    TIM100: MOV     #DEVTSK,R3              ;
            JSR     R7,GETTIM               ;DEV. MON. TIMER
            TST     (R3)                    ; STARTED ?
            BEQ     TIM200                  ;NO
            DEC     (R3)                    ;YES-DECREMENT TIMER
            BNE     TIM200                  ;NOT TIMED OUT
            INCB    -2(R3)                  ;SET TIMEOUT
            MOV     #TIMS02,R3              ;'NO TSO ACTIVITY'
            JSR     R7,TAPOUT
    ;
    ;
    ;   CHECK LOG TRANSFER TIMER
    ;
    TIM200: MOV     #TLTTSK,R3
            JSR     R7,GETTIM               ;
            TST     (R3)                    ;LOG TRANSFER TIMER STARTED?
            BEQ     TIM300                  ;NO
            DEC     (R3)                    ;YES-DECREMENT TIMER
            BNE     TIM300                  ;NOT TIMED OUT
    ;
    ;   LOG TRANSFER FAILED
    ;
            JSR     R7,C360TS               ;CLEAR STATUS FOR ALL 360 TASKS
            MOV     #TIMS03,R3              ;'LOG TRANSFER FAILED '
            JSR     R7,TAPOUT
            MOV     #STPTSK,R3              ;
            JSR     R7,INITOR               ;STOP 360 PROGRAM
    ;
    ;
    ;   CHECK SENSE TIMER
    ;
    TIM300: MOV     #TASTTB+SENDSP-TIMERR,R3  ;ADDRESS OF SENSE TIMER
            TST     (R3)                    ;SENSE TIMER ON ?
            BEQ     TIM400                  ;NO
    ;
            DEC     (R3)                    ;YES-DECREMENT TIMER
            BNE     TIM400                  ;NOT TIMED OUT
    ;
    ;   360 OFFLINE
    ;
    TIM350: JSR     R7,C360TS               ;CLEAR ALL 360 TASKS
            BIC     #KIBOL,MMDREG           ;TURN OFF ON-LINE LIGHT
            MOV     #TIMS04,R3              ;'360 OFFLINE'
            JSR     R7,TAPOUT               ;
    ; 20 SEC DEBUG TIMER
    TIM400: MOV     #TASTTB+STTDSP-TIMERR,R3  ;TIMER
            TST     (R3)                    ;STARTED ?
            BEQ     TIM450                  ;NO
            DEC     (R3)                    ;DEC TIMER
            BNE     TIM450                  ;NOT TIMED OUT
            TSTB    TASTTB+LGPDSP           ;TIMED OUT-LOG PRINTING?
            BEQ     TIM420                  ;NO-ABEND
            MOV     #NOPSEN,R3              ;YES-SEND NO-OP
            JSR     R7,XSENSI
            BR      TIM450
    TIM420: MOV     #25,R3                  ;ABEND
            JSR     R7,SYSFLT
    ;
    ;   CHECK TYPIN TIMER (1 MIN. BETWEEN KEY STRIKES )
    ;
    TIM450: MOV     #TASTTB+TYPDSP-TIMERR,R3  ;ADDRESS OF TYPIN TIMER
            TST     (R3)                    ;TYPIN TIMER STARTED ?
```

```
            BEQ     TIM500                  ;NO
            DEC     (R3)                    ;YES-DECREMENT TIMER
            BNE     TIM500                  ;NOT TIMED OUT
;
;   TERMINATED INPUT
;
            JSR     R7,ENLINE               ;TERMINATE THIS LINE
            CLRB    FCB11                   ;CLEAR BUSY IN INPUT FCB
;
;   CHECK SIGN IN TIMER
;
TIM500:     MOV     #TASTTB+SGNDSP-TIMERR,R3 ;ADDRESS OF SIGN IN TIMER
            TST     (R3)                    ;SIGN IN TIMER STARTED ?
            BEQ     TIM600                  ;NO
            DEC     (R3)                    ;YES-DEC TIMER
            BNE     TIM600                  ;NOT TIMED OUT
            MOV     #SGNTSK,R3              ;TIMED OUT-TERMINATE
            JSR     R7,TERMTR               ;  SIGN IN
;   CHECK EMERGENCY POWER TIMER
;
TIM600:     MOV     #EMPTSK,R3
            JSR     R7,GETTIM               ;EMER PWR TIMER STARTED ?
            TST     (R3)
            BEQ     TIM700                  ;NO
;
            DEC     (R3)                    ;YES-DECREMENT TIMER
            BNE     TIM700                  ;NOT TIMED OUT
;
;   EMERGENCY POWER
;
            MOV     #TIMS06,R3              ;'EMERGENCY POWER'
            JSR     R7,TATYMS
;
;   ATTENDANCE CHECK TIMER
;
TIM700:     MOV     #ATCTSK,R3
            MOV     16(SP),R2               ;RETRIEVE PC AT TIME OF ENTRPT
            MOV     ATMAX,R1
            COM     R1
            BIC     R1,R2                   ;MASK TO MAX VALUE
            BIS     ATMIN,R2                ;MASK TO MIN VALUE
            JSR     R7,GETTIM               ;ATT CHECK TIMER STARTED ?
            TST     (R3)
            BEQ     TIM750                  ;NO
;
            DEC     (R3)                    ;YES-DECREMENT TIMER
            BNE     TIM750                  ;NOT TIMED OUT
;
;   ATTENDANCE CHECK
;
            MOV     #TIMS07,R3              ;'ATTENDANCE CHECK'
            JSR     R7,TAPOUT
            BIS     #KATCHK,MMDREG          ;TURN ON ATT. CHECK LIGHT
            BIT     #KRS,MMDREG             ;STILL IN RS MODE ?
            BEQ     TIM720                  ;NO
            MOV     R2,TASTTB+ATCDSP-TIMERR ;YES START NEW ATT CHK
TIM720:     MOV     #ATRTSK,R3              ;START ATTENDANCE RESPONSE
            JSR     R7,INITOR               ;  TIMER
;
;   ATTENDANCE RESPONSE
;
TIM750:     MOV     #ATRTSK,R3
            JSR     R7,GETTIM
            TST     (R3)                    ;ATT RESP TIMER STARTED
            BEQ     TIM800                  ;NO
;
            DEC     (R3)                    ;YES-DECREMENT TIMER
            BNE     TIM800                  ;NOT TIMED OUT
;
;   ATTENDANCE FAILURE
;
            CLRB    -4(R3)                  ;RESET INITIATED
            INCB    -1(R3)                  ;BUMP ERROR COUNT
            MOV     #TIMS08,R3              ;'ATTENDANCE FAILURE'
            JSR     R7,TAPOUT
```

```
;
;       TIME PRINTOUT
;
TIM800: MOV     #TASTTB+CLKDSP-TIMERR,R3  ;15 MIN CLOCK
        TST     (R3)                      ;STARTED ?
        BNE     TIM840                    ;YES
        TST     SECOND                    ;SECONDS=0 ?
        BNE     TIM850                    ;NO-DON'T PRINT
        MOV     MINUTE,R0                 ;GET SECONDS
        MOV     #60.,R2                   ; AND DEVIDE BY
        JSR     R7,MPY

MOV     2(R3),R2                  ; SET VALUE-WHEN NO REMAINDER,PRINT
        JSR     R7,DIV                    ; TIME
        .WORD   240                       ;UNUSED ERROR RETURN
TIM820:  TST    R1                        ;REMAINDER=0 ?
        BNE     TIM850                    ;NO
        MOV     #CLKTSK,R3
        JSR     R7,SETTIM
        BR      TIM845
;
TIM840: DEC     (R3)                      ;DECREMENT TIMER
        BNE     TIM850                    ;NOT TIMED OUT
TIM845: JSR     R7,TYPTYM
        JSR     R7,TAPTYM
;
;       OP CHECK TIMER
;
TIM850: MOV     #TASTTB+OPCDSP-TIMERR  ;OP CHECK TIMER
        TST     (R3)                      ; STARTED ?
        BEQ     TIM900                    ; NO
        DEC     (R3)                      ; DEC TIME
        BNE     TIM900                    ; TIMED OUT ?
        JSR     R7,ENLINE                 ;YES-END LINE
TIM900: JSR     R7,XRSTR                  ; RESTORE REGS
        RTS     R7                        ; EXIT
TIMS01: .BYTE   TIMS1N-TIMS01,TCNMTA,SCDSA,PCDSA,1,0
        .ASCII  /SECURITY DECK FAILED/
TIMS1N=.
TIMS02: .BYTE   TIMS2N-TIMS02,TCNMTA,SCDSA,PCDSA,1,0
        .ASCII  /NO TSO ACTIVITY/
TIMS2N=.
TIMS03: .BYTE   TIMS3N-TIMS03,TCNMTA,SCDSA,PCDSA,1,0
        .ASCII  /LOG TRNSFR FAILED/
TIMS3N=.
TIMS04: .BYTE   TIMS4N-TIMS04,TCNMTA,SCDSA,PCDSA,1,0
        .ASCII  /360 OFFLINE/
TIMS4N=.
TIMS06: .BYTE   TIMS6N-TIMS06,TCNMTA,SCDSA,PCDSA,1,0
        .ASCII  /EMERGENCY POWER/
TIMS6N=.
TIMS07: .BYTE   TIMS7N-TIMS07,TCNMTA,SCDSA,PCDSA,1,0
        .ASCII  /ATTENDANCE CHECK/
TIMS7N=.
TIMS08: .BYTE   TIMS8N-TIMS08,TCNMTA,SCDSA,PCDSA,1,0
        .ASCII  /ATTENDANCE FAILURE/
TIMS8N=.
NOPSEN: .BYTE   1,0,0,0,0,0               ;NO OP SENSE
        .EVEN
;
;////////////////////////////////////////////////////////////////////
;       ENTER READ/WRITE DEC TAPE IN QUEUE AND INITIATE ACTION
;////////////////////////////////////////////////////////////////////
;
TPRDWT: JSR     R7,XSAVE                  ;SAVE REGS
        BIT     #400,R1                   ;UNIT NO TEST
        BNE     TRW100                    ;UNIT 1
        MOV     QUE0PT,R4                 ;INIT. UNIT 0 PTNR.
        BR      .+6
TRW100: MOV     QUE1PT,R4                 ;INIT. UNIT 1 PNTR.
        TST     (R4)                      ;QUEUE FULL
        BNE     .-2                       ;YES, WAIT FOR QUEUE SPACE
        MOV     @#PSW,-(SP)               ;SAVE STATUS
        MOV     #340,@#PSW                ;DISABLE INTRS.
        NEG     R2                        ;NEGATE WORD COUNT
```

```
                MOV     R5,(R4)+            ;FCB TO QUEUE
                MOV     R2,(R4)+            ;= WD CNT
                MOV     6(R5),(R4)+         ; BUFFER ADR.
                MOV     R1,(R4)             ; TAPE COMMAND
;
                BIT     #1,10(R5)           ;ODD BLOCK # ?

BEQ     TRW200              ;EVEN FORWARD
                BIS     #4000,(R4)          ;ODD REVERSE
TRW200:         TST     (R4)+               ; MOVE NEXT QUEUE LOCATION
                MOV     10(R5),(R4)+        ; SAVE PHYSICAL BLK NO.
                CLR     (R4)+               ; CLEAR ERROR CNTR.
                BIT     #400,-6(R4)         ;TEST UNIT NUMBER
                BNE     TRW350              ; UNIT 1
                CMP     UN0PTR,QUE0PT       ; QUEUE BUSY?
                BNE     TRW250              ; YES
                MOV     #103,R0             ; UNIT 0, INTR. ENABLE, RNUM, FWD
                BIT     #4000,-6(R4)        ;DIRECTION TEST
                BEQ     .+6                 ; FWD
                BIS     #4000,R0            ; REV
                MOV     R0,@#TCCM           ; ISSUE CMD
                INCB    2(R5)               ; SET I/O IN PROC.
TRW250:         CMP     R4,#UN0END          ; END OF QUEUE?
                BNE     TRW300              ; NO
                MOV     #UN0QUE,R4          ; YES, INIT. TO TOP
TRW300:         MOV     R4,QUE0PT           ; UPDATE PNTR.
                BR      TRW500
TRW350:         CMP     UN1PTR,QUE1PT       ;QUEUE BUSY?
                BNE     TRW400              ; YES
                MOV     #503,R0             ; UNIT 1, INTR. NBL., RNUM, FWD
                BIT     #4000,-6(R4)        ;DIRECTION TEST
                BEQ     .+6                 ; FWD
                BIS     #4000,R0            ; REV - SET BIT
                MOV     R0,@#TCCM           ; ISSUE CMD
                INCB    2(R5)               ; SET I/O IN PROC
TRW400:         CMP     R4,#UN1END          ;END OF QUEUE
                BNE     .+6                 ; NO
                MOV     #UN1QUE,R4          ; YES, INIT. TO TOP
                MOV     R4,QUE1PT           ; UPDATE PNTR
TRW500:         MOV     (SP)+,@#PSW         ; SET PREVIOUS STATUS
                JSR     R7,XRSTR            ; RESTORE REGS.
                RTS     R7
;
; TAPE BLOCK COUNTER AND WRAPAROUND
;
TPWRAP:         INC     R0                  ;COUNT BLOCK
                CMP     R0,#287.-SYSCON     ; TEST FIRST SEQUENCE BREAK
                BLOS    TPWRX               ;NO
;
                CMP     R0,#288.+SYSCON     ;YES, TEST FIRST BREAK ALREADY MADE
                BHIS    TPWR1               ;YES
                MOV     #288.+SYSCON,R0     ;MAKE FIRST BREAK
                BR      TPWRX               ;EXIT
;
TPWR1:          CMP     R0,#575.-SYSCON     ;TEST WRAPAROUND
                BLOS    TPWRX               ;NO
                MOV     #SYSCON,R0          ;YES, WRAPAROUND
                RTS     R7                  ;WRAPAROUND EXIT
;
TPWRX:          ADD     #2,(SP)             ; BUMP
                RTS     R7                  ;NORMAL EXIT
;
;
;////////////////////////////////////////////////////////////////////
;        READ OR WRITE ON UNIT 0 OR UNIT 1
;////////////////////////////////////////////////////////////////////
;
TR0BLK:         JSR     R7,XSAVE            ;SAVE REGS.
                MOV     #105,R1             ;UNIT 0 READ
                BR      TRWBLK
TR1BLK:         JSR     R7,XSAVE            ;SAVE REGS.
                MOV     #505,R1             ;UNIT 1 READ
                BR      TRWBLK
```

```
TW0BLK: JSR     R7,XSAVE            ;SAVE REGS.
        MOV     #115,R1             ;UNIT 0 WRITE
        BR      TRWBLK
TW1BLK: JSR     R7,XSAVE            ;SAVE REGS.
        MOV     #515,R1             ;UNIT 1 WRITE
TRWBLK: MOV     R3,R5               ;FCB ADR
        MOV     #256.,R2            ;BLOCK CNT
        JSR     R7,TPROWT           ;QUEUE ENTRY
        JSR     R7,XRSTR            ;RESTORE REGS.
        RTS     R7                  ;EXIT
;//
;//                       TSOOUT
;//
;RFD
TSOOUT: JSR     R7,TYPOUT           ;TYPE MSG.
        JSR     R7,DECOUT           ;TAPE MSG.
        RTS     R7
;////////////////////////////////////////////////////////////////////
;/////////////////////////// TTYPRT /////////////////////////////////
;////////////////////////////////////////////////////////////////////
;RFD
;
TTYPRT=.
TTYPR1: TSTB    @#TPS               ;WAIT FOR TTY
        BPL     TTYPR1              ; READY
        TSTB    (R1)                ;VALID CHARACTER ?
        BNE     TTYPR2              ;YES
        RTS     R7                  ;NO-RETURN
TTYPR2: MOVB    (R1)+,@#TPB         ;PRINT CHARACTER
        BR      TTYPR1              ;WAIT TILL PRINTED
;
;////////////////////////////////////////////////////////////////////
;       FORMAT   A   TIME   KEY      REENTRANT
;////////////////////////////////////////////////////////////////////
;
TYMKEY: MOVB    MONTH,(R3)+         ;SAVE MONTH
        MOVB    DAY,(R3)+           ;SAVE DAY
        MOVB    HOUR,(R3)+          ;SAVE HOUR
        MOVB    MINUTE,(R3)+        ;SAVE MINUTE
        MOVB    SECOND,(R3)+        ;SAVE SECOND
        SUB     #5,R3               ;RESTORE INPUT R3
        RTS     R7
;
;////////////////////////////////////////////////////////////////////
;       TAKES   INPUT TIME KEY AND GIVES TIME MSG BACK
;////////////////////////////////////////////////////////////////////
;
TYMSG:  JSR     R7,XSAVE            ;SAVE REGS
        MOV     R2,R4               ;SAVE RECEIVING AREA ADR
        MOV     R3,R1               ;SAVE TIME KEY ADR
        MOVB    #63,26(R4)          ; 3
        MOVB    #67,25(R4)          ; 7
        MOVB    #57,24(R4)          ; /
        MOV     #10.,R2             ; UNBIN RADIX
        MOVB    1(R1),R0            ; DAY IN BINARY
        MOV     R4,R3
        ADD     #16,R3              ;ADR OF STORE FOR DAY VALUE
        JSR     R7,UNBIN            ;DAY TO BUFFER
        MOVB    #57,21(R4)          ; /
        SUB     #3,R3               ;ADJUST ADR FOR MON=R3=R3-3
        MOVB    (R1),R0             ;MONTH
        JSR     R7,UNBIN
        SUB     #3,R3               ; R3-3
        MOVB    4(R1),R0            ; SECONDS
        JSR     R7,UNBIN
        MOVB    #56,13(R4)          ; PERIOD TO BUFFER
        SUB     #3,R3               ; ADJUST PNTR
        MOVB    3(R1),R0            ;MINUTES
        JSR     R7,UNBIN
        MOVB    #72,10(R4)          ;COLON
        SUB     #3,R3
        MOVB    2(R1),R0            ;HOUR
        JSR     R7,UNBIN
```

—Continued

```
        MOVB    #23.,(R4)+              ;BUILD HEADER=COUNT=23.
        MOV     #1,R0
        MOVB    #TCTIME,(R4)+           ;TYPE CODE   1
        MOVB    #PCDSA,(R4)+            ;PROCESSOR 1
        MOVB    #SCDSA,(R4)+            ;SOURCE 1
        MOVB    R0,(R4)+                ;PRECEEDING CR/LF = 1
        CLRB    -(R4)                   ;0 TRAILING CR/LF'S
        JSR     R7,XRSTR
        RTS     R7

;       INPUT R3=FCB ADDRESS WITH LOGICAL BLOCK #
;       OUTPUT R3=FCB ADDRRESS WITH PHYSICAL BLOCK #
;       LOGICAL BLK 0=PHYSICAL BLK 4

LOTOP:  JSR     R7,XSAVE
        MOV     10(R3),R0
        MOV     #580.,R1                ; BLOCK NUMBER
        MOV     #144.,R2                ; ALIGNMENT CONSTATS
        CLR     R3                      ; SECTION CNTR.
TRW150: SUB     #144.,R0                ; REDUCE R0 UNTIL NEG.
        BMI     LOT020
        INC     R3                      ; CNT UNTIL NEG.
        DEC     R1                      ;ADJUST ALIGNMENT
        BR      TRW150
        BIT     #1,R3                   ; TEST ODD SECTION
        BEQ     TRW030                  ; EVEN
        ADD     R2,R0                   ; ODD, COMPLEMENT R0(BASE 144)
        COM     R0
LOT020: ASL     R0
        ASL     R0
        ADD     R1,R0                   ; R0=PHYSICAL BLK NO.
        MOV     6(SP),R3
        MOV     R0,10(R3)
        JSR     R7,XRSTR
        RTS     R7

;///////////////////////////////////////////////////////////////
;       TYPE OUT    MESSAGES                REENTRANT
;///////////////////////////////////////////////////////////////
;
TYPOUT: JSR     R7,XSAVE                ;SAVE REGS
        MOVB    (R3),R0                 ;MSG.CNT.
        BIC     #177400,R0              ;MASK
        MOVB    4(R3),R1                ;#PRECEEDING CR/LF
        MOVB    5(R3),R2                ;#TRAILING CR/LF
        SUB     #5,R0                   ;CNT = HEADER + TERM. BYTE
        CMPB    1(R3),#TCLOGP           ;LOG PRINT TYPE ?
        BNE     TYP010                  ;NO.
        ADD     #5,R0                   ;ADD 5 FOR BLANKS
        BR      TYP015
TYP010: CMPB    1(R3),#TCLGPC           ;PRINT CONSOLE LINE ?
        BNE     TYP015                  ;NO
        ADD     #4,R0                   ;ADJUST FOR SPACES
TYP015: CMP     R0,#77.                 ;MSG. > 1 LINE
        BLE     TYP020                  ;NO
        ADD     #5,R0                   ;YES, ADD 5 TO CNT FOR CR,CR,CR,CR,LF
TYP020: DEC     R1                      ;PRECEEDING CNT -1
        BPL     TYP050                  ;AT LEAST 1 PAIR
        CLR     R1                      ;RESTORE R1 FOR 0 PREC. CR/LF
        BR      TYP060
TYP050: ADD     #5,R0                   ;ADD 5 FOR 4CR AND 1LF FOR 1ST PAIR
TYP060: DEC     R2                      ;TRAILING CNT -1
        BPL     TYP070                  ;AT LEAST 1 PAIR
        CLR     R2                      ;RESTORE R2 FOR 0 TRAIL. CR/LF
        BR      TYP080
TYP070: ADD     #5,R0                   ;ADD 5 FOR 4CR AND 1LF FOR 1ST PAIR
TYP080: ADD     R2,R1                   ;PREC. AND TRAIL. CR/LF
        ASL     R1                      ;CR/LF PAIRS X 2
        ADD     R1,R0                   ;TOTAL CHARS. IN BUFFER
```

```
         -Continued

TYP200: CMP     R0,#1
        BGT     TYP210
        JMP     TYP800          ;EXIT  NO MESSAGE TO PRINT
TYP210: CMP     R0,ROOM         ;ENOUGH SPACE IN QUEUE?
        BLE     TYP250          ;YES
        MOV     #2,R3
        JSR     R7,SYSFLT       ;NO, MUST BE SYSTEM ERROR
;
TYP250: MOV     @#PSW,-(SP)     ;SAVE PSW FOR RESTORE LATER
        MOV     #340,@#PSW      ;DO NOT ALLOW INTERRUPTS
        MOV     MSBQP,R1        ;GET QUEUE PUT PNTR
        MOV     R1,R2           ;COMPUTE QUEUE PNTR UPDATE
        ADD     R0,R2           ;UPDATE WITH MSG CNT
        CMP     R2,MSBQN        ;WRAP AROUND QUEUE?
        BLE     TYP400          ;NO
        SUB     MSBQN,R2        ;YES,COMPUTE WRAP AROUND FACTOR
        ADD     MSBQ,R2
        DEC     R2
TYP400: MOV     R2,MSBQP        ;UPDATE QUEUE PNTR.
        SUB     R0,ROOM         ;REDUCE AVAIL. CNT.
        MOV     (SP)+,@#PSW     ;RESTORE PSW -)NABLE INTERRUPTS
        MOV     R3,R4
        ADD     #6,R4           ;INIT. TO START OF MSG.
        MOVB    4(R3),R2        ;GET PRECEEDING CR/LF
        BEQ     TYP530          ;NONE
        JSR     R7,CR4          ;MOVE 4 CR TO BUFFER
        BR      TYP510
TYP500: MOVB    #CR,(R1)        ;CR TO BUFFER
        JSR     R7,BUFNCK       ;CK FOR BUFFER END
TYP510: MOVB    #LF,(R1)        ;LF TO BUFFER
        JSR     R7,BUFNCK       ;CK FOR BUFFER END
        DEC     R2              ;ALL CR/LF IN QUEUE ?
        BNE     TYP500          ;NO
TYP530: CMPB    1(R3),#TCLOGP   ;LOG PRINT REQ?
        BNE     TYP555          ;NO
TYP550: MOVB    #SPC,(R1)       ;MOVE SPACES TO QUEUE
        JSR     R7,BUFNCK       ;CK FOR WRAP AROUND IN QUEUE
        INC     R2              ;INC MSG CNTR FOR CHRS/LINE
        CMP     R2,#5           ;FIVE SPACES IN QUEUE?
        BNE     TYP550          ;NO
        BR      TYP558
TYP555: CMPB    1(R3),#TCLGPC   ;CONSOLE LINE ?
        BNE     TYP558          ;NO
TYP556: MOVB    #SPC,(R1)       ;YES-MOVE 4
        JSR     R7,BUFNCK       ; SPACES TO
        INC     R2              ; QUEUE
        CMP     R2,#4
        BNE     TYP556
TYP558: MOVB    (R3),R5         ;GET MSG COUNT
        BIC     #177400,R5      ;MASK TO 8 BITS
        SUB     #6,R5           ;SUB HEADER CNT
        BEQ     TYP580          ;NO MESG.
TYP560: MOVB    (R4)+,(R1)      ;MOVE
        JSR     R7,BUFNCK       ;CK WRAP AROUND
        INC     R2              ;INC CHR/LINE CNT
        CMP     #77.,R2         ;END OF LINE?
        BGT     TYP575          ;NO
        JSR     R7,CR4          ;MOVE 4 CR TO BUFFER
        MOVB    #LF,(R1)
        JSR     R7,BUFNCK
        CLR     R2              ;RE-INIT. FOR LINE
TYP575: DEC     R5              ;MESSAGE MOVED?
        BNE     TYP560          ;NOT YET
TYP580: MOVB    5(R3),R2        ;# OF TRAILING CR/LF
        BEQ     TYP610
        JSR     R7,CR4          ;MOVE 4 CR AND 1 LF
        BR      TYP605
TYP600: MOVB    #CR,(R1)        ;CR TO BUFFER
        JSR     R7,BUFNCK       ;CK FOR BUFFER END
TYP605: MOVB    #LF,(R1)        ;LF TO BUFFER
        JSR     R7,BUFNCK       ;CK FOR BUFFER END
        DEC     R2              ;ALL CR/LF PAIRS IN QUEUE?
        BNE     TYP600          ;NO
```

```
TYP610:   MOVB    #EOMCH1,(R1)        ;END OF MSG BYTE TO BUF
          CMPB    1(R3),#TCPRMT       ;PROMPT MESG?
          BNE     TYP620              ;NO
          MOVB    #EOMCH2,(R1)        ;PROMPT MESG TERM. BYTE
TYP620:   JSR     R7,BUFNCK           ;CK FOR BUFFER END
          JSR     R7,GET              ;GET NEXT AND PRINT
          .WORD   240
TYP800:   JSR     R7,XRSTR            ;RESTORE REGS
          RTS     R7                  ;RETURN
;
;     CHECK  FOR TYPOUT QUEUE  WRAP AROUND
;
BUFNCK:   CMP     R1,MSBQN            ;END OF QUEUE?
          BNE     BUFCK1              ;NO
          MOV     MSBQ,R1             ;RE-INIT TYPOUT QUEUE PNTR
          RTS     R7
BUFCK1:   TSTB    (R1)+               ;BUMP PNTR
          RTS     R7
;/////////////////////////////////////////////////////////////////
;///////////////////////   GET   /////////////////////////////////
;/////////////////////////////////////////////////////////////////
GET:      MOV     R4,-(SP)            ;SAVE R4
          MOV     @#PSW,-(SP)         ;SAVE PROGRAM STATUS
          MOV     #340,@#PSW          ;SET NO INTERRUPTS
          TSTB    @#TPS               ;TTY PRINTER BUSY ?
          BPL     GET30               ;YES
          TSTB    @MSBQG              ;ANY PRINTABLE CHAR IN QUEUE?
          BEQ     GET30               ;NO
          MOV     MSBQG,R4            ;INIT GET POINTER
          MOVB    (R4),R3             ;GET CHAR
          CLRB    (R4)                ;ZERO BYTE
          CMP     R4,MSBQN            ;END OF QUEUE?
          BNE     GET10               ;NO
          MOV     MSBQ,R4             ;RE-INIT. GET PNTR
          BR      .+4
GET10:    TSTB    (R4)+               ;INC PNTR
          MOV     R4,MSBQG            ;UPDATE GET PNTR VECTOR
          INC     ROOM                ;UPDATE #OF AVAILABLE BYTES
          CMPB    R3,#EOMCH1          ;EOM?
          BEQ     GET40               ;YES
          CMPB    R3,#EOMCH2          ;END OF PROMPT MSG?
          BEQ     GET40               ;YES
          MOVB    R3,@#TPB            ;PRINT CHAR
GET30:    MOV     (SP)+,@#PSW         ;RESTORE PROGRAM STATUS
          MOV     (SP)+,R4            ;RESTORE R4
          RTS     R7                  ;EXIT
;
GET40:    ADD     #2,4(SP)            ;EOM EXIT
          BR      GET30               ;
;/////////////////////////////////////////////////////////////////
;///////////////////////////// CR4 ///////////////////////////////
;/////////////////////////////////////////////////////////////////
CR4:      MOV     R5,-(SP)            ;SAVE R5
          MOV     #4,R5
CR4A:     MOVB    #CR,(R1)            ;CR TO BUFFER
          JSR     R7,BUFNCK
          DEC     R5
          BNE     CR4A
          MOV     (SP)+
          RTS     R7
;
;////////////////////////////////////////////////////////////////
;     TYPTYM    TYPES  THE CURRENT TIME KEY
;     TYPSMT    TYPES  INPUT TIME KEY
;////////////////////////////////////////////////////////////////
;
TYPSMT:   JSR     R7,XSAVE            ;SAVE REGS
          BR      TTYM10
TYPTYM:   JSR     R7,XSAVE            ;SAVE REGS
          MOV     #KEYBUF,R3          ;ADR FOR TIME KEY BUF
          JSR     R7,TYMKEY           ;BUILD TIME KEY
TTYM10:   MOV     #TYMBUF,R2          ;ADR FOR TIME STATEMENT
          JSR     R7,TYMSG            ;BUILD TIME STATEMENT
```

```
            MOV    R2,R3                  ;MOVE ADR OF TYPE OUT BUF
            JSR    R7,TYPOUT              ;TYPE OUT MESSAGE
            JSR    R7,XRSTR               ;RESTORE REGS
            RTS    R7                     ;EXIT
;
;
;////////////////////////////////////////////////////////////////////
;////////////////////////////////////////////////////////////////////
;      TYPE A TIME MESSAGE AND A REQUESTED MESSAGE
;
TYTYMS:     JSR    R7,XSAVE               ;SAVE REGS.
            JSR    R7,CRLF3               ;3 LINE FEEDS AND CR
            JSR    R7,TYPTYM              ;BUILD TIME KEY AND PRINT TIME
            MOV    6(SP),R3               ;RESTORE ADR OF MSG.
            JSR    R7,TYPOUT              ;PRINT MSG.
            JSR    R7,XRSTR               ;RESTORE REGS
            RTS    R7
;
;
;
;/////////////////////////////BINARY TO OUTPUT    ///////////////////////////
;       TITLE   01JUL71                   UNBIN
;EAJ
;
UNTBL:      .BYTE  60,61,62,63,64,65,66,67,70,71
            .BYTE  101,102,103,104,105,106
            .EVEN
;
UNBIN:      JSR    R7,XSAVE
            MOV    #-6,R4
UNBIN1:     MOVB   #BLANK,(R3)+           ;BLANK OUT SIX CHARACTERS
            INC    R4
            BNE    UNBIN1
            MOVB   #60,-1(R3)             ;ZERO LOWER TWO CHARACTER,
            MOVB   #60,-2(R3)
;
            MOVB   #BLANK,R5              ;SETUP MINUS CONSIDERATIONS
            MOV    #-4,R4
            CMP    #16.,R2                ;TEST HEXIDECIMAL
            BEQ    UNBIN2                 ;YES
            MOV    #-5,R4                 ;NO
            TST    R0                     ;TEST FOR NEGATIVE
            BPL    UNBIN2                 ;NO
            MOVB   #61,R5                 ;SETUP CHARACTER "1"
            CMP    #8.,R2                 ;TEST OCTAL
            BEQ    UNBIN2                 ;YES
            MOVB   #MINUS,R5              ;SETUP CHARACTER "MINUS SIGN"
            NEG    R0                     ;MAKE BINARY INTO POSITIVE
;
;
UNBIN2:     JSR    R7,DIV                 ;DIVIDE R0 BY RADIX IN R2
            .WORD  240                    ;ERROR RETURN
;
            MOVB   UNTBL(R1),R1           ;LOOKUP DIGIT USING REMAINDER
            MOVB   R1,-(R3)               ;MOVE DIGIT TO LOWEST-ORDER POSITION
            CMP    #10.,R2                ;TEST DECIMAL
            BNE    UNBIN3                 ;NO
            TST    R0                     ;TEST FOR ZERO QUOTIENT
            BEQ    UNBIN4                 ;YES, END CONVERSION
UNBIN3:     INC    R4                     ;TEST END OF CONVERSION
            BNE    UNBIN2                 ;NO.
;
UNBIN4:     CMPB   -1(R3),#60             ;TEST FOR LESS THAN 2DIGITS
            BEQ    .+4                    ;YES
            MOVB   R5,-(R3)               ;NO, PLACE SIGN
            JSR    R7,XRSTR               ;RESTORE REGS.
            RTS    R7                     ;EXIT
;
;////////////////////////////UNHASH///////////////////////////////////////////
;       TITLE   24 MAY '72                UNHASH
;
UNHASH:     JSR    R7,XSAVE
            MOV    #-3,R5                 ; COUNT 3 TRIADS
```

```
            ADD     #9.,R2              ; START AT END
            SUB     #6,R3               ; START 1ST TRIAD
            MOV     (R3)+,-(SP)         ; 1ST
            MOV     (R3)+,-(SP)         ; 2ND
            MOV     (R3)+,-(SP)         ; 3RD

UNHA2:      MOV     (SP)+,R0            ; NXT TRIAD FOR UNHASH
            MOV     #40.,R2
            MOV     #-3,R4
UNHA3:      JSR     R7,DIV              ;DIVIDE
            BR      .+2
;
;
            MOVB    #BLANK,-(R3)        ;MSG= *
            CMP     R1,#1
            BLOS    UNHA5               ; R1 = 1
            ADD     #56,R1
            CMP     R1,#71              ; CONVERT R1
            BLOS    UNHA4               ;    TO ASCII
            ADD     #6,R1
UNHA4:      MOVB    R1,(R3)
;
;
UNHA5:      INC     R4                  ; TEST 3 CHARACTERS
            BNE     UNHA3               ; NO
            INC     R5                  ; TEST 3 TRIADS
            BNE     UNHA2               ; NO
;
            JSR     R7,XRSTR
            RTS     R7                  ;EXIT
;////////////////////////////////////////////////////////////////////
;///////////////////////////// UPTPHD ///////////////////////////////
;////////////////////////////////////////////////////////////////////
;
;RFU
;       ROUTINE TO UPDATE DEC TAPE HEADER
;       RETURN CODE  R3=0 GOOD
;                      =1 BAD
UPTPHD:     JSR     R7,XSAVE
            MOV     #FCB5,R3            ;SETUP FCB
            MOVB    #DECTSK,4(R3)       ; TO READ
            MOVB    #1,(R3)             ; BLK 0
            CLRB    3(R3)
            CLR     10(R3)
            JSR     R7,TR1BLK           ;READ UNIT 1 BLK 0
UPT020:     TSTB    (R3)                ;DONE ?
            BNE     UPT020              ;NO
            MOV     6(R3),R3            ;BUFF ADDRESS
;    SETUP HEADER
UPT060:     MOV     DECFCB,R1           ;GET CURRENT
            MOV     10(R1),R1           ; BLOCK #
            BPL     UPT070              ;LEGAL ?
            MOV     #575.,R1            ;NO-SET=MAX
UPT070:     MOV     R1,22(R3)           ;BLK # TO BUFF
            ADD     #31,R3              ;FORMAT PRESENT TIME AS
            JSR     R7,TYMKEY           ;TIME KEY IN HEADER
;    WRITE HEADER
            MOV     #FCB5,R3            ;SETUP TO WRITE
            MOVB    #1,(R3)             ; HEADER
            JSR     R7,TW1BLK           ;WRITE UNIT 1 BLK 0
UPT080:     TSTB    (R3)                ;DONE ?
            BNE     UPT080              ;NO
;    GOOD RETURN
UPT100:     CLR     6(SP)               ;RETURN CODE
UPT110:     JSR     R7,XRSTR
            RTS     R7
;///////////////////////////EXCEPTION AUTHORITY TABLE BUILD/////////////
;//                          XABLD
;//
;//
;
;RFU
;    R3=SCAN CONTROL BLOCK ADDRESS
```

```
!
XABLD:  JSR     R7,XSAVE
        MOV     #8.,R2
XAB010: MOV     (R3)+,-(SP)         ;SAVE SCB
        DEC     R2
        BNE     XAB010
        CLR     R5                  ;USE R5 TO COLLECT BITS
        MOV     26(SP),R3           ;RESTORE SCB ADDRESS
        JSR     R7,SCAN             ;SCAN OVER NAME
XAB015: MOV     26(SP),R3           ;RESTORE SCB ADD.
        JSR     R7,SCAN
        CMP     10(R3),#LCNUM       ;NUMERIC?
        BNE     XAB070              ;NO
        MOV     14(R3),R4           ;R4= # OF BYTES
        MOV     4(R3),R0
        ADD     12(R3),R0           ;R3= ADDRESS
        MOV     R0,R3
        JSR     R7,BIN              ;CONVERT TO BINARY
        .WORD   XABTMP
        CMP     R0,#15.             ;LEGAL PROPERTY?
        BGT     XAB050              ;NO
        CMP     R0,#13.             ;SEC OFFICER?
        BNE     XAB020              ;NO
        BIS     #6000,R5            ;YES-ALSO SET 10,11
;  SET PROP BIT
XAB020: MOV     #1,R0               ;SET BIT 0
        NEG     R0                  ;USE PROP NUMBER AS COUNT
        BEQ     XAB040              ;DONE IF 0
XAB030: ASL     R1                  ;SHIFT UNTIL
        INC     R0                  ;COUNT=0
XAB040: BIS     R1,R5               ;THEN SAVE BIT
        BR      XAB015              ;AND CONTINUE
;  ILLEGAL PROP BITS SET
XAB050: MOV     #2,R3               ;ERROR INDICATOR
XAB055: ADD     #20,SP              ;POP STACK
XAB060: MOV     R3,6(SP)            ;ERROR INDICATOR
        JSR     R7,XRSTR
        RTS     R7
;  END OF PROP BITS
XAB070: CMP     10(R3),#LCEOL       ;EOL ?
        BNE     XAB100              ;NO
        TST     R5                  ;YES  ANY BITS SET?
        BEQ     XAB050              ;NO-ERROR
        JMP     XAB200              ;YES BUILD ENTRY
;  DELETE ENTRY
XAB100: JSR     R7,RESCB            ;RESTORE SCB AND GET NAME
        TST     R3                  ;ALFA OR NUMERIC?
        BEQ     XAB050              ;NO-ERROR
        JSR     R7,XALKP            ;LOOKUP IN TABLE
        TST     R3                  ;IN TABLE ?
        BLE     XAB050              ;NO
;
;       DELETE ENTRY FROM SCAT
;
        MOV     R3,R5               ;SAVE CURRENT POSITION
XAB130: JSR     R7,XADVS            ;ADVANCE TO NEXT ENTRY
        TST     (R3)                ;AVAILABLE SLOT ?
        BNE     XAB160              ;NO
        MOV     R3,R2               ;YES  END OF CHAIN ?
        TST     -(R2)
        BNE     XAB130              ;NO
        BNE     XAB130              ;NO
        TST     -(R2)
        TST     -(R2)
        BNE     XAB130              ;NO
        SUB     #6,R5               ;YES-ZERO ENTRIES BACK
XAB140: CLR     -(R2)               ;TO START
        CMP     R2,R5
        BNE     XAB140
XAB150: MOV     #1,R3               ;SET DELETE INDICATOR
        BR      XAB055              ;AND LEAVE
;       CHAIN DOES NOT END HERE
XAB160: CLR     (R5)                ;CLEAR PROPERTIES
```

```
            BR      XAB150              ;AND SET INDICATOR
;
; BUILD ENTRY
;
XAB200: JSR     R7,RESCB            ;RESTORE SCB AND RESCAN
        TST     R3                  ;ALPHA OR NUMERIC ?
        BNE     XAB210              ;YES
XAB205: JMP     XAB050              ;ILLEGAL
;
        BNE     XAB030
XAB210: JSR     R7,XALKP            ;LOOKUP IN SCAT
        TST     R3                  ;IN TABLE ?
        BLE     XAB215              ;NO
        MOV     R3,R4
        BR      XAB240
; NEW NAME
XAB215: JSR     R7,MOVE             ;MOVE TO STACK
        MOV     SP,R3
        JSR     R7,XHASH            ;COMPUTE HASH
        TST     R3                  ;LEGAL ?
        BEQ     XAB205              ;NO - EXIT
        MOV     6(R3),R4            ;COMPUTE SCAT
        ADD     XATBP,R4            ;POSITION
        SUB     #10,R4              ;BACKUP ENTRY
        MOV     R4,R2               ;SAVE START
        MOV     R2,R3
XAB220: JSR     R7,XADVS            ;ADVANCE TO NEXT ENTRY
        TST     6(R3)               ;VACANT?
        BEQ     XAB230              ;YES - OK TO BUILD
        CMP     R3,R2               ;TABLE FULL ?
        BNE     XAB220              ; NO - DO NEXT
        CLR     R3                  ;YES - SET INDICATOR
        JMP     XAB055              ;AND LEAVE
XAB230: MOV     R3,R4               ;ENTRY POSITION
        MOV     (SP)+,(R4)+         ;MOVE ENTRY TO SCAT
        MOV     (SP)+,(R4)+
        MOV     (SP)+,(R4)+
        CLR     (R4)                ;CLEAR PROP.
        CMP     (SP)+,(SP)+         ;POP STACK
XAB240: BIS     R5,(R4)             ;SET BITS IN TABLE
        MOV     26(SP),R3           ;RESTORE INPUT R3
        JMP     XAB055              ;AND LEAVE
XABTMP: .WORD   0,0                 ;FLAG AREA FOR BINARY
;//////////////// AME HASHER ////////////////////////////////
;RE-ENTRANT
;       R3 RETURN  0=ILLEGAL CHARACTER

XHASH:  JSR     R7,XSAVE
        ADD     #9.,R3              ;LAST CHAR +1
        MOV     #-3,R4              ;COUNTS 3 HASH TOTALS
;
XHASH1: MOV     #1,R2               ;40 ** 0
        MOV     #-3,R5              ;COUNTS 3 CHARS
        CLR     -(SP)               ;HASH ACCUMULATOR
XHASH2: MOVB    -(R3),R0            ;BYTES IN REVERSE ORDER
        MOVB    HTBL(R0),R0
        TST     R0                  ;LEGAL ?
        BMI     XHASH9              ;NO
;
;
XHASH4: JSR     R7,MPY              ;R0X 40**N
        ADD     R0,(SP)             ;ACCUMULATE IN STACK
;
        MOV     #40.,R0             ;40.XR2
        JSR     R7,MPY
        MOV     R0,R2
;
        INC     R5
        BNE     XHASH2              ;REPEAT FOR 3 CHARS
        INC     R4
        BNE     XHASH1              ;REPEAT FOR 3 TRIADS
;
        BIC     #1,R3               ;ENSURE WORD BOUNDARY
        MOV     R3,14(SP)           ;SAVE R3 IN STACK R3
```

```
            MOV     (SP),R0              ;RECOVER 1ST TRIAD
            MOV     (SP)+,(R3)+          ;OVERLAY NAME WITH
            MOV     (SP)+,(R3)+          ;    3 TRIADS
            MOV     (SP)+,(R3)+          ;    FROM STACK
;
            MOV     XATBNP,R1            ;TABLE SIZE
            SUB     XATBP,R1
            INC     R1
            BIC     #7,R1                ;SIZE DIVISIBLE BY 8
            SWAB    R0                   ;SWAP FOR ADRS.
            BIC     #100000,R0           ;MAKE HASH POSITIVE
XHASH5:     SUB     R1,R0
            CMP     R0,R1                ;MAKE HASH.LT.SIZE
            BGE     XHASH5
            TST     R0
            BPL     XHASH6               ;BUT NOT NEGATIVE
            ADD     R1,R0
XHASH6:     BIC     #7,R0                ;MAKE HASH DIVISIBLE BY 8
            BNE     XHASH7               ;CONT ALLOW ZERO
            MOV     #10,R0
XHASH7:     MOV     R0,(R3)+             ;SAVE HASH OVER NAME
XHASH8:     JSR     R7,XRSTR
            RTS     R7
; HASH CHAR TBL
HTBL:       .BYTE   377,377,377,377,377,377,377,377
            .BYTE   377,377,377,377,377,377,377,377
            .BYTE   377,377,377,377,377,377,377,377
            .BYTE   1,377,377,377,377,377,377,377
            .BYTE   377,377,377,377,377,377,377,377
            .BYTE   2,3,4,5,6,7,10,11
            .BYTE   12,13,377,377,377,377,377,377
            .BYTE   14,15,16,17,20,21,22,23
            .BYTE   24,25,26,27,30,31,32,33
            .BYTE   34,35,36,37,40,41,42,43
            .BYTE   44,45,46,377,377,377,377,377
; ILLEGAL CHARACTER
XHASH9:     TST     (SP)+                ;POP STACK
            DEC     R4
            CMP     R4,#-4
            BNE     XHASH9
            CLR     6(SP)                ;SET FAILED INDICATOR
            BR      XHASH8
;
;////////////////////////////////////////////////////////////////
;////////////////////////// VECSIM //////////////////////////////
;////////////////////////////////////////////////////////////////
;RFO
;
VECSIM:     CLRB    M360
            MOV     #IFWA,IBWA           ;ADDRESS REG     (SIMULATED)
            MOV     #IFBC,IBBC           ;BYTE COUNT REG  (SIMULATED)
            MOV     #IFST,IBST           ;STATUS REG      (SIMULATED)
            MOV     #IFCD,IBCD           ;COMMAND REG     (SIMULATED)
            RTS     R7
;////////////////////////////////////////////////////////////////
;////////////////////////// VEC360 //////////////////////////////
;////////////////////////////////////////////////////////////////
;RFO
;
VEC360:     TSTB    M360                 ;360 IN SYSTEM ?
            BEQ     VEC020               ;NO
            MOV     #162004,IBWA         ;ADDRESS REG FOR I/F
            MOV     #162002,IBBC         ;BYTE COUNT REG FOR I/F
            MOV     #162006,IBST         ;STATUS REG FOR I/F
            MOV     #162000,IBCD         ;COMMAND REG FOR I/F
VEC020:     RTS     R7
;////////////////////////////////////////////////////////////////
;/////////////////////////// WAIT ///////////////////////////////
;//WAIT 100 MS
;
WAITMS:     JSR     R7,XSAVE
WAIT10:     MOV     #3,R2
WAIT20:     MOV     #177777,R3
```

```
WAIT30: DEC    R3
        BNE    WAIT30
        DEC    R2
        BNE    WAIT20
        JSR    R7,XRSTR
        RTS    R7
;
;////////////////////////////////AUTHORITY TABLE LOOKUP///////////////////
;RE-ENTRANT
XALKP:  JSR    R7,XSAVE
        JSR    R7,MOVE              ;MOVE ITEM TO STACK
;   CHECK FOR CONCATENATION
        CMP    10(R3),#LCCCAT       ;CONCATENATION ?
        BNE    XALK03               ;NO-CONTINUE
        MOV    #LCALFA,10(R3)       ;RESTORE LEX CODE ALPHA
        CMP    14(R3),#9.           ;ROOM FOR EXTRA CHARACTER ?
        BGE    XALK03               ;NO
        MOV    14(R3),R2            ;YES-GET COUNT AND ADD TO STACK
        ADD    SP,R2                ; POSITION TO FIND END OF ITEM,
        MOVB   #CCATCH,(R2)         ; THEN MOVE CONCAT. CHAR. TO END
XALK03: MOV    SP,R3                ;ADDRESS OF ITEM FOR HASH
XALK05: JSR    R7,XHASH             ;COMPUTE HASH TOTALS
        TST    R3                   ;LEGAL ?
        BEQ    XALK60               ;NO
        MOV    R3,R5                ;SAVE HASH ADDRESS
        MOV    6(R3),R3             ;RELATIVE START ADDRESS
        ADD    XATBP,R3             ;BEGINNING OF TABLE
        SUB    #10,R3               ;BACKUP 1 ENTRY
        MOV    R3,R2                ;SAVE START POSOTION
        MOV    R3,R0                ;SAVE R3
XALK10: MOV    R0,R3                ;RESTORE R3
        JSR    R7,XADVS             ;ADVANCE TO NEXT ENTRY
;
        MOV    R3,R0                ;SAVE R3 AGAIN
        TST    (R3)                 ;TEST VACANT
        BEQ    XALK60               ;YES-NO MATCH FOUND
XALK15: CMP    R3,R2                ;TEST COMPLETELY AROUND
        BEQ    XALK40               ;YES, TABLE FULL
        TST    6(R3)                ;AVAILABLE SLOT ?
        BEQ    XALK10               ;YES-KEEP LOOKING
        MOV    R5,R4                ;HASH ADDRESS
        CMP    (R3)+,(R4)+          ;1ST TRIAD
        BNE    XALK10               ;NO MATCH
        ADD    #4,R3                ;MOVE TO PROPERTY BITS
        BIT    #80ID,(R3)           ;SEC OFF ?
        BEQ    XALK20               ;NO
        MOV    20(SP),R1            ;ENTERED 9 HAR
        CMP    14(R1),#6            ; ID ?
        BGT    XALK20               ;YES
        TST    -(R3)                ;NO-TEST 3RD TRIAP
        BR     XALK30               ;AND TEST 3RD TRIAD
XALK20: BIT    #104000,(R3)         ;IEST PREFIX OR ID
        BNE    XALK50               ;YES
        SUB    #4,R3                ;NO
        CMP    (R4)+,(R3)+          ;2ND TRIAD
        BNE    XALK10               ;NO MATCH
XALK30: CMP    (R4)+,(R3)+          ;3RD TRIAD
        BNE    XALK10               ;NO MATCH
        BR     XALK50               ;MATCH FOUND
XALK40: CLR    R3                   ;MARK TABLE FULL
XALK50: MOV    R3,20(SP)            ;UPDATE STACK R3
        ADD    #10.,SP              ;AND POP STACK
        JSR    R7,XRSTR
        RTS    R7
;
XALK60: MOV    #-1,R3               ;SET 'NOT FOUND' AND
        BR     XALK50               ; LEAVE
;
; AUTHORITY TABLE ADVANCE
;
XADVS:  JSR    R7,XSAVE
        ADD    #10,R3               ;BUMP TO NXT ENTRY
        MOV    XATBNP,R2            ;COMPUTE REAL END
        SUB    XATBP,R2
```

―Continued

```
            BIC     #7,R2                   ;   (IE, SIZE DIVISIBLE BY 8)
            ADD     XATBP,R2
            CMP     R3,R2                   ;TEST END
            BLO     XADV10                  ;NO
            MOV     XATBP,R3                ;YES
XADV10:     MOV     R3,6(SP)                ;BACK TO STACK
            JSR     R7,XRSTR
            RTS     R7
;
;
;
;
;
;
;////////////////////////////////////////////////////////////////////////
;///////////////////////////////// XSAVE ////////////////////////////////
;////////////////////////////////////////////////////////////////////////
;RFD
;
XSAVE:      SUB     #14,SP                  ;ADJUST STACK
            MOV     14(SP),(SP)             ;MOVE RETURN PC TO CURRENT SP
            MOV     R0,2(SP)                ;SAVE ALL REGISTERS (0-5)
            MOV     R1,4(SP)
            MOV     R2,6(SP)
            MOV     R3,10(SP)
            MOV     R4,12(SP)
            MOV     R5,14(SP)
            RTS     R7                      ;AND RETURN
;////////////////////////////////////////////////////////////////////////
;///////////////////////////////// XRSTR ////////////////////////////////
;////////////////////////////////////////////////////////////////////////
;RFD
;
XRSTR:      MOV     14(SP),R5               ;RESTORE R5 AND USE THIS PLACE
            MOV     (SP)+,12(SP)            ;TO SAVE RETURN PC
            MOV     (SP)+,R0                ;RESTORE REGISTERS 0-4
            MOV     (SP)+,R1
            MOV     (SP)+,R2
            MOV     (SP)+,R3
            MOV     (SP)+,R4
            RTS     R7                      ;AND RETURN
;
;////////////////////////////////////////////////////////////////////////
;///////////////////////////////////ENTER SENSE INFORMATION /////////////
;       TITLE   01 MAR 72
;RFD
;
XSENSE:     MOV     @#PSW,-(SP)             ;SAVE STATUS
            MOV     #340,@#PSW              ;NO INTERRUPTS
            JSR     R7,XSAVE
            MOV     #SENTSK,R3              ;SENSING STARTED ?
            JSR     R7,GETTAS               ;
            TSTB    (R3)                    ;
            BEQ     SNS050                  ;NO-IGNORE REQUEST
            MOV     6(SP),R3                ;YES-RESTORE INPUT R3 AND CONTINUE
            CLRB    MSNSI                   ;CLEAR XSENSI FLAG
            MOV     SENSQP,R2               ;'PUT' POINTER
SNS015:     MOVB    (R3)+,(R2)+             ;MOVE SENSE BYTES
            MOVB    (R3)+,(R2)+             ; TO QUEUE
            MOVB    (R3)+,(R2)+
            MOVB    (R3)+,(R2)+
            MOVB    (R3)+,(R2)+
;
            TSTB    MSNSI                   ;SENSE IMMEDIATE ?
            BNE     SNS040                  ;YES-DON'T UPDATE POINTERS
            CMP     R2,#IBSNQN              ;WRAPAROUND ?
            BLO     SNS020                  ;NO
            MOV     #IBSENQ,R2              ;
SNS020:     MOV     R2,SENSQP               ;RESTORE 'PUT'
SNS040:     CLRB    MSNSI                   ;RESET FLAG
SNS050:     TSTB    TASTTB+SENDSP-WAIT      ;SENSE WAITING ?
            BEQ     SNS060                  ;NO
```

```
           CLRB    TASTTB+SENDSP-WAIT    ;CLEAR WAIT
           MOV     #6,@IBBC              ;AND START SENSE
           MOV     SENSQG,@IBWA
SNSB60:    JSR     R7,XRSTR
           MOV     (SP)+,@#PSW
           RTS     R7
;
;
;    IMMEDIATE SENSE
;
XSENSI:    MOV     @#PSW,-(SP)           ;SAVE STATUS
           MOV     #340,@#PSW            ;NO INTERRUPTS
           JSR     R7,XSAVE
           MOV     #SENTSK,R3
           JSR     R7,GETTAS             ;SENSING STARTED ?
           TSTB    (R3)                  ;
           BEQ     SNS050                ;NO-IGNORE REQUEST
           MOV     6(SP),R3              ;YES-RESTORE INPUT R3 AND CONTINUE
           INCB    MSNSI                 ;
           MOV     SENSQG,R2             ; 'GET' POINTER
           SUB     #6,R2                 ;BACK UP
           CMP     R2,#IBSENQ            ; BACKWARDS WRAPAROUND ?
           BHIS    SNSI20                ;NO
           MOV     #IBSNQN,R2
           SUB     #4,R2
SNSI20:    MOV     R2,SENSQG             ;RESTORE 'GET'
           JMP     SNS015
;//////////////////////////////////////////////////////////////
;
; SYSTEM TRANSFER
;
;//////////////////////////////////////////////////////////////
XNFER:     MOV     (SP),-(SP)            ;MOVE PC DOWN
           MOV     4(SP),2(SP)           ;MOVE PS DOWN
           MOV     (SP),4(SP)            ;FOR RTS R7
           MOV     R5,-(SP)              ;SAVE OLD R5
           MOV     2(SP),R5              ;GET PC IN R5
           MOV     -2(R5),R5             ;GET EMT IN R5
           BIT     #200,R5               ;TEST BIT 7 IN EMT
           BNE     XNFER1                ;    SET.ACT LIKE JSR R7
           MOV     (SP),6(SP)            ;FOR RTS R5
           MOV     2(SP),(SP)            ;MOVE PC TO R5 RESTORE POS.
;
XNFER1:    ASLB    R5                    ;DOUBLE EMT COUNT FIELD
           BIC     #177400,R5            ;SAVE LOW 8 BITS
           ADD     #MONTBL,R5            ;CALC. TRANSFER VECTOR
;
           MOV     (R5),2(SP)            ;SAVE DESTINATION ADRS.
           MOV     (SP)+,R5              ;SET R5 TO SIMULATE JSR
           RTI                           ;GO TO DESTINATION
                                         ;    STACK KEEPS RTS VALUE.
;
ENDSYS=.
           .=37474+MEMCON

.WORD   STRTQT
           .WORD   SRTSYS
;
;////////////////////////////DEC TAPE 0 BOOT STRAP/////////////////////////
           .=37000+MEMCON
;
;
;
;
;                                        ;TPBOOT
;
           CLR     R0                    ;UNIT 0,BLOCK 0
           MOV     #550,SP               ;INIT STACK
READ:      MOV     #5,R1                 ;READ COMMAND
           BR      TPINIT
```

```
WRITE:  MOV     #15,R1                  ;WRITE COMMAND
;
;
TPINIT: RESET                           ;CLEAR OLD COMMANDS
        MOVB    R0,R4                   ;SAVE BLOCK NO.
        BIC     #177400, R4
        BIC     #377,R0                 ;SAVE UNIT NO.
        BIS     R0,R1                   ;   IN COMMAND
        BIS     #3,R0
        MOV     R0,RNUM + 2             ;AND IN BLK READS
        BIS     #4000,R0
        MOV     R0,RVNUM+2
        MOV     #40000+MEMCON,R0        ;COMPUTE WORDS
        SUB     #1000,R0
        ASR     R0
        NEG     R0
        MOV     R0,@#TCWC               ;   FOR WORD COUNT
        CLR     @#TCBA                  ;BUFFER START ADRS.
REVERS: MOV     R4    ,R0               ;BLK NO.
        SUB     #3,R0
RVNUM:  MOV     #4003,@#TCCM            ;READ BLK NO. REVERSE
        BIT     #100200,@#TCCM          ;TEST ERROR OR RDY
        BEQ     .-6
        BMI     TPERR                   ;ERROR
        SUB     @#TCDT,R0               ;TEST WITHIN RANGE
        BLT     REVERS                  ;NO
FORWRD: MOV     R4,R0                   ;YES, MOVE FORWARD
RNUM:   MOV     #0003,@#TCCM            ;READ BLK.NO. FORWARD
        BIT     #100200,@#TCCM          ;TEST ERROR OR RDY
        BEQ     .-6
        BMI     TPERR                   ;ERROR
RECOVR: SUB     @#TCDT,R0               ;TEST BLK FOUND
        BGT     FORWRD                  ;NO
        BLT     REVERS                  ;NO
        MOV     R1,@#TCCM               ;YES, READ OR WRITE
        BIT     #100200,@#TCCM
        BEQ     .-6
        BMI     TPERR1                  ;ERROR
;
        CMPB    #15,R1                  ;WRITE COMMAND?
        BEQ     TPEXIT                  ;YES - EXIT
        CMP     R4,#62                  ;SCAT TBL READ?
        BEQ     TPEXIT                  ;YES
        MOV     #TPBOOT,R0              ; COMPUTE SCAT SIZE
        SUB     #XATBL,R0
        INC     R0
        ASR     R0
        NEG     R0
        MOV     R0,@#TCWC               ;WORD CNT OF TBL
        MOV     #XATBL,@#TCBA           ;ADR OF SCAT TBL
        MOV     #05,R1                  ;READ UNIT 0
        MOV     #62,R4                  ;SCAT TABLE
        JMP     REVERS
;
;
TPERR:  TST     @#TCST                  ;TEST END ZONE
        BPL     TPERR1                  ;NO
        BIT     #4000,@#TCCM            ;YES, REVERSE
        BNE     FORWRD
        BR      REVERS
TPERR1: RESET                           ;STOP MOTION
        MOV     #TAPERR,R1              ;# TAPE ERROR#
        JSR     R7,TTYPRT
TPEXIT: RESET
        HALT
        JMP     @PROG1
TPERR:  .ASCII  /TAPE ERROR/
        .BYTE   0
        .=#37474+MEMCON
PROG1:  .WORD   0
PROG2:  .WORD   0
```

— Continued

```
;
;////////////////////////BOOTSTRAP LOADER////////////////////////////
;
;
        .=ENDSYS
;
;////////////////////////////////////////////////////////////////////
;//////////////////////////// CLRALC /////////////////////////////////
;////////////////////////////////////////////////////////////////////
;RFD
;
CLRALC: JSR     R7,XSAVE
        CLR     MCSREG              ;CLEAR CORE IMAGE REGISTERS (STATUS)
        CLR     MALREG              ; (ALARM)
        CLR     MMOREG              ; (MODE)
        CLR     **CRS               ;DISABLE ALARM CNSLE INTERRUPT
;
        TSTB    MALC                ;A/C IN SYSTEM ?
        BEQ     CLRA50              ;NO
;
        MOV     #3,R3               ;CLEAR A/C REGISTERS (MODE)
        JSR     R7,CLRREG
        MOV     #5,R3               ; TAMPER REG
        JSR     R7,CLRREG
        MOV     #2,R3               ; ALARM REG.
        JSR     R7,CLRREG
        MOV     #1,R3               ; STATUS REG.
        JSR     R7,CLRREG
CLRA50:  JSR     R7,XRSTR
        RTS     R7
;
;////////////////////////////////////////////////////////////////////
;//////////////////////////// CLRREG /////////////////////////////////
;////////////////////////////////////////////////////////////////////
;RFD
;
CLRREG: JSR     R7,XSAVE
        MOV     **CRB,R0            ;CLEAR 'DONE' IN RECEIVE STATUS
        MOV     #20,R0
        BIS     R3,R0               ;BUILD SELECT COMMAND
        MOVB    R0,**CTB            ;SELECT REGISTER
CLRR10: TSTB    **CRS               ;WAIT FOR DONE
        BPL     CLRR10
        MOV     **CRB,R0            ;CLEAR 'DONE'
        MOVB    #40,**CTB           ;CLEAR REGISTER
CLRR20: TSTB    **CRS               ;WAIT FOR DONE
        BPL     CLRR20
        MOVB    **CRB,R0            ;CLEAR DONE
        JSR     R7,XRSTR
        RTS     R7
        .END
```

Of course, many other programming languages could be used to meet the requirements set out in this specification and claims.

In addition, it should be noted that any ordinarily skilled systems programmer may construct source programs which would accomplish the same ends within the scope of the claims as are accomplished by the preceding program embodiments.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An electronic system for preventing undetected alteration, destruction, removal or reproduction of data available to a central processing unit (CPU) of a computer implementing at least one problem process and an operating process comprising:

means for monitoring operating statements communicated to the CPU for the operating process and means for monitoring problem steps to be used by the operating process in governing the problem process, both said monitoring means electronically reflecting the nature of the information monitored;

means for comparing the monitored information with predetermined standards comprising representations of operating statements and problem steps; and means for initiating a predetermined counteraction when the comparing means electronically indicates that the monitored information is outside the limits defined by the predetermined standards.

2. A system as defined in claim 1 comprising control and library devices and data channels connecting the CPU and corresponding control and library devices and wherein both said monitoring means comprise means for electronically reflecting electric signal pulses transferred along the data channels to the comparing means without altering or interrupting the flow of signal pulses between the control and library devices and the CPU.

3. A system as defined in claim 1 wherein said comparing means is encompassed within a secondary computer comprising:
   a memory device controlled by the secondary computer, the memory device storing a collection of representations of statements and problem steps requiring special authority; and
   means comprising the comparing means and communicating with the memory device for electronically retrieving the representations from the memory device for comparison with information monitored by at least one of the operating statement and problem step monitoring means.

4. A system as defined in claim 1 wherein said initiating means comprises means for recording events identifying the monitored information which is found outside limits defined by the predetermined standards and means for energizing a humanly discernable alarm.

5. A system as defined in claim 1 wherein said initiating means comprises means for suppressing unauthorized operating statements and problem steps before the effect thereof inheres in the operating process of the CPU.

6. A system as defined in claim 1 further comprising means for sensing physical tampering at at least one location in the system and developing an electronic tamper signal, means communicating the tamper signal to the initiating means and means comprising part of the initiating means for generating a tamper alert counteraction in response to the tamper signal.

7. A method for preventing undetected alteration, removal, destruction or inspection of data available to a central processing unit (CPU) comprising the steps of:
   establishing a problem process in the CPU for processing problem data to problem results;
   governing the problem process with an operating process, which operating process responds to operating statements and implements program steps;
   sensing first electric pulse representations of the operating statements to develop a corresponding electric pulse sequence which represents the actual operating statements used;
   sensing second electric pulse representations of the problem steps to develop a corresponding electric pulse sequence which represents the actual problem steps used;
   comparing at least one of the corresponding electric pulse sequences with a predetermined standard comprising electric pulse representations of corresponding standard operating statements and standard problem steps; and
   electronically initiating predetermined counteraction when any part of the pulse sequence is found outside the limits defined by the predetermined standard.

8. A method as defined in claim 7 wherein said comparing step is preceded by creating a comparative standard by developing a table of expected statistics comprising a collection of electronic pulse representations indentifying permissible operating statements and problem steps and storing the table of expected statistics in a memory which is separate from the CPU.

9. A method as defined in claim 8 wherein said predetermined counteraction comprises suppressing all operating statements and problem steps.

10. A method as defined in claim 8 wherein said predetermined counteraction comprises generating a humanly discernable alarm and recording the identification of the illegitimate operating statement or problem step.

11. A method for electronically monitoring operating statements to prevent undetected alteration, removal, destruction, or inspection of data available to a central processing unit (CPU), the steps of:
   preparing a vocabulary of operating statements which are permitted only by special authority;
   developing a collection of authority codes which is associated with the prepared vocabulary of operating statements and electronically storing the collection;
   accompanying each authorized operating statement communicated to the CPU with an authority code;
   scanning all operating statements submitted to the CPU to detect the existence and identity of the authority code;
   comparing the data bit representation of the authority code with the data bit representation of the collection of codes to determine if the authority code is found accompanying the operating statement; and
   initiating a predetermined electronically responsive counteraction where the operating statement is not accompanied by an authority code which is found in the collection of codes.

12. A method as defined in claim 11 wherein said preparing step comprises requiring operating statements to be accompanied by any one of a range of authority levels represented by a unique code corresponding to the nature of the operating statement, including no authority represented by the absence of an authority code as a lower bound of the range.

13. A method as defined in claim 11 wherein said accompanying step is preceded by entering a plurality of enabling codes into a card punch device and mechanically punching a unique code in each of a plurality of cards; concealing the punched code in an array of punches; and placing at least one of the encoded cards so as to be associated with cards carrying operating statements to be transferred to the CPU.

14. A method as defined in claim 13 wherein said punching step comprises omitting a selected digit from the range of authority codes to minimize predictability of the codes.

15. A method as defined in claim 11 wherein said accompanying step comprises entering authority codes at a keyboard terminal so as to be associated with corresponding operating statements transmitted to the CPU.

16. A method as defined in claim 11 wherein said electronically storing step comprises accumulating authority codes in a bit register, each bit being specifically identified to a unique authority code; and setting the corresponding bit in the register for each of the codes detected in the scanning step thereby preventing use of a single authority code more than once.

17. A method as defined in claim 11 further comprising:

identifying a vocabulary of operating statements, each statement in the vocabulary being restricted;

collecting the vocabulary of restricted operating statements in a table and electronically storing the table;

comparing the data bit representation of each operating statement submitted to the CPU with the table prior to scanning the operating statements for an accompanying authority code; and initiating a predetermined counteraction when the operating statement submitted to the CPU is found in the vocabulary of restricted operating statements.

18. A system for electronically monitoring operating statements in a digital computer to prevent undetected alteration, removal, destruction or inspection of data available to a central processing unit (CPU) comprising:

means compiling a vocabulary of data bit representations of operating statements permitted only by special authority;

means identifying each of the data bit representations of the operating statements in the vocabulary with an authority code;

means storing the vocabulary of data bit representations of operating statements and associated authority codes in an electronically retrievable form;

means scanning all data bit representations of operating statements submitted to the CPU to detect the existence and identity of any authority code associated with the operating statements submitted;

means comparing authority codes associated with the submitted representations of operating statements with the authority code associated with the corresponding stored representations of operating statements; and means initiating a predetermined electronically responsive counteraction when the scanned authority code does not match the stored authority code for corresponding operating statements.

19. A system as defined in claim 18 further comprising:

additional means collecting a vocabulary of data bit representations of restricted operating statements and means electronically storing the data bit representations of the restricted operating statements in a retrievable form;

means comparing the representation of each operating statement submitted to the CPU with the stored vocabulary of representations of restricted operating statements; and means initiating a predetermined electronically responsive counteraction when the representations of the operating statements submitted to the CPU are found in the vocabulary of representations of restricted operating statements.

20. A system as defined in claim 18 comprising means for mechanically punching authority codes in random order in card stock; means for communicating enabling codes to the punching means; and means for assembling the cards into a deck.

* * * * *